US012210092B1

(12) United States Patent
Fonts et al.

(10) Patent No.: US 12,210,092 B1
(45) Date of Patent: Jan. 28, 2025

(54) CONTINUOUS-WAVE RADAR SYSTEM FOR DETECTING FERROUS AND NON-FERROUS METALS IN SALTWATER ENVIRONMENTS

(71) Applicant: HG Partners, LLC, Dallas, TX (US)

(72) Inventors: Carlos Alberto Fonts, Dallas, TX (US); Carlos Ernesto Fonts, Dallas, TX (US); Mark Allen O'Hair, Santa Fe, NM (US); John Richard O'Hair, Ruskin, FL (US)

(73) Assignee: HG Partners, LLC, Dallas, TX (US)

( * ) Notice: Subject to any disclaimer, the term of this patent is extended or adjusted under 35 U.S.C. 154(b) by 0 days.

(21) Appl. No.: 18/937,794

(22) Filed: Nov. 5, 2024

Related U.S. Application Data

(63) Continuation-in-part of application No. 18/625,853, filed on Apr. 3, 2024, which is a continuation of
(Continued)

(51) Int. Cl.
*G01S 13/89* (2006.01)
*B63B 21/20* (2006.01)
(Continued)

(52) U.S. Cl.
CPC .............. *G01S 13/89* (2013.01); *B63B 21/56* (2013.01); *B63B 35/00* (2013.01); *G01S 7/04* (2013.01);
(Continued)

(58) Field of Classification Search
CPC . G01S 7/025; G01S 13/89; G01S 7/04; G01S 7/414; G01S 13/32; G01S 13/885;
(Continued)

(56) References Cited

U.S. PATENT DOCUMENTS 5,179,542 A 1/1993 Reese et al.
5,303,207 A * 4/1994 Brady .................... H04B 11/00
367/134

(Continued)

FOREIGN PATENT DOCUMENTS

AU 2020217910 A1 8/2021
CN 106275335 A 1/2017

(Continued)

OTHER PUBLICATIONS

Alan Payne, "The Inductance of Ferrite Rod Antennas," Research Gate, May 13, 2021.

(Continued)

*Primary Examiner* — Peter M Bythrow
(74) *Attorney, Agent, or Firm* — NEO IP

(57) ABSTRACT

The present invention includes systems and methods for a continuous-wave (CW) radar system for detecting, geolocating, identifying, discriminating between, and mapping ferrous and non-ferrous metals in brackish and saltwater environments. The radar system (e.g., the CW radar system) generates multiple extremely low frequency (ELF) electromagnetic waves simultaneously and uses said waves to detect, locate, and classify objects of interest. These objects include all types of ferrous and non-ferrous metals, as well as changing material boundary layers (e.g., soil to water, sand to mud, rock to organic materials, water to air, etc.). The radar system (e.g., the CW radar system) is operable to detect objects of interest in near real time.

31 Claims, 156 Drawing Sheets
(69 of 156 Drawing Sheet(s) Filed in Color)

Related U.S. Application Data application No. 18/336,612, filed on Jun. 16, 2023, now Pat. No. 11,960,000, which is a continuation-in-part of application No. 17/849,170, filed on Jun. 24, 2022, now Pat. No. 11,686,839, which is a continuation-in-part of application No. 17/830,035, filed on Jun. 1, 2022, now Pat. No. 11,662,458, which is a continuation of application No. 17/498,420, filed on Oct. 11, 2021, now Pat. No. 11,353,576, which is a continuation of application No. 17/033,046, filed on Sep. 25, 2020, now Pat. No. 11,150,341.

(60) Provisional application No. 62/978,021, filed on Feb. 18, 2020.

(51) Int. Cl.

| | |
|---|---|
| ***B63B 21/56*** | (2006.01) |
| ***B63B 35/00*** | (2020.01) |
| ***G01S 7/04*** | (2006.01) |
| ***G01S 13/32*** | (2006.01) |
| ***G01V 9/00*** | (2006.01) |

(52) U.S. Cl.
CPC ................ *G01S 13/32* (2013.01); *G01V 9/00* (2013.01); *B63B 21/20* (2013.01)

(58) Field of Classification Search
CPC ......... B63B 21/20; B63B 21/56; B63B 35/00; G01V 3/12; G01V 3/15; G01V 9/00
See application file for complete search history.

(56) References Cited

U.S. PATENT DOCUMENTS

| | | | | |
|---|---|---|---|---|
| 5,315,561 | A | 5/1994 | Grossi | |
| 5,361,029 | A | 11/1994 | Rider et al. | |
| 5,525,907 | A | 6/1996 | Frazier | |
| 5,535,176 | A * | 7/1996 | Yang | G01S 15/86 367/24 |
| 5,633,649 | A | 5/1997 | Grossi et al. | |
| 6,850,173 | B1 * | 2/2005 | Steinbrecher | G01V 1/38 340/984 |
| 6,859,038 | B2 | 2/2005 | Ellingsrud et al. | |
| 6,972,690 | B1 | 12/2005 | Schaefer | |
| 7,336,078 | B1 * | 2/2008 | Merewether | G01V 3/15 324/67 |
| 7,457,196 | B2 * | 11/2008 | Acker | G01S 15/89 367/88 |
| 7,657,391 | B2 | 2/2010 | Alumbaugh et al. | |
| 7,755,360 | B1 | 7/2010 | Martin | |
| 8,208,478 | B2 * | 6/2012 | Robinson | H04L 12/4616 340/853.3 |
| 8,237,560 | B2 | 8/2012 | Candy | |
| 8,299,936 | B2 | 10/2012 | Papadopoulos | |
| 8,373,596 | B1 | 2/2013 | Kimball et al. | |
| 8,604,986 | B2 | 12/2013 | Lucas | |
| 9,647,861 | B1 | 5/2017 | Loren et al. | |
| 10,101,438 | B2 | 10/2018 | Subburaj et al. | |
| 10,663,579 | B2 * | 5/2020 | Stanley | G01S 13/885 |
| 11,601,205 | B2 * | 3/2023 | Ko | H04B 11/00 |
| 2002/0033758 | A1 * | 3/2002 | Hudson | G01V 3/12 340/573.1 |
| 2002/0093338 | A1 | 7/2002 | Rowan | |
| 2005/0212520 | A1 | 9/2005 | Homan et al. | |
| 2008/0015779 | A1 | 1/2008 | Alumbaugh et al. | |
| 2008/0015809 | A1 | 1/2008 | Alumbaugh et al. | |
| 2008/0061790 | A1 | 3/2008 | Strack | |
| 2008/0224704 | A1 * | 9/2008 | Westersten | G01V 3/104 324/326 |
| 2008/0284636 | A1 | 11/2008 | Hausner et al. | |
| 2009/0140741 | A1 | 6/2009 | Tenghamn et al. | |
| 2011/0136444 | A1 | 6/2011 | Rhodes et al. | |
| 2011/0169638 | A1 * | 7/2011 | Krumhansl | G01V 1/001 340/566 |
| 2013/0021192 | A1 | 1/2013 | Daly | |
| 2013/0278439 | A1 | 10/2013 | Stamatescu et al. | |
| 2014/0012505 | A1 | 1/2014 | Smith | |
| 2015/0377655 | A1 * | 12/2015 | Dorfman | G01V 3/12 385/12 |
| 2016/0245945 | A1 * | 8/2016 | Rokkan | B63B 35/00 |
| 2016/0266246 | A1 * | 9/2016 | Hjelmstad | G01S 15/86 |
| 2017/0307670 | A1 | 10/2017 | Olsson | |
| 2018/0074174 | A1 * | 3/2018 | Beer | G01S 7/539 |
| 2018/0081355 | A1 * | 3/2018 | Magy | H04B 17/27 |
| 2018/0267140 | A1 | 9/2018 | Corcos et al. | |
| 2018/0299543 | A1 | 10/2018 | Lomnitz et al. | |
| 2018/0299544 | A1 | 10/2018 | Shao et al. | |
| 2019/0020417 | A1 | 1/2019 | Zhou | |
| 2021/0031885 | A1 * | 2/2021 | Suarez Montalvo | G08G 3/02 |
| 2021/0255357 | A1 | 8/2021 | Fonts et al. | |
| 2022/0026563 | A1 | 1/2022 | Fonts et al. | |
| 2023/0110848 | A1 | 4/2023 | Fonts et al. | |
| 2023/0184925 | A1 | 6/2023 | Fonts et al. | |
| 2023/0296759 | A1 | 9/2023 | Fonts et al. | |
| 2023/0333244 | A1 | 10/2023 | Fonts et al. | |
| 2024/0272295 | A1 | 8/2024 | Fonts et al. | |

FOREIGN PATENT DOCUMENTS

| | | | |
|---|---|---|---|
| CN | 104535063 | B | 7/2017 |
| CN | 108459152 | A | 8/2018 |
| CN | 110462433 | A | 11/2019 |
| CN | 110758679 | A | 2/2020 |
| KR | 101784178 | B1 | 11/2017 |
| RU | 2670175 | C1 | 10/2018 |
| WO | 2021205769 | A1 | 10/2021 |

OTHER PUBLICATIONS

Alan Payne, "The Radiation Resistance of Ferrite Rod Antennas," Research Gate, Jun. 6, 2021.
Alan Payne, "The Self-Capacitance of Single Layer Toroidal Inductors with Ferrite Cores," Aug. 2015.
Extremely Low Frequency (ELF) Radar (Active Magnetic Anomaly Detection) Moser, Paul M. (N62269-89-C-0561 Naval Air Development Center, Code 501, Warminster, PA 1897 4 Unclassified Research Contract Report Approved for public release, distribution unlimited (Year: 1989).
H. Qi, L. Guo and Y. Liang, "Electromagnetic wave propagation in weak magnetic field water environment," 2016 IEEE International Geoscience and Remote Sensing Symposium (IGARSS), Beijing, China, 2016, pp. 2650-2653, doi: 10.1109/IGARSS.2016.7729684 (Year: 2016).
M. Islam, M. U. Afzal, M. Ahmad and T. Tauqeer, "Simulation and modeling of ground penetrating RADARs," 2012 International Conference on Emerging Technologies, Islamabad, Pakistan, 2012, pp. 1-6, doi: 10.1109/ICET.2012.6375487 (Year: 2012).

* cited by examiner

FIG. 1E
FIG. 1F
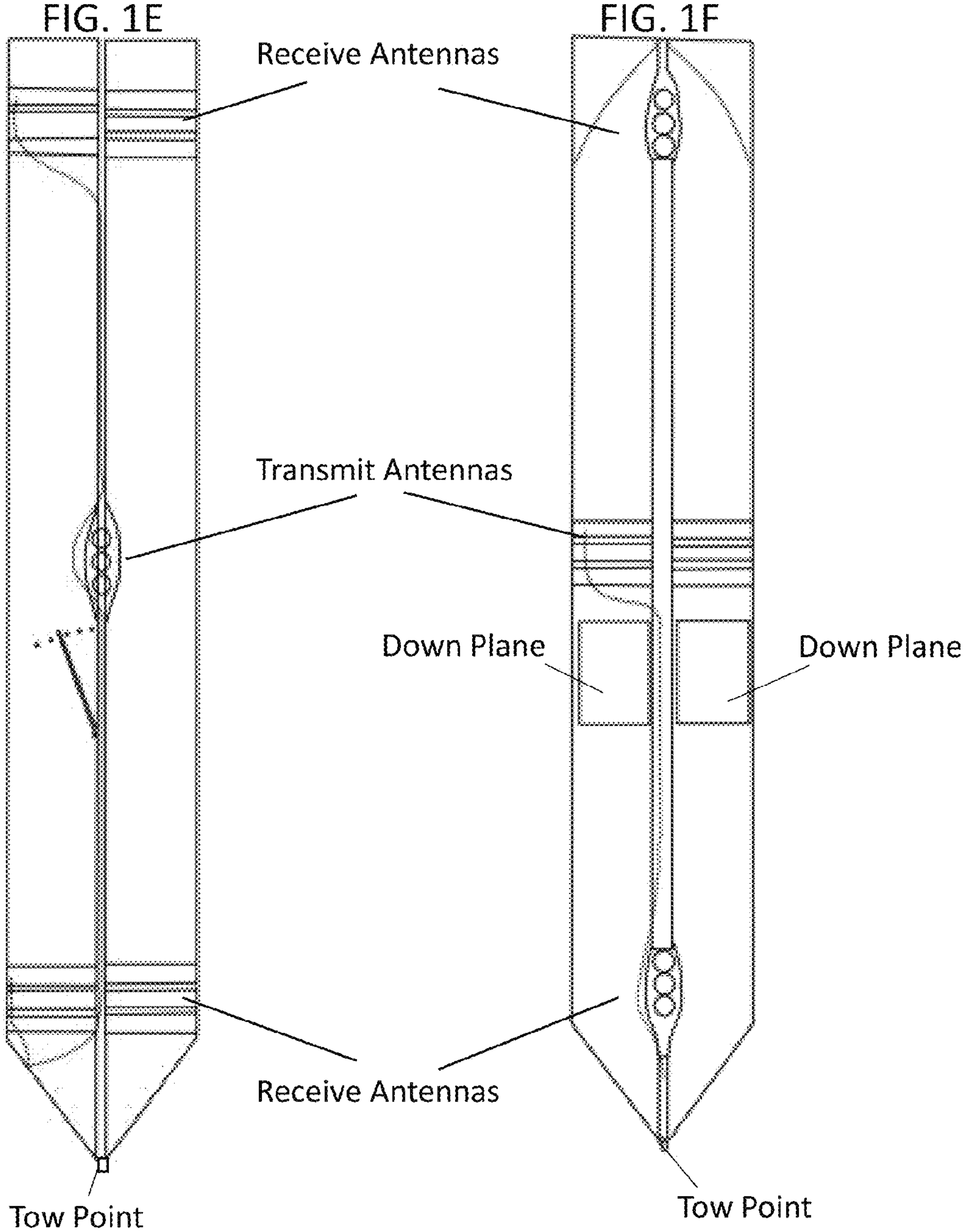
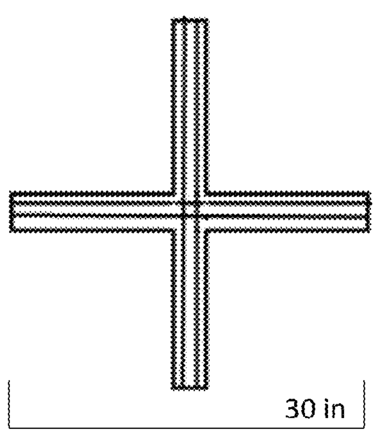
FIG. 1G

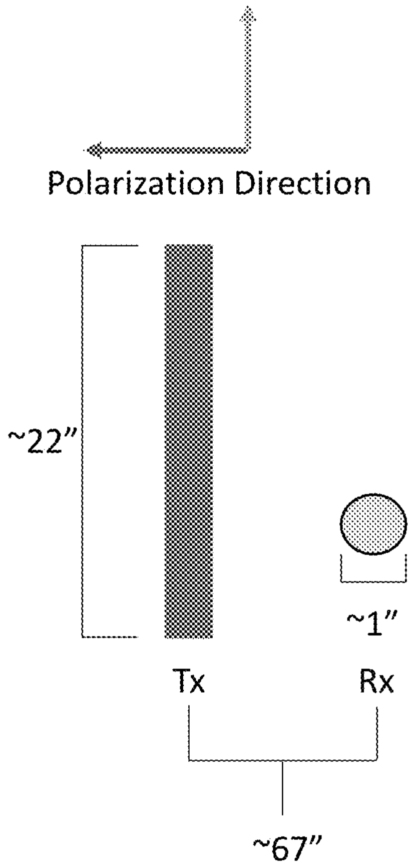
FIG. 3A
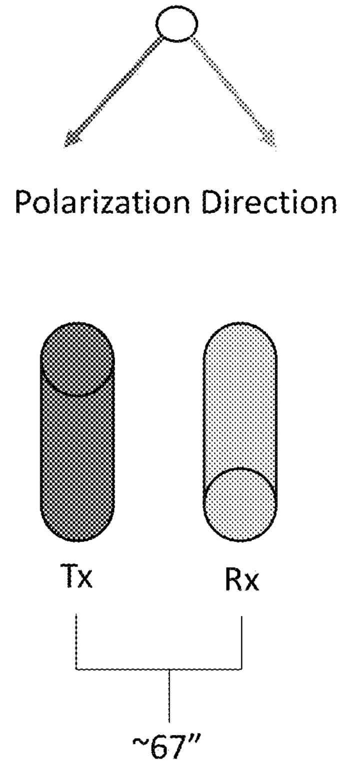
FIG. 3B
FIG. 3C
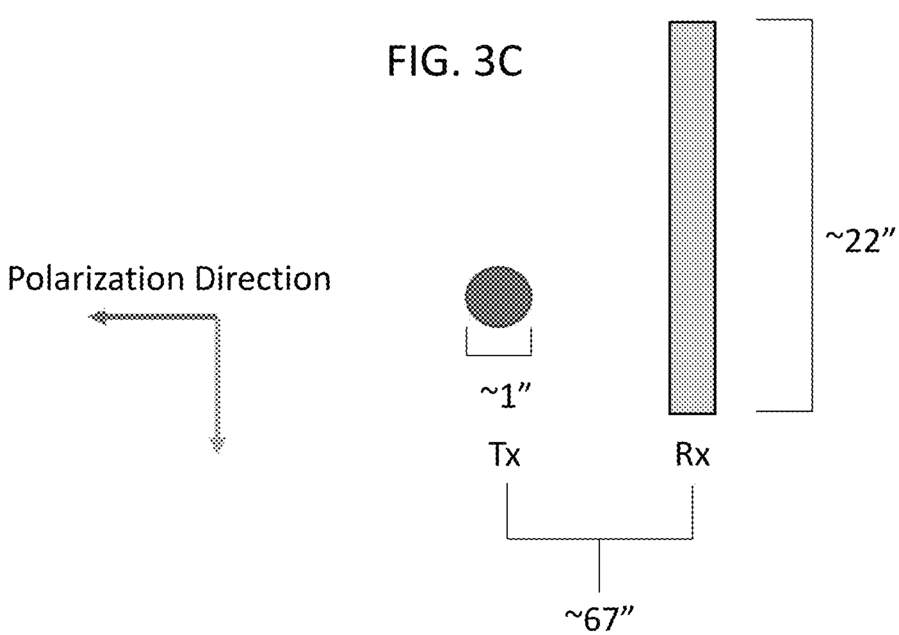

Variance in Signal Strength between $Rx_1$ & $Rx_2$

Receiver 1

Receiver 2

Lower Frequency

Tx Frequency

Higher Frequency

Variance in Frequency (Doppler)

| | North Value (°) | West Value (°) | Signal Strength (σ) |
|---|---|---|---|
| A | 24.46314408 | 81.9536605 | 32.687 |
| B | 24.46342287 | 81.95370989 | 31.178 |
| C | 24.46331495 | 81.95335421 | 28.946 |
| D | 24.4630991 | 81.95299853 | 39.20 |
| E | 24.46333292 | 81.95291948 | 30.527 |
| F | 24.46312607 | 81.95260332 | 27.61 |
| G | 24.46253248 | 81.9515758 | 27.916 |
| H | 24.46250550 | 81.9513584 | 28.032 |
| I | 24.46234360 | 81.94098301 | 33.850 |
| J | 24.46165112 | 81.95090400 | 24.173 |
| K | 24.46078777 | 81.95089416 | 26.270 |
| L | 24.45966362 | 81.95089422 | 26.449 |
| M | 24.46256956 | 81.95230694 | 25.790 |
| N | 24.46275736 | 81.95289974 | 30.164 |
| O | 24.46259548 | 81.93530874 | 29.748 |
| P | 24.46273039 | 81.95341351 | 33.279 |
| Q | 24.46259549 | 81.95357159 | 35.243 |
| R | 24.46276639 | 81.95462976 | 27.735 |
| S | 24.4633869 | 81.9540653 | 25.268 |
| T | 24.46384557 | 81.95457934 | 29.876 |

FIG. 13B

| | North Value (°) | West Value (°) | North | West |
|---|---|---|---|---|
| A | 25.529219 | 80.127794 | 25° 31.778 | 80° 7.609 |
| B | 25.529804 | 80.126822 | 25° 31.788 | 80° 7.609 |
| C | 25.529183 | 80.127077 | 25° 31.751 | 80° 7.625 |
| D | 25.527537 | 80.125656 | 25° 31.652 | 80° 7.538 |
| E | 25.527888 | 80.128038 | 25° 31.673 | 80° 7.682 |
| F | 25.527645 | 80.128203 | 25° 31.659 | 80° 7.692 |
| G | 25.528095 | 80.128128 | 25° 31.686 | 80° 7.688 |
| H | 25.529197 | 80.127968 | 25° 31.752 | 80° 7.678 |
| I | 25.529381 | 80.128003 | 25° 31.763 | 80° 7.680 |

FIG. 15B

| | Priority Zone |
|---|---|
| A | 1 |
| B | 2 |
| C | 3 |

FIG. 17B

| | Priority Zone |
|---|---|
| A | 1 |
| B | 2 |
| C | 3 |
| D | 4 |
| E | 5 |
| F | 6 |
| G | 7 |
| H | 8 |
| I | 9 |
| J | 10 |

FIG. 19B

| | North Value (°) | West Value (°) |
|---|---|---|
| A | 25.529219 | -80.1278 |
| B | 25.527 | -80.1285 |
| C | 25.5278 | -80.1269 |
| D | 25.5255 | -80.126 |
| E | 25.5286 | -80.1253 |
| F | 25.5267 | -80.1243 |

FIG. 20B

Primary Gain Stage

| R_1 (Ω) | R_4(Ω) | A (increase in Voltage) | Gain (dB) |
|---|---|---|---|
| 1,000,000 | 100,000 | 21.00 | 26.44 |
| 1,000,000 | 10,000 | 201.00 | 46.06 |
| 10,000,000 | 100,000 | 201.00 | 46.06 |
| 1,000,000 | 1,000 | 2001.00 | 66.02 |
| 10,000,000 | 10,000 | 2001.00 | 66.02 |
| 1,000,000 | 100 | 200001.00 | 86.02 |
| 10,000,000 | 1,000 | 200001.00 | 86.02 |
| 10,000,000 | 100 | 2000001.00 | 106.02 |

FIG. 23

Secondary Gain Stage

| Stage Settings (Ω) | R_3(Ω) | R_2(Ω) | A (increase in Voltage) | Gain (dB) |
|---|---|---|---|---|
| 10k\|\|15k\|\|20k\|\|33k\|\|47k\|\|75k | 3,551 | 10,000 | 0.36 | -8.99 |
| 10k\|\|15k\|\|20k\|\|33k\|\|47k | 3,728 | 10,000 | 0.37 | -8.57 |
| 10k\|\|15k\|\|20k\|\|33k | 4,049 | 10,000 | 0.40 | -7.85 |
| 10k\|\|15k\|\|20k | 4,615 | 10,000 | 0.46 | -6.72 |
| 10k\|\|15k | 6,000 | 10,000 | 0.60 | -4.44 |
| 10k\|\|20k | 6,667 | 10,000 | 0.67 | -3.52 |
| 10k\|\|33k | 7,674 | 1,000 | 0.77 | -2.30 |
| 10k\|\|47k | 8,246 | 10,000 | 0.82 | -1.68 |
| 10k\|\|75k | 8,824 | 10,000 | 0.88 | -1.09 |
| 10k | 10,000 | 10,000 | 1.00 | 0.00 |
| 15k | 15,000 | 10,000 | 1.50 | 3.52 |
| 20k | 20,000 | 10,000 | 2.00 | 6.02 |
| 33k | 33,000 | 10,000 | 3.30 | 10.37 |
| 47k | 47,000 | 10,000 | 4.70 | 13.44 |
| 75k | 75,00 | 10,00 | 7.50 | 17.50 |

FIG. 24

| **Stage 1 Setting (Ω)** | **1MΩ & 100kΩ** | **1MΩ & 10kΩ** | **1MΩ & 1kΩ** |
|---|---|---|---|
| Stage 2 Setting | 26.44 | 46.06 | 66.02 |
| 10k\|\|15k\|\|20k \|\|33k\|\|47k\|\| 75k | 17.45 | 37.07 | 57.03 |
| 10k\|\|15k\|\|20k \|\|33k\|\|47k | 17.87 | 37.49 | 57.45 |
| 10k\|\|15k\|\|20k \|\|33k | 18.59 | 38.21 | 58.17 |
| 10k\|\|15k\|\|20k | 19.73 | 39.35 | 59.31 |
| 10k\|\|15k | 22.01 | 41.63 | 61.59 |
| 10k\|\|20k | 22.92 | 42.54 | 62.50 |
| 10k\|\|33k | 24.15 | 43.76 | 63.73 |
| 10k\|\|47k | 24.77 | 44.39 | 64.35 |
| 10k\|\|75k | 25.36 | 44.98 | 64.94 |
| 10k | 26.44 | 46.06 | 66.02 |
| 15k | 29.97 | 49.59 | 69.55 |
| 20k | 32.46 | 52.08 | 72.05 |
| 33k | 36.81 | 56.43 | 76.40 |
| 47k | 39.89 | 59.51 | 79.47 |
| 75k | 43.95 | 63.57 | 83.53 |

FIG. 25

Gain Calculations

| Stage Setting (Ω) | R_3(Ω) | R_2(Ω) | A (increase in Voltage) | Gain (dB) |
|---|---|---|---|---|
| | 10,000 | 10,000 | 1.00 | 0.00 |
| | 15,000 | 10,000 | 1.50 | 3.52 |
| | 20,000 | 10,000 | 2.00 | 6.02 |
| | 33,000 | 10,000 | 3.30 | 10.37 |
| | 47,000 | 10,000 | 4.70 | 13.44 |
| | 75,000 | 10,000 | 7.50 | 17.50 |
| 10k\|\|15k | 6,000 | 10,000 | 0.67 | -4.44 |
| 10k\|\|20k | 6,666.67 | 10,000 | 0.67 | -3.52 |
| 10k\|\|33k | 7,674.42 | 10,000 | 0.77 | -2.30 |
| 10k\|\|47k | 8,245.61 | 10,000 | 0.82 | -1.68 |
| 10k\|\|75k | 8,823.53 | 10,000 | 0.88 | -1.09 |
| 10k\|\|15k\|\|20k | 4,615.38 | 10,000 | 0.46 | -6.72 |
| 10k\|\|15k\|\|20k\|\|33k | 4,049.08 | 10,000 | 0.40 | -7.85 |
| 10k\|\|15k\|\|20k\|\|33k\|\|47k | 3,727.92 | 10,000 | 0.37 | -8.57 |
| 10k\|\|15k\|\|20k\|\|33k\|\|47k\|\|75k | 3,551.39 | 10,000 | 0.36 | -8.99 |

FIG. 26

| Stage 1 Setting (Ω) | 1, 7, 6 (Ω) | 1, 7, 5 (Ω) | 1, 7, 4 (Ω) |
|---|---|---|---|
| Stage 2 Setting | 26.44 | 46.06 | 66.02 |
| Switch ON: 1, 2, 3, 4, 5, 6 | 17.45 | 37.07 | 57.03 |
| Switch ON: 1, 2, 3, 4, 5 | 17.87 | 37.49 | 57.45 |
| Switch ON: 1, 2, 3, 4 | 18.59 | 38.21 | 58.17 |
| Switch ON: 1, 2, 3 | 19.73 | 39.35 | 59.31 |
| Switch ON: 1, 2 | 22.01 | 41.63 | 61.59 |
| Switch ON: 1, 3 | 22.92 | 42.54 | 62.50 |
| Switch ON: 1, 4 | 24.15 | 43.76 | 63.73 |
| Switch ON: 1, 5 | 24.77 | 44.39 | 64.35 |
| Switch ON: 1, 6 | 25.36 | 44.98 | 64.94 |
| Switch ON: 1 | 26.44 | 46.06 | 66.02 |
| Switch ON: 2 | 29.97 | 49.59 | 69.55 |
| Switch ON: 3 | 32.46 | 52.08 | 72.05 |
| Switch ON: 4 | 36.81 | 56.43 | 76.40 |
| Switch: ON: 5 | 39.89 | 59.51 | 79.47 |
| Switch ON: 6 | 43.95 | 63.57 | 83.53 |

FIG. 27

| Resistance Values(Ω) | Total Resistance(Ω) | Gain (A) | dB | Dip |
|---|---|---|---|---|
| 20,000 | 20,000 | 3.53 | 10.94 | 1 |
| 15,000 | 15,000 | 4.37 | 12.80 | 2 |
| 10,000 | 10,000 | 6.05 | 15.64 | 3 |
| 4,700 | 4,700 | 11.74 | 21.40 | 1 & 2 |
| 3,300 | 3,300 | 16.30 | 24.25 | 1 & 3 |
| 1,500 | 1,500 | 34.67 | 30.80 | 2 & 3 |
| 750 | 750 | 68.33 | 36.69 | 4 |
| 470 | 470 | 108.45 | 40.70 | 1 & 4 |
| 330 | 330 | 154.03 | 43.75 | 2 & 4 |
| 100 | 100 | 506.00 | 54.08 | 5 |
| 50 | 50 | 1,011.00 | 60.10 | 3 & 4 |
| 20,000\|\| 15,000 | 8,571.43 | 6.89 | 16.77 | 1 & 5 |
| 20,000\|\| 10,000 | 6,666.67 | 8.58 | 18.66 | 2 & 5 |
| 20,000\|\| 4,700 | 3,805.67 | 14.27 | 23.09 | 3 & 5 |
| 20,000\|\| 3,300 | 2,832.62 | 18.83 | 25.50 | 4 & 5 |
| 20,000\|\| 1,500 | 1,395.35 | 37.19 | 31.41 | 6 |
| 20,000\|\|750 | 722.89 | 70.86 | 37.01 | 1 & 6 |
| 20,000\|\|330 | 459.21 | 110.97 | 40.90 | 2 & 5 |
| 20,000\|\|100 | 99.50 | 508.53 | 54.13 | 3 & 6 |
| 20,000\|\|50 | 49.98 | 1,013.53 | 60.12 | 4 & 6 |

FIG. 28A

| Resistance Values(Ω) | Resistance(Ω) | Gain (A) | dB | Dip |
|---|---|---|---|---|
| 15,000\|\|10,000 | 6,000 | 9.42 | 19.48 | 5 & 6 |
| 15,000\|\|4,700 | 3,578.68 | 15.11 | 23.59 | 7 |
| 15,000\|\|3,300 | 2,704.92 | 19.67 | 25.88 | 1 & 7 |
| 15,000\|\|1,500 | 1,363.64 | 38.03 | 31.60 | 2 & 7 |
| 15,000\|\|750 | 714.29 | 71.70 | 37.11 | 3 & 7 |
| 15,000\|\|470 | 455.71 | 111.81 | 40.97 | 4 & 7 |
| 15,000\|\|330 | 322.90 | 157.40 | 43.94 | 5 & 7 |
| 15,000\|\|100 | 99.34 | 509.37 | 54.14 | 6 & 7 |
| 15,000\|\|50 | 49.83 | 1,014.37 | 60.12 | 8 |
| 10,000\|\|4,700 | 3,197.28 | 16.79 | 24.50 | 1 & 9 |
| 10,000\|\|3,300 | 2,481.20 | 21.35 | 26.59 | 2 & 9 |
| 10,000\|\|1,500 | 1,304.35 | 39.72 | 31.98 | 3 & 8 |
| 10,000\|\|750 | 697.67 | 73.38 | 37.31 | 4 & 8 |
| 10,000\|\|470 | 448.90 | 113.50 | 41.10 | 5 & 8 |
| 10,000\|\|330 | 319.46 | 159.08 | 44.03 | 6 & 8 |
| 10,000\|\|100 | 99.01 | 511.05 | 54.17 | 9 |
| 10,000\|\|50 | 49.75 | 1,016.05 | 60.14 | 2 & 9 |
| 4,700\|\|3,300 | 1,938.75 | 27.05 | 28.64 | 3 & 9 |
| 4,700\|\|1,500 | 1,137.10 | 45.41 | 33.14 | 4 & 9 |
| 4,700\|\|750 | 646.79 | 79.08 | 37.96 | 5 & 9 |

FIG. 28B

| Resistance Values(Ω) | Resistance(Ω) | Gain (A) | dB | Dip |
|---|---|---|---|---|
| 4,700\|\|330 | 308.35 | 164.77 | 44.34 | 6 & 9 |
| 4,700\|\|100 | 97.92 | 516.74 | 54.27 | 7 & 9 |
| 4,700\|\|50 | 39.47 | 1,021.74 | 60.19 | 8 & 9 |
| 3,300\|\|1,500 | 1,031.25 | 49.97 | 33.97 | 10 |
| 3,300\|\|750 | 611.11 | 83.64 | 38.45 | 1 & 10 |
| 3,300\|\|470 | 411.41 | 123.75 | 41.85 | 2 & 10 |
| 3,300\|\|330 | 300.00 | 169.33 | 44.57 | 3 & 10 |
| 3,300\|\|100 | 97.06 | 521.30 | 54.34 | 4 & 10 |
| 3,300\|\|50 | 49.25 | 1,026.30 | 60.23 | 5 & 10 |
| 1,500\|\|750 | 500.00 | 102.00 | 40.17 | 6 & 10 |
| 1,500\|\|470 | 357.87 | 142.11 | 43.05 | 7 & 10 |
| 1,500\|\|330 | 270.49 | 187.70 | 45.47 | 8 & 10 |
| 1,500\|\|100 | 93.75 | 539.67 | 54.64 | 9 & 10 |
| 1,500\|\|50 | 49.39 | 1,044.67 | 60.38 | 11 |
| 750\|\|470 | 288.93 | 175.78 | 44.90 | 1 & 11 |
| 750\|\|330 | 229.17 | 221.36 | 46.90 | 2 & 11 |
| 750\|\|100 | 82.46 | 613.45 | 55.76 | 3 & 11 |
| 750\|\|50 | 46.68 | 1,078.33 | 60.66 | 4 & 11 |
| 470\|\|330 | 193.88 | 261.48 | 48.35 | 5 & 11 |
| 470\|\|100 | 82.46 | 613.45 | 55.76 | 6 & 11 |
| 470\|\|50 | 45.19 | 1,118.45 | 60.97 | 7 & 11 |
| 330\|\|100 | 76.74 | 659.03 | 56.38 | 8 & 11 |
| 330\|\|50 | 43.42 | 1,164.03 | 61.32 | 9 & 11 |
| 100\|\|50 | 33.33 | 1,516.00 | 63.61 | 10 & 11 |

FIG. 28C

See FIG. 56G

See FIG. 56F

| | |
|---|---|
| A | Raw time-domain data for four channels |
| B | Power at the transmitted low frequency at 5Hz rate for last six minutes |
| C | Real-time running standard deviation of the power (low frequency) for last six minutes |
| D | Power at the transmitted high frequency at 5Hz rate for last six minutes |
| E | Real-time running standard deviation of the power (high frequency) for last six minutes |
| F | Control of actual frequency being monitored in B-E and M, N, P, and Q |
| G | Map showing real-time survey tracks |
| H | Power spectral density in low and high channels for the last second |
| I | Monitor and control of the GPS units |
| J | Monitor of all internal stages within the analog amplifiers |
| K | Time-domain display of last second of data for internal stage currently monitored |
| L | Frequency-domain display of last second of data for internal stage currently monitored |
| M | Power in the low channel sampled at 1Hz rate displaying past six minutes |
| N | Real-time running standard deviation of the power (low frequency) for last six minutes |
| O | Sum of power in all channels over last five minutes |
| P | Power in the high channel sampled at 1Hz rate displaying past six minutes |
| Q | Real-time running standard deviation of the power (high frequency for last six minutes) |
| R | Amplifier board controls |

FIG. 56C

| | |
|---|---|
| A | Transmitter antenna (at least three) |
| B | Forward left receiver antennas (at least three) |
| C | Aft left receiver antennas (at least three) |
| D | Forward right receiver antennas (at least three) |
| E | Aft right receiver antennas (at least three) |
| F | Tow and data cable |

FIG. 58B

| | |
|---|---|
| A | Transmitter antenna (at least three) |
| B | Forward center receiver antennas (at least three) |
| C | Aft center receiver antennas (at least three) |
| D | Forward right receiver antennas (at least three) |
| E | Aft right receiver antennas (at least three) |
| F | Forward left receiver antennas (at least three) |
| G | Aft left receiver antennas (at least three) |
| H | Tow and data cable |

FIG. 59B

| | |
|---|---|
| A | Transmitter antenna (at least three) |
| B | Forward receiver antennas (two sets of at least three) |
| C | Aft receiver antennas (two sets of at least three) |

FIG. 60C

| | |
|---|---|
| A | Transmitter antenna (at least three) |
| B | Forward receiver antennas (three sets of at least three) |
| C | Aft receiver antennas (three sets of at least three) |

FIG. 61C

| | |
|---|---|
| A | Tx and Rx antennas collocated (operable to be separated locations) |
| B | Ocean floor |
| C | Sub-surface vessel in detection range |
| D | Surface vessel receiving detection notification or raw data |
| E | Ocean surface |
| F | Communication line to land-based control station |

FIG. 62B

| | |
|---|---|
| A | Tx and/or Rx node that acts as RF relay to surface vessel |
| B | Ocean floor |
| C | Tx and/or Rx node that acts as a wired relay to other Tx/Rx nodes |
| D | Final Tx and/or Rx node in fence line |
| E | Ocean surface |
| F | Receiving surface vessel |
| G | Sub-surface target moving along fence line |

FIG. 63B

| | |
|---|---|
| A | Rx or Tx/Rx node at end of fence line detecting sub-surface vessel and reporting via RF communication link |
| B | Ocean floor |
| C | Tx or Tx/Rx node in center of line acting addition as an RF relay node. Node is detecting both surface and sub-surface targets. |
| D | Rx or Tx/Rx node at end of line relaying received detection notifications (via RF link) and relaying to land-based control center via fiber-optic or wire |
| E | Ocean surface |
| F | Surface vessel being detected by D |
| G | Sub-surface vessel being detected by A |
| H | Fiber-optic or wire connecting fence line to land-based facility |
| I | Land-based control facility |

FIG. 64B

| | |
|---|---|
| A | Rx or Tx/Rx node detecting sub-surface target and relaying detection to intermediate node C |
| B | Ocean floor |
| C | Tx and/or Rx node detecting sub-surface target, transmitting detection to node D via RF link, and/or relaying node A detection |
| D | Tx or Tx/Rx node relaying detections from A and C to F via RF link |
| E | Ocean surface |
| F | Surface vessel (control) |
| G | Sub-surface vessel (target) |

FIG. 65B

CONTINUOUS-WAVE RADAR SYSTEM FOR DETECTING FERROUS AND NON-FERROUS METALS IN SALTWATER ENVIRONMENTS

CROSS REFERENCES TO RELATED APPLICATIONS

This application is a continuation-in-part of U.S. patent application Ser. No. 18/625,853, filed Apr. 3, 2024, which is a continuation of U.S. patent application Ser. No. 18/336,612, filed Jun. 16, 2023 and issued as U.S. Pat. No. 11,960,000, which is a continuation-in-part of U.S. patent application Ser. No. 17/849,170, filed Jun. 24, 2022 and issued as U.S. Pat. No. 11,686,839, which is a continuation in part of U.S. patent application Ser. No. 17/830,035, filed Jun. 1, 2022 and issued as U.S. Pat. No. 11,662,458, which is a continuation of U.S. patent application Ser. No. 17/498,420, filed Oct. 11, 2021 and issued as U.S. Pat. No. 11,353,576, which is a continuation of U.S. patent application Ser. No. 17/033,046, filed Sep. 25, 2020 and issued as U.S. Pat. No. 11,150,341, which claims priority from U.S. Provisional Patent Application 62/978,021, filed Feb. 18, 2020, each of which is incorporated herein by reference in its entirety.

BACKGROUND OF THE INVENTION

1. Field of the Invention

The present invention relates to continuous-wave radar systems and more specifically to detecting ferrous and non-ferrous metals in saltwater environments.

2. Description of the Prior Art

It is generally known in the prior art to provide devices capable of propagating electromagnetic waves through bodies of water, including seawater and brackish water.

Prior art patent documents include the following:

U.S. Patent Pub. No. 2016/0266246 for A system for monitoring a maritime environment by inventor Hjelmstad, filed Oct. 23, 2014 and published Sep. 15, 2016, is directed to a system for monitoring a maritime environment, the system including a plurality of detection devices for detecting objects in the maritime environment, the detection devices being configured for object detection according to different object detection schemes, and a data processing device having a communication interface and a processor, wherein the communication interface is configured to receive detection signals from the detection devices, and wherein the processor is configured to determine locations of the objects in the maritime environment upon the basis of the received detection signals within a common coordinate system.

U.S. Patent Pub. No. 2013/0278439 for Communication between a sensor and a processing unit of a metal detector by inventors Stamatescu, et al., filed Jun. 20, 2013 and published Oct. 24, 2013, is directed to a method for improving a performance of a metal detector, including: generating a transmit signal; generating a transmit magnetic field based on the transmit signal for transmission using a magnetic field transmitter; sending a receive signal based on a receive magnetic field received by a magnetic field receiver to a processing unit of the metal detector; sending a communication signal, including information from a sensor, to the processing unit; and processing the receive signal with the communication signal to produce an indicator output signal indicating a presence of a target under an influence of the transmit magnetic field; wherein one or more characteristics of the communication signal are selected based on the transmit signal to reduce or avoid an interference of the communication signal to the receive signal.

U.S. Pat. No. 8,604,986 for Device for propagation of electromagnetic waves through water by inventor Lucas, filed May 14, 2009 and issued Dec. 10, 2013, is directed to an invention concerning a device for propagating electromagnetic waves through impure water such as seawater or brackish water. The device comprises a body of polar material, for example pure water, contained in an enclosure, and an antenna arranged to emit an electromagnetic signal into the polar material. Excitation of dipoles in the polar material by the electromagnetic signal causes them to re-radiate the signal, which is thereby emitted into and relatively efficiently propagated through the water in which the device is submerged. The device offers the possibility of improved underwater communication.

U.S. Patent Pub. No. 2018/0267140 for High spatial resolution 3D radar based on a single sensor by inventors Corcos, et al., filed Mar. 20, 2017 and published Sep. 20, 2018, is directed to a novel system that allows for 3D radar detection that simultaneously captures the lateral and depth features of a target is disclosed. This system uses only a single transceiver, a set of delay-lines, and a passive antenna array, all without requiring mechanical rotation. By using the delay lines, a set of beat frequencies corresponding to the target presence can be generated in continuous wave radar systems. Likewise, in pulsed radar systems, the delays also allow the system to determine the 3D aspects of the target(s). Compared to existing solutions, the system allows for the implementation of simple, reliable, and power efficient 3D radars.

U.S. Patent Pub. No. 2002/0093338 for Method and apparatus for distinguishing metal objects employing multiple frequency interrogation by inventor Rowan, filed Feb. 11, 2002 and published Jul. 18, 2002, is directed to a method and apparatus for distinguishing metal objects employing multiple frequency interrogation. In one aspect, the method includes interrogating a target with at least two frequencies, obtaining respective response signals for the two frequencies, resolving the response signals into at least respective resistive component portions, comparing the magnitudes of at least two of the resistive component portions, selecting one response signal from among the response signals based on the comparison, and characterizing the target with the selected response signal. In other aspects, the method includes obtaining response data by interrogating the target at at least two frequencies, normalizing the response data and comparing the normalized response data. A signal is provided indicating the extent of any disagreement in the normalized response data.

U.S. Patent Pub. No. 2014/0012505 for Multiple-component electromagnetic prospecting apparatus and method of use thereof by inventor Smith, filed Mar. 27, 2012 and published Jan. 9, 2014, is directed to systems and methods for the detection of conductive bodies using three-component electric or magnetic dipole transmitters. The fields from multiple transmitters can be combined to enhance fields at specific locations and in specific orientation. A one- two- or three-component receiver or receiver array is provided for detecting the secondary field radiated by a conductive body. The data from multiple receivers can be combined to enhance the response at a specific sensing location with a specific orientation. Another method is provided in which a three-component transmitter and receiver are separated by an arbitrary distance, and where the position and orientation of the receiver relative to the transmitter are calculated, allowing the response of a highly conductive body to be detected.

U.S. Pat. No. 10,101,438 for Noise mitigation in radar systems by inventors Subburaj, et al., filed Apr. 15, 2015 and issued Oct. 16, 2018, is directed to a noise-mitigated continuous-wave frequency-modulated radar including, for example, a transmitter for generating a radar signal, a receiver for receiving a reflected radar signal and comprising a mixer for generating a baseband signal in response to the received radar signal and in response to a local oscillator (LO) signal, and a signal shifter coupled to at least one of the transmitter, LO input of the mixer in the receiver and the baseband signal generated by the mixer. The impact of amplitude noise or phase noise associated with interferers, namely, for example, strong reflections from nearby objects, and electromagnetic coupling from transmit antenna to receive antenna, on the detection of other surrounding objects is reduced by configuring the signal shifter in response to an interferer frequency and phase offset.

U.S. Pat. No. 7,755,360 for Portable locator system with jamming reduction by inventor Martin, filed Apr. 21, 2008 and issued Jul. 13, 2010, is directed to a portable self-standing electromagnetic (EM) field sensing locator system with attachments for finding and mapping buried objects such as utilities and with intuitive graphical user interface (GUI) displays. Accessories include a ground penetrating radar (GPR) system with a rotating Tx/Rx antenna assembly, a leak detection system, a multi-probe voltage mapping system, a man-portable laser-range finder system with embedded dipole beacon and other detachable accessory sensor systems are accepted for attachment to the locator system for simultaneous operation in cooperation with the basic locator system. The integration of the locator system with one or more additional devices, such as fault-finding, geophones and conductance sensors, facilitates the rapid detection and localization of many different types of buried objects.

U.S. Pat. No. 8,237,560 for Real-time rectangular-wave transmitting metal detector platform with user selectable transmission and reception properties by inventor Candy, filed Oct. 11, 2011 and issued Aug. 7, 2012, is directed to a highly flexible real-time metal detector platform which has a detection capability for different targets and applications, where the operator is able to alter synchronous demodulation multiplication functions to select different types or mixtures of different types to be applied to different synchronous demodulators, and also different waveforms of the said synchronous demodulation multiplication functions; examples of the different types being time-domain, square-wave, sine-wave or receive signal weighted synchronous demodulation multiplication functions. The operator can alter the fundamental frequency of the repeating switched rectangular-wave voltage sequence, and an operator may alter the waveform of the repeating switched rectangular-wave voltage sequence and corresponding synchronous demodulation multiplication functions.

U.S. Patent Pub. No. 2005/0212520 for Subsurface electromagnetic measurements using cross-magnetic dipoles by inventors Homan, et al., filed Mar. 29, 2004 and published Sep. 29, 2005, is directed to sensor assemblies including transmitter and receiver antennas to respectively transmit or receive electromagnetic energy. The sensor assemblies are disposed in downhole tools adapted for subsurface disposal. The receiver is disposed at a distance less than six inches (15 cm) from the transmitter on the sensor body. The sensor transmitter or receiver includes an antenna with its axis tilted with respect to the axis of the downhole tool. A sensor includes a tri-axial system of antennas. Another sensor includes a cross-dipole antenna system U.S. Patent Pub. No. 2017/0307670 for Systems and methods for locating and/or mapping buried utilities using vehicle-mounted locating devices by inventor Olsson, filed Apr. 25, 2017 and published Oct. 26, 2017, is directed to systems and methods for locating and/or mapping buried utilities. The publication discloses one or more magnetic field sensing locating devices include antenna node(s) to sense magnetic field signals emitted from a buried utility and a processing unit to receive the sensed magnetic field signals may be mounted on a vehicle. The received magnetic field signals may be processed in conjunction with sensed vehicle velocity data to determine information associated with location of the buried utility such as depth and position.

U.S. Patent Pub. No. 2011/0136444 for Transmit and receive antenna by inventor Rhodes, et al., filed Dec. 9, 2009 and published Jun. 9, 2011, is directed to a transmit/receive antenna for transmission and reception of electromagnetic signals. The transmit/receive antenna comprises a TX section and an RX section, where the TX section comprises a magnetically coupled TX element and a TX input terminal and the RX section comprises at least one magnetically coupled RX element and has an RX output terminal. Axes of the TX loop element and the at least one magnetically coupled RX solenoid element are parallel. Moreover, the at least one magnetically coupled RX element is positioned to provide high isolation at the RX terminal of the antenna from TX electrical signals fed to the TX input. Specifically, the at least one magnetically coupled RX element is positioned at a so that the net magnetic flux generated by the TX loop element and threading the RX solenoid element is zero.

U.S. Patent Pub. No. 2008/0224704 for Apparatus and method for detecting and identifying ferrous and non-ferrous metals by inventor Westersten, filed Sep. 9, 2005 and published Sep. 18, 2008, is directed to a metal detector using a linear current ramp followed by an abrupt current transition to energize the transmitter coil. The constant emf imposed on the target during the current ramp permits separation of transient voltages generated in response to eddy currents in the target and its environment from the voltages arising as a result of an inductive imbalance of the coil system. The temporal separation of the various voltages makes reliable differentiation between ferrous and non-ferrous targets possible.

The article "The Inductance of Ferrite Rod Antennas Issue 3," by Alan Payne, published online May 2021, describes the inductance of air-cored coils around a short, permeable ferrite rod. The increase in inductance when the ferrite is introduced is independent of the number of turns or their spacing or the inductance of the original air coil. Also, if the ferrite permeability is high the increase is dependent only on the overall physical dimensions of the coil and ferrite.

The article "The Self-Capacitance of Single Layer Toroidal Inductors with Ferrite Cores," by Alan Payne, published 2014, describes self-capacitance of coils around a permeable ferrite rod.

The article "The Radiation Resistance of Ferrite Rod Antennas," by Alan Payne, published online June 2021, describes modeling ferrite rod antennas as magnetic dipoles rather than a loop antenna and the coil is merely a device for detecting its flux. For a given ferrite, it is therefore better to use the material long and thin, but this requires the highest permeability to achieve its full potential.

SUMMARY OF THE INVENTION

The present invention relates to a radar system, and particularly a continuous-wave (CW) and/or pulsed radar system for detecting ferrous and non-ferrous metals in underwater (e.g., saltwater) environments.

It is an object of this invention to provide a radar system (e.g., CW radar system) for detecting ferrous and non-ferrous metals in underwater (e.g., saltwater) environments, increasing radar geolocation accuracy, enabling the identification of the type of material of a target object, discriminating between ferrous and non-ferrous target objects, determining the size and shape of a target object, and mapping target objects onto a 2D and 3D coordinate system (e.g., absolute and/or relative).

In one embodiment, the present invention provides a radar system for detecting objects in an underwater environment, including at least one transmitter (Tx) antenna including at least one signal generator operable to emit at least one transmission signal to a target area, at least one receiver (Rx) antenna including at least one signal receiver and at least one signal processor, wherein the at least one Tx antenna and the at least one Rx antenna include a plurality of toroidal ring stacks, wherein a first of the plurality of toroidal ring stacks is mounted to an inductor rod, wherein each of the plurality of toroidal ring stacks include an outer circumference equal to an inner circumference of a subsequent toroidal ring stack such that each of the plurality of toroidal ring stacks increases an overall diameter of the at least one Tx antenna and/or the at least one Rx antenna, wherein an outer circumference of an outermost toroidal ring stack of the plurality of toroidal ring stacks includes wire wrapping sufficient to induce an oscillating magnetic field, wherein the at least one signal receiver is operable to receive at least one return signal from the target area via the at least one Rx antenna, and wherein the at least one signal processor is operable to analyze the at least one return signal.

In another embodiment, the present invention provides a radar system for detecting objects in an underwater environment, including a plurality of transmitter (Tx) antennas, each including at least one signal generator operable to emit at least one transmission signal to a target area, a plurality of receiver (Rx) antennas, each including at least one signal receiver and at least one signal processor, wherein the plurality of Tx antennas and the plurality of Rx antennas include a plurality of toroidal ring stacks, wherein a first of the plurality of toroidal ring stacks is mounted to an inductor rod, wherein each of the plurality of toroidal ring stacks include an outer circumference equal to an inner circumference of a subsequent toroidal ring stack such that each of the plurality of toroidal ring stacks increases an overall diameter of each of the plurality of Tx antennas and/or the plurality of Rx antennas, wherein an outer circumference of an outermost toroidal ring stack of the plurality of toroidal ring stacks includes wire wrapping, wherein the at least one signal receiver is operable to receive at least one return signal from the target area via the plurality of Rx antennas, and wherein the at least one signal processor is operable to analyze the at least one return signal.

In yet another embodiment, the present invention provides a radar system for detecting objects in an underwater environment, including a plurality of transmitter (Tx) antennas, each including at least one signal generator operable to emit at least one transmission signal to a target area, a plurality of receiver (Rx) antennas, each including at least one signal receiver and at least one signal processor, wherein the plurality of Tx antennas and the plurality of Rx antennas include a plurality of toroidal ring stacks, wherein a first of the plurality of toroidal ring stacks is mounted to an inductor rod, wherein each of the plurality of toroidal ring stacks include an outer circumference equal to an inner circumference of a subsequent toroidal ring stack such that each of the plurality of toroidal ring stacks increases an overall diameter of each of the plurality of Tx antennas and/or the plurality of Rx antennas, wherein an outer circumference of an outermost toroidal ring stack of the plurality of toroidal ring stacks includes wire wrapping sufficient to induce an oscillating magnetic field, wherein the at least one signal receiver is operable to receive at least one return signal from the target area via the plurality of Rx antennas, wherein the at least one signal processor is operable to analyze the at least one return signal, and wherein the at least one signal processor is operable to detect at least one target object in the target area based on the at least one return signal.

In yet another embodiment, the present invention provides a radar system for detecting ferrous and non-ferrous metal in an underwater environment, including at least one transmitter system including a transmitter antenna, wherein the transmitter antenna includes a signal generator connected to a wireless communication system, at least one receiver system including a receiver antenna operable to receive signals generated by the signal generator, wherein the receiver antenna includes a signal processor connected to a wireless communication system, at least one shore-based facility operable to connect to the transmitter antenna wireless communication system and the receiver antenna wireless communication system, wherein the at least one transmitter system is mounted below a first buoy operable to receive power, wherein the at least one transmitter system draws power from the first buoy, wherein the transmitter system is operable to transmit a signal to a target area, wherein the at least one receiver system is mounted below a second buoy operable to receiver power, wherein the at least one receiver system draws power from the second buoy, wherein the receiver system is operable to receive the transmitted signal from the target area, wherein the transmitter system is operable to transmit continuous wave, pulsed waveform, and/or a time-shared combination of continuous wave and pulsed waveform, wherein the radar system is operable to shift frequencies in real time, and wherein the underwater environment includes saltwater.

In yet another embodiment, the present invention provides a system for detection of unintentional radiated emissions (URE) in an underwater environment, including at least one receiver antenna tethered to the ocean floor, residing upon the ocean floor, and/or buried under the ocean floor, at least one transmitter antenna operable to transmit a signal to a target area, wherein the at least one receiver antenna is operable to receive the transmitted signal from the target area, wherein the at least one receiver antenna is tied to or connected to a high-gain, low-noise amplifier, a receiver/digitizer, and a signal processor, wherein the system is operable detect URE from at least one target in the target area, and wherein the underwater environment is a saltwater environment.

In yet another embodiment, the present invention provides a system for detection of unintentional radiated emissions (URE) in an underwater environment, including at least one vehicle, at least one receiver antenna, wherein the at least one receiver antenna is towed by the at least one vehicle or mounted directly on the at least one vehicle, at least one transmitter antenna operable to transmit a signal to a target area, wherein the at least one receiver antenna is connected to a high-gain, low-noise amplifier, wherein the high-gain, low noise amplifier is connected to a signal processor, wherein the at least one receiver antenna is operable to receive the transmitted signal from the target area, wherein the signal processor is operable to detect the URE from at least one target in the target area, and wherein the underwater environment is a saltwater environment.

In yet another embodiment, the present invention provides a radar system for detecting ferrous and non-ferrous metal in an underwater environment, including at least one transmitter antenna including a signal generator, at least one receiver antenna including a signal processor, wherein the at least one transmitter antenna and the at least one receiver antenna are powered from shore, internal power, and/or connected to a surface of the underwater environment or near-surface of the underwater environment to a renewable power system, wherein the at least one transmitter antenna and the at least one receiver antenna are connected to a communication system operable to provide command, control, and exfiltration of detection of at least one target in a target area, wherein the at least one transmitter antenna is separated by sufficient distance from the at least one receiver antenna to provide electrical isolation, wherein the at least one transmitter antenna and the at least one receiver antenna are located at a depth greater than 30 meters and are arranged to observe the ocean above the at least one transmitter antenna and the at least one receiver antenna, wherein the at least one transmitter antenna is operable to transmit a signal including a continuous wave, a pulsed waveform, or a time-shared combination continuous wave and pulsed waveform, wherein the radar system is operable to shift frequencies in real time, and wherein the underwater environment is a saltwater environment.

These and other aspects of the present invention will become apparent to those skilled in the art after a reading of the following description of the preferred embodiment when considered with the drawings, as they support the claimed invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1E illustrates a side view of a radar system (e.g., a CW radar system) according to one embodiment of the present invention operable to transmit and receive at least three frequencies simultaneously.

FIG. 1F illustrates a top view of a radar system (e.g., a CW radar system) according to one embodiment of the present invention operable to transmit and receive at least three frequencies simultaneously.

FIG. 1G illustrates a front view of a radar system (e.g., a CW radar system) according to one embodiment of the present invention operable to transmit and receive at least three frequencies simultaneously.

FIG. 3A illustrates a cross-polarization orientation for Tx and Rx antennas according to one embodiment of the present invention.

FIG. 3B illustrates a cross-polarization orientation for Tx and Rx antennas according to another embodiment of the present invention.

FIG. 3C illustrates a cross polarization orientation for Tx and Rx antennas according to another embodiment of the present invention.

FIG. 13B lists all the labels in FIG. 13A representing different geographic locations for detected objects according to one embodiment of the present invention.

FIG. 15B lists all the labels in FIG. 15A representing different geographic locations for detected objects according to one embodiment of the present invention.

FIG. 17B lists all the labels in FIG. 17A representing different priority zones on a 2D underwater heatmap for a radar system (e.g., a CW radar system) according to one embodiment of the present invention.

FIG. 19B lists all the labels in FIG. 19A representing different priority zones on a 2D underwater heatmap for a radar system (e.g., a CW radar system) according to one embodiment of the present invention.

FIG. 20B lists all the labels in FIG. 20A representing different geographic locations for detected objects according to one embodiment of the present invention.

FIG. 23 is a table for a primary gain stage of an amplifier board for a radar system (e.g., a CW radar system) according to one embodiment of the present invention.

FIG. 24 is a table for a secondary gain stage of an amplifier board for a radar system (e.g., a CW radar system) according to one embodiment of the present invention.

FIG. 25 is a table for Stage One and Stage Two gain settings for an amplifier board for a radar system (e.g., a CW radar system) according to one embodiment of the present invention.

FIG. 26 is a table for gain calculations for an amplifier board for a radar system (e.g., a CW radar system) according to one embodiment of the present invention.

FIG. 27 is a table for Stage One and Stage Two gain settings for an amplifier board for a radar system (e.g., a CW radar system) according to another embodiment of the present invention.

FIG. 28A is a table for resistance values for an amplifier board for a radar system (e.g., a CW radar system) according to one embodiment of the present invention.

FIG. 28B is a table for additional resistance values for an amplifier board for a radar system (e.g., a CW radar system) according to one embodiment of the present invention.

FIG. 28C is a table for additional resistance values for an amplifier board for a radar system (e.g., a CW radar system) according to one embodiment of the present invention.

FIG. 56C lists all the labels in FIGS. 56A and 56B.

FIG. 58B lists all the labels in FIG. 58A.

FIG. 59B lists all the labels in FIG. 59A.

FIG. 60C lists all the labels in FIGS. 60A and 60B.

FIG. 61C lists all the labels in FIGS. 61A and 61B.

FIG. 62B lists all the labels in FIG. 62A.

FIG. 63B lists all the labels in FIG. 63A.

FIG. 64B lists all the labels in FIG. 64A.

FIG. 65B lists all the labels in FIG. 65A.

FIG. 66C shows the error between the actual gain settings and a theoretical perfectly linear distribution of gain settings.

FIG. 66D shows the possible gain settings for an Instrument Amplifier using a parallel resistor network.

FIG. 66E shows the actual gain setting used which are selected based upon linear gain steps.

FIG. 66F shows the error between the actual gain values that were selected and a theoretical perfectly linear distribution of gain settings.

FIG. 67 illustrates the placement of a stationary fence system for a harbor according to one embodiment of the present invention.

FIG. 68 illustrates a sentry unit node for a stationary fence system according to one embodiment of the present invention.

FIG. 69 illustrates multiple chained sentry unit nodes for a stationary fence system according to one embodiment of the present invention.

FIG. 70 illustrates a cross-sectional diagram of a cable for connecting sentry unit nodes according to one embodiment of the present invention.

FIG. 71 illustrates an example of a stationary fence system lying on a seafloor according to one embodiment of the present invention.

FIG. 72 illustrates a buried stationary fence system according to one embodiment of the present invention.

FIG. 73 illustrates a floating stationary fence system according to one embodiment of the present invention.

FIG. 74 illustrates a schematic of a stationary fence system detecting vessels through underwater obstacles according to one embodiment of the present invention.

Figure 75:
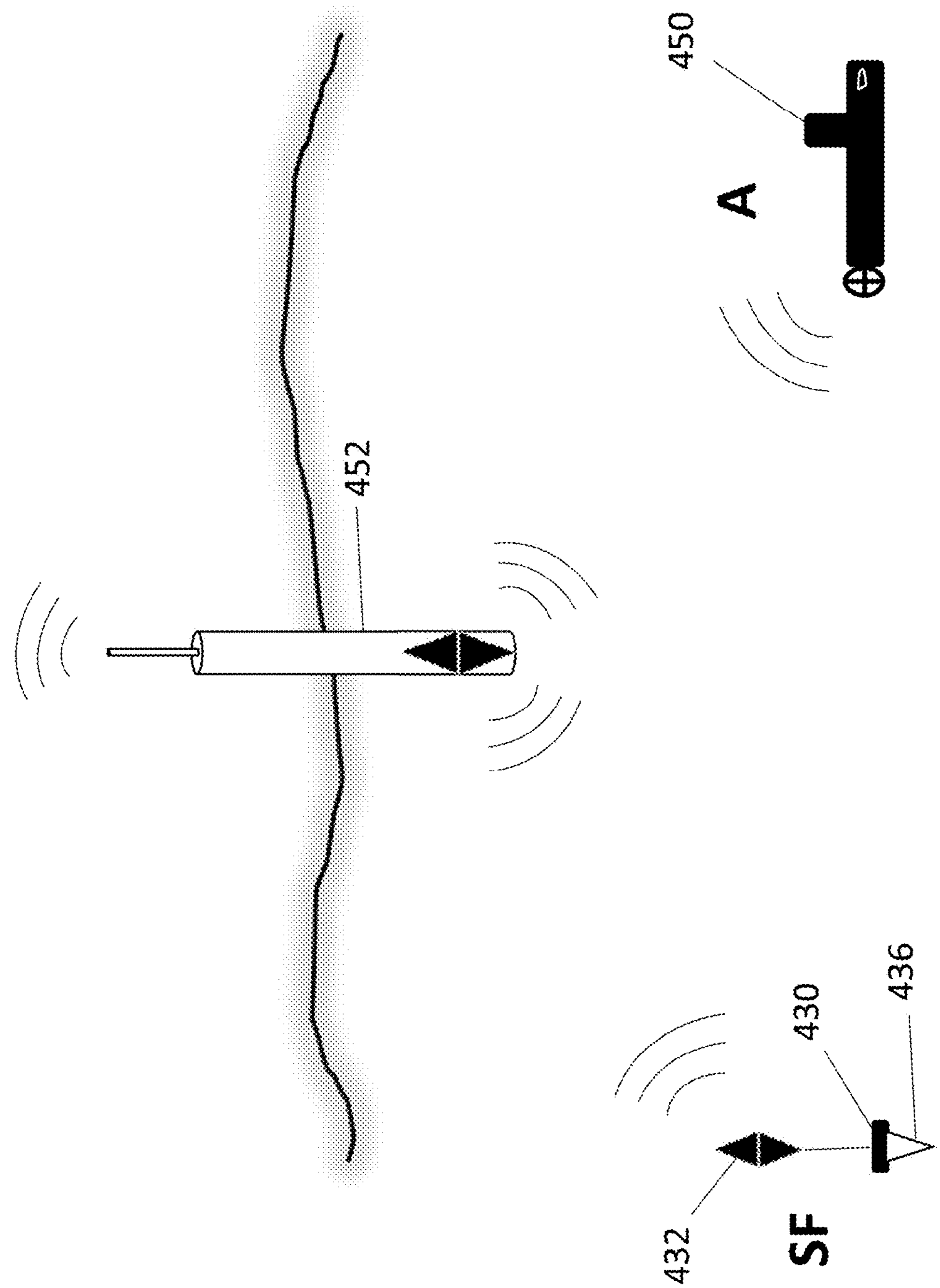

FIG. 75 illustrates a stationary fence system utilizing a transponder according to one embodiment of the present invention.

Figure 76:
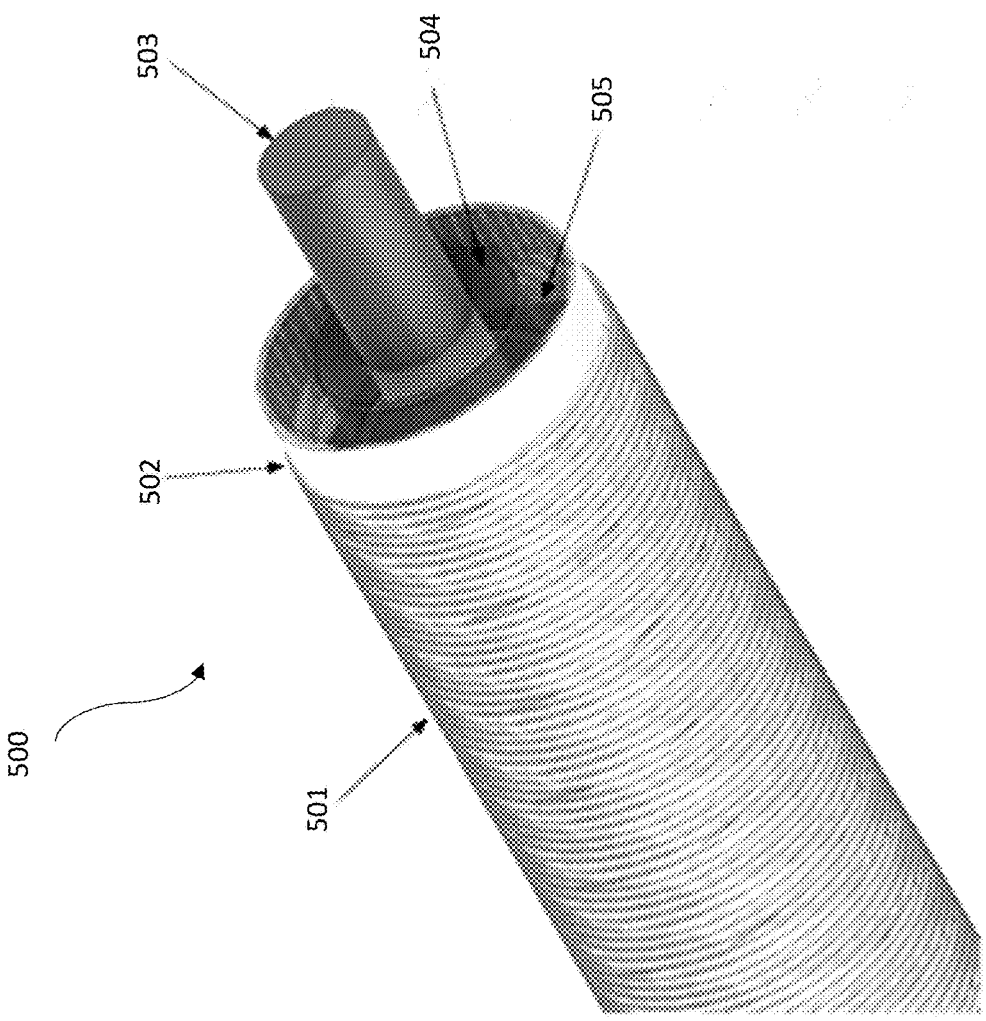

FIG. 76 illustrates an antenna according to one embodiment of the present invention.

Figure 77:
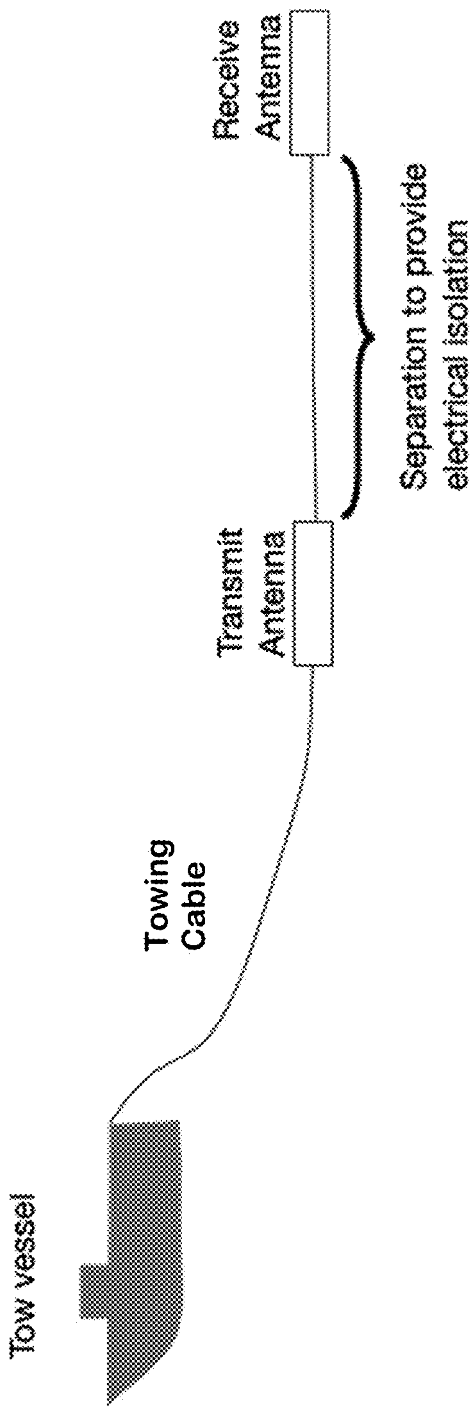

FIG. 77 illustrates a radar system (e.g., CW or pulse radar system) according to yet another embodiment of the present invention.

Figure 78:
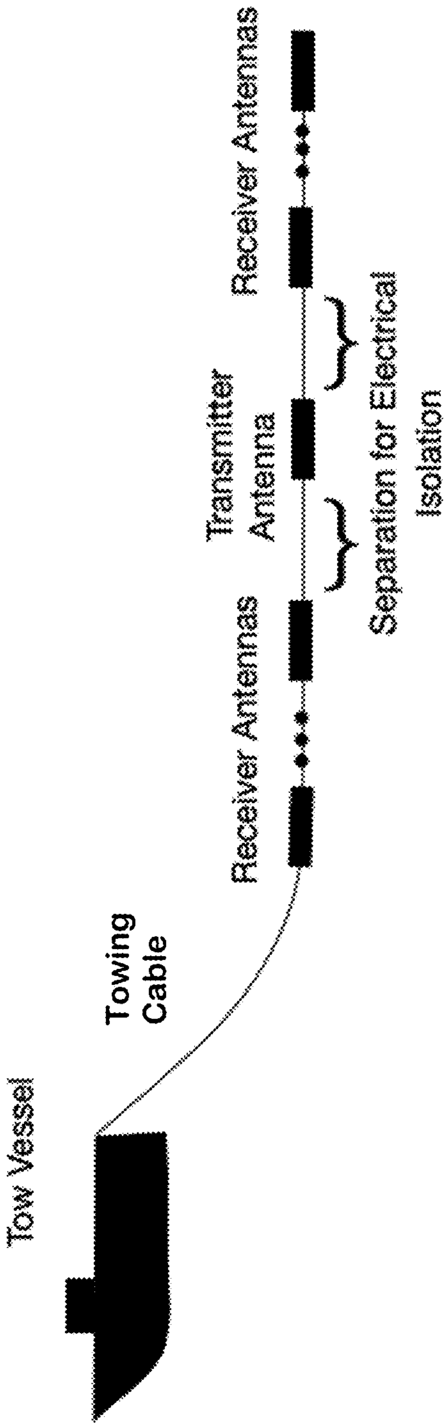

FIG. 78 illustrates a linear sequence radar system (e.g., CW or pulse radar system) according to yet another embodiment of the present invention.

Figure 79:
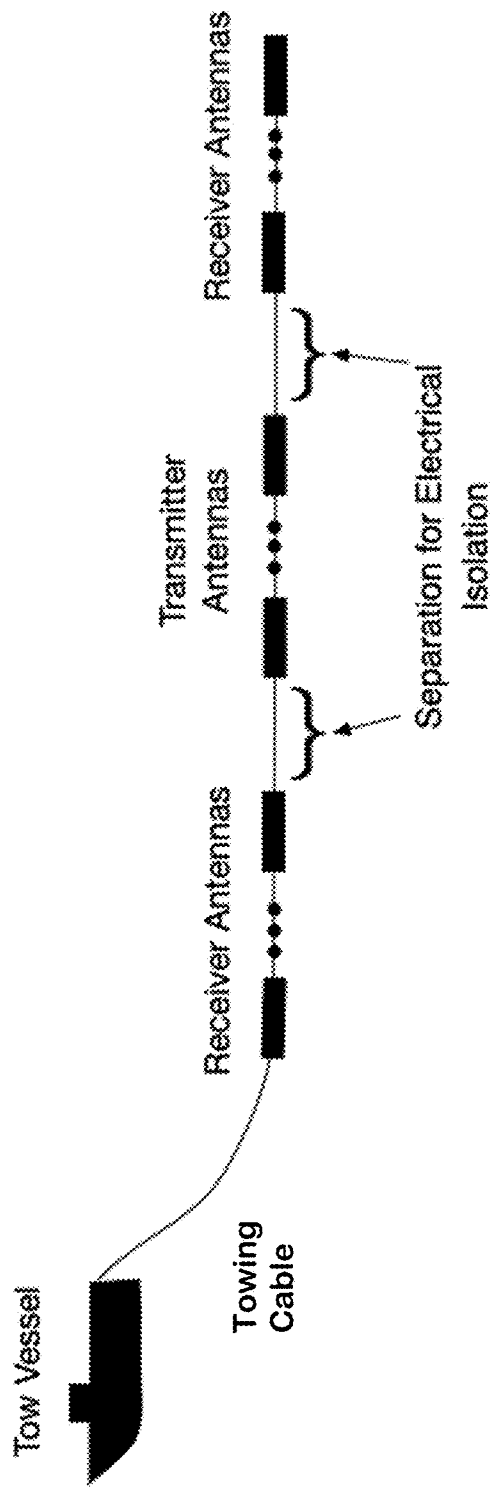

FIG. 79 illustrates a linear sequence radar system (e.g., CW or pulse radar system) including more than one receiver antenna and more than one transmitter antenna according to yet another embodiment of the present invention.

Figure 80:
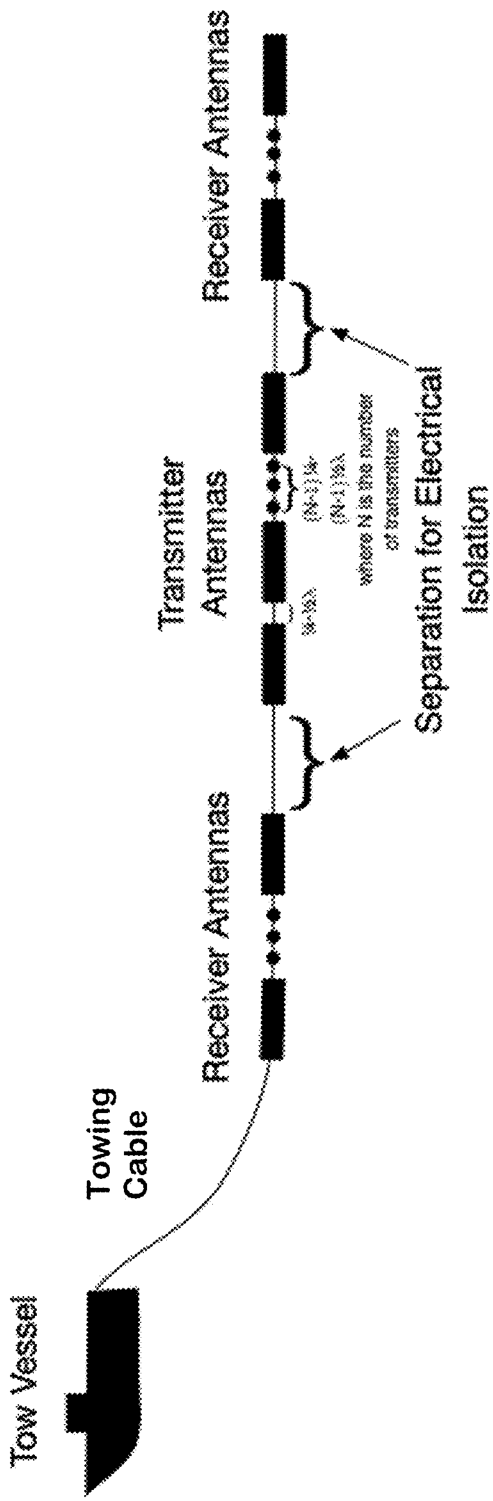

FIG. 80 illustrates a linear sequence radar system (e.g., CW or pulse radar system) including more than one receiver antenna and more than one transmitter antenna according to yet another embodiment of the present invention.

Figure 81:
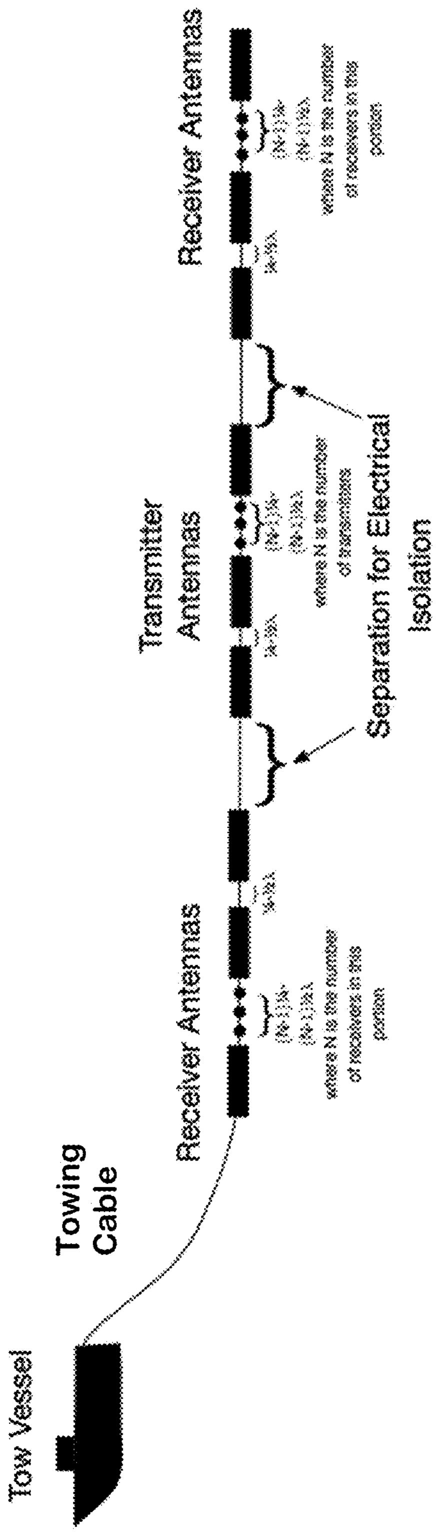

FIG. 81 illustrates a linear sequence radar system (e.g., CW or pulse radar system) including more than one receiver antenna, more than one transmitter antenna, and antenna spacing according to yet another embodiment of the present invention.

Figure 82:
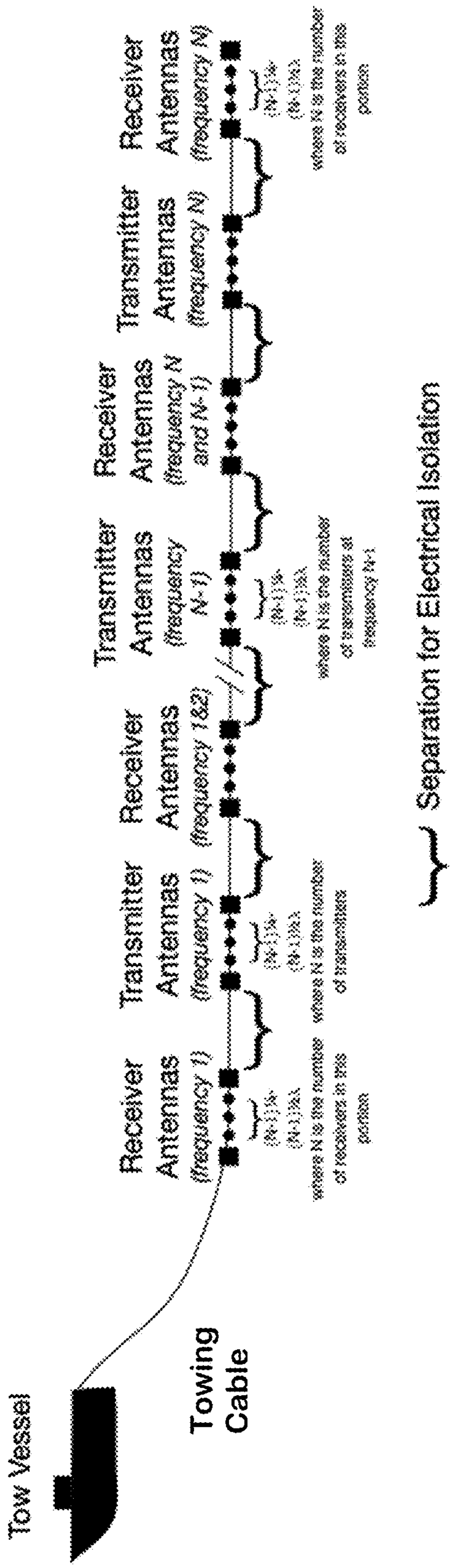

FIG. 82 illustrates a linear sequence radar system (e.g., CW or pulse radar system) including more than one receiver antenna, more than one transmitter antenna, and more than one frequency according to one embodiment of the present invention.

Figure 83:
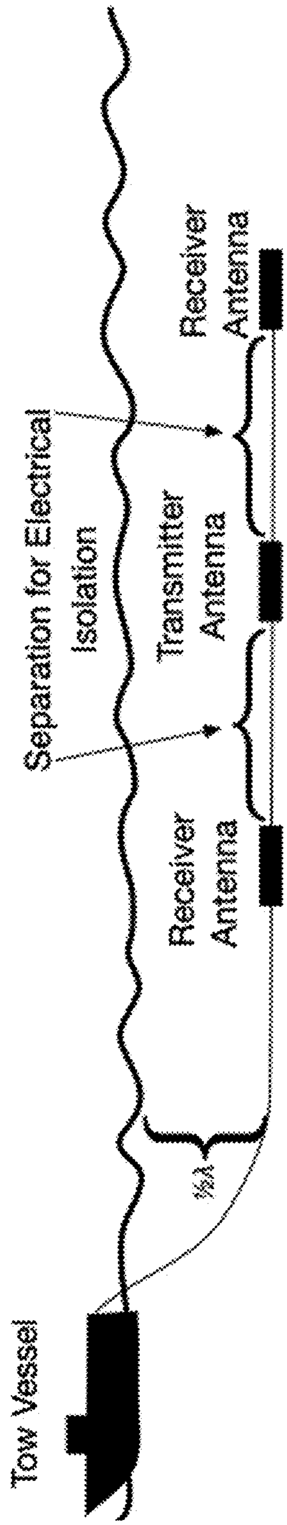

FIG. 83 illustrates a linear sequence radar system (e.g., CW or pulse radar system) including a depth according to one embodiment of the present invention.

Figure 84A:
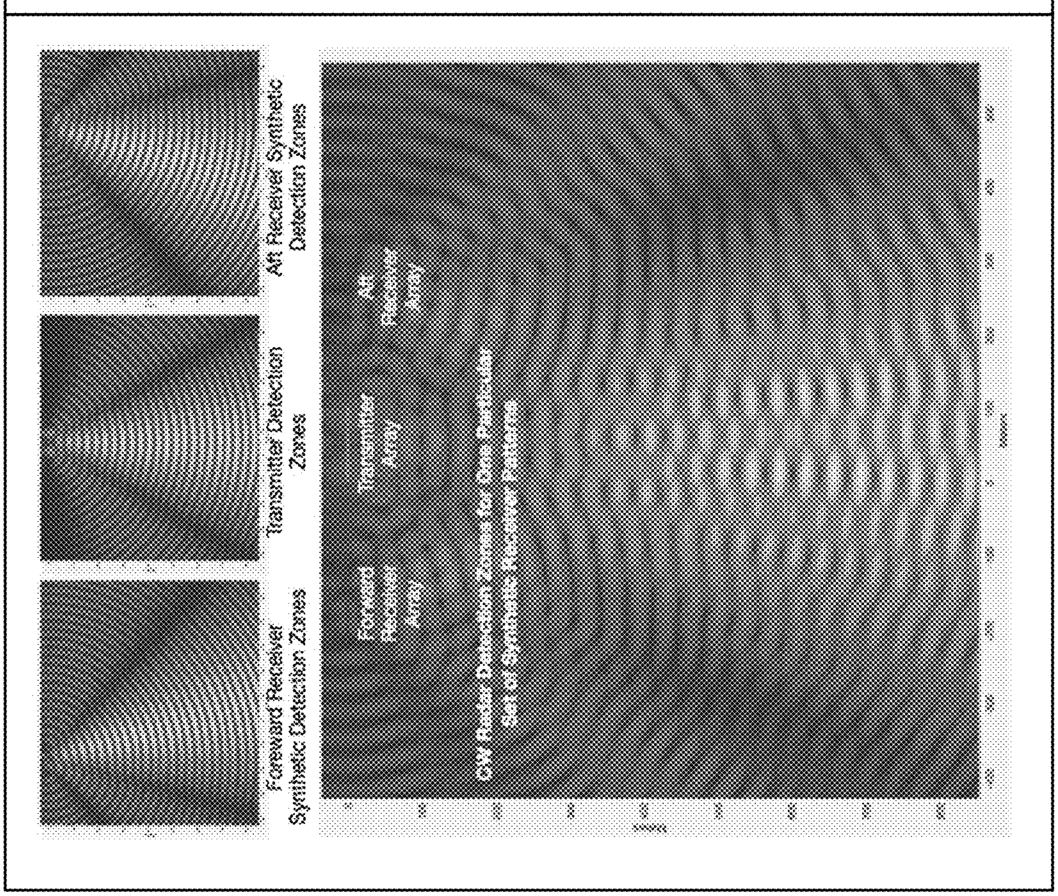

FIG. 84A illustrates radar detection zones according to one embodiment of the present invention.

Figure 84B:
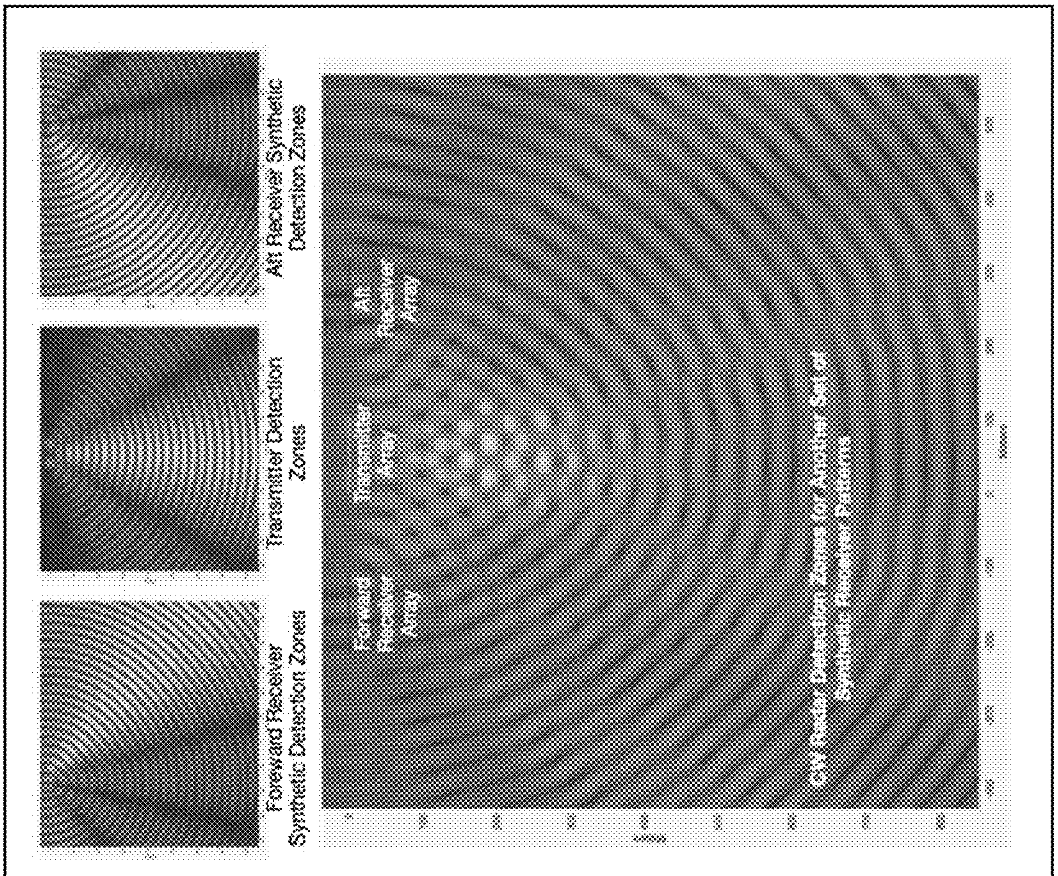

FIG. 84B illustrates radar detection zones according to another embodiment of the present invention.

Figure 85:
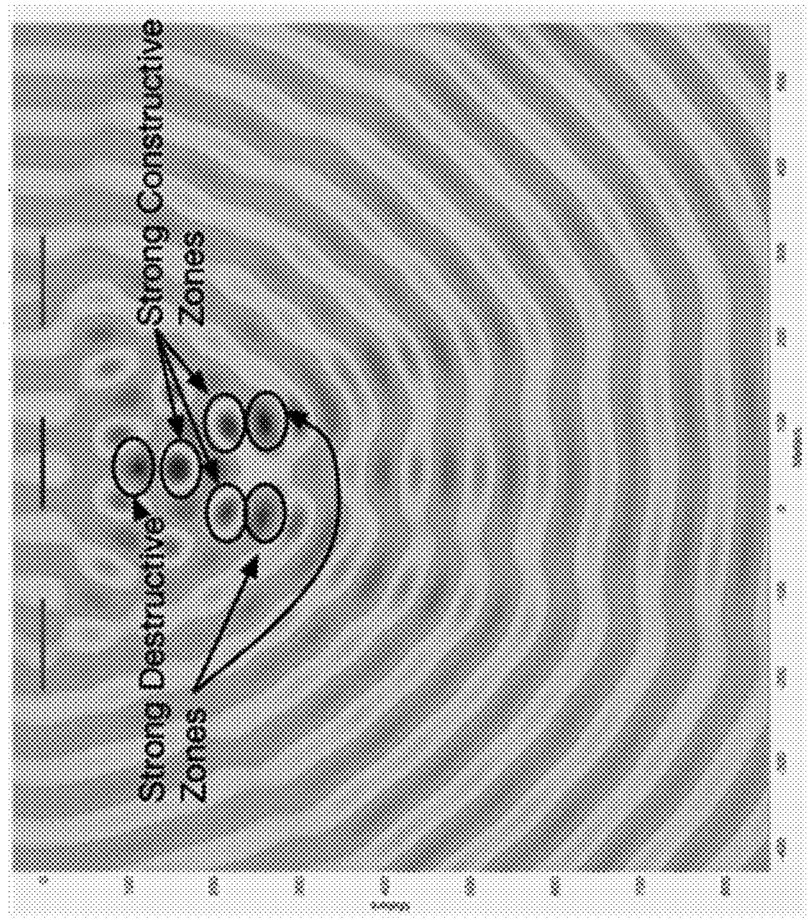

FIG. 85 illustrates radar detection zones with constructive and destructive zones according to one embodiment of the present invention.

Figure 86:
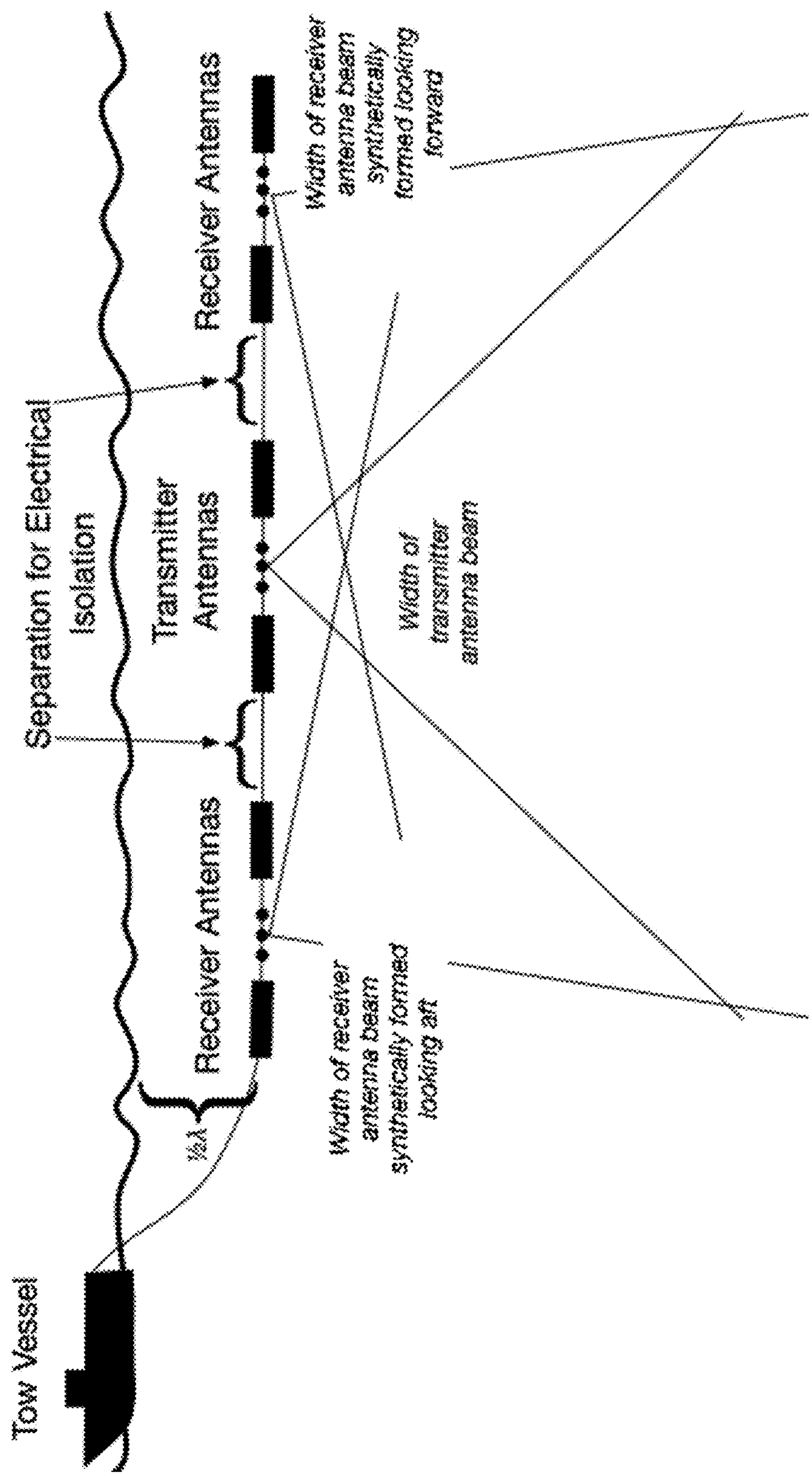

FIG. 86 illustrates a linear sequence radar system (e.g., CW or pulse radar system) beam pattern according to one embodiment of the present invention.

Figure 87:
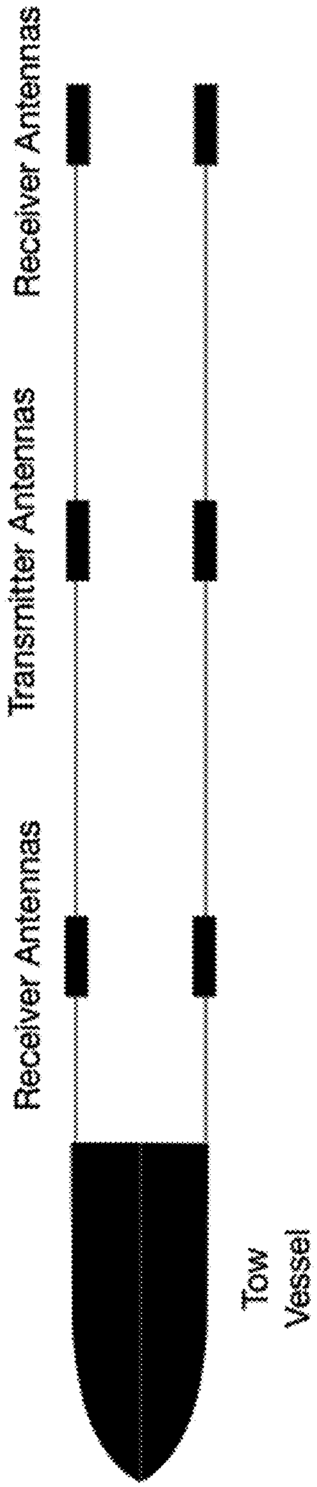

FIG. 87 illustrates a radar system (e.g., CW or pulse radar system) including a first linear sequence radar and a second linear sequence radar according to one embodiment of the present invention.

Figure 88:
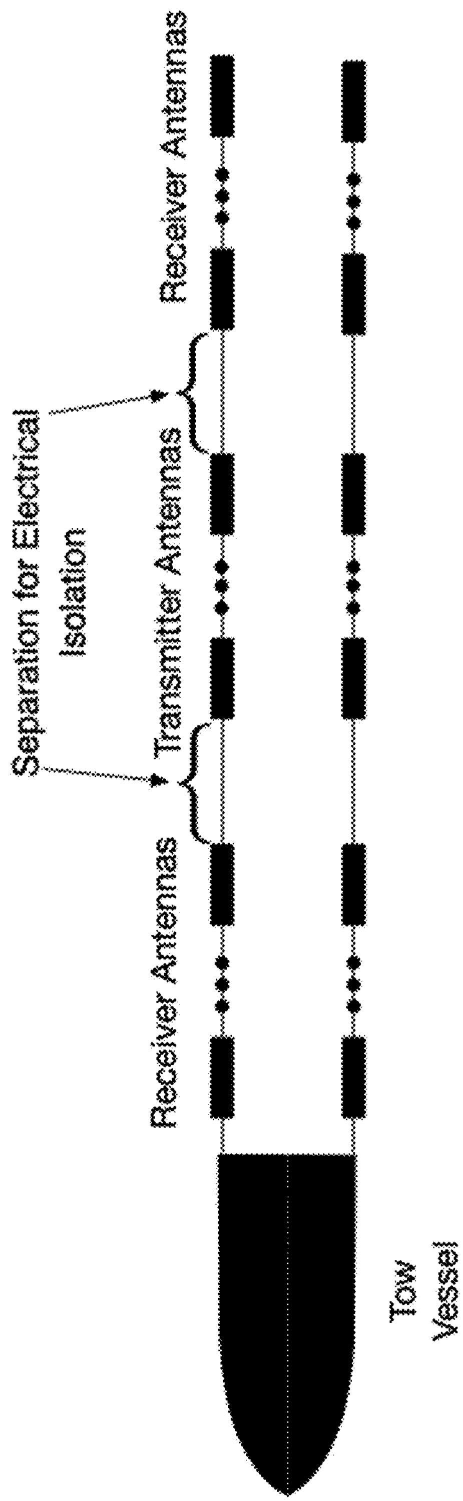

FIG. 88 illustrates a radar system (e.g., CW or pulse radar system) including a first linear sequence radar and a second linear sequence radar according to another embodiment of the present invention.

Figure 89:
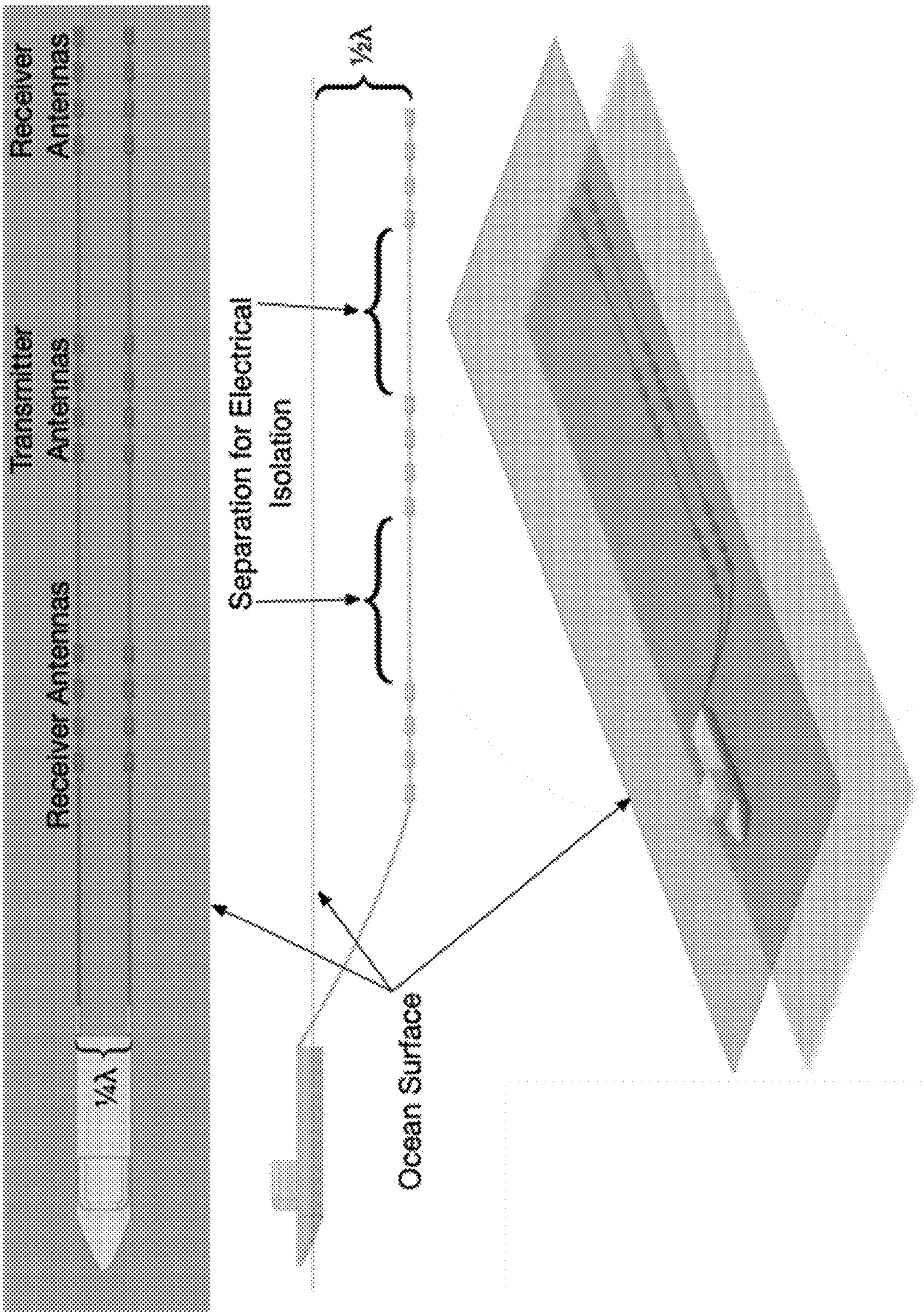

FIG. 89 illustrates a perspective view of a radar system (e.g., CW or pulse radar system) including a first linear sequence radar and a second linear sequence radar according to another embodiment of the present invention.

Figure 90:
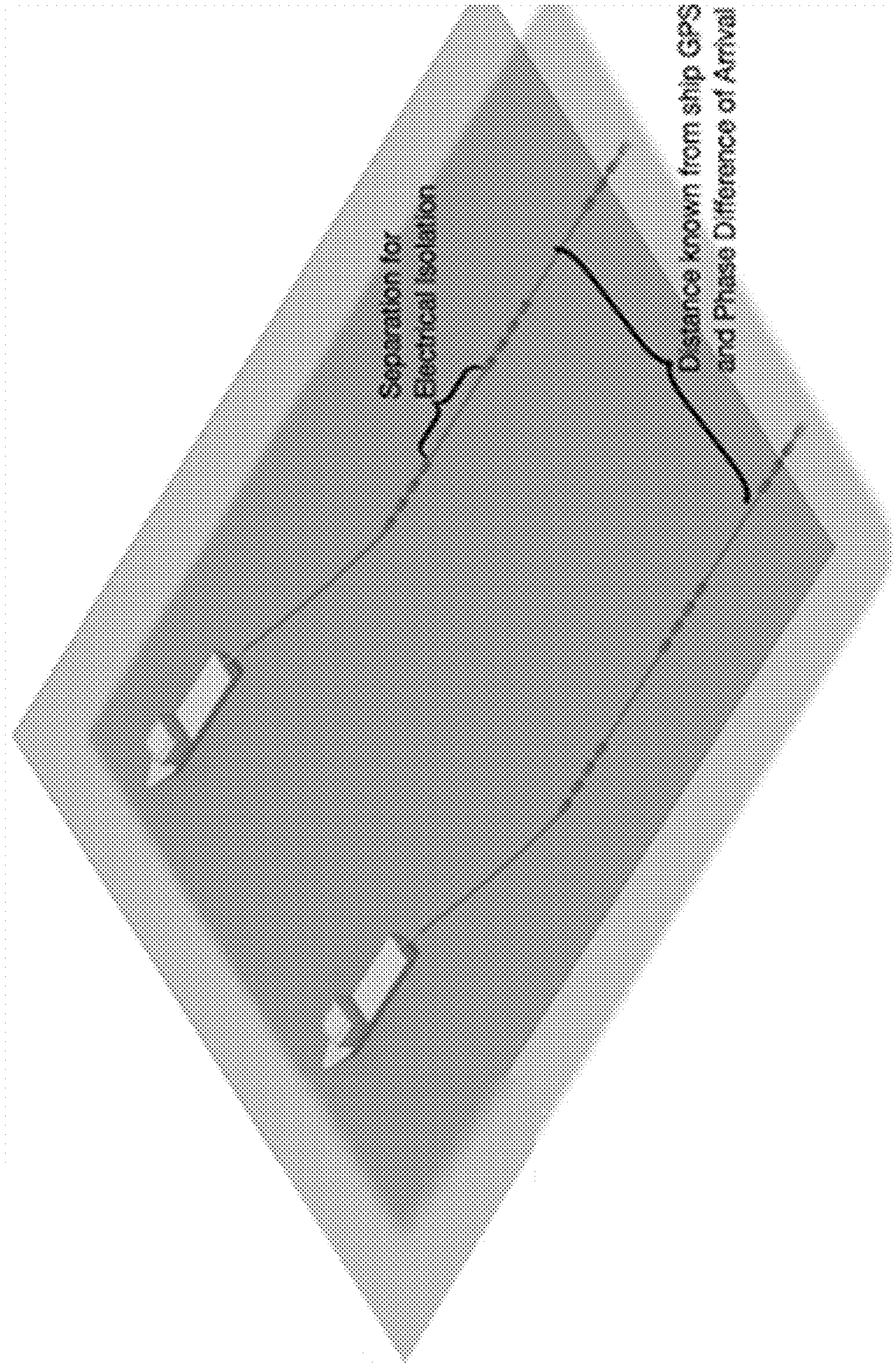

FIG. 90 illustrates a radar system (e.g., CW or pulse radar system) including a first linear sequence radar and a second linear sequence radar towed by separate towing vessels according to one embodiment of the present invention.

Figure 91:
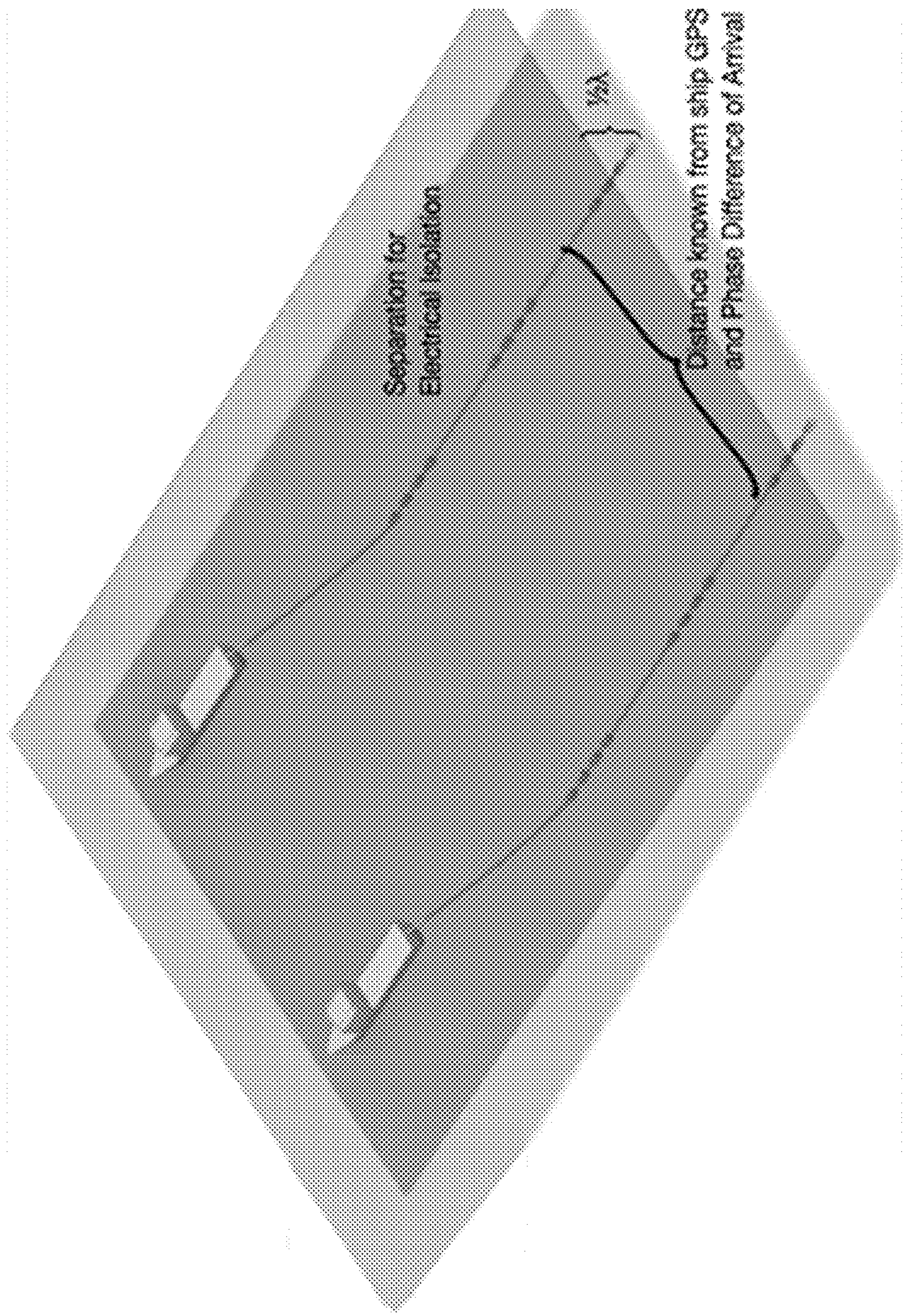

FIG. 91 illustrates another embodiment wherein the first linear radar sequence and the second linear radar sequence are towed at a depth of about ½ wavelength according to one embodiment of the present invention.

Figure 92A:
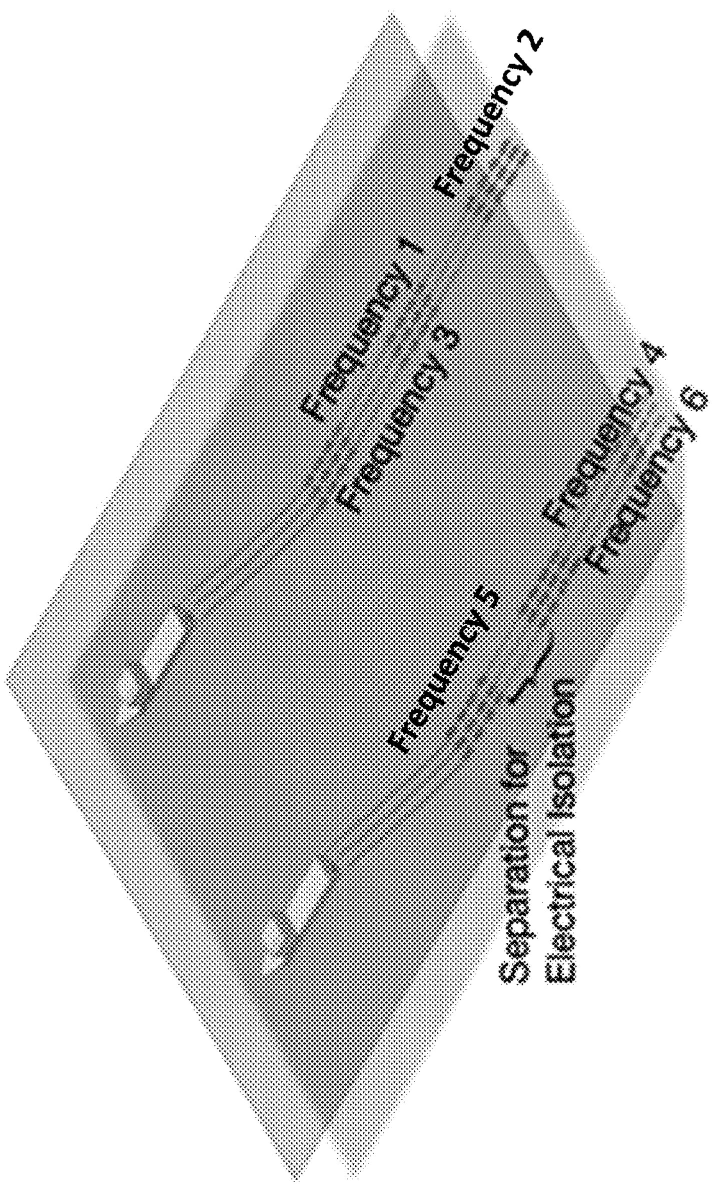

FIG. 92A illustrates a radar system (e.g., CW or pulse radar system) including a plurality of linear radar sequences and a plurality of frequencies according to one embodiment of the present invention.

Figure 92B:

FIG. 92B illustrates a side orthogonal view of a radar system including a plurality of linear radar sequences and a plurality of frequencies according to one embodiment of the present invention.

Figure 93:
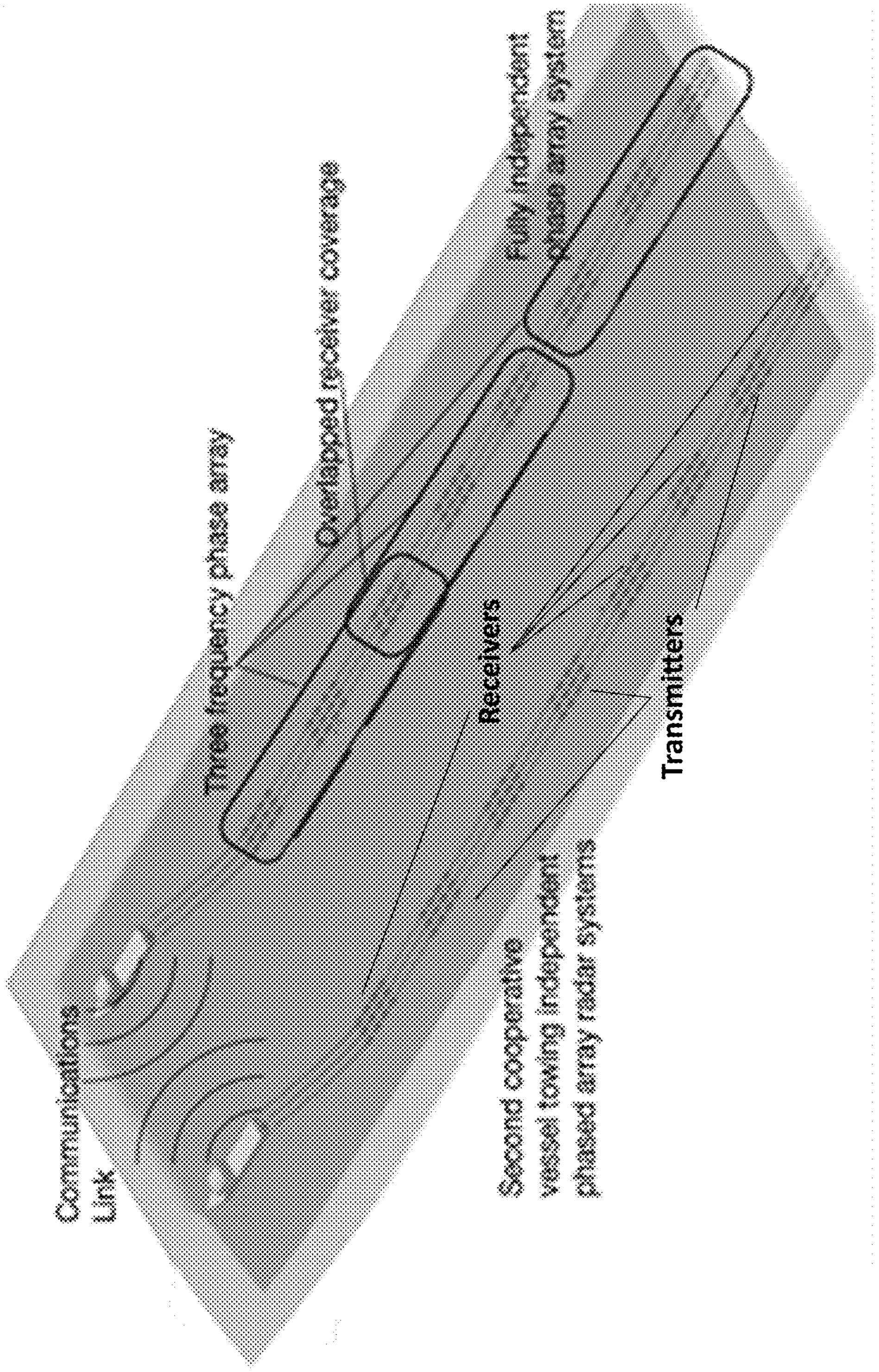

FIG. 93 illustrates a radar system (e.g., CW or pulse radar system) including a plurality of linear radar sequences, a plurality of frequences, and a plurality of antennas according to one embodiment of the present invention.

Figure 94A:
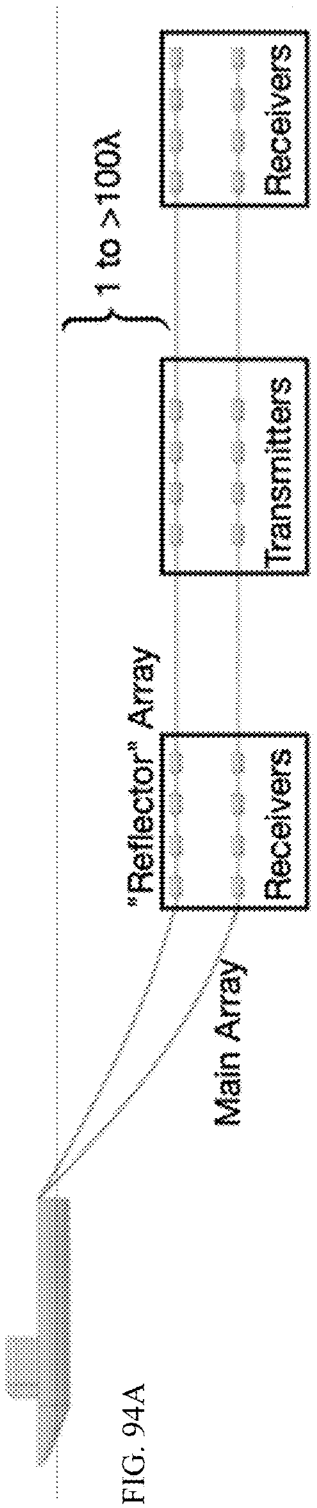

FIG. 94A illustrates a radar system (e.g., CW or pulse radar system) including at least two linear radar sequences at various depths according to one embodiment of the present invention.

Figure 94B:
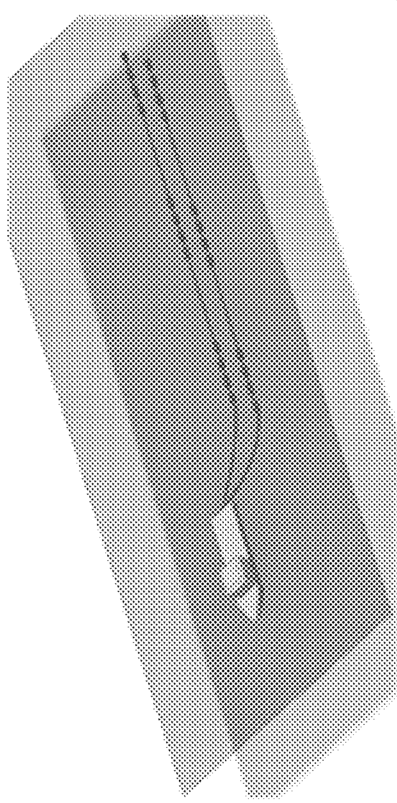

FIG. 94B illustrates a perspective view of a radar system (e.g., CW or pulse radar system) including at least two linear radar sequences at various depths according to one embodiment of the present invention.

Figure 94C:
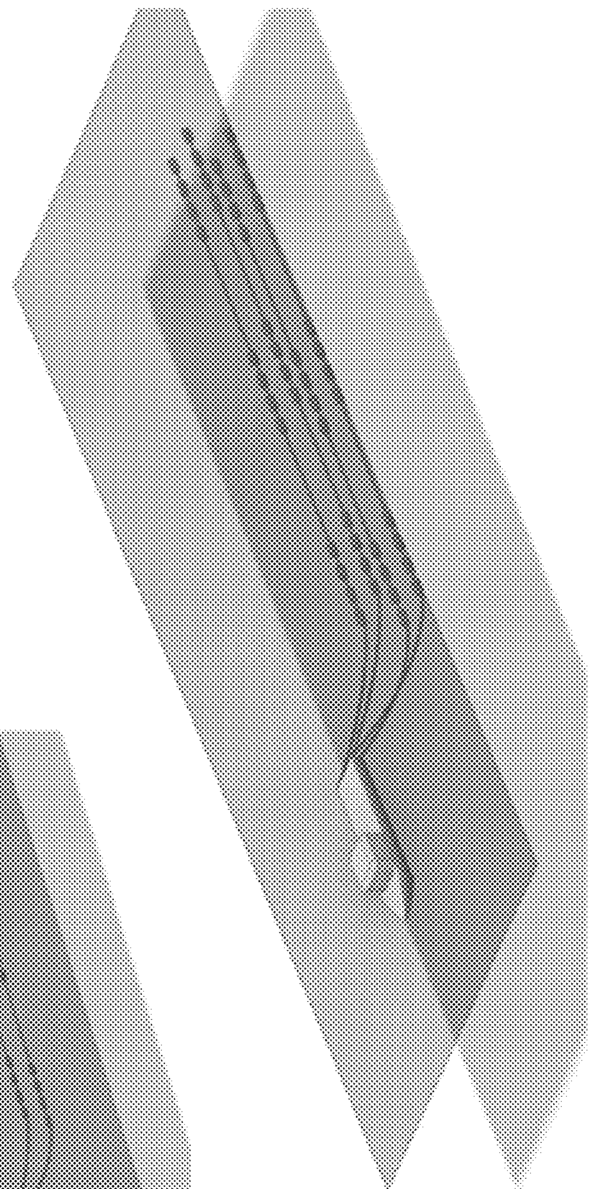

FIG. 94C illustrates a perspective view of a radar system (e.g., CW or pulse radar system) including a plurality of linear radar sequences at various depths according to one embodiment of the present invention.

Figure 95A:
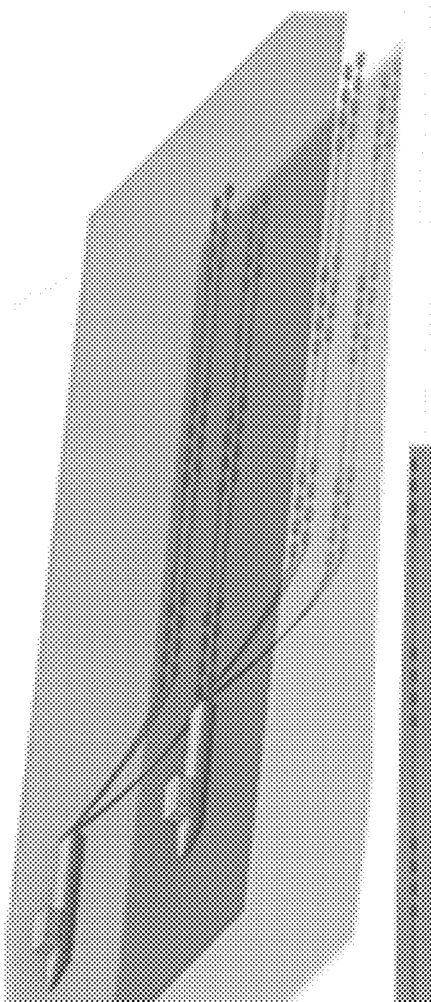

FIG. 95A illustrates a radar system (e.g., CW or pulse radar system) including at least two towing vessels and a plurality of linear radar sequences according to one embodiment of the present invention.

Figure 95B:
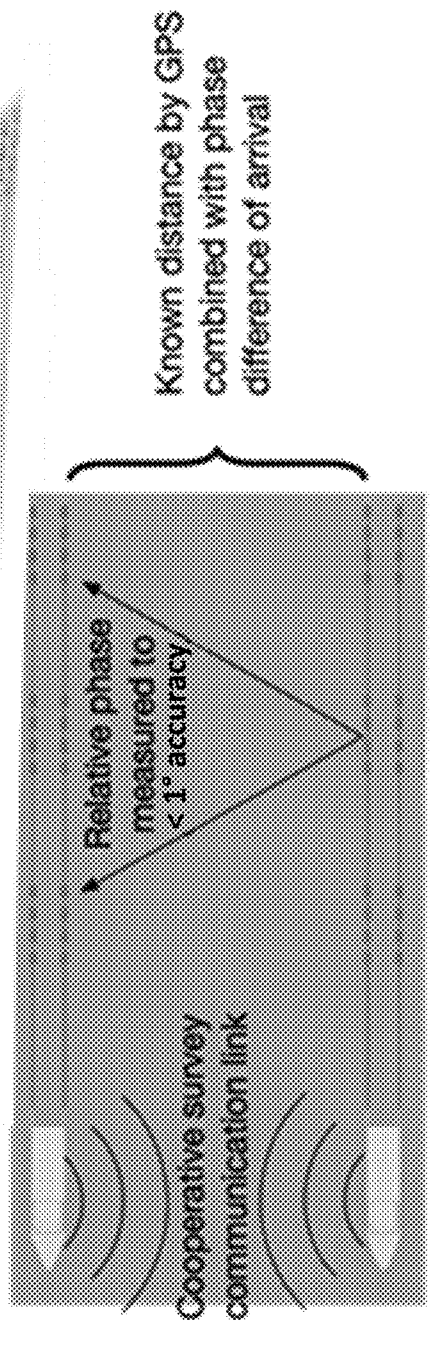

FIG. 95B illustrates a phase angle of arrival according to one embodiment of the present invention.

Figure 95C:
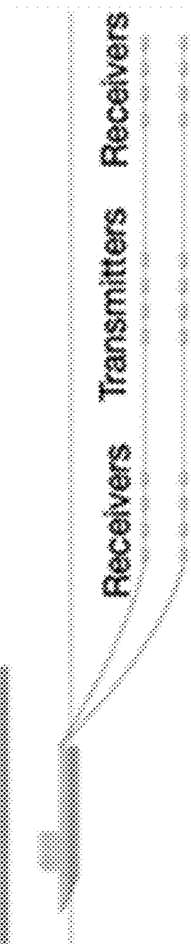

FIG. 95C illustrates a perspective view of a radar system (e.g., CW or pulse radar system) including at least two towing vessels and a plurality of linear radar sequences according to one embodiment of the present invention.

Figure 96A:
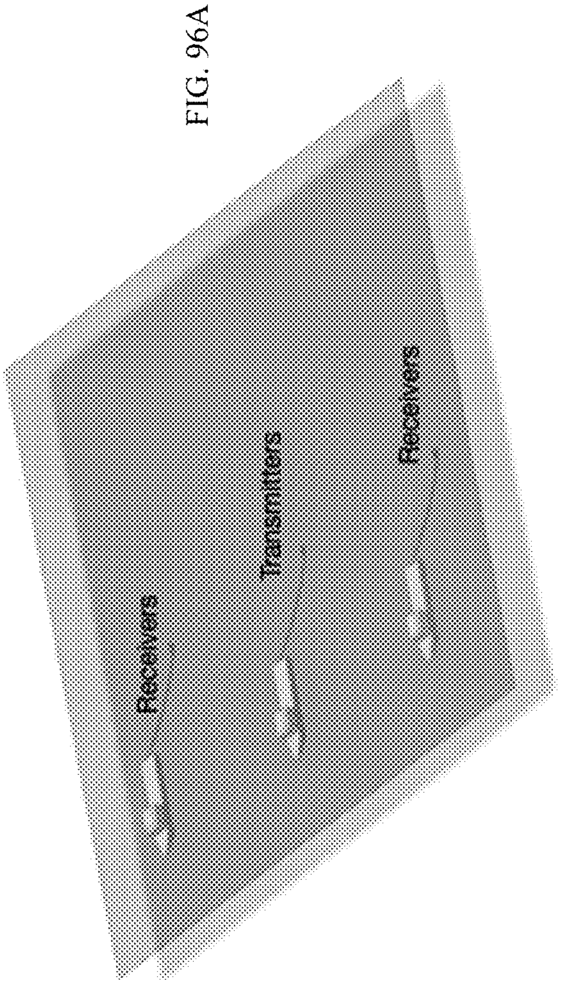

FIG. 96A illustrates a radar system (e.g., CW or pulse radar system) including at least three towing vessels according to one embodiment of the present invention.

Figure 96B:
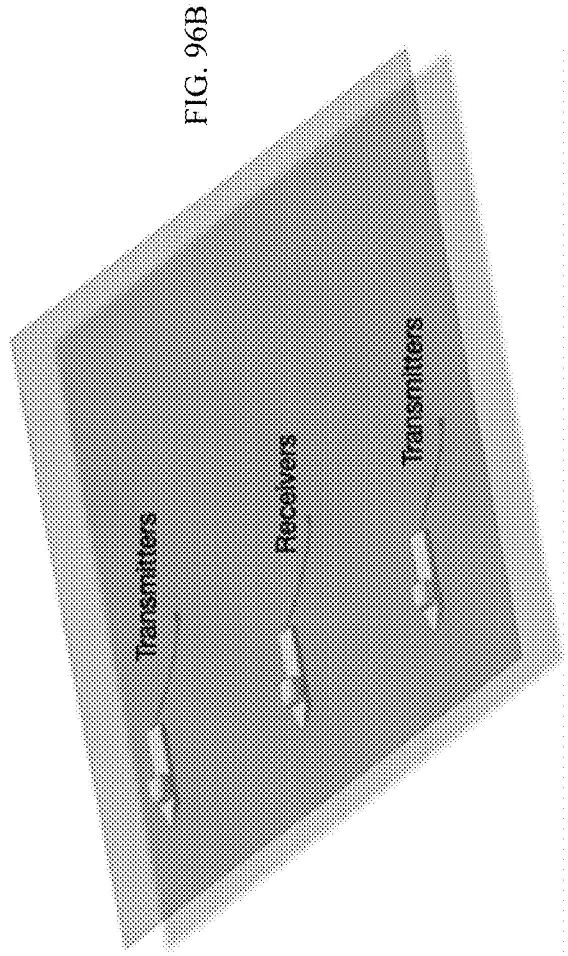

FIG. 96B illustrates a radar system (e.g., CW or pulse radar system) including at least three towing vessels according to another embodiment of the present invention.

Figure 97A:
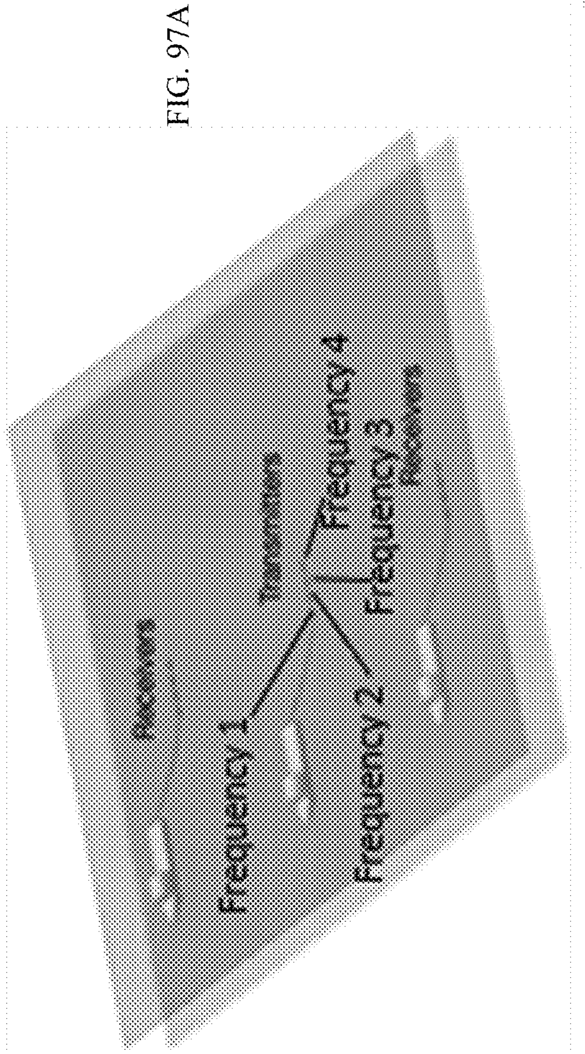

FIG. 97A illustrates a radar system (e.g., CW or pulse radar system) including at least three towing vessels and a plurality of receiver antennas and a plurality of transmitter antennas according to one embodiment of the present invention.

Figure 97B:
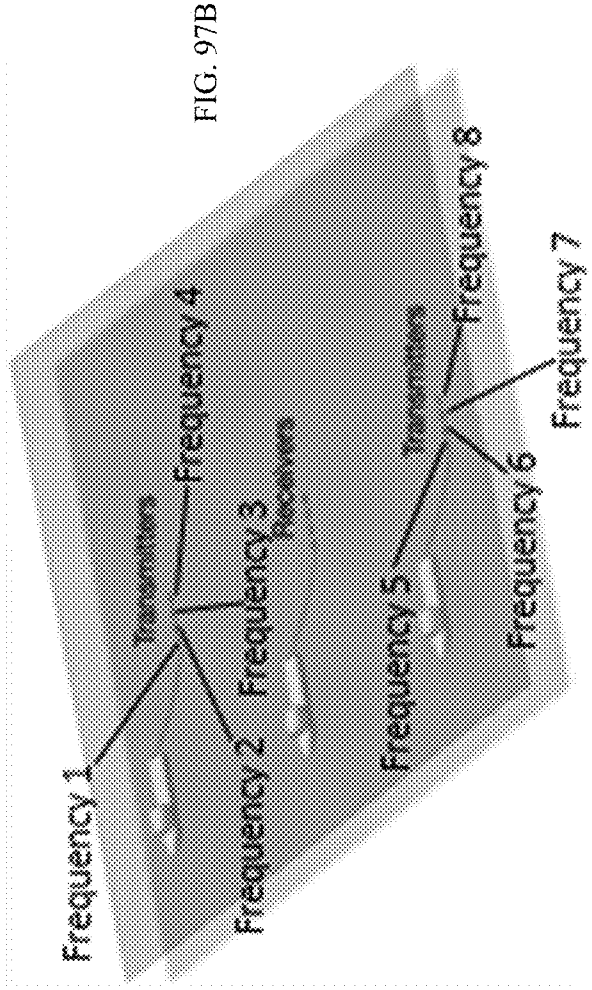

FIG. 97B illustrates a radar system (e.g., CW or pulse radar system) including at least three towing vessels and a plurality of receiver antennas and a plurality of transmitter antennas according to another embodiment of the present invention.

Figure 98A:
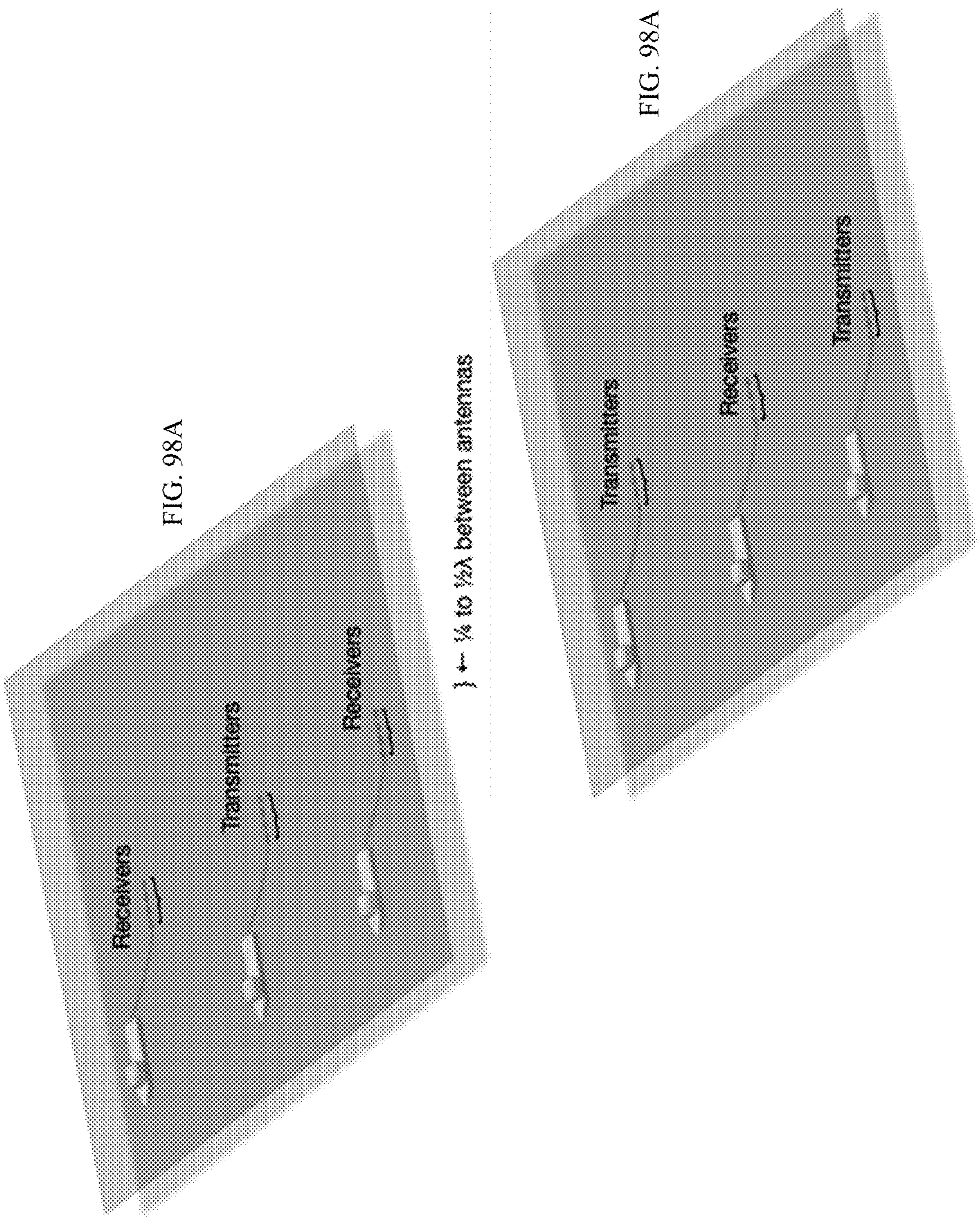

FIG. 98A illustrates a radar system (e.g., CW or pulse radar system) including at least three towing vessels and a plurality of receiver antennas and a plurality of transmitter antennas according to one embodiment of the present invention.

FIG. 98B illustrates a radar system (e.g., CW or pulse radar system) including at least three towing vessels and a plurality of receiver antennas and a plurality of transmitter antennas according to another embodiment of the present invention.

Figure 99A:
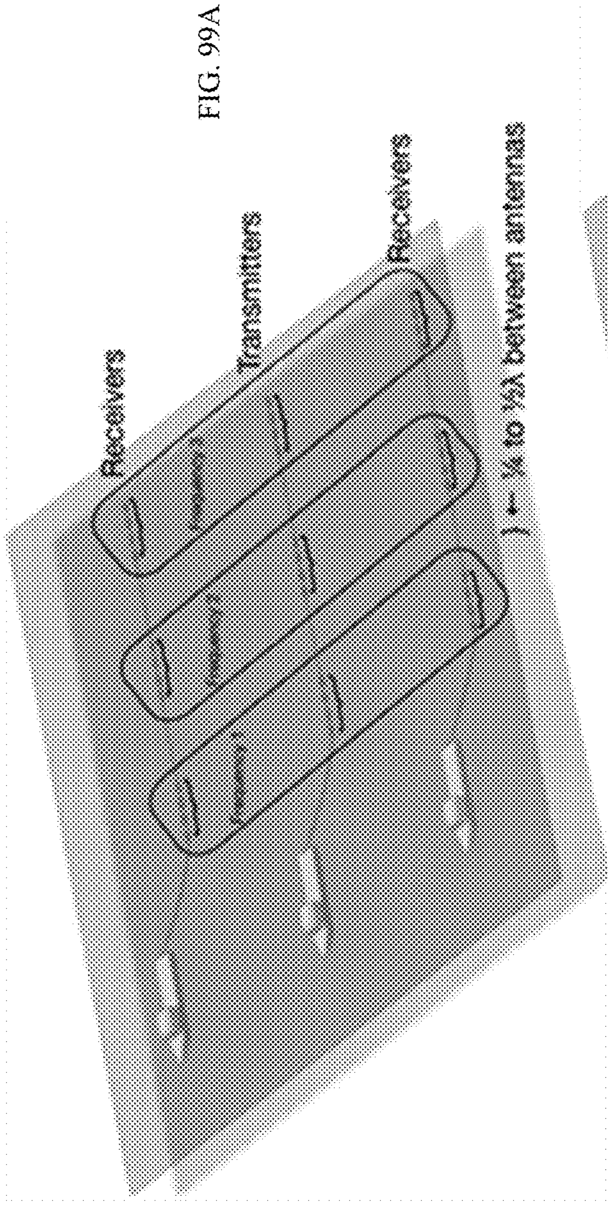

FIG. 99A illustrates a radar system (e.g., CW or pulse radar system) including at least three towing vessels, a plurality of receiver antennas, a plurality of transmitter antennas, and a plurality of frequencies according to one embodiment of the present invention.

Figure 99B:
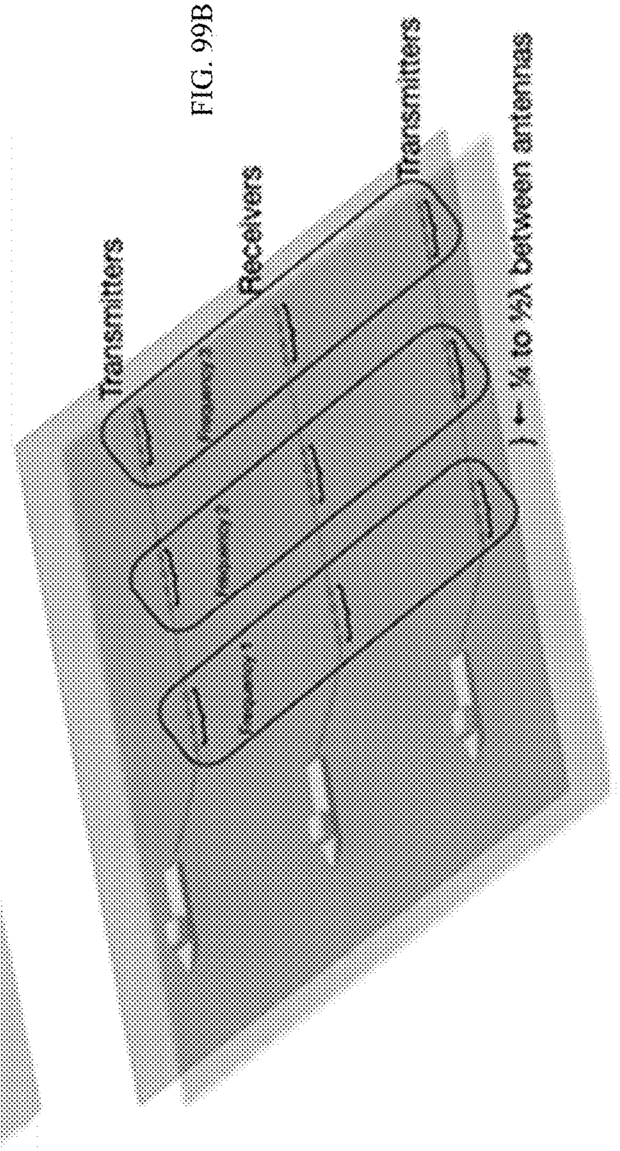

FIG. 99B illustrates a radar system (e.g., CW or pulse radar system) including at least three towing vessels, a plurality of receiver antennas, a plurality of transmitter antennas, and a plurality of frequencies according to another embodiment of the present invention.

Figure 100:
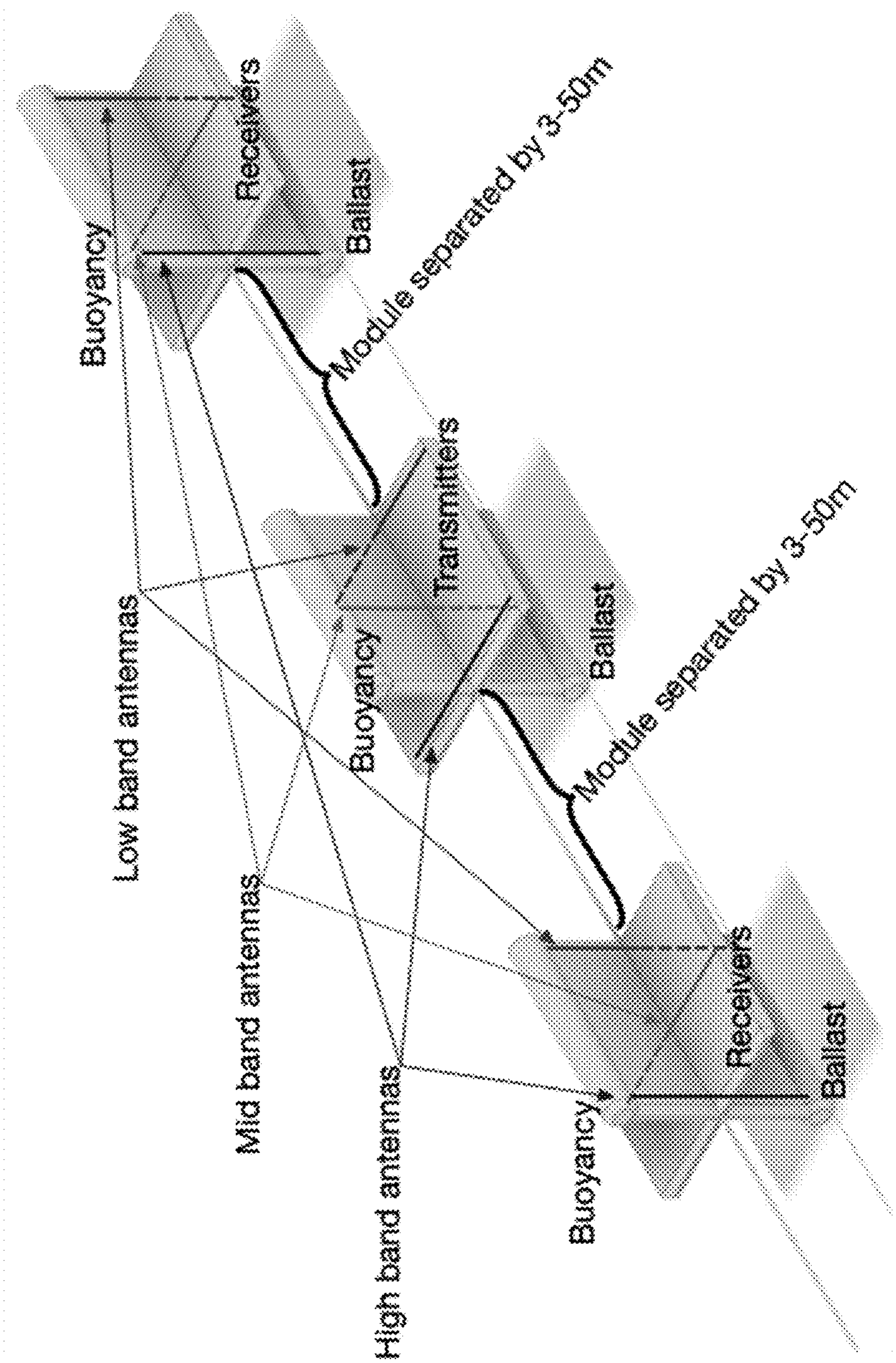

FIG. 100 illustrates a radar system (e.g., CW or pulse radar system) including modules according to one embodiment of the present invention.

Figure 101:
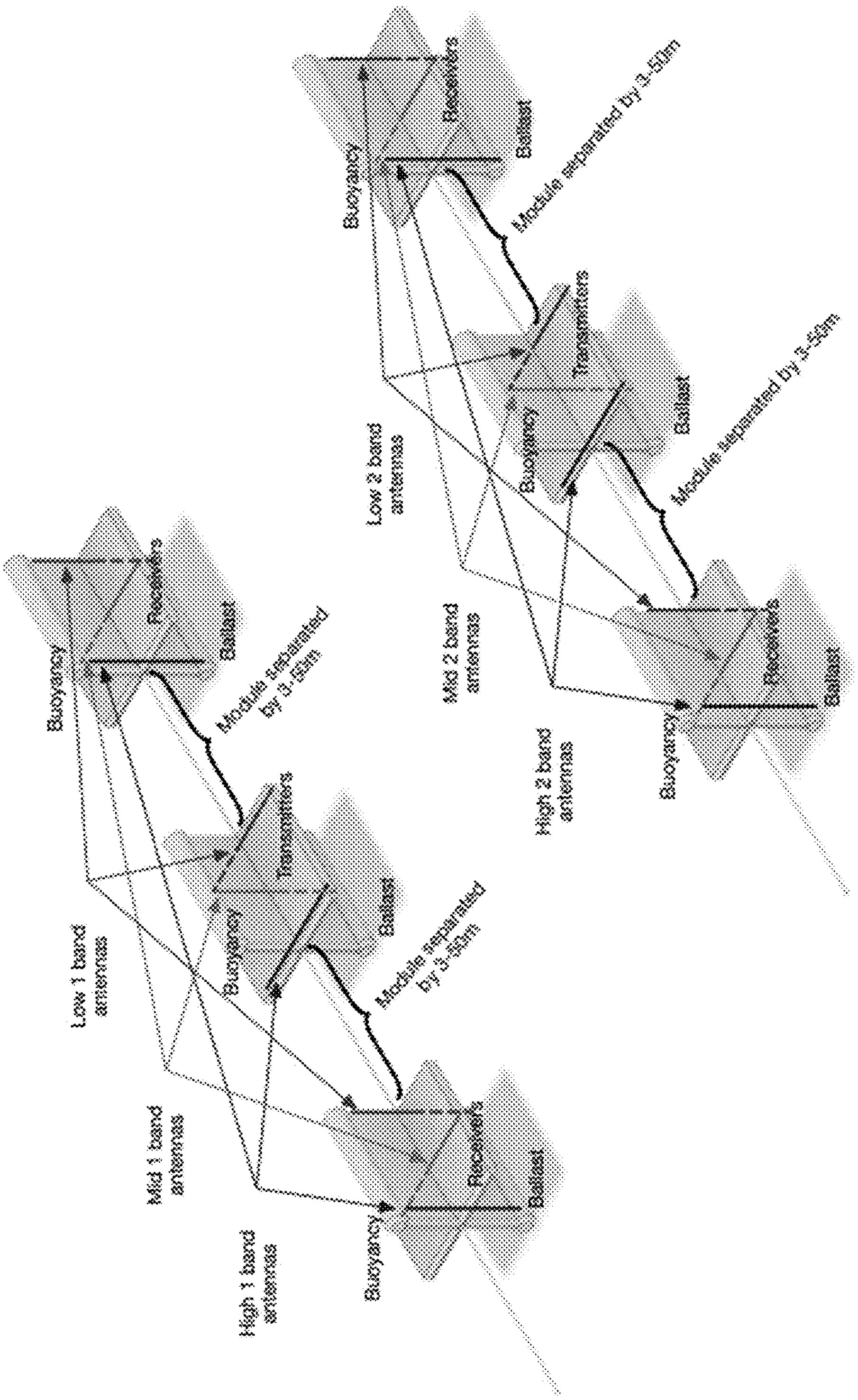

FIG. 101 illustrates a radar system (e.g., CW or pulse radar system) including two towing cables and a plurality of modules according to one embodiment of the present invention.

Figure 102A:
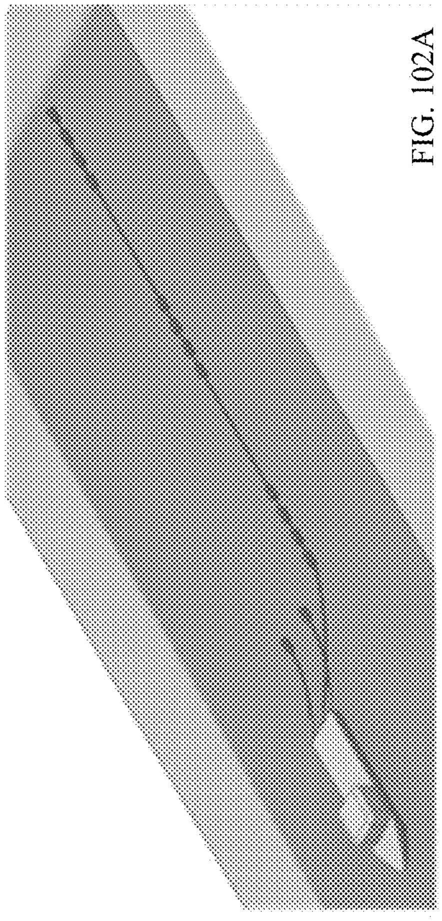

FIG. 102A illustrates a radar system (e.g., CW or pulse radar system) including a plurality of transmitter antennas and a plurality of receiver antennas according to one embodiment of the present invention.

Figure 102B:
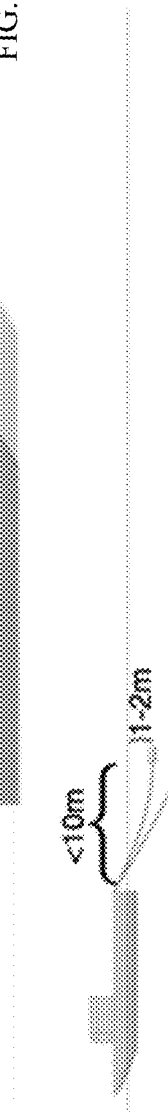

FIG. 102B illustrates a side orthogonal view of a radar system (e.g., CW or pulse radar system) including a plurality of transmitter antennas and a plurality of receiver antennas according to one embodiment of the present invention.

Figure 102C:
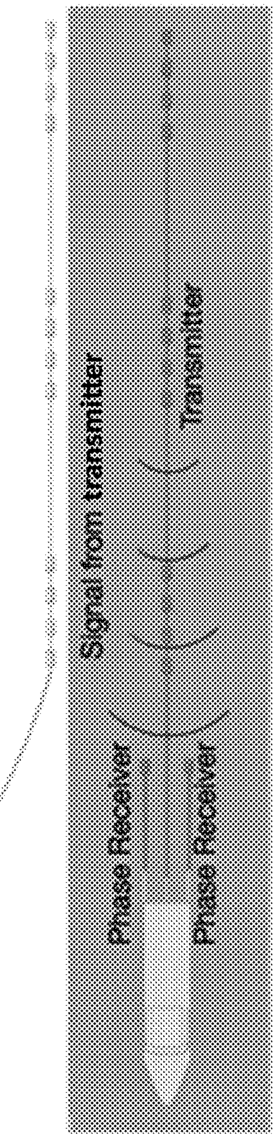

FIG. 102C illustrates a top orthogonal view of a radar system (e.g., CW or pulse radar system) including a plurality of transmitter antennas and a plurality of receiver antennas according to one embodiment of the present invention.

Figure 103A:
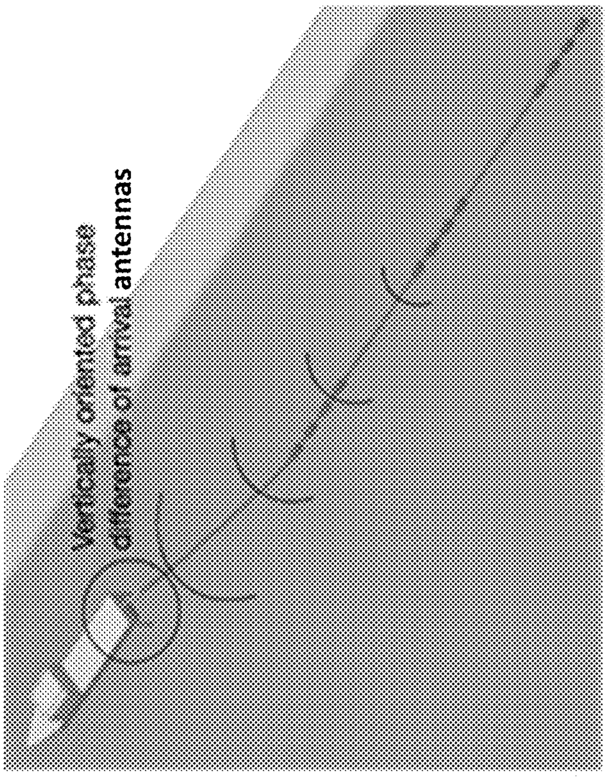

FIG. 103A illustrates a radar system (e.g., CW or pulse radar system) including a plurality of transmitter antennas and a plurality of receiver antennas according to another embodiment of the present invention.

Figure 103B:
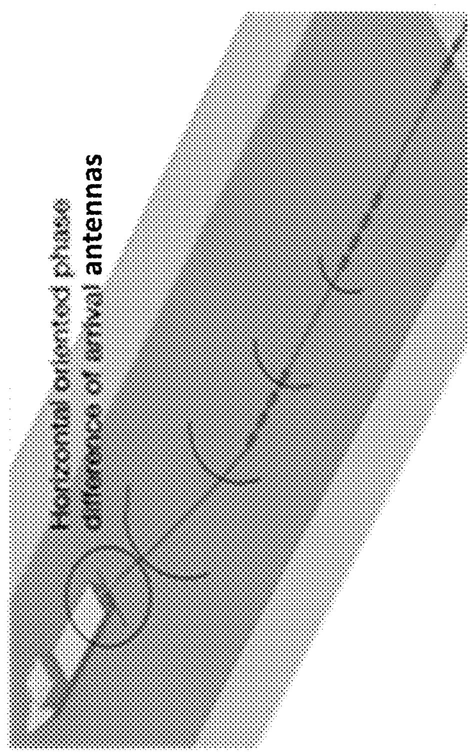

FIG. 103B illustrates a radar system (e.g., CW or pulse radar system) including a plurality of transmitter antennas and a plurality of receiver antennas according to yet another embodiment of the present invention.

Figure 104:
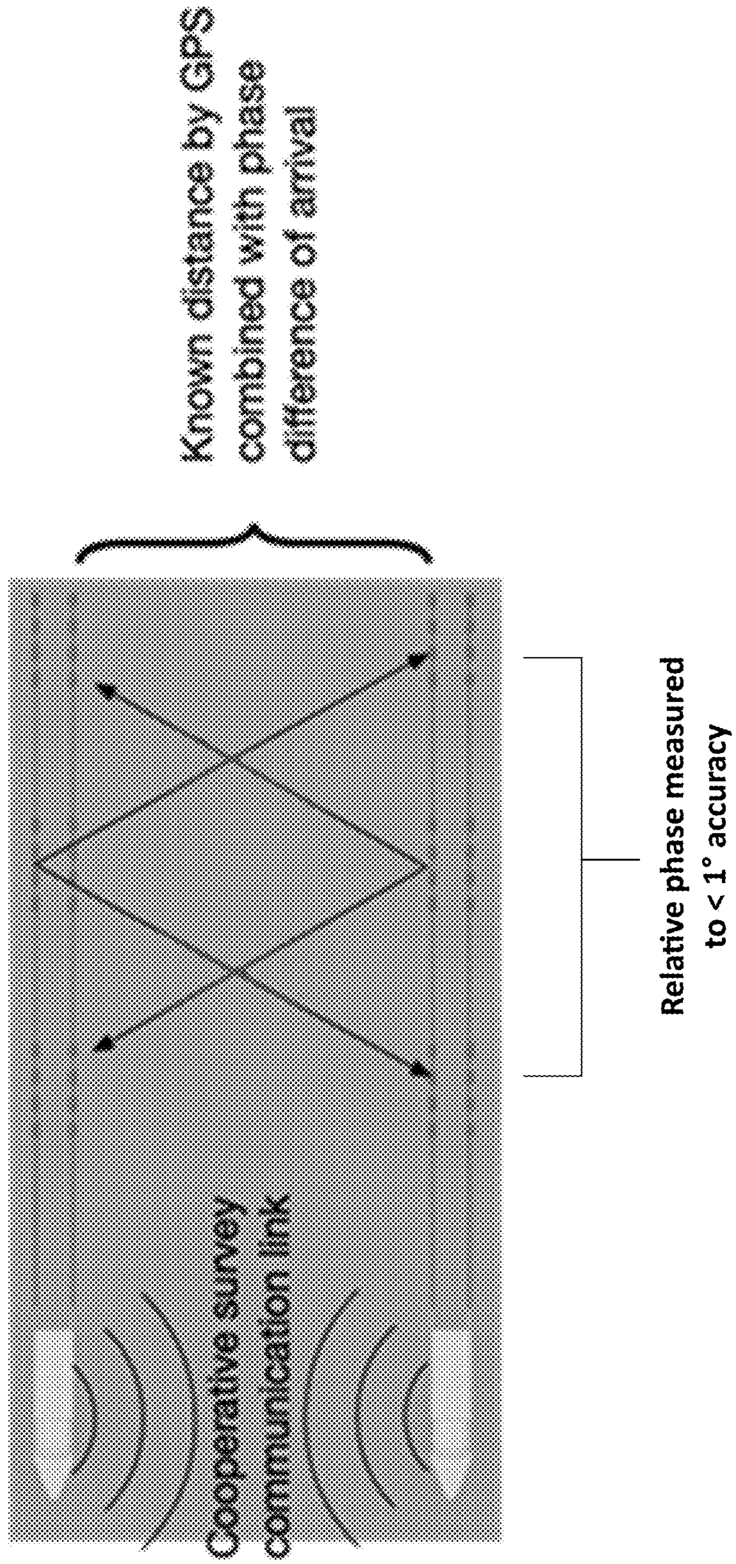

FIG. 104 illustrates a radar system (e.g., CW or pulse radar system) using GPS according to one embodiment of the present invention.

Figures 105A, 105B:
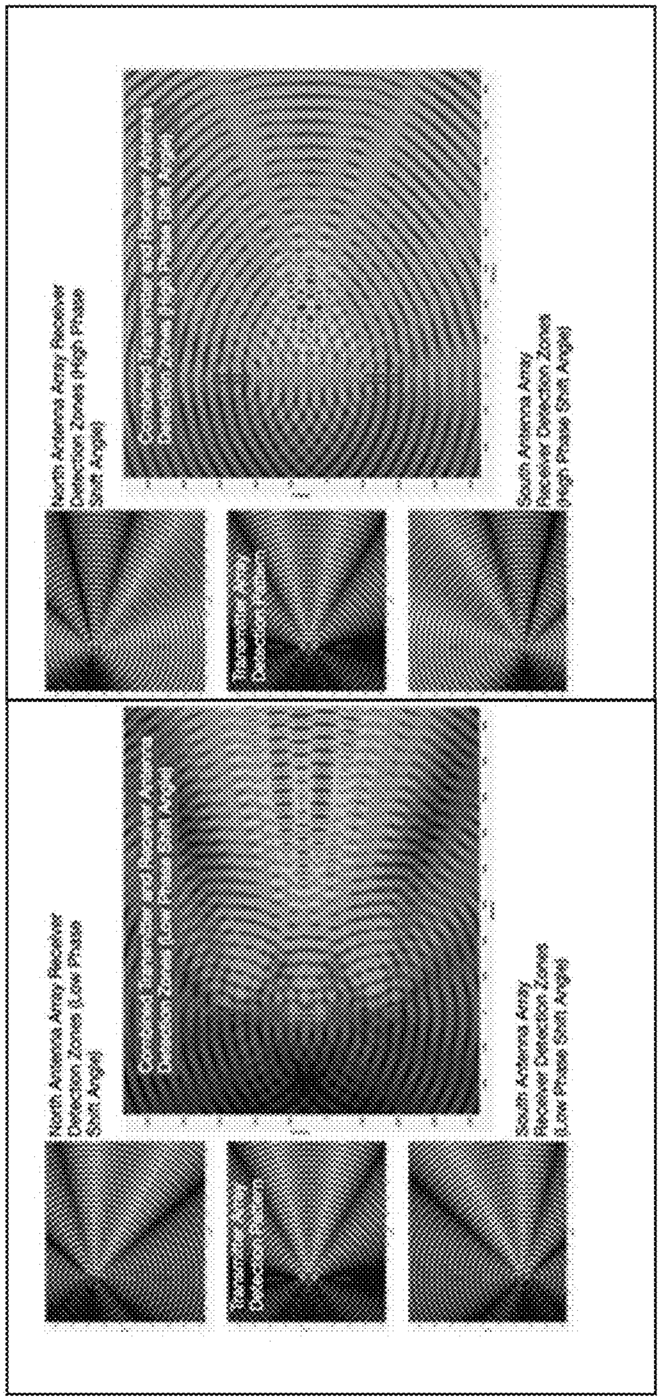

FIG. 105A illustrates radar detection zones with constructive and destructive zones according to one embodiment of the present invention.

FIG. 105B illustrates radar detection zones with constructive and destructive zones according to another embodiment of the present invention.

Figure 106:
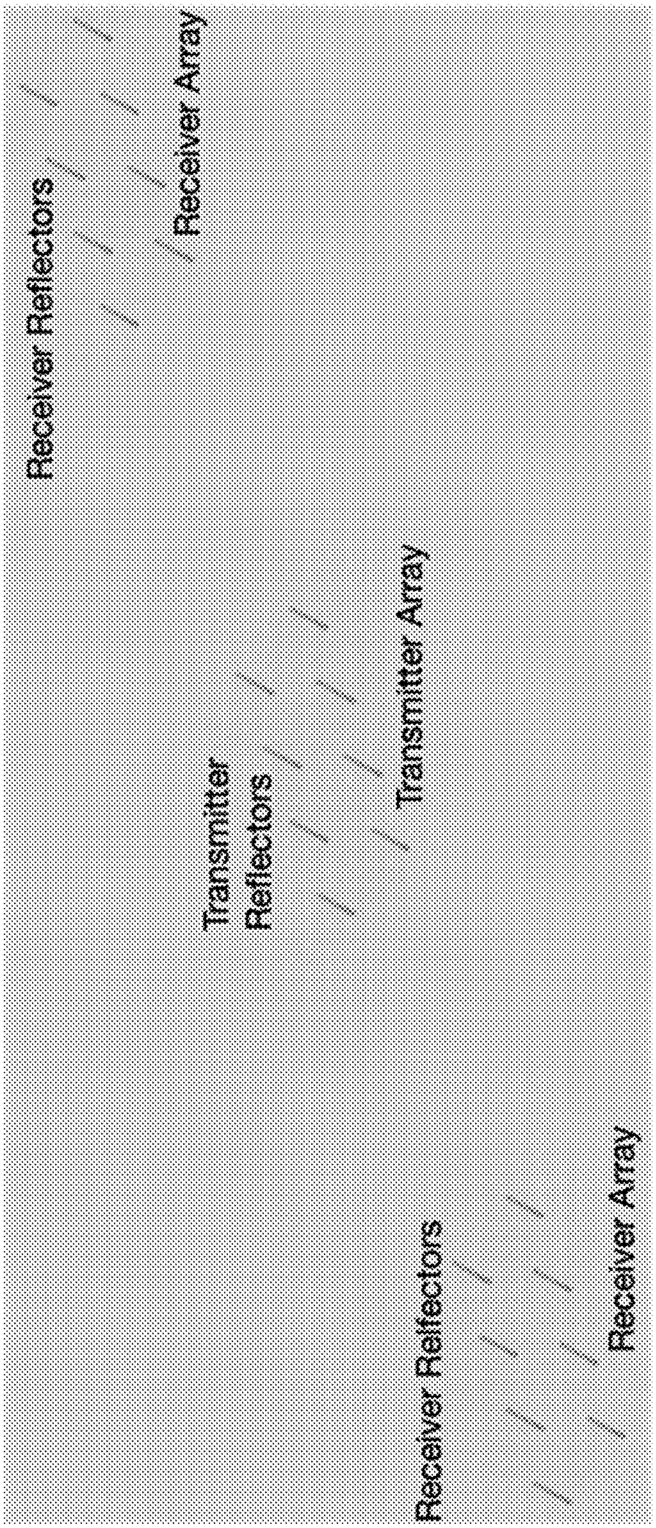

FIG. 106 illustrates a perspective view of radar detection zones according to one embodiment of the present invention.

Figure 107:
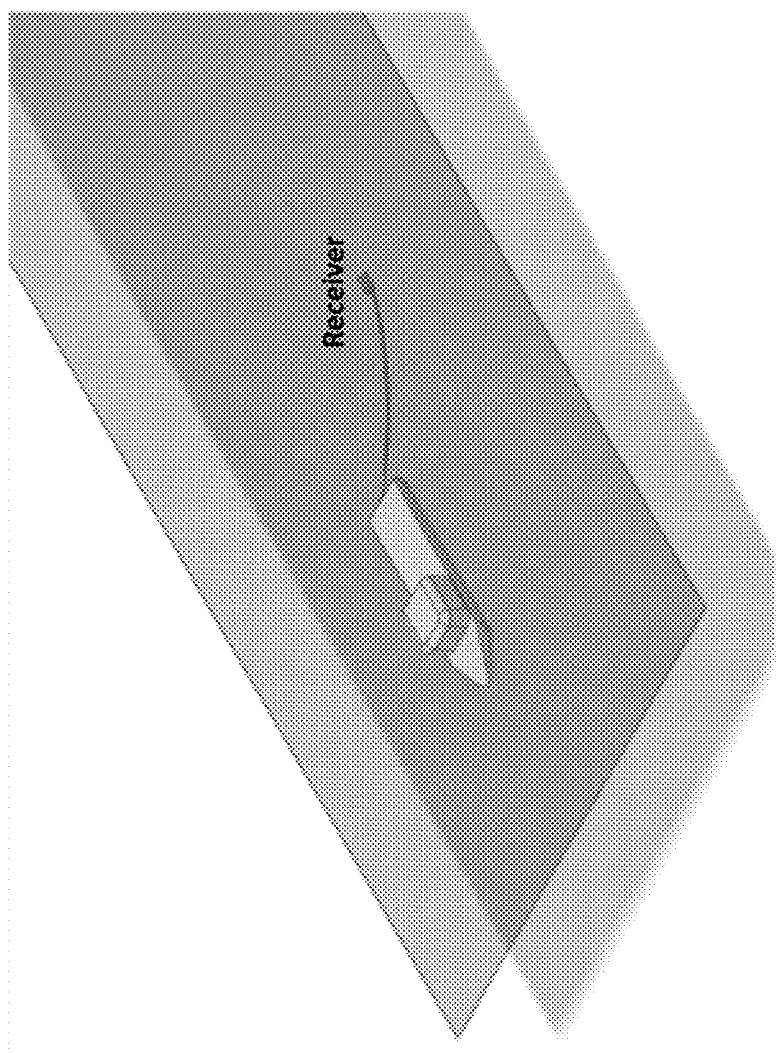

FIG. 107 illustrates a receiver system according to one embodiment of the present invention.

Figure 108:
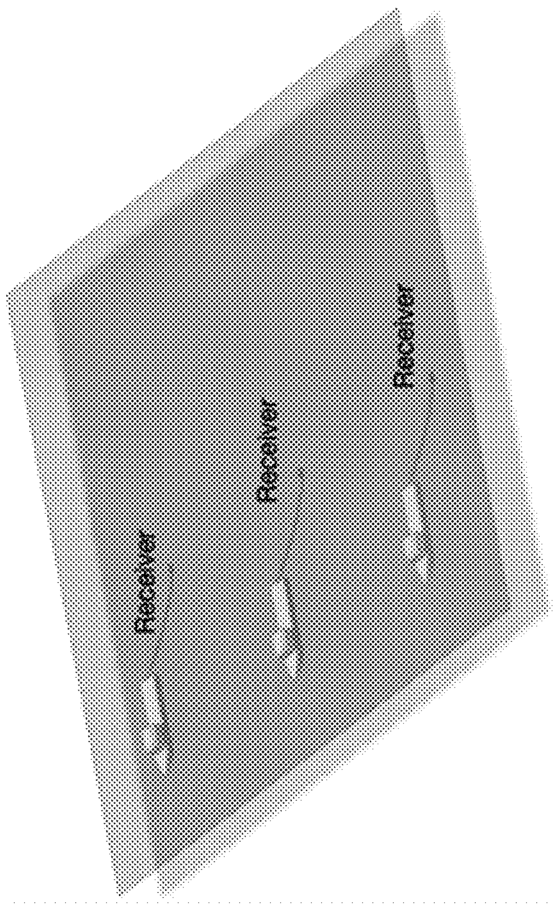

FIG. 108 illustrates a receiver system including more than one vessel according to one embodiment of the present invention.

Figure 109:
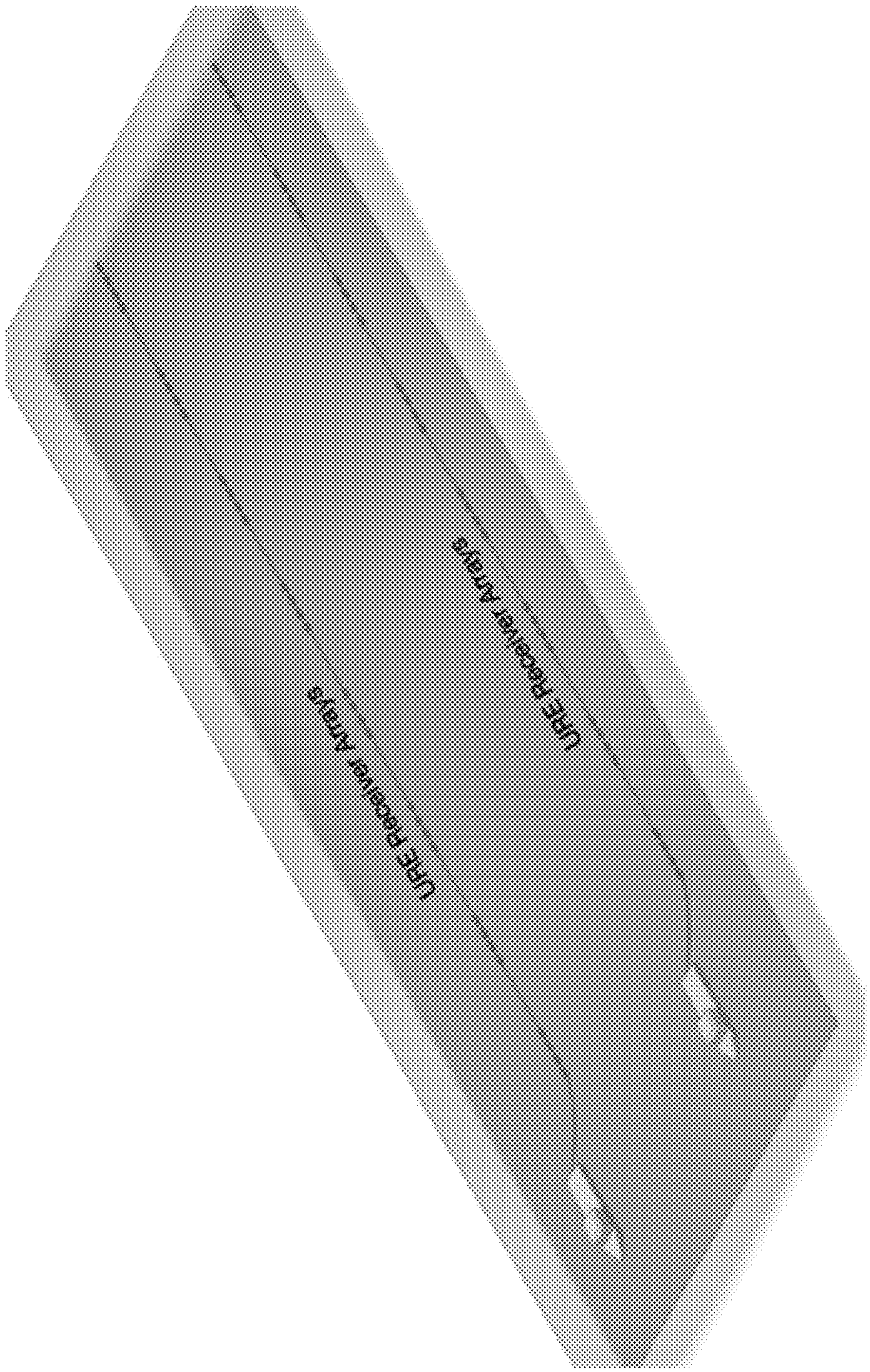

FIG. 109 illustrates a receiver system including more than one tow vessel according to another embodiment of the present invention.

Figure 110A:
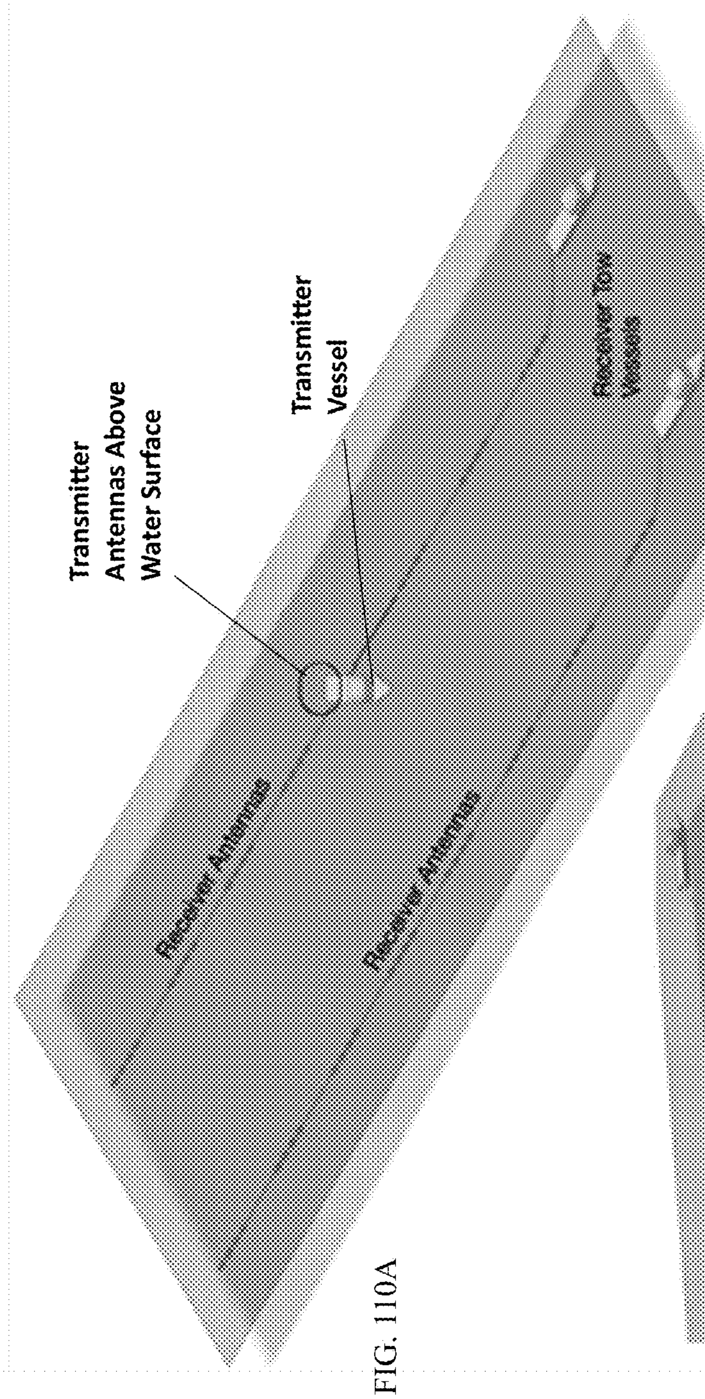

FIG. 110A illustrates an above sea level transmitter antenna in combination with at least one below sea level receiver antennas according to one embodiment of the present invention.

Figure 110B:
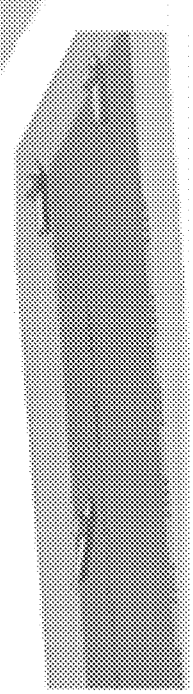

FIG. 110B illustrates a perspective view of an above sea level transmitter antenna in combination with at least one below sea level receiver antennas according to one embodiment of the present invention.

Figure 111:
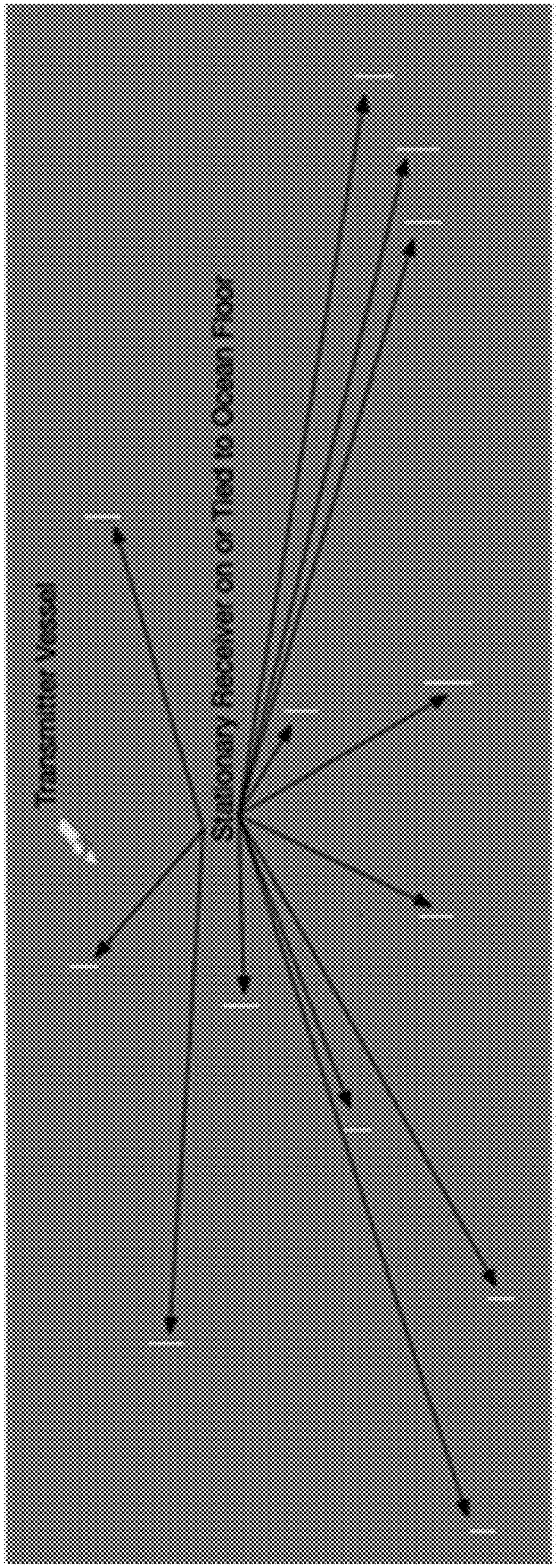

FIG. 111 illustrates a stationary set of receivers according to one embodiment of the present invention.

Figure 112:
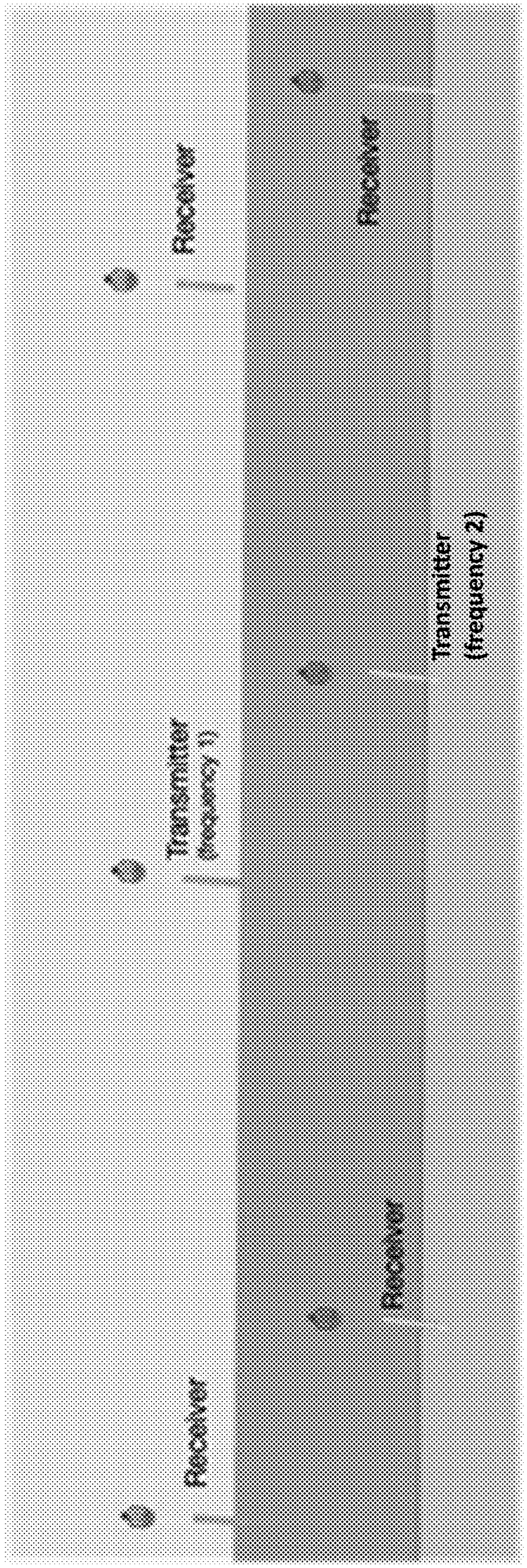

FIG. 112 illustrates a radar system (e.g., CW or pulse radar system) according to one embodiment of the present invention.

Figure 113:
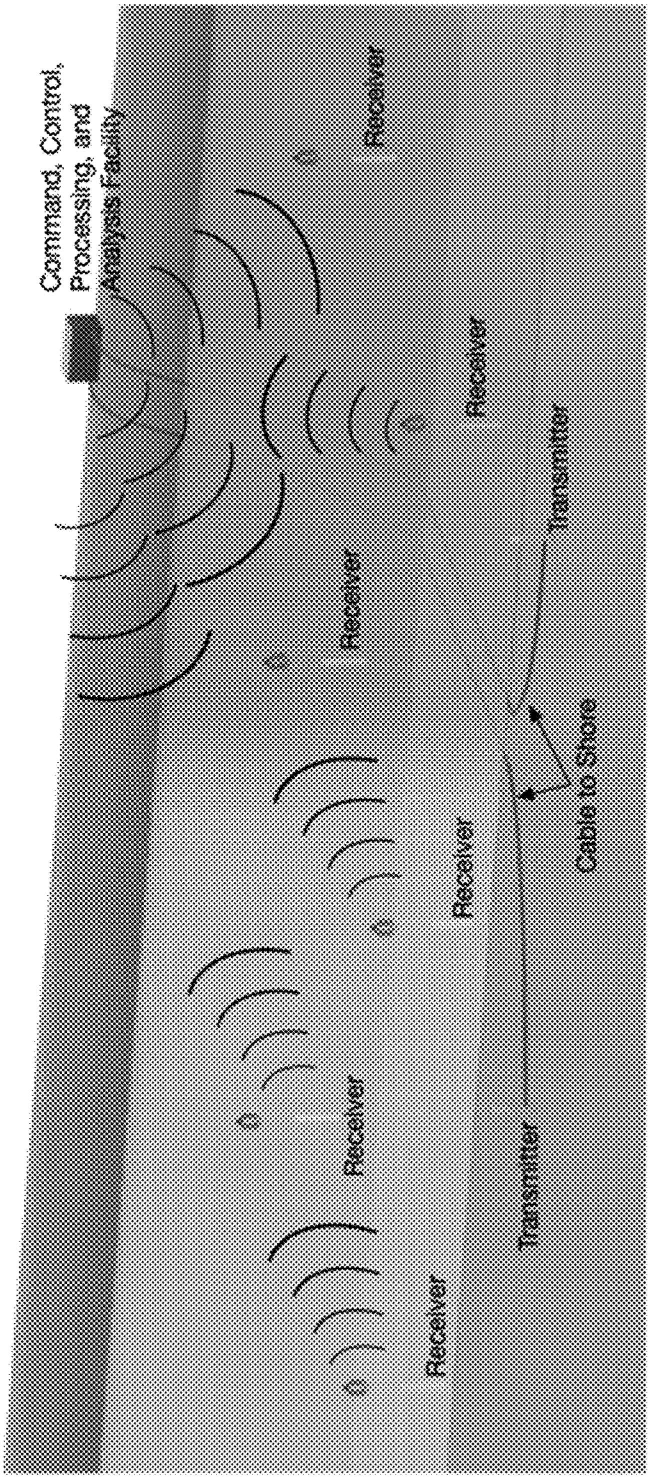

FIG. 113 illustrates an above sea level radar system (e.g., CW or pulse radar system) including a shore facility according to one embodiment of the present invention.

Figure 114:
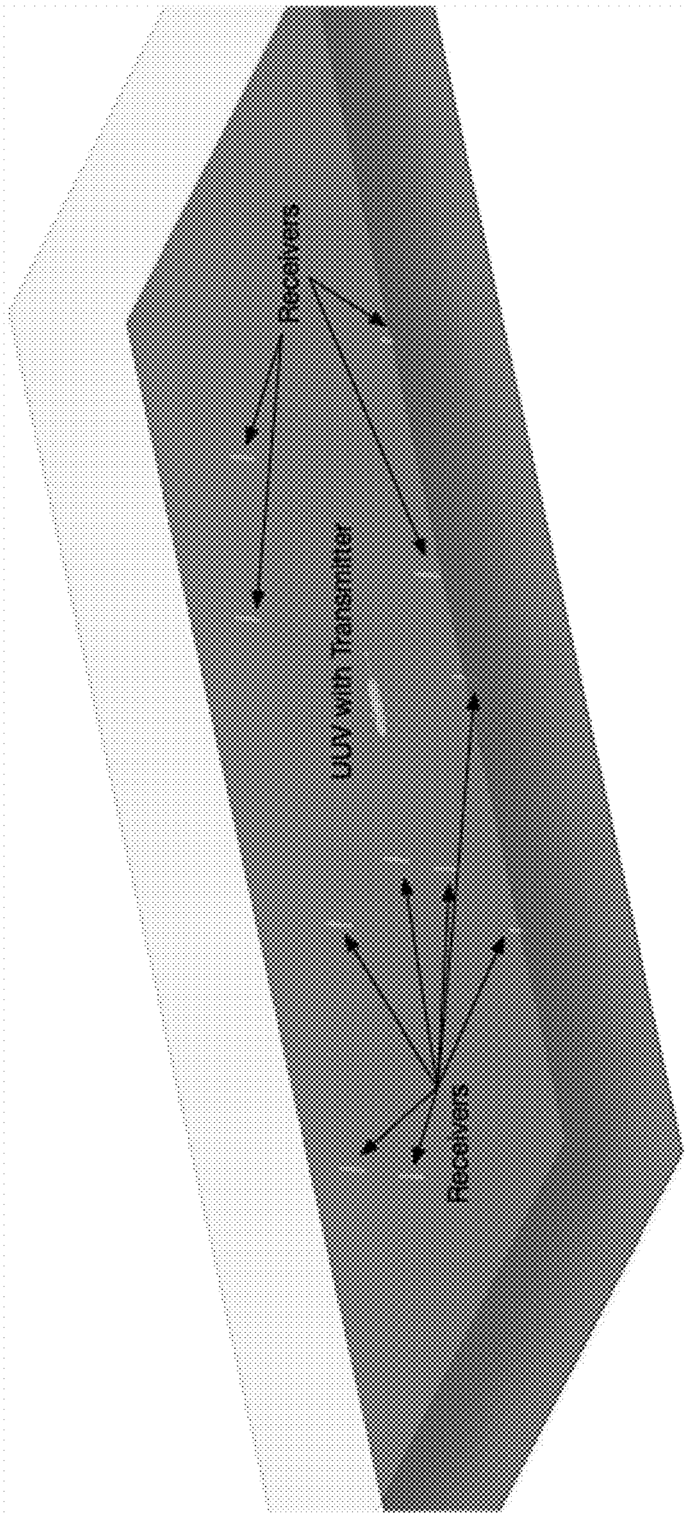

FIG. 114 illustrates radar system (e.g., CW or pulse radar system) including an Unmanned Underwater Vehicle (UUV) according to one embodiment of the present invention.

Figure 115:
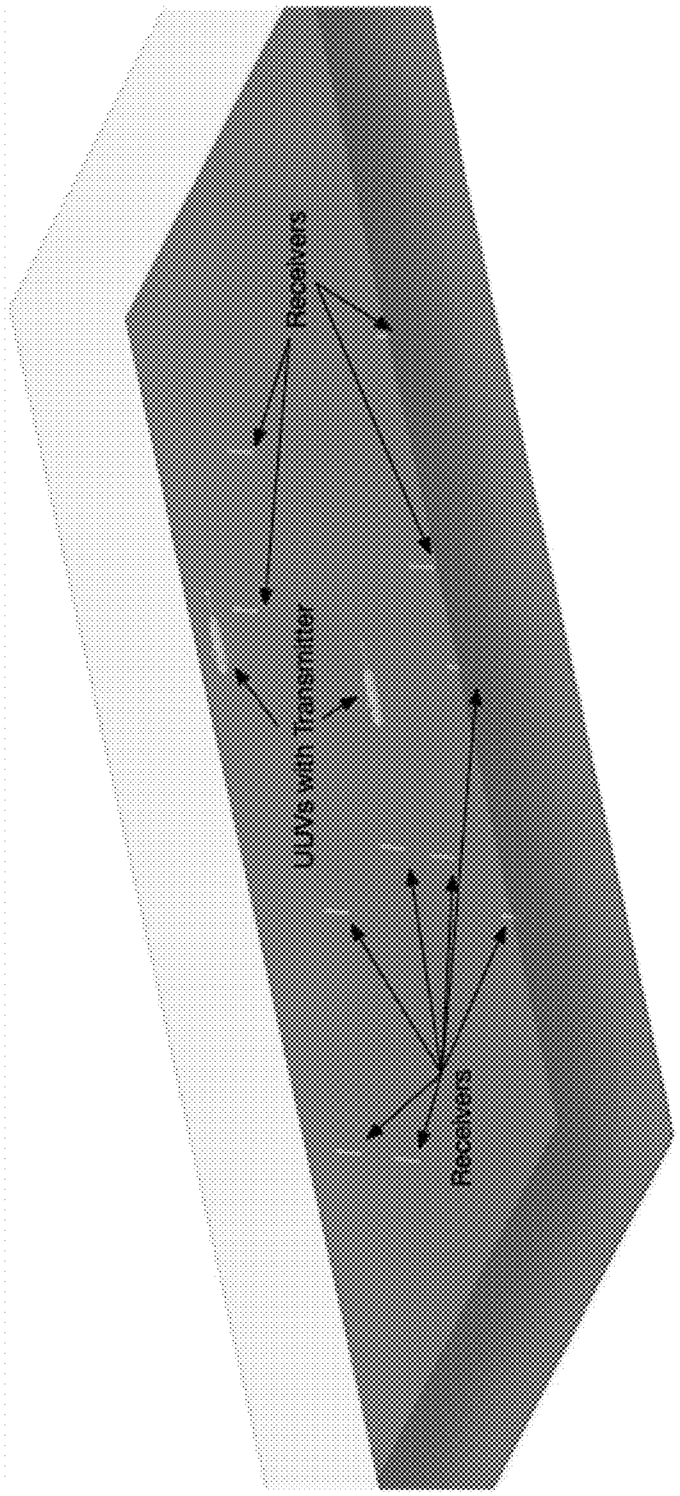

FIG. 115 illustrates radar system (e.g., CW or pulse radar system) including at least two UUVs according to one embodiment of the present invention.

Figure 116:
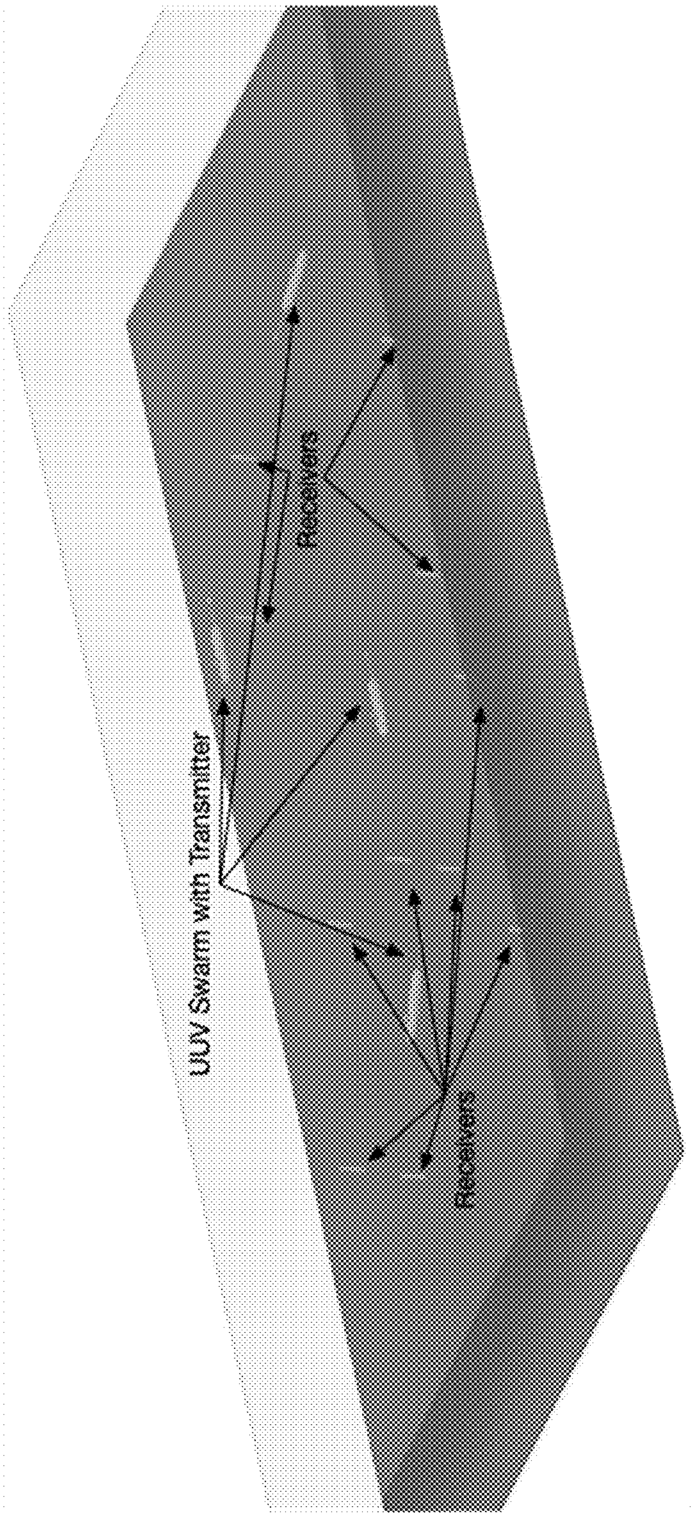

FIG. 116 illustrates a radar system (e.g., CW or pulse radar system) including a plurality of UUVs according to one embodiment of the present invention.

Figure 117:
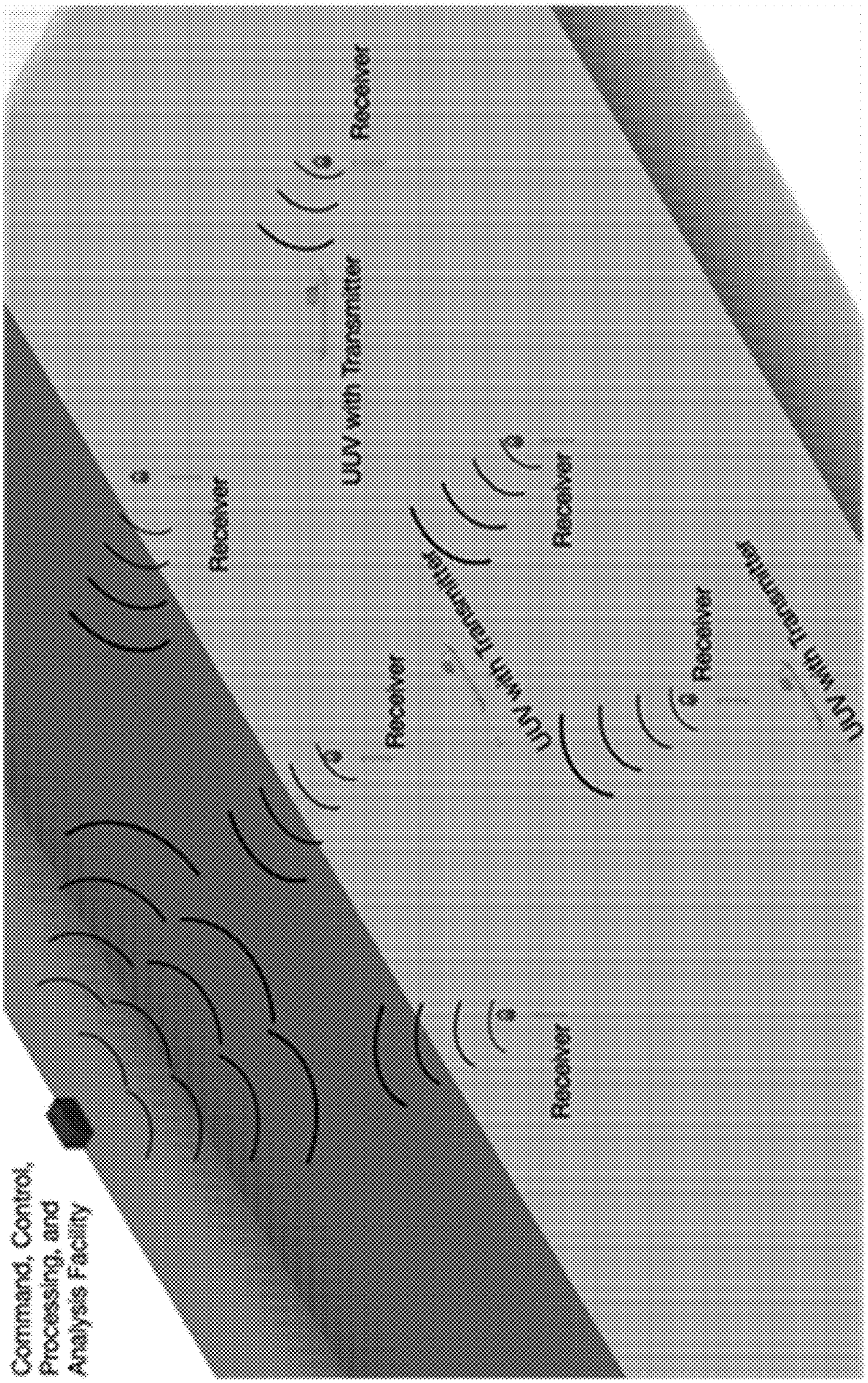

FIG. 117 illustrates a radar system (e.g., CW or pulse radar system) including a plurality of UUVs and a ground processing facility according to one embodiment of the present invention.

Figure 118:
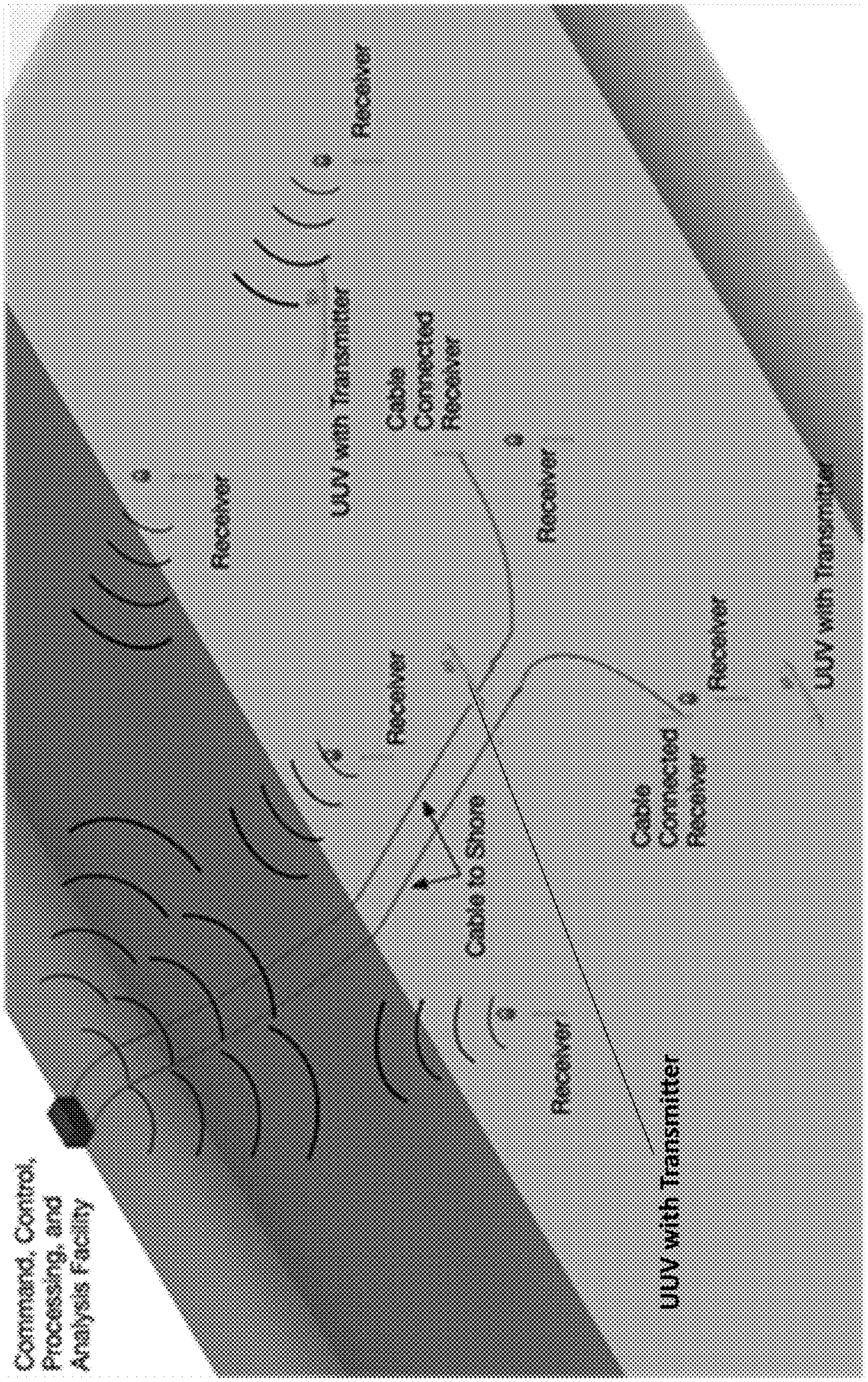

FIG. 118 illustrates radar system (e.g., CW or pulse radar system) including a plurality of UUVs and a ground processing facility according to another embodiment of the present invention.

Figure 119:
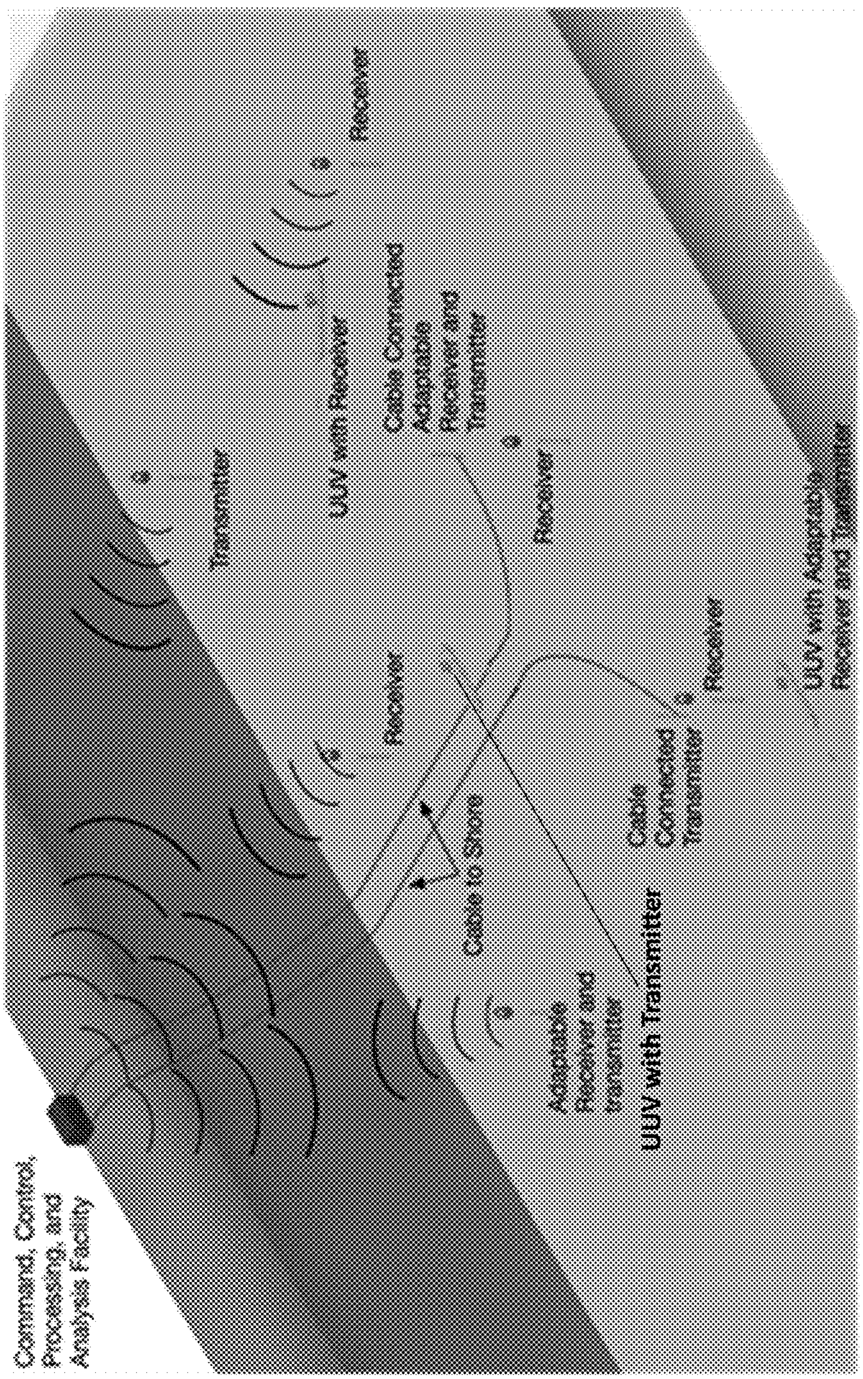

FIG. 119 illustrates a radar system (e.g., CW or pulse radar system) including a plurality of UUVs and a ground processing facility according to yet another embodiment of the present invention.

Figure 120:
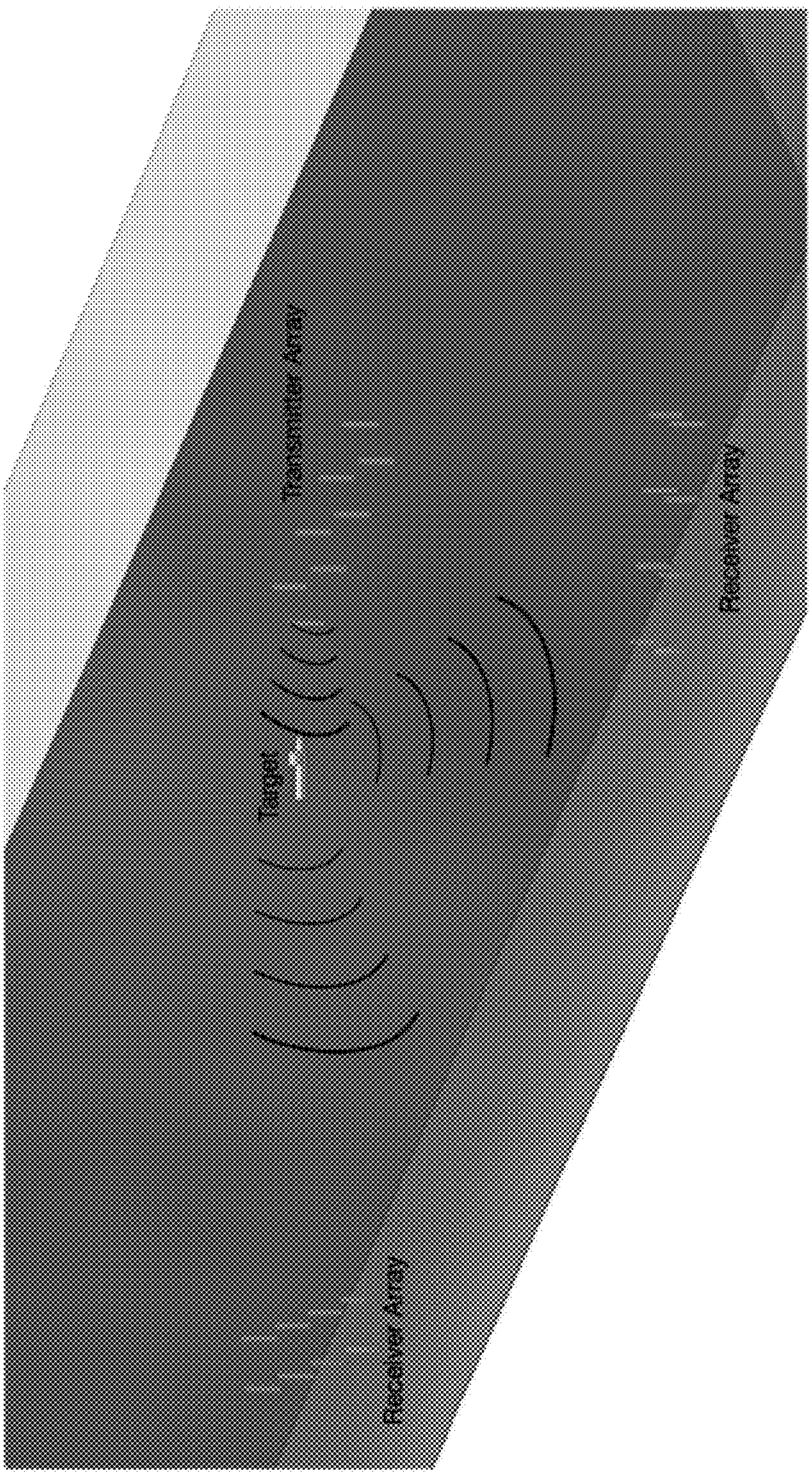

FIG. 120 illustrates a radar system (e.g., CW or pulse radar system) fixed to the ocean floor according to one embodiment of the present invention.

Figure 121:
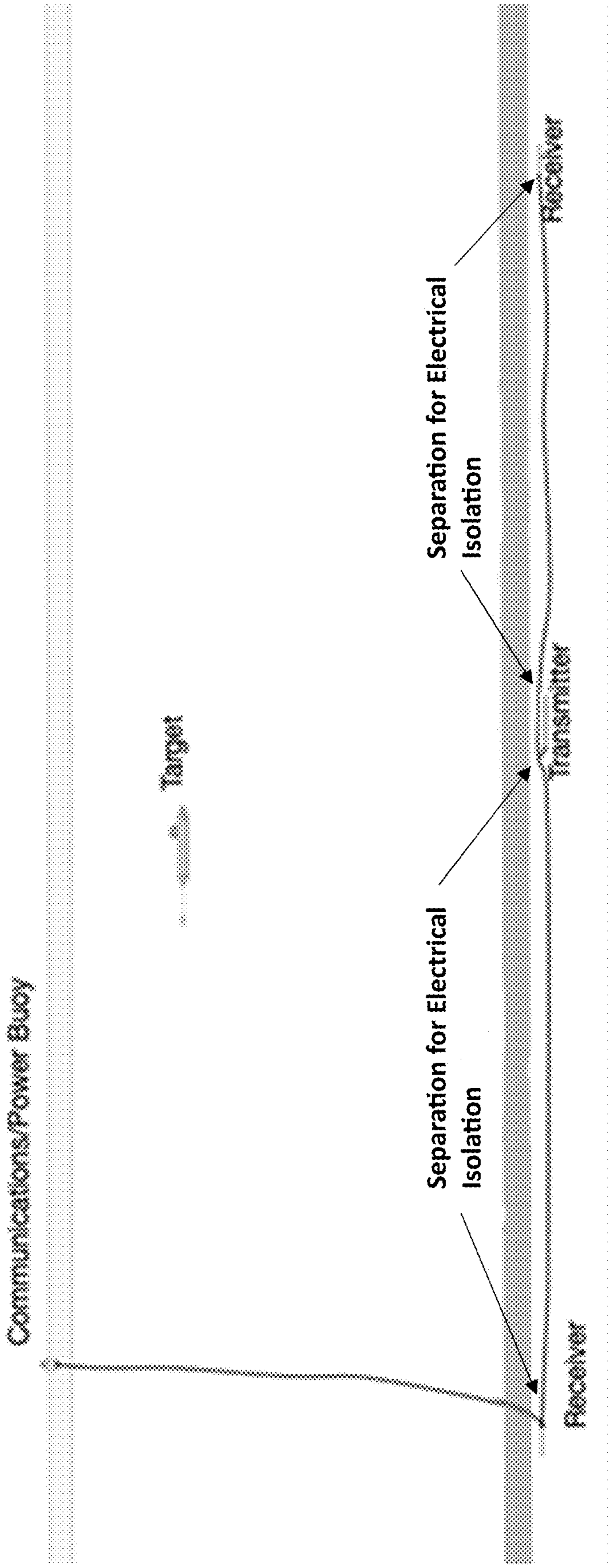

FIG. 121 illustrates a radar system (e.g., CW or pulse radar system) including a self-contained power supply according to one embodiment of the present invention.

Figure 122:
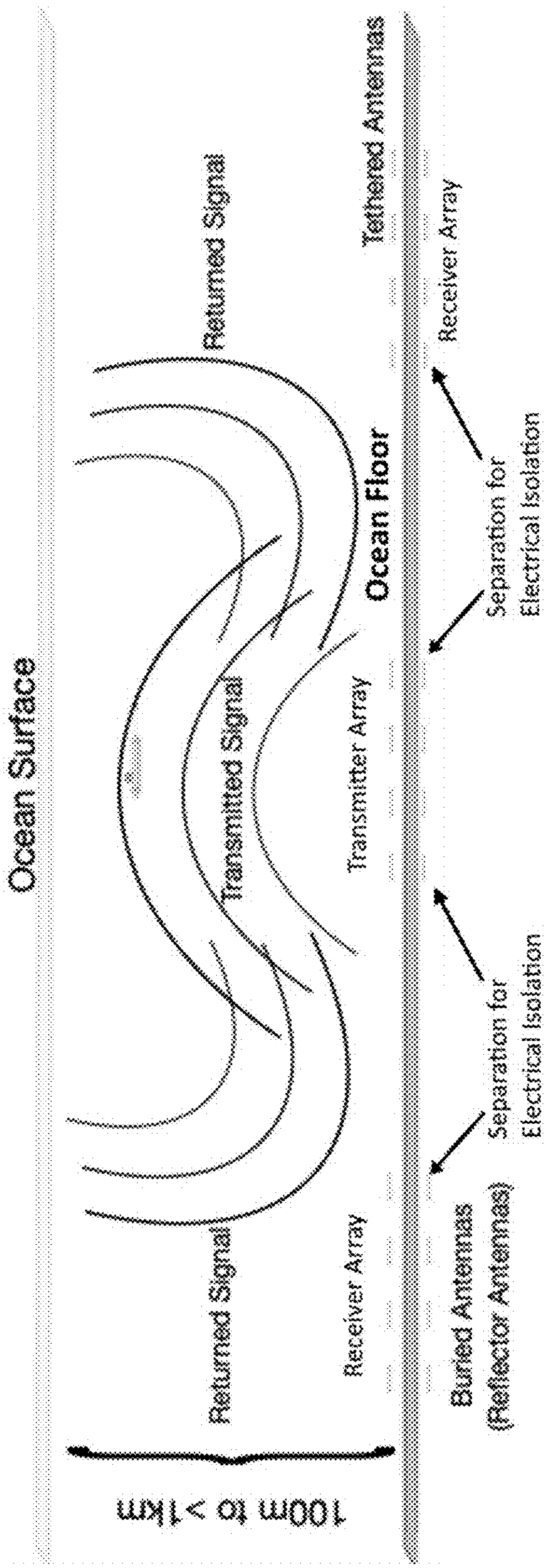

FIG. 122 illustrates a radar system (e.g., CW or pulse radar system) including various depth antennas according to one embodiment of the present invention.

Figure 123:
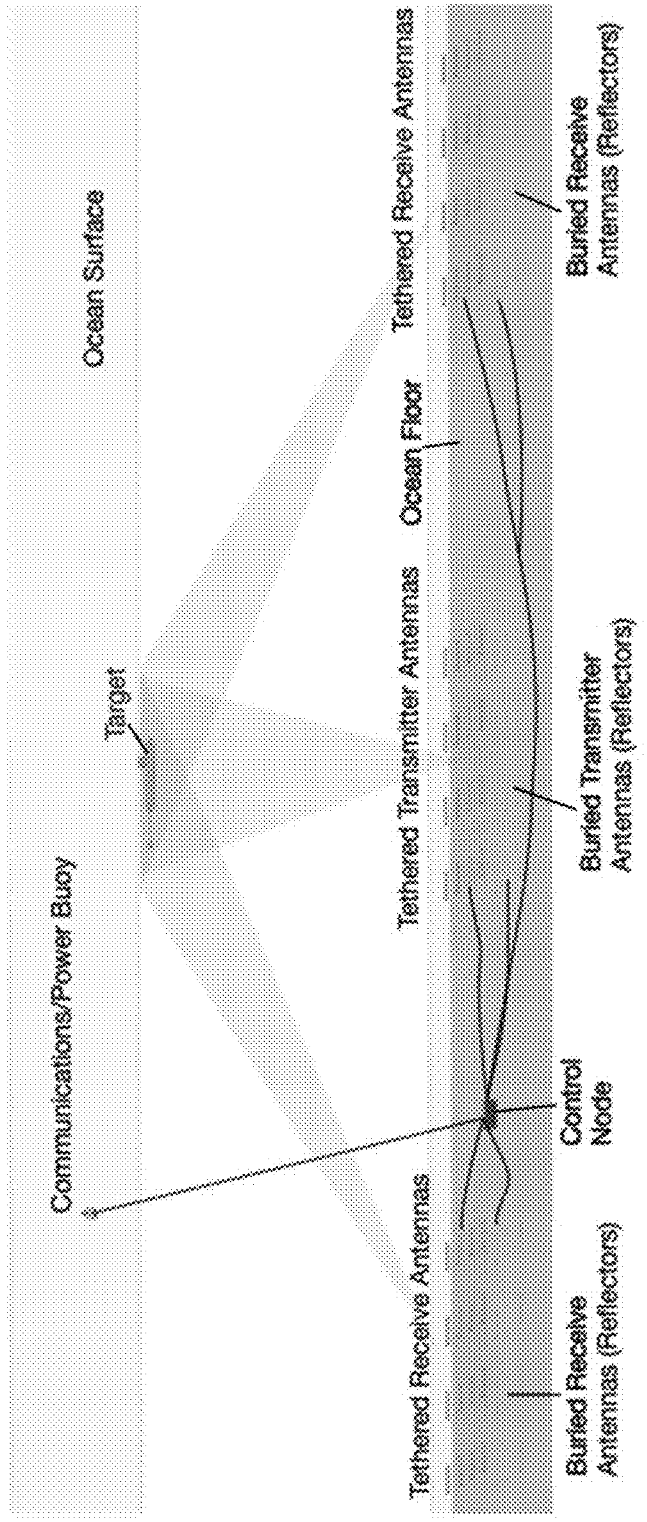

FIG. 123 illustrates a radar system (e.g., CW or pulse radar system) including an elliptical antenna array according to one embodiment of the present invention.

DETAILED DESCRIPTION

The present invention is generally directed to a continuous-wave (CW) and/or pulsed waveform radar system for detecting ferrous and non-ferrous metals in saltwater environments, as well as methods of using the radar system (e.g., the CW radar system) to detect, geolocate in two and/or three dimensions using absolute and/or relative coordinate systems, convert geolocation to two and three dimensional mapping systems, determine an approximate size of an object, and determine a material composition of the object for ferrous and non-ferrous metals in underwater (e.g., saltwater) environments.

In one embodiment, the present invention provides a radar system for detecting objects in an underwater environment, including at least one transmitter (Tx) antenna including at least one signal generator operable to emit at least one transmission signal to a target area, at least one receiver (Rx) antenna including at least one signal receiver and at least one signal processor, wherein the at least one Tx antenna and the at least one Rx antenna include a plurality of toroidal ring stacks, wherein a first of the plurality of toroidal ring stacks is mounted to an inductor rod, wherein each of the plurality of toroidal ring stacks include an outer circumference equal to an inner circumference of a subsequent toroidal ring stack such that each of the plurality of toroidal ring stacks increases an overall diameter of the at least one Tx antenna and/or the at least one Rx antenna, wherein an outer circumference of an outermost toroidal ring stack of the plurality of toroidal ring stacks includes wire wrapping sufficient to induce an oscillating magnetic field, wherein the at least one signal receiver is operable to receive at least one return signal from the target area via the at least one Rx antenna, and wherein the at least one signal processor is operable to analyze the at least one return signal.

In another embodiment, the present invention provides a radar system for detecting objects in an underwater environment, including a plurality of transmitter (Tx) antennas, each including at least one signal generator operable to emit at least one transmission signal to a target area, a plurality of receiver (Rx) antennas, each including at least one signal receiver and at least one signal processor, wherein the plurality of Tx antennas and the plurality of Rx antennas include a plurality of toroidal ring stacks, wherein a first of the plurality of toroidal ring stacks is mounted to an inductor rod, wherein each of the plurality of toroidal ring stacks include an outer circumference equal to an inner circumference of a subsequent toroidal ring stack such that each of the plurality of toroidal ring stacks increases an overall diameter of each of the plurality of Tx antennas and/or the plurality of Rx antennas, wherein an outer circumference of an outermost toroidal ring stack of the plurality of toroidal ring stacks includes wire wrapping, wherein the at least one signal receiver is operable to receive at least one return signal from the target area via the plurality of Rx antennas, and wherein the at least one signal processor is operable to analyze the at least one return signal.

In yet another embodiment, the present invention provides a radar system for detecting objects in an underwater environment, including a plurality of transmitter (Tx) antennas, each including at least one signal generator operable to emit at least one transmission signal to a target area, a plurality of receiver (Rx) antennas, each including at least one signal receiver and at least one signal processor, wherein the plurality of Tx antennas and the plurality of Rx antennas include a plurality of toroidal ring stacks, wherein a first of the plurality of toroidal ring stacks is mounted to an inductor rod, wherein each of the plurality of toroidal ring stacks include an outer circumference equal to an inner circumference of a subsequent toroidal ring stack such that each of the plurality of toroidal ring stacks increases an overall diameter of each of the plurality of Tx antennas and/or the plurality of Rx antennas, wherein an outer circumference of an outermost toroidal ring stack of the plurality of toroidal ring stacks includes wire wrapping sufficient to induce an oscillating magnetic field, wherein the at least one signal receiver is operable to receive at least one return signal from the target area via the plurality of Rx antennas, wherein the at least one signal processor is operable to analyze the at least one return signal, and wherein the at least one signal processor is operable to detect at least one target object in the target area based on the at least one return signal.

In yet another embodiment, the present invention provides a radar system for detecting ferrous and non-ferrous metal in an underwater environment, including at least one transmitter system including a transmitter antenna, wherein the transmitter antenna includes a signal generator connected to a wireless communication system, at least one receiver system including a receiver antenna operable to receive signals generated by the signal generator, wherein the receiver antenna includes a signal processor connected to a wireless communication system, at least one shore-based facility operable to connect to the transmitter antenna wireless communication system and the receiver antenna wireless communication system, wherein the at least one transmitter system is mounted below a first buoy operable to receive power, wherein the at least one transmitter system draws power from the first buoy, wherein the transmitter system is operable to transmit a signal to a target area, wherein the at least one receiver system is mounted below a second buoy operable to receiver power, wherein the at least one receiver system draws power from the second buoy, wherein the receiver system is operable to receive the transmitted signal from the target area, wherein the transmitter system is operable to transmit continuous wave, pulsed waveform, and/or a time-shared combination of continuous wave and pulsed waveform, wherein the radar system is operable to shift frequencies in real time, and wherein the underwater environment includes saltwater.

In yet another embodiment, the present invention provides a system for detection of unintentional radiated emissions (URE) in an underwater environment, including at least one receiver antenna tethered to the ocean floor, residing upon the ocean floor, and/or buried under the ocean floor, at least one transmitter antenna operable to transmit a signal to a target area, wherein the at least one receiver antenna is operable to receive the transmitted signal from the target area, wherein the at least one receiver antenna is tied to or connected to a high-gain, low-noise amplifier, a receiver/digitizer, and a signal processor, wherein the system is operable detect URE from at least one target in the target area, and wherein the underwater environment is a saltwater environment.

In yet another embodiment, the present invention provides a system for detection of unintentional radiated emissions (URE) in an underwater environment, including at least one vehicle, at least one receiver antenna, wherein the at least one receiver antenna is towed by the at least one vehicle or mounted directly on the at least one vehicle, at least one transmitter antenna operable to transmit a signal to a target area, wherein the at least one receiver antenna is connected to a high-gain, low-noise amplifier, wherein the high-gain, low-noise amplifier is connected to a signal processor, wherein the at least one receiver antenna is operable to receive the transmitted signal from the target area, wherein the signal processor is operable to detect the URE from at least one target in the target area, and wherein the underwater environment is a saltwater environment.

In yet another embodiment, the present invention provides a radar system for detecting ferrous and non-ferrous metal in an underwater environment, including at least one transmitter antenna including a signal generator, at least one receiver antenna including a signal processor, wherein the at least one transmitter antenna and the at least one receiver antenna are powered from shore, internal power, and/or connected to a surface of the underwater environment or near-surface of the underwater environment to a renewable power system, wherein the at least one transmitter antenna and the at least one receiver antenna are connected to a communication system operable to provide command, control, and exfiltration of detection of at least one target in a target area, wherein the at least one transmitter antenna is separated by sufficient distance from the at least one receiver antenna to provide electrical isolation, wherein the at least one transmitter antenna and the at least one receiver antenna are located at a depth greater than 30 meters and are arranged to observe the ocean above the at least one transmitter antenna and the at least one receiver antenna, wherein the at least one transmitter antenna is operable to transmit a signal including a continuous wave, a pulsed waveform, or a time-shared combination continuous wave and pulsed waveform, wherein the radar system is operable to shift frequencies in real time, and wherein the underwater environment is a saltwater environment.

None of the prior art discloses the use of extremely-low frequency (ELF) electromagnetic (EM) waves in saltwater to pinpoint and/or locate ferrous and non-ferrous metals.

Current underwater detection and surveying technologies make use of magnetometers which are only able to measure magnetism in ferrous materials, such as iron or steel. Magnetometers are unable to detect non-ferrous metals such as gold, silver, copper, brass, bronze, aluminum, molybdenum, zinc, or lead. In addition, magnetometers only detect the strength, or relative change of the Earth's magnetic field at a particular location, and are strictly passive sensors. Thus, magnetometers only use the natural, surrounding magnetism of an object, relying solely on the Earth's fixed magnetic output as the transmitter (Tx). In such a system, only the magnetometer as the receiver (Rx) portion can be modified or manipulated. Moreover, magnetometers have a fixed range based on receiver sensitivity which results in a minimal detection range for ferrous materials.

While sub-bottom sonar, side scanning sonar, dual band metal detectors, ground penetrating radar (GPR), and pulsed-wave (PW) radar techniques are also available, these detection technologies are subject to faults and limitations that make their usage in saltwater environments impractical.

Sub-bottom sonar systems are able to penetrate the ocean floor, but cannot identify, locate, or differentiate between sedimentary material, ferrous material, and non-ferrous material. These systems can only detect "acoustic" impedance, which provides for determining changes in density from one stratigraphic layer to another stratigraphic layer of the subsurface geology. Acoustic impedance corresponds to a physical "pressure" wave (e.g., sound, physical vibrations, earthquakes, etc.), while "electrical" impedance corresponds to an electromagnetic wave (e.g., signals from radio, cell phones, microwaves, light, etc.). Typically, sub-bottom sonar systems operate in the acoustic range of 5-50 kilohertz (kHz). While lower frequencies penetrate deeper into mud and silt, these systems lack the ability to provide real detail of the detected layers. In contrast, higher frequencies provide minor surface layer detail, but lack the ability to penetrate sand, mud, or silt.

Side-scanning sonar is typically used to create a map of the ocean bottom. However, much like sub-bottom sonar, side-scanning sonar lacks the ability to penetrate into the surface of the ocean bottom. The devices utilized for side-scanning sonar are also acoustic-only devices.

Dual band metal detectors are also used in underwater salvaging. These systems are active systems and are able to identify ferrous and non-ferrous metals using dual frequency differences to determine metal types (e.g., ferrous vs. non-ferrous). Dual band metal detectors operate in the 5-100 kilohertz (kHz) range and are typically able to penetrate between 7.6 cm (3 inches) to 45.7 cm (18 inches) of sand, saltwater, soil, etc. In addition, dual band metal detectors are restricted to searching an area directly under the detector unit's coil diameter, which is typically less than 30.5 cm (12 inches) in diameter.

Ground penetrating radar (GPR) systems are used only in air environments. The frequency of GPR falls between 10-3000 megahertz (MHz). Even if a GPR system was encapsulated for ocean use, the radar energy would immediately be absorbed on contact with saltwater and its effective range would be less than 2.54 cm (1 inch). High frequency, commercial, hand-held metal detectors used on the land have the ability to not only detect metal objects (typically <1.8 m (6 ft) away), but are also able to classify what type of metal the object is made of (e.g., gold, silver, iron, etc.). This is accomplished through the differences between the multiple radar bands. In multiple signal systems, signals reflect off of the metal, but based on the metal material, the strength and phase of return between the frequencies is different. However, the frequencies of these commercial metal detectors do not transmit far enough in saltwater environments before being completely absorbed by the water and hence are operationally ineffective.

Pulsed-wave (PW) radar systems transmit electromagnetic (EM) waves during a time duration, or pulse width. During this process, the receiver is isolated from the antenna in order to protect the receiver's sensitive components from a transmitter's high-power EM waves. No received signals are operable to be detected during this time.

The faults and limitations of the previously mentioned detection and sensor technologies have led to the present invention: a continuous-wave (CW) radar system for detecting ferrous and non-ferrous objects in saltwater environments. Such a radar system combines all of the positive attributes of current sensor and detection technologies with none of the limitations or faults. Instead of relying on "acoustic" waves, the system uses "electromagnetic" waves, but at frequencies which allow for greater penetration than even the most sophisticated sub-bottom sonar systems.

In one embodiment, the radar system (e.g., the CW radar system) generates electromagnetic (EM) waves and uses those EM waves to perform functions including, but not limited to, detection, location, classification, and identification of objects of interest. Such objects include, but are not limited to, all types of ferrous and non-ferrous metals, as well as changing material boundary layers (e.g., soil to water, sand to mud, rock to organic materials, etc.). In one embodiment, the EM waves used are between 1 Hz and 1 MHz. In one embodiment, the radar system (e.g., the CW radar system) is operable to detect and record all frequencies below 1 MHz. In one embodiment, the radar system (e.g., the CW radar system) generates ELF EM waves. In one embodiment, the ELF EM waves used are between 100 Hz and 3000 Hz. In one embodiment, the radar system (e.g., the CW radar system) is operable to detect and record all frequencies below approximately 3000 Hz. Thus, the ELF EM waves are operable to propagate through water, soil, sand, rock, and/or metals. A portion of the ELF EM waves are reflected off of thicker metals and boundary layers, which are used to perform functions including, but not limited to, detection, location, analysis, mapping, and/or classification of objects. This entire process is performed using short, manageable antennas which are operable to transmit and receive the same ELF EM waves or signals. Thus, the present invention is operable to identify both ferrous and non-ferrous metals.

In one embodiment, the radar system (e.g., the CW radar system) of the present invention makes use of a multi-band system capable of operating at simultaneous frequencies in order to decrease location error and provide the ability to specifically identify the type of metal associated with an object and/or target during operations.

A key element of this system is the environment it functions in: saltwater. Saltwater is conductive and distributed equally around the system's sensors. The saltwater becomes a barrier to transmission, due to absorption, but simultaneously acts as a filter to keep the detection ranges local to the sensor. Without a saltwater environment, the transmission ranges measure in kilometers instead of meters. All conductive surfaces within a few kilometers would create a return signal and greatly reduce the ability to locate a specific target, local to the sensors. Saltwater changes the effective wavelength from potentially thousands of kilometers to less than 100 meters, enabling detection of targets, as well as localization of objects around the system's sensors from a few meters to a few hundred meters, based on Tx signal strength and Rx sensitivity. In one embodiment, the system is operable to handle variations in salinity within at least an 80.5 km (50 mile) radius without further adjustment. In another embodiment, the system is operable to be recalibrated at startup and/or when the saltwater environment changes to accommodate different levels of salinity. In one embodiment, the system is operable to detect targets and/or objects in brackish water.

The radar system (e.g., the CW radar system) is operable to function in deep saltwater environments, from tens of feet to tens of thousands of feet. Moreover, the design of the radar system (e.g., the CW radar system) of the present invention prevents saltwater from contaminating the towing device(s) connected to a collecting and/or towing vehicle. The radar system (e.g., the CW radar system) is capable of determining absolute object and/or target geolocation to within <4 meters (m) circular error probable (CEP) of accuracy. The radar system (e.g., the CW radar system) is also capable of providing object and/or target geolocation within <2 m CEP of accuracy using a relative positioning system. In one embodiment, relative positioning is determined through the use of a GPS receiver. In another embodiment, the relative positioning of detected targets is determined with respect to known metal targets or markers placed within the field of search.

Referring now to the drawings in general, the illustrations are for the purpose of describing one or more preferred embodiments of the invention and are not intended to limit the invention thereto.

The continuous-wave (CW) radar system of the present invention utilizes a combination of transmitter (Tx) and receiver (Rx) antennas. By using multiple Rx antennas, the system is able to reject clutter and provide more accurate localization of objects.

Figure 1A:
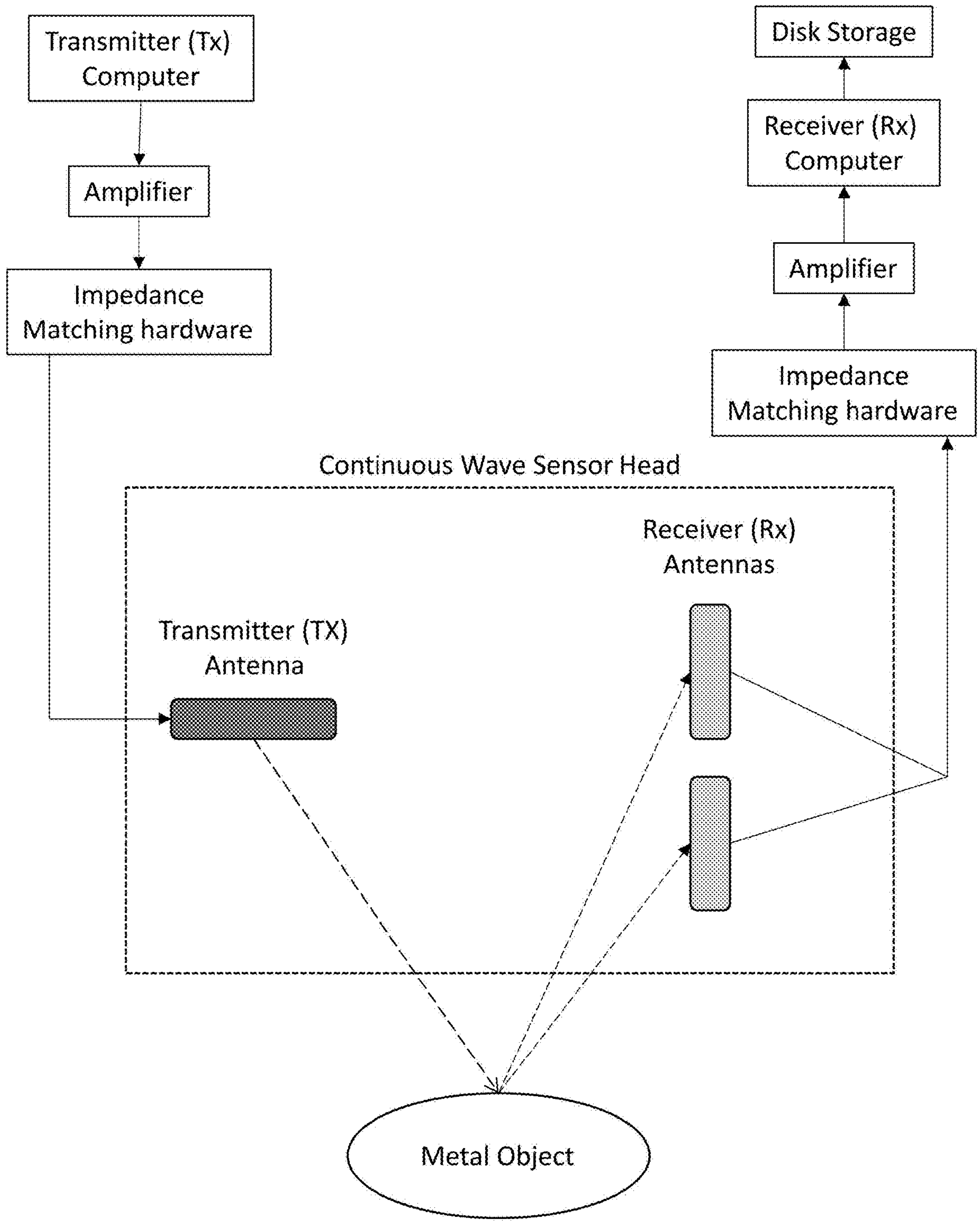
FIG. 1A illustrates a block diagram of a continuous-wave (CW) radar system according to one embodiment of the present invention.

FIG. 1A illustrates a block diagram of a continuous-wave (CW) radar system according to one embodiment of the present invention. The components include, but are not limited to, a transmitter computer, a receiver computer, at least two amplifiers, a storage component, at least two impedance matching hardware components coupled to the at least two amplifiers, a continuous wave sensor head (the submerged, towed structure comprising the Transmitter (Tx), Receiver (Rx) antennas, down plane, horizontal stabilizer, floatation elements, and structural support elements), a tow point, a Tx communications cable, a Rx communications cable. The continuous wave sensor head is comprised of at least one transmitter (Tx) antenna and at least two receiver (Rx) antennas. The submersion of the Tx and Rx antennas in a saltwater environment modifies the relative Tx and Rx wavelengths from thousands of kilometers to less than a few hundred of meters range. This enables the use of electrically short dipole antennas to collect enough energy, at the Rx antennas, to detect, locate, and/or identify all types of ferrous and non-ferrous metals.

Figure 1B:
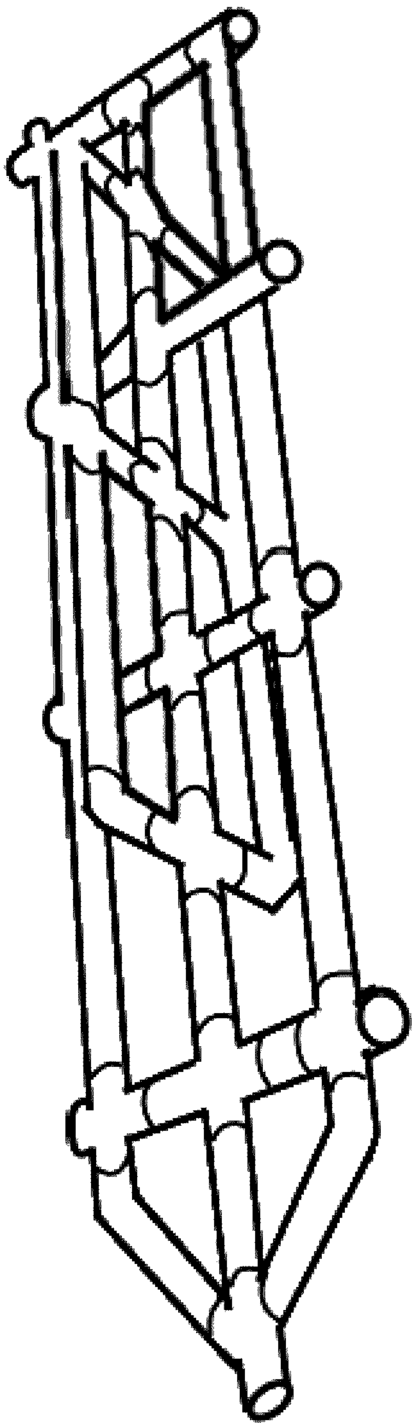
FIG. 1B illustrates a pipe frame for a radar system (e.g., a CW radar system) according to another embodiment of the present invention.

FIG. 1B illustrates a pipe frame for a radar system (e.g., a CW radar system) according to another embodiment of the present invention. The radar system (e.g., the CW radar system) is comprised of a multitude of piping, operable to house at least one Tx antenna and at least two Rx antennas.

Figure 1C:
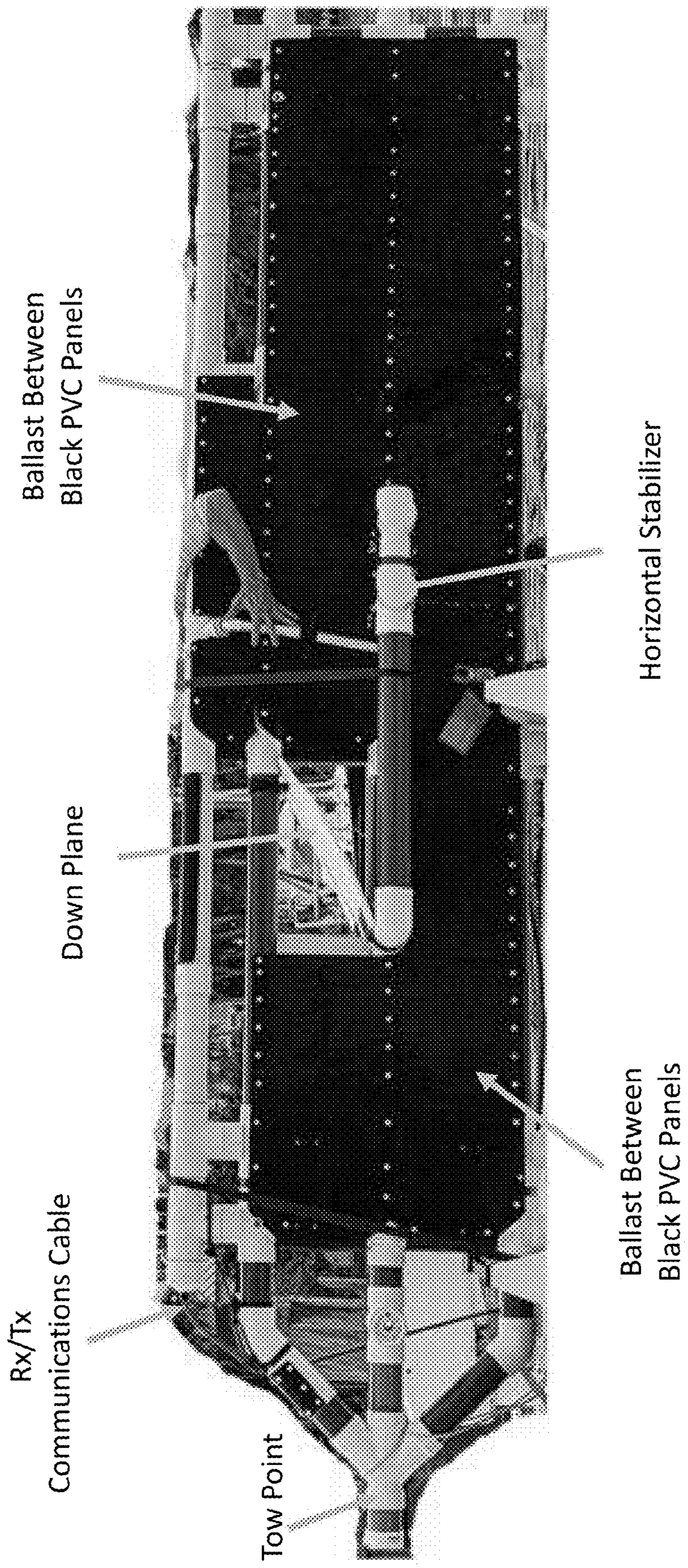
FIG. 1C illustrates a radar system (e.g., a CW radar system) according to yet another embodiment of the present invention.

FIG. 1C illustrates a radar system (e.g., a CW radar system) according to yet another embodiment of the present invention. The radar system (e.g., the CW radar system) is comprised of components including, but not limited to, a tow point, a Rx/Tx communications cable, a down plane, a horizontal stabilizer, at least one Tx antenna, and/or at least two Rx antennas. The tow point is positioned to maximize the stability of the radar system (e.g., the CW radar system) while it is being towed from a towing vessel. In one embodiment, the towing vessel is a watercraft, including but not limited to a boat, ship, JET SKI, or submarine. In another embodiment, the towing vessel is an underwater Remotely Operated Vehicle (ROV). In another embodiment, the towing vessel is an Autonomous Underwater Vehicle (AUV). The tow point also helps keep the tow cable separate from the data cable. The data cable enters the radar system (e.g., the CW radar system) above and behind the tow point on top of the radar system (e.g., the CW radar system). The data cable has multiple electrically shielded wires running throughout the structure to each of the six antennas, four Rx antennas and two Tx antennas. Furthermore, the path of the data cable throughout the radar system (e.g., the CW radar system) is also important, as the cable(s) are run in order to maximize their individual cross polarization to the Tx antennas. By positioning the Tx antennas at a 90-degree angle in relation to the Rx antennas, this prevents the Rx antenna's wiring from coming into contact with the Tx antenna output pattern, further reducing the crosstalk from the Tx antennas into the Rx antenna data cable(s). The 90-degree angle between Tx and Rx antennas also provides for the majority of the direct path attenuation through the use of the polarization properties of dipole antennas. Without this attenuation, signal from the Tx antenna would saturate the Rx antenna and any returning signal from a target would be lost due to the much, much stronger direct path signal.

Figure 1D:
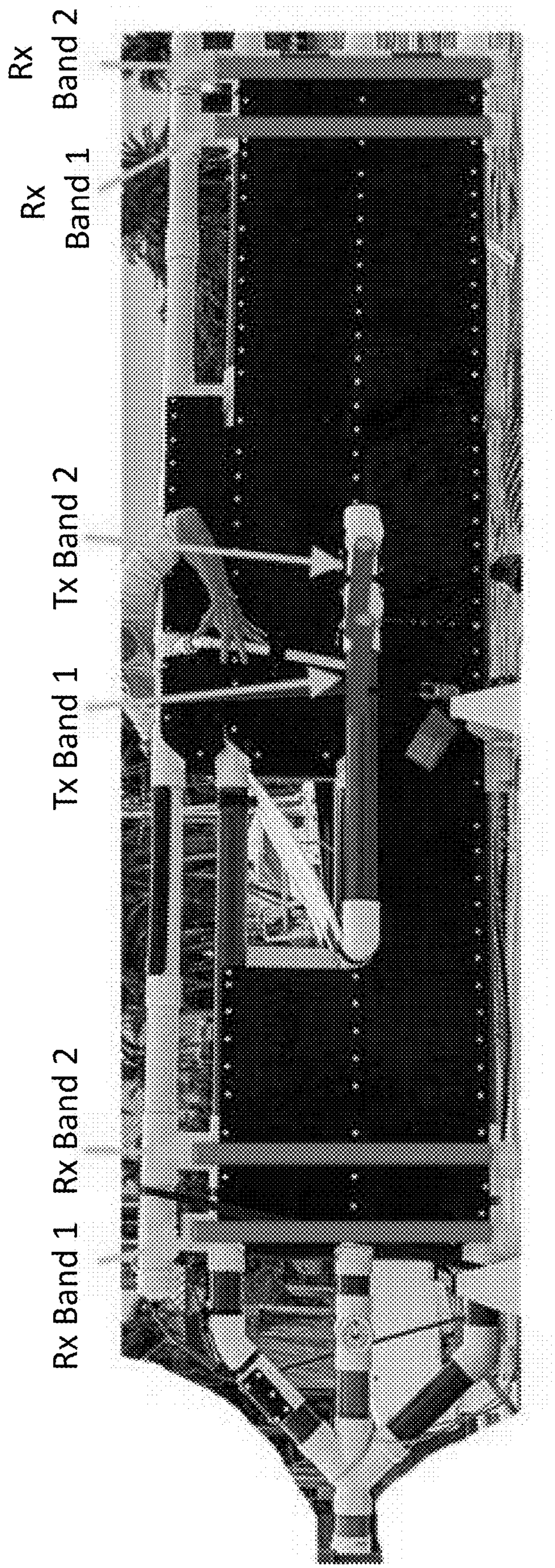
FIG. 1D illustrates the radar system (e.g., the CW radar system) of FIG. 1C showing the location of antennas in the piping according to another embodiment of the present invention operable to transmit and receive at least two frequencies simultaneously.

FIG. 1D illustrates the radar system (e.g., the CW radar system) of FIG. 1C showing the location of antennas in the piping according to another embodiment of the present invention. The radar system (e.g., the CW radar system) is comprised of components including, but not limited to, at least two bow Rx antennas, at least two Tx antennas placed approximately at the center of the radar system (e.g., the CW radar system), and at least two aft Rx antennas. In one embodiment, the at least two Tx antennas are positioned near a horizontal stabilizer for the radar system (e.g., the CW radar system). In one embodiment, the Tx and Rx antennas are dipole antennas. When two dipole antennas are placed in close proximity to one another, this sets up a transformer-like condition, resulting in a loss of power to the radar system if each antenna is too close to the other. As in a transformer, energy from one Tx antenna is absorbed by any adjacent Tx antenna. This results in a direct loss of usable power and requires the system to also prevent this lost energy/power from feeding back in to either Tx antenna's circuitry. In order to minimize these effects, the radar system (e.g., the CW radar system) of the present invention has been constructed with a functional distance built into the structure, holding the radar antennas separate. This functional distance is a function of how much transmitted energy loss is acceptable for the radar system (e.g., the CW radar system) and the specific transmitted frequencies being used. In one embodiment, the range for acceptable energy loss is between 5-20%. In one embodiment, the antennas are placed between approximately 22.9-61.0 cm (9-24 inches) away from each other to maintain acceptable energy loss wherein the distance is inversely proportional to the amount of energy loss. Where the Rx antennas are also dipole antennas, the Tx antennas must be angled 90-degrees or near-90-degrees with respect to the Rx antennas in order to maximize the benefits of cross polarization. In another embodiment, the Tx and Rx antennas are short dipole antennas. In another embodiment, the Tx and Rx antennas are half-wave dipole antennas. In another embodiment, the Tx and Rx antennas are folded dipole antennas. In yet another embodiment, the Tx and Rx antennas are bow-tie dipole antennas. In yet another embodiment, the Tx and Rx antennas are cage dipole antennas. In yet another embodiment, the Tx and Rx antennas are halo dipole antennas. In yet another embodiment, the Tx and Rx antennas are turnstile dipole antennas. In yet another embodiment, the Tx and Rx antennas are sloper dipole antennas. In yet another embodiment, the Tx and Rx antennas are inverted "V" dipole antennas. In yet another embodiment, the Tx and Rx antennas are G5RV dipole antennas. In yet another embodiment, the Tx and Rx antennas are not dipole antennas.

In one embodiment, a Tx antenna is placed in one of two center pipes and the corresponding Rx antenna pair(s) are perpendicular to the Tx antenna, forward and aft. Each Rx antenna is placed approximately 1-3 meters from the Tx antenna. The Rx antenna pair(s) are always perpendicular or substantially perpendicular to the Tx antenna in order to take advantage of the noise cancellation provided by the polarization characteristics of the antennas. In one embodiment, one Tx antenna effectively has four Rx antennas, two forward and two aft, with each Rx antenna spaced approximately 1-2 meters away from the Tx antenna. In one embodiment, the Tx and Rx antennas are spaced approximately 152.4 cm (60 inches) apart from each other. In one embodiment, the Tx and Rx antenna structures are approximately 4.4 m (14.5 feet) long in total when using a multiband system.

The addition of multiple Rx antennas facilitates the detection of signal strength and phase changes between the Rx antennas. Each Rx antenna remains perpendicular or substantially perpendicular to the surface of the water, while the Tx antenna(s) remain parallel or substantially parallel to the water's surface. This keeps the Tx and Rx antennas at right angles to each other, preventing self-jamming and shielding the Rx antennas from the water's surface reflection. Thus, this orientation functions to prevent self-jamming and reduce the surface bounce energy from the Tx into the Rx antenna(s).

In one embodiment, the radar system (e.g., the CW radar system) includes a third Tx/Rx antenna combination. In another embodiment, the radar system (e.g., the CW radar system) includes a fourth Tx/Rx antenna combination. In yet another embodiment, the radar system (e.g., the CW radar system) includes more than four Tx/Rx antenna combinations. In one embodiment, additional cross pipes are included in the design of the piping frame, thereby providing for the radar system (e.g., the CW radar system) to accommodate more bands while only increasing the overall length of the piping frame of the radar system (e.g., the CW radar system) for each added band. All portions/elements of the underwater structure housing the cables, Tx/Rx antennas, and connectors are made from dielectric or non-metallic, non-conducting material.

The entire CW radar system is towed from a single tow point, maximizing stability while towing and keeping the towing cable separate from a data cable. The data cable enters the radar system (e.g., the CW radar system) above and behind the tow point. The data cable has multiple electrically shielded wires running throughout the structure to each of the Tx and Rx antennas. Data cables are positioned to maximize their individual cross-polarization while avoiding exposure to the Tx antenna(s) output pattern, reducing crosstalk from the Tx and Rx antenna data cables.

The structure of the radar system (e.g., the CW radar system) of the present invention further minimizes issues with vibration. Mechanical vibrations induce a Doppler response into the processed data, directly contributing to decrease in Signal to Noise Ratio (SNR) in the system. In one embodiment, the ballast between the panels is constructed of high-density foam with a crush depth of more than 1219 m (4000 feet) deep. This enables the system to remain buoyant and keeps panels of the system from vibrating under towing conditions. The panels also serve to keep the pipes and structures holding the cables and antennas rigid. Thus, the combination of the panels and high-density foam reduces overall system vibration when being towed. In embodiment, the system is towed at speeds up to approximately 12 knots (kts). In another embodiment, the system is towed at a speed greater than 12 kts.

FIG. 1E illustrates a side view of a radar system (e.g., a CW radar system) according to one embodiment of the present invention. A tow point is positioned at one end of the radar system (e.g., the CW radar system), enabling a towing vessel to attach to the radar system (e.g., the CW radar system). The radar system (e.g., the CW radar system) also includes a buoyancy tank, enabling the radar system (e.g., the CW radar system) to remain afloat on the surface of a body of water. In one embodiment, the radar system (e.g., the CW radar system) is connected to the towing vessel via a tow cable and a data cable. In one embodiment, the radar system (e.g., the CW radar system) is connected to the towing vessel via a dinghy, where the dinghy is connected to the towing vessel via a data cable and tow cable, and the dinghy connects to the radar system (e.g., the CW radar system) using the data cable and/or tow cable.

FIG. 1F illustrates a top view of a radar system (e.g., a CW radar system) according to one embodiment of the present invention. The radar system (e.g., the CW radar system) includes at least one down plane, operable to adjust the angle of the radar system (e.g., the CW radar system) as it travels along the surface of a body of water, and at least one buoyancy tank.

FIG. 1G illustrates a nose-on view of a radar system (e.g., a CW radar system) according to one embodiment of the present invention.

Figure 1H:
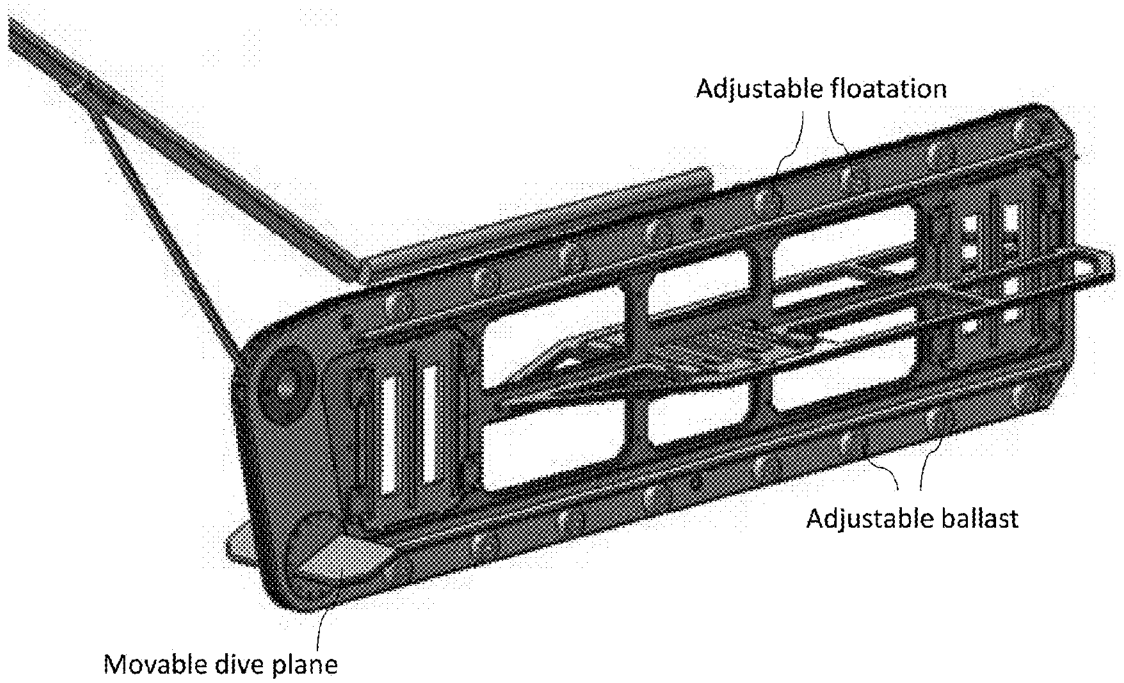
FIG. 1H illustrates a port view of a radar system (e.g., a CW radar system) according to one embodiment of the present invention operable to transmit and receive at least three frequencies simultaneously using modular antenna assemblies.
Figure 1I:
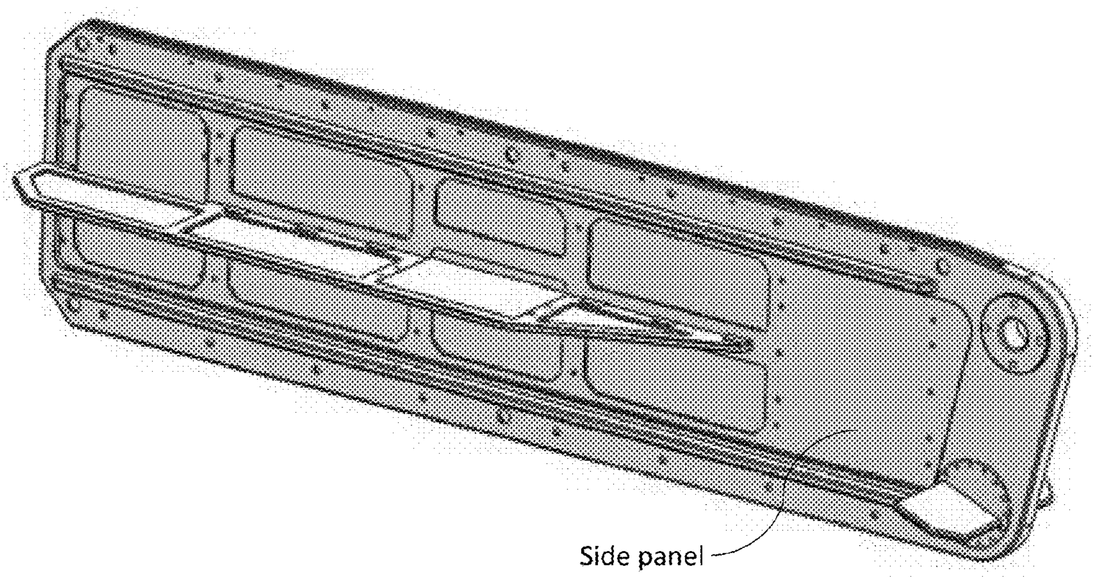
FIG. 1I illustrates a starboard view of a radar system (e.g., a CW radar system) according to one embodiment of the present invention operable to transmit and receive at least three frequencies simultaneously using modular antenna assemblies.
Figure 1J:
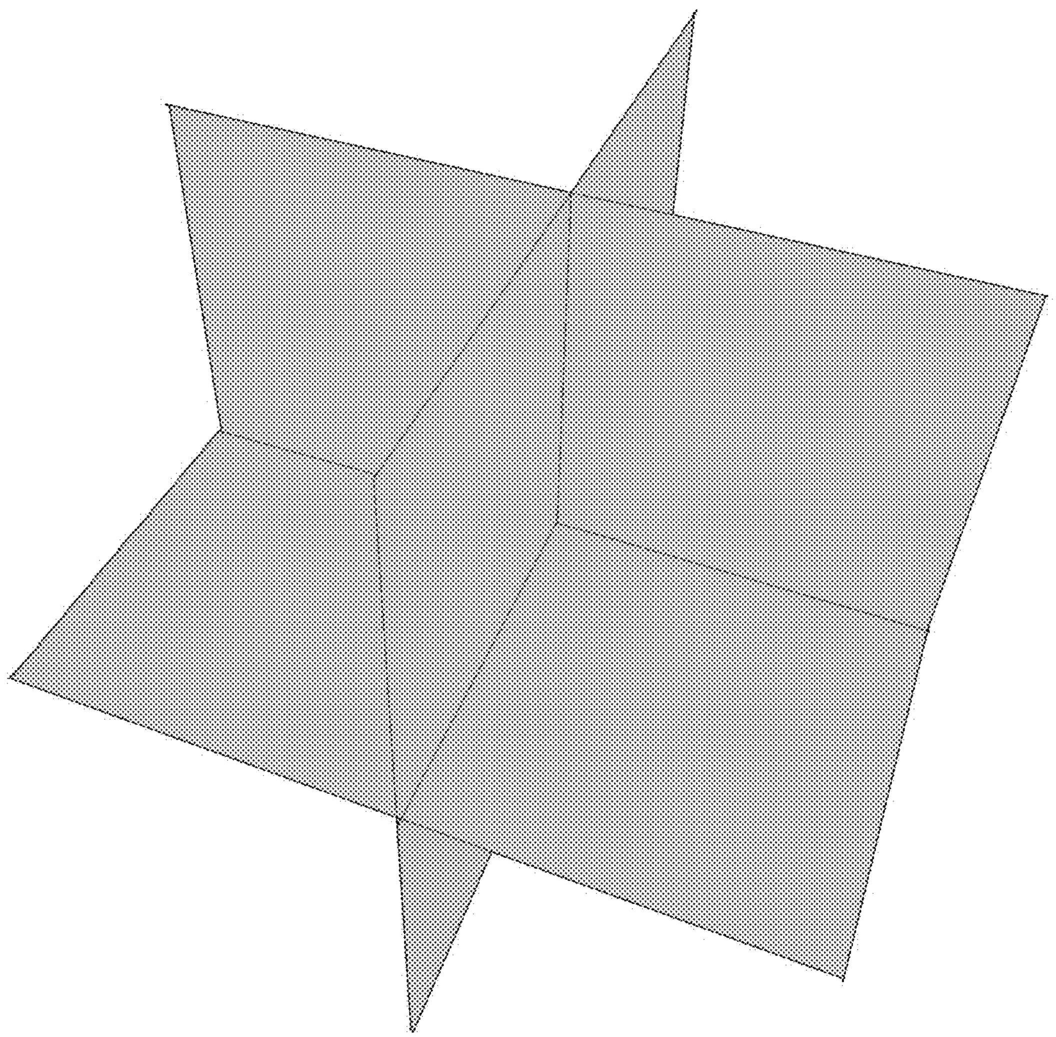
FIG. 1J illustrates a radar corner reflector used during calibration of the radar system (e.g., the CW radar system) according to one embodiment of the present invention.

FIG. 1H illustrates a side view of a radar system (e.g., a CW radar system) according to one embodiment of the present invention. The system has a movable dive plane (seen on the lower front corner of the sensor head). The design has provision for adjustable floatation (yellow cylinders along the top of the sensor head) and for adjustable ballast (yellow cylinders along the bottom of the sensor head). The design shown in FIG. 1H includes provision for up to three Tx antennas and six receive antennas (three forward and three aft of the Tx antennas). In one embodiment, the system includes additional antennas. For example, and not limitation, in one embodiment, the system includes four Tx antennas and eight Rx antennas. In a preferred embodiment, the antennas are mounted in removable cartridges, which advantageously allow for easy repair and/or replacement. In one embodiment, the antenna cartridges are operable to be removed and replaced with antennas with different capabilities (e.g., frequency, power, type, depth rating, etc.) while the system is at sea or on land. FIG. 1I shows the radar system once the side panels have been installed.

In one embodiment, the radar system (e.g., the CW radar system) includes a down plane. The down plane is placed forward of the center of balance of the radar system (e.g., the CW radar system). This positioning, in conjunction with the two point and horizontal stabilizer, provides a balanced, smooth towing operation. The down plane is sized and angled to provide precise underwater depths for the radar system (e.g., the CW radar system) when being towed at peak, desired collection speeds. In one embodiment, the peak towing speed for collection is approximately 2-8 kts. The depth of the radar system (e.g., the CW radar system)'s keel from the ocean surface is a function of tow cable length for a set collection speed. In one embodiment, the down plane is a fiberglass down plane. In one embodiment, the down plane is made of polyvinyl chloride (PVC). In another embodiment, the down plane is made of fiberglass composite. In another embodiment, the down plane is made of a non-metallic, non-conducting, dielectric material. In one embodiment, the down plane is actively adjustable. Using an actively adjustable down plane enables the radar system (e.g., the CW radar system) to operate at greater depths. In another embodiment, the down plane is coupled with a sonar reflector system on the radar system (e.g., the CW radar system) in order to precisely locate targets underwater. This coupling of the down plane with the sonar reflector system increases the geolocational accuracy of the radar system (e.g., the CW radar system) during surveying operations. In one embodiment, the sonar reflector is a corner reflector that reflects a sonar acoustic signal. In one embodiment, the sonar reflector signal is used by the towing vessel to determine the location and depth of the radar system (e.g., the CW radar system) as it is being towed. In one embodiment, the sonar reflector is operable to locate the corners of the radar system (e.g., the CW radar system) as it is being towed. In one embodiment, there is at least one transponder on each side of the towing vessel. The transponders each emit signals of different frequencies. The location and depth of the radar system (e.g., the CW radar system) is calculated using the combined stereo vision of the at least one transponder on each side of the towing vessel. In one embodiment, the system is operable to generate a 3D image of the radar system (e.g., the CW radar system) as it is being towed with geolocation accuracy of the radar system (e.g., the CW radar system) within 3 m (10 ft).

In one embodiment, the radar system (e.g., the CW radar system) of the present invention further includes a towed floatation device attached to the radar system (e.g., the CW radar system). In one embodiment, the towed flotation device is a dinghy. The towed floatation device cushions the radar system (e.g., the CW radar system) against waves, reducing sudden jerking motions encountered while towing and vibrational noise. In one embodiment, the towed floatation device also carries an additional GPS receiver that helps to triangulate the location of the underwater sensor-head during surveying operations. The combination of all GPS receiver(s) on the towing vessel and the towed floatation device together provides a <2 m accuracy of the underwater sensor-head.

In one embodiment, the sensor-head is coupled with an active tow fish to control the height of the sensor above the ocean floor. Advantageously, this allows the system to be used in a wide variety of ocean floor terrains. In one embodiment, the sensor head of the tow fish is connected to the surface with a single fiber optic cable including power, replacing a plurality of cables with the single fiber optic cable including power. Preliminary analog processing of signals is conducted on the tow fish and then transmitted to the surface as a digital stream. Advantageously, this significantly reduces the number of cables and, therefore, the size and weight of the cables needed to operate the system. This also dramatically reduces the cost of cabling for the system. In one embodiment, from the tow fish back, individual wires are housed in an integrated cable and run to the sensor head where the wire for each antenna is broken out, providing the transmit signals and returning the received signals. Control of the sensor is provided remotely from the surface via the fiber optic cable and managed by the tow fish electronics.

The system is operable to provide insight into the ocean floor and sub-floor environment. In one embodiment, the system further includes at least one additional survey technology. In one embodiment, the tow fish includes a geo-positioning transponder to allow the precise location of any return. In one embodiment, the system also includes dual magnetometers (one on either side), sub-bottom profile sonar, and/or side-scan sonar. The radar system (e.g., the CW radar system) and the at least one additional survey technology are georeferenced and temporally aligned to allow multi-sensor fusion of a complete data set.

Figure 39:
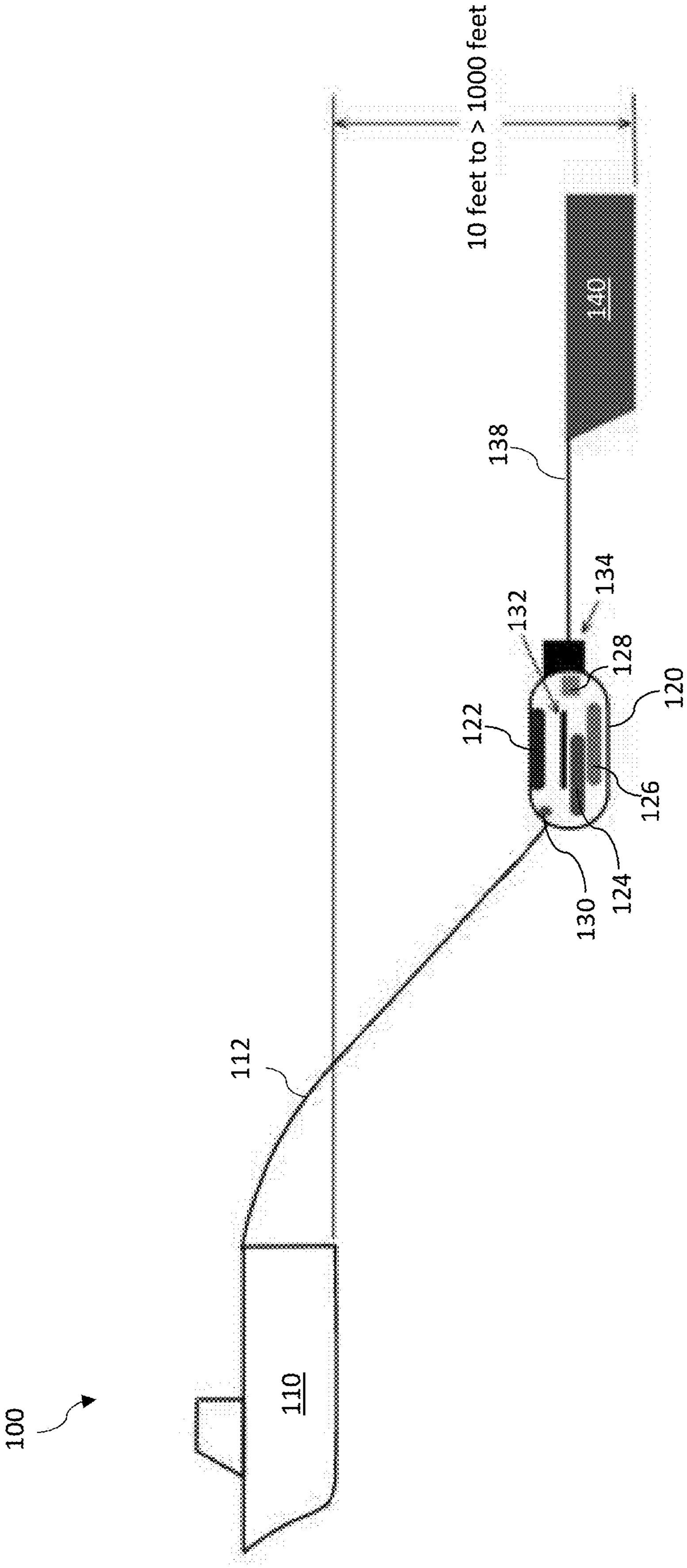
FIG. 39 illustrates one embodiment of a system of the present invention including an active tow fish.

FIG. 39 illustrates one embodiment of a system of the present invention. The system 100 includes a vessel 110 connected to an active tow fish 120 via a fiber optic cable including power 112. The active tow fish 120 includes side-scan sonar 122, at least one magnetometer 124 (e.g., two magnetometers), a sub-bottom profiler 126, electronics for the radar system (e.g., the CW radar system) 128, and an active transponder 130. The active tow fish 120 further includes a dive plane 132 and a rudder 134. The active tow fish 120 is connected to the radar system (e.g., the CW radar system) 140 via a cable 138. In one embodiment, the cable 138 from the active tow fish 120 to the radar system 140 is a single integrated cable carrying power to at least one Low Noise Amplifier (LNA) on each receive antenna and signal from the receive antennas after amplification by the at least one LNA. The cable 138 also carries the transmitter signal to the transmitter antennas as well as returning monitor signal necessary to prevent damage to the transmitter antennas. In one embodiment, the side-scan sonar is a commercial off-the-shelf unit. The specific model and capabilities of the side-scan sonar are operable to be selected based upon requirements of the survey. In one embodiment, the magnetometers are operable to be commercial off-the-shelf units. The specific model and capabilities of the magnetometer are operable to be selected based upon the requirements of the survey. In one embodiment, the sub-bottom profiler is a commercial off-the-shelf unit. The specific model and capabilities of the sub-bottom profiler are operable to be selected based upon the requirements of the survey.

In one embodiment, the receivers have impedance matching circuitry and at least one Low Noise Amplifier (LNA) embedded with the receiver antennas. The at least one LNA is operable to amplify the very small signal of the receiver antennas and convert the signal such that the signal is operable to be transmitted over coaxial cable. The at least one LNA is attached to the antenna through impedance matching circuitry to maximize the signal received and help reduce out of band noise.

In one embodiment, the receiver antennas include an impedance matching circuit combined with a BALUN to convert a balanced signal of the antenna to an unbalanced signal of the coaxial cable.

In one embodiment, the impedance matching circuit and one or more of the at least one LNA are removed from the antenna and placed along the tow cable to remove it from close proximity to the antenna and possible interference with the operation of the antenna. A twisted pair cable of set length is run between the impedance matching circuit to allow for a proper impedance match to be implemented.

In one embodiment, the transmitter signals are sent via coaxial cable to maximize the signal available to the antenna and make the antenna impedance matching independent to the length of the cable. A shielded twisted pair wire is also run with the coaxial cable. The shielded twisted pair is used to carry a monitoring signal back to the control computer to ensure the antennas are not damaged by too strong of a transmitter signal. The transmitter signal in the coaxial cable is converted from an unbalanced signal in the coaxial cable to a balanced signal required by the antenna using a BALUN which is encapsulated in the antenna housing along with the necessary impedance matching circuitry.

In one embodiment, the impedance matching circuit and BALUN for the transmit antenna is removed from the antenna housing and placed along the tow cable. A shielded twisted pair cable is run from the impedance matching circuit to the transmitter antennas.

In one embodiment, the cables to the receive antennas are twisted pair and go directly from the antenna feeds to the receiver digitizer circuitry which contain an impedance matching circuit. The impedance matching circuit ensures the receive signal is maximized for the amplifier and filter stage that precede the digitizer. Any significant change in cable length requires the impedance matching circuit to be modified to adjust to the changed system impedance. The advantage of the twisted pair is the removal of one or more of the at least one LNA or a BALUN at the receive antenna.

In one embodiment, the cables to the transmit antennas are shielded twisted pair and go directly to the antenna feeds. The shielded twisted pair go through an impedance matching circuit which also has monitoring circuitry to protect the transmit antennas from damage. The impedance matching circuit is positioned between the power amplifier and the transmit antennas. In the event the cable lengths are changed significantly, the impedance matching circuitry must be adapted to the new system impedance.

Figure 40:
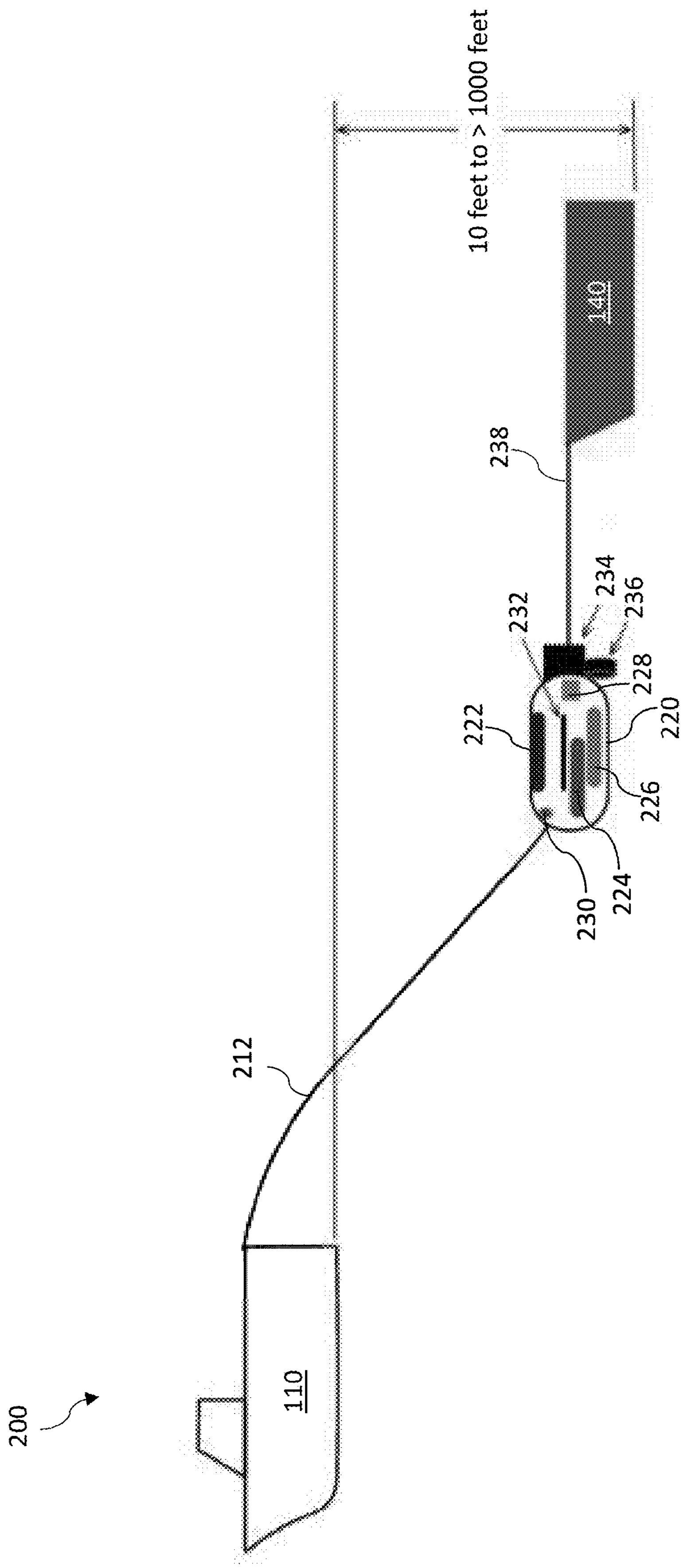
FIG. 40 illustrates one embodiment of a system of the present invention including a remotely operated vehicle (ROV).

Alternatively, the tow fish is replaced with a remotely operated vehicle (ROV). FIG. 40 illustrates another embodiment of a system of the present invention. The system 200 includes a vessel 110 connected to an ROV 220 via an ROV tether 212. The ROV 220 includes side-scan sonar 222, at least one magnetometer 224 (e.g., two magnetometers), a sub-bottom profiler 226, electronics for the radar system (e.g., the CW radar system) 228, and an active transponder 230. The ROV 220 further includes a dive plane 232, a rudder 234, and a propulsion system 236. The ROV 220 is connected to the radar system (e.g., the CW radar system) 140 via a cable 238. The active tow fish and the ROV have similar cables, but the drive forces of the systems are different. The active tow fish has no propulsion and must be towed. The ROV has its own propulsion, but it is controlled from the surface. Advantageously, this makes the ROV more maneuverable and consistent in following desired survey lines. In one embodiment, the ROV tether has the same fiber optic as the tow fish, but typically the power supply from the surface is 100× greater in order to drive the propulsion units on the ROV. Thus, the active tow fish cable is lighter and less expensive.

Figure 41:
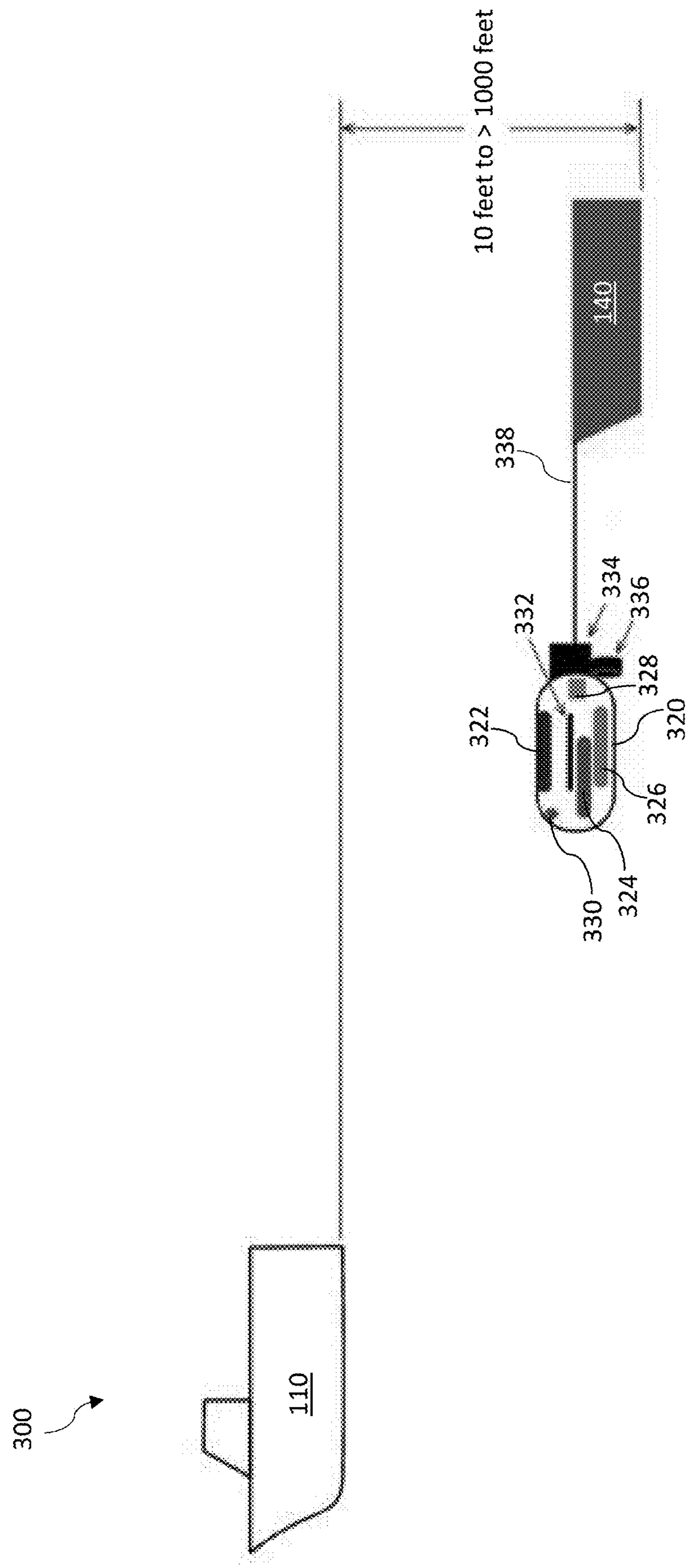
FIG. 41 illustrates one embodiment of a system of the present invention including an autonomous underwater vehicle (AUV).

In yet another embodiment, the tow fish is replaced with an autonomous underwater vehicle (AUV). FIG. 41 illustrates yet another embodiment of a system of the present invention. The system 300 includes a vessel 110 in communication with an AUV 320. The AUV 320 includes side-scan sonar 322, at least one magnetometer 324 (e.g., two magnetometers), a sub-bottom profiler 326, electronics for the radar system (e.g., the CW radar system) 328, and an active transponder 330. The AUV 320 further includes a dive plane 332, a rudder 334, and a propulsion system 336. The AUV 320 is connected to the radar system (e.g., the CW radar system) 140 via a cable 338. The AUV has propulsion and autonomous control of navigation and mission profile.

In one embodiment, the radar system (e.g., the CW radar system) is placed on the keel of a smooth, structurally simple and highly shielded ROV or AUV. The body of the ROV or AUV changes the transmitted and received signals and impacts the electrical isolation of the receivers. However, these effects are operable to be calibrated out, with the system remaining able to perform. In one embodiment, the system is calibrated by placing a series of known controlled targets in a well-documented and/or a pristine location where either all the uncontrolled metal objects in the area are known or simply do not exist. The known controlled targets (i.e., calibration targets) are introduced to the area and verified by an existing radar system. Next, the ROV or the AUV equipped with the radar system surveys the area and the differences between the existing radar system and the ROV/AUV radar system are calculated such that the effects of the ROV/AUV body are operable to be removed from the data during future surveys.

In addition, the overall distance between the radar system (e.g., the CW radar system) of the present invention and a towing vessel is of critical importance. The engines, hull structures, electronics, aluminum superstructures, screws, and other vessel or tow components are operable to create a target that is detected by the radar system (e.g., the CW radar system). In one embodiment, the radar system (e.g., the CW radar system) is towed from a vessel between approximately 61 m (200 feet (ft)) to 152.4 m (500 ft) behind the vessel. In one embodiment, the radar system (e.g., the CW radar system) is attached to a dinghy, where the distance between the towing vessel and the dinghy is between approximately 30.5 m (100 ft) to 91.4 m (300 ft) and the distance from the radar system (e.g., the CW radar system) and the dinghy is approximately 15.2 m (50 ft) to 121.9 m (400 ft). In another embodiment, the dinghy is more than 91.4 m (300 ft) away from the towing vessel and the radar system (e.g., the CW radar system) is more than 121.9 m (400 ft) from the dinghy. In one embodiment, the towing vessel is a watercraft (boat, ship, JET SKI, submarine, etc.). In one embodiment, the towing vessel is an underwater Remotely Operated Vehicle (ROV). In one embodiment, the towing vessel is an Autonomous Underwater Vehicle (AUV). In one embodiment, the dinghy is replaced with a dynamic winch system onboard the towing vessel. The depth of the sensor-head is then determined by the distance of the sensor-head behind the towing vessel. The sensor-head distance from the towing vessel is lengthened or shortened to increase or decrease the sensor-head depth. In one embodiment, the sensor head depth is adjustable from anywhere between about 30.48 m (100 ft) and about 3,048 m (10,000 ft) depending only on the capabilities of the support vessel. Below about 3,048 m (10,000 ft), it is rare for winch-based systems to be used. Typically, somewhere after about 304.8 m (1000 ft), ROV and AUV based systems dominate.

The radar system (e.g., the CW radar system) is capable of transmitting multiple, simultaneous frequencies. In one embodiment, the radar system (e.g., the CW radar system) transmits multiple simultaneous frequencies up to approximately 5000 Hz. The radar system (e.g., the CW radar system) is compatible with higher frequencies. In one embodiment, the radar system (e.g., the CW radar system) is a dual-band system that operates using two separate radars in the same sensor head, enabling the transmission of multiple frequencies from multiple radars simultaneously. By using multiple frequencies, the radar system (e.g., the CW radar system) has increased 3-Dimensional (3D) target geolocation functionality and is operable to more efficiently classify surveyed objects and/or target materials and detect objects and/or targets through solid surfaces, the solid surfaces including but not limited to, soil, sand, reef, mud, and/or iron/steel (e.g., thin iron/steel). In one embodiment, this dual-band system is comprised of at least one Tx antenna and at least two Rx antennas. In one embodiment, this dual-band system is comprised of at least two or more Tx antennas and at least two or more Rx antennas. In one embodiment, geolocation is achieved with a set of global positioning system (GPS) coordinates. In one embodiment, geolocation is based on a differential GPS system. In one embodiment, the radar system (e.g., the CW radar system) uses GPS receivers on land and/or GPS receivers at anchor points in the underwater environment to improve the accuracy of the GPS geolocation using differential GPS. In one embodiment, the radar system (e.g., the CW radar system) includes a plurality of GPS receivers located on the towing vessel and on the towed floatation device to improve the accuracy of geolocation. In one embodiment, geolocation is based on a localized or relative coordinate system.

In one embodiment, geolocation is based on a relative coordinate system wherein the relative coordinate system is defined by metal targets and/or reflectors placed under or on the water surface and in the survey field prior to/or during survey operations. In one embodiment, the metal targets are aluminum. In one embodiment, the metal targets are rounded so as not to skew the directions of the signals that they reflect. In one embodiment, the metal targets are used for relative geolocation within 1-2 m of a target and/or object. All objects discovered from the radar system (e.g., the CW radar system) are then referenced relative to the metal targets and/or reflectors that were placed into the survey field. In one embodiment, geolocation is based on a relative coordinate system using active transmitters placed under or on the water surface and in the survey field prior to/or during survey operations. All objects discovered from the radar system (e.g., the CW radar system) are then referenced relative to the active transmitters that were placed into the survey field. In another embodiment, the GPS coordinate system is used to locate the metal targets, active transmitters, and/or reflectors used to define the relative coordinate system. In one embodiment, a combination of GPS coordinates and relative coordinates are used to geolocate the objects and/or targets in the target survey area.

By using a dual-band system, the radar system (e.g., the CW radar system) is able to transmit a signal from any Tx antenna. Additionally, the radar system (e.g., the CW radar system) is further able to transmit many signals, simultaneously, within a specific band. For example, in one embodiment, the radar system (e.g., the CW radar system) is able to transmit multiple signals simultaneously within a frequency band up to approximately 5000 Hz. However, the higher the frequency used, the weaker the overall return signal strength is, assuming the same output power per frequency at the Tx.

In another example, the transmitter is able to transmit between 0.1 and 100+ watts of power. If two frequencies are transmitted from the single transmitter, each frequency will have one-quarter of the amount of power available. In this system, power is equal to voltage squared. Therefore, in order to transmit two frequencies out of one band, power is sacrificed. In one embodiment, the system includes 20 watts of radiated power in the low band and approximately 13 watts of radiated power in the high band.

In one embodiment, the radar system (e.g., the CW radar system) is operable to generate multiple transmission frequencies through one of three methods. In one embodiment, the radar system (e.g., the CW radar system) transmits two or more frequencies simultaneously from a single Tx antenna. This embodiment reduces the number of Tx/Rx pairs in the overall system, thus reducing the overall physical complexity of the system. A single Tx antenna is operable to transmit a few or even tens of frequencies simultaneously. This approach requires that the power required to transmit multiple frequencies increases as a squared function of each additional frequency. If one frequency is now expanded to two simultaneous frequencies, then the amplifier power required to match the single frequency increases from a factor of $(1)^2=1$ to $(2)^2=4$. In the case where the amplifier is at maximum power setting and an additional frequency is added, then signal strength is reduced effectively from a factor of $1/(1)^2=1$ to $1/(2)^2=1/4$. In the case of 3 simultaneous frequencies, this transmitted power per frequency falls to $1/(3)^2=1/9$ of the system's total output power.

In another embodiment, there are multiple Tx/Rx pairs in the system. In one embodiment, there is one Tx/Rx pair for each frequency transmitted. This allows the use of multiple amplifiers (one for each Tx antenna) and provides more overall power transmitted per each frequency. The current CW radar in FIG. 1D shows two separate Tx/Rx systems in the same structure. The structure shown is operable to easily handle 3 or more Tx/Rx pairs. The advantage is that output power is operable to be maximized. A slight loss is discussed above where some power is lost due to transformer-like losses; typical losses seen amount to no more than 3% of the transmitted power. The amount of power lost as discussed above is much less than the amount of power lost in the first embodiment wherein multiple frequencies are transmitted from a single Tx/Rx pair.

The third embodiment is a combination of approaches 1 and 2 above to achieve the desired number of frequencies transmitted with the desired amount of power from the total amplifiers in the system. An additional issue, whether using approach one, two, or three above is that the transmission of any two frequencies will also generate a third signal wherein the frequency of the third signal is the beat frequency, or the difference between the frequencies of the two intended signals. As an example, transmitting two signals at 300 Hz and 500 Hz from either approach above will also generate a third frequency of 200 Hz (500 Hz-300 Hz). Transmitting three frequencies will produce the three frequencies and two additional beat frequencies.

In another embodiment, the system includes a plurality of Tx antennas. In one embodiment, the system includes three Tx antennas. Each of the plurality of Tx antennas preferably transmits a different frequency between 1 Hz and 1 MHz. The frequencies chosen depend on factors including, but not limited to, the size of the target objects and expected range between the sensor-head and the target. In one embodiment, the system operates as a pulsed system (e.g., at higher frequencies). In one embodiment, the pulsed system uses frequencies greater than about 100,000 Hz. However, the pulsed system is not optimized for total energy on the target.

In a preferred embodiment, each Tx antenna is paired with two Rx antennas. In one embodiment, a first Rx antenna is positioned in front of the Tx antenna and a second Tx is positioned behind the Tx antenna. Advantageously, this provides improved geolocation accuracy and an improved ability to reject false targets (e.g., in shallow water or waves). The limit on the number of antennas is governed by the size of the sensor-head.

In one embodiment, the plurality of antennas includes between three and ten Tx antennas. In another embodiment, the plurality of antennas includes more than ten Tx antennas. In one embodiment, the fore Rx antenna or the aft Rx antenna are removed. Advantageously, this embodiment is operable to be used for applications requiring less confidence in target geolocation or where environmental noise and clutter are reduced (e.g., in deep water where surface wave returns are not seen). As most false targets are induced by surface waves, the number of false alarms is manageable.

In one embodiment, a single broadband Tx antenna (i.e., more than one decade in bandwidth) being driven by multiple frequencies (e.g., two to thousands) is operable to replace multiple Tx antennas. Additionally or alternatively, a single broadband Rx antenna is operable to replace multiple Rx antennas.

In one embodiment, multiple broadband antennas are operable to be used in the same fashion as multiple narrow-band antennas when wide frequency coverage is desired and/or required. In one embodiment, the system includes a three-transmitter broadband antenna system. In one embodiment, the three-transmitter broadband antenna system covers more than three decades of bandwidth (e.g., 100 Hz to 100,000 Hz of instantaneous bandwidth). Advantageously, broadband antennas are operable to reduce the overall size of the radar system (e.g., the CW radar system). In another embodiment, the system includes at least two broadband antennas. In one embodiment, the system includes at least five broadband antennas (e.g., nine broadband antennas). Adding additional antennas increases the cost, the weight, and/or the overall dimensions (e.g., due to separation between antennas) of the radar system (e.g., the CW radar system). Advantageously, adding broadband antennas allows for smaller dimensions of the radar system (e.g., the CW radar system), requiring a smaller vessel and providing for ease of use.

Figure 58A:
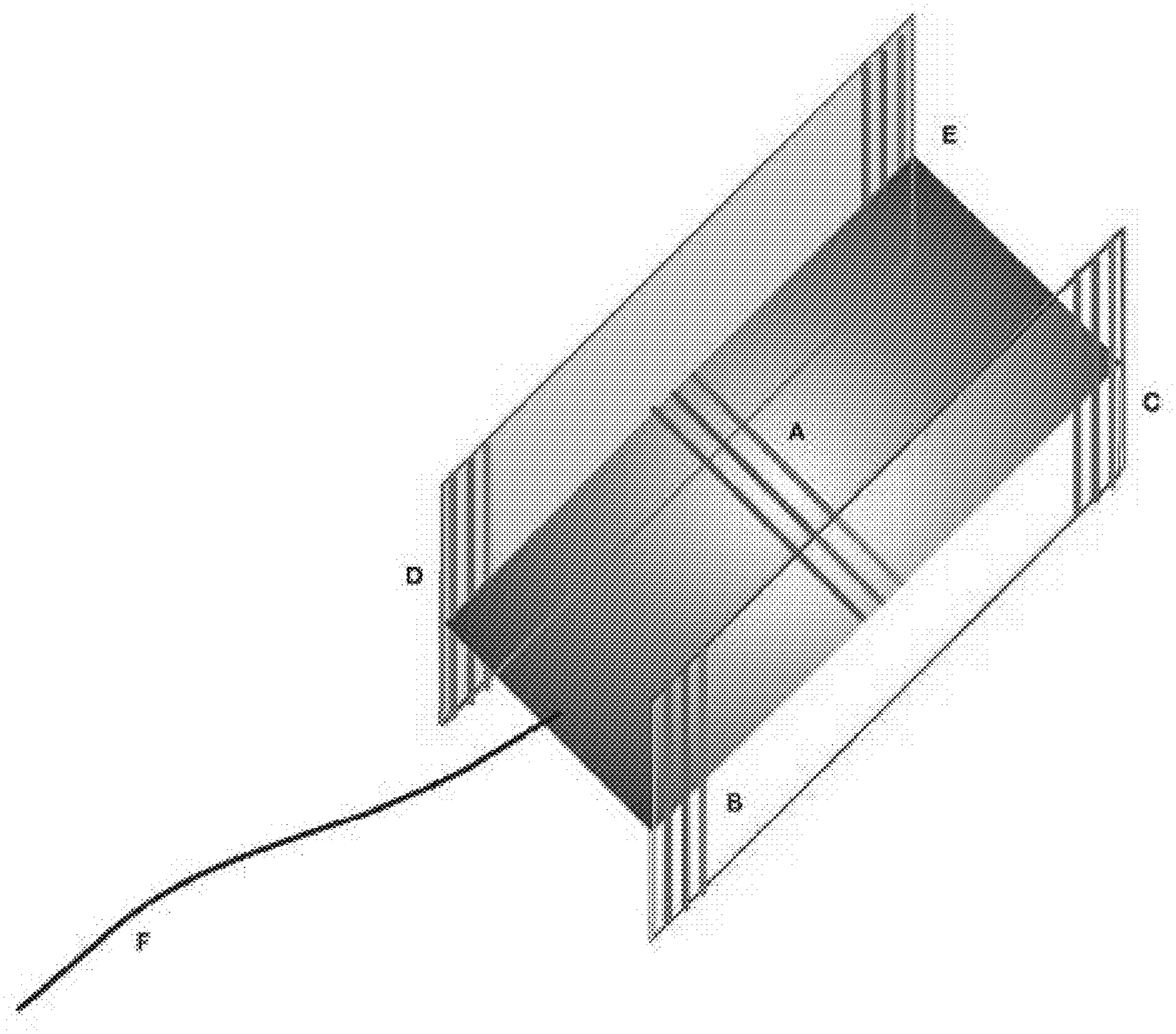
FIG. 58A illustrates one embodiment of the radar system that uses two parallel receive arrays to provide real-time determination of target location to left or right of track.

In one embodiment, illustrated in FIG. 58A, the receive antennas are duplicated and separated (e.g., by about 1-2 m) to the side of each other, creating a second array of receiver antennas. In one embodiment, both sets of antennas are offset from the tow center line by about 0.5 m to about 1 m (about 1.64 ft to about 3.28 ft). In one embodiment, the transmitter antennas are increased in length to about 1 m to about 2 m (about 3.28 ft to about 6.56 ft) to maintain good electrical isolation. This embodiment improves over other embodiments made up of a single in-line series of antennas in that this embodiment is operable to determine whether the target is to the left or right of the sensor head in a single pass within range of the target object. Additionally, this embodiment produces separate range measurements on the object that reduces the number of runs over the target necessary to produce high-quality 3D maps of the sub-surface metal objects. FIG. 58B lists all the labels in FIG. 58A.

Figure 59A:
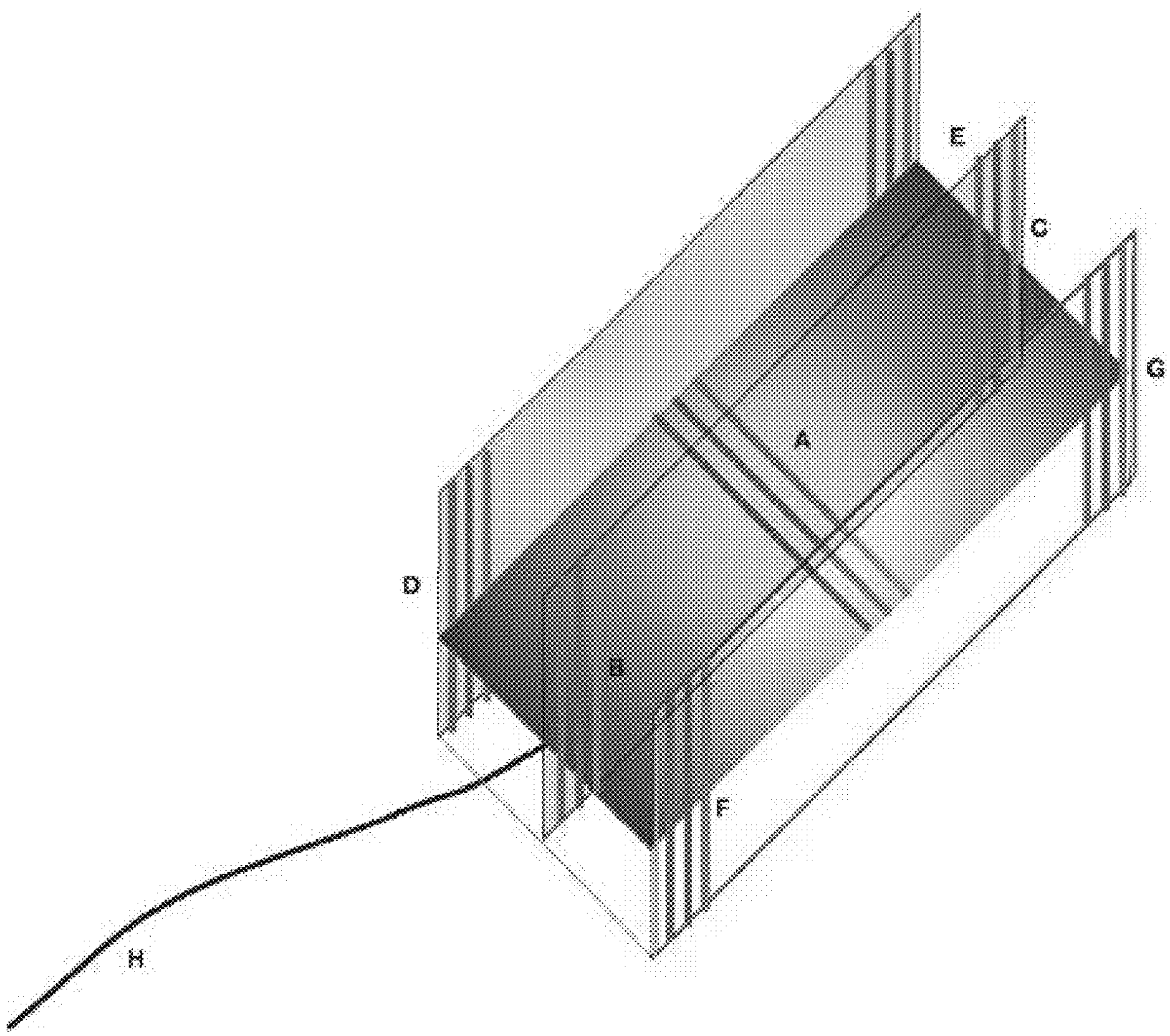
FIG. 59A illustrates one embodiment of the radar system that uses three parallel receive arrays to determine target location left or right of survey track and provide enhanced 3D geolocation and mapping of sub-ocean floor metals.

In one embodiment, three arrays of receiver antennas are included in the sensor head. In addition to the second array added above, a third receiver antenna array is added along the center line of the sensor head as illustrated in FIG. 59A. The advantage of this embodiment is an improvement in range to target determination and unambiguous direction (e.g., left or right of the sensor track). In one embodiment, the receiver arrays are positioned between about 0.5 m (1.64 ft) and about 1 m (3.28 ft) apart. In one embodiment, the transmitters are increased in length to about 1 m to about 2 m (3.28 ft to 6.56 ft) to maintain good electrical isolation. Advantageously, using three receiver arrays operates to provide data needed to calculate and display extremely high detailed 3D maps of the sub-surface distribution of metal objects. The system is operable to create maps with <0.3 m (1 ft) resolution. FIG. 59B lists all the labels in FIG. 59A.

Figure 60A:
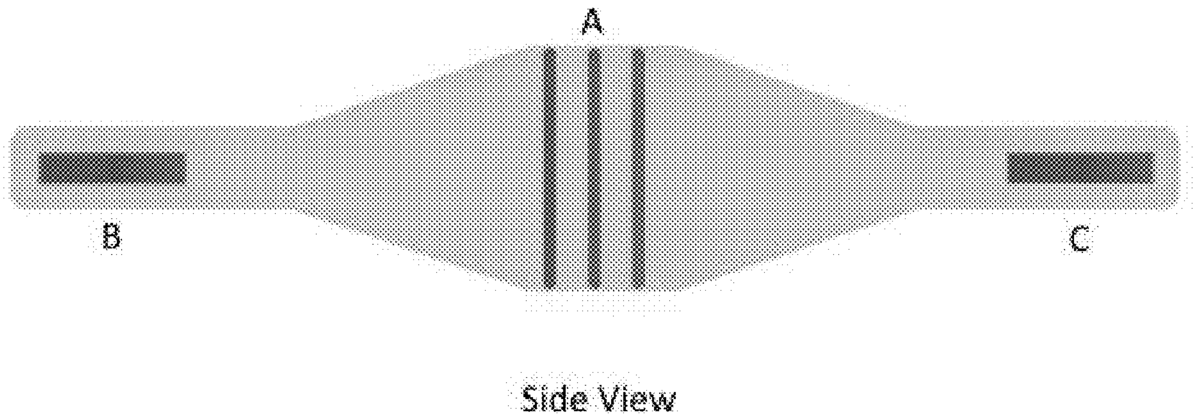
FIG. 60A illustrates a side view of one embodiment of the radar system that uses vertical transmit antennas and horizontal receive antennas to improve polarization rejection of the direct path signal while providing real-time location of targets to left or right of survey line.
Figure 60B:
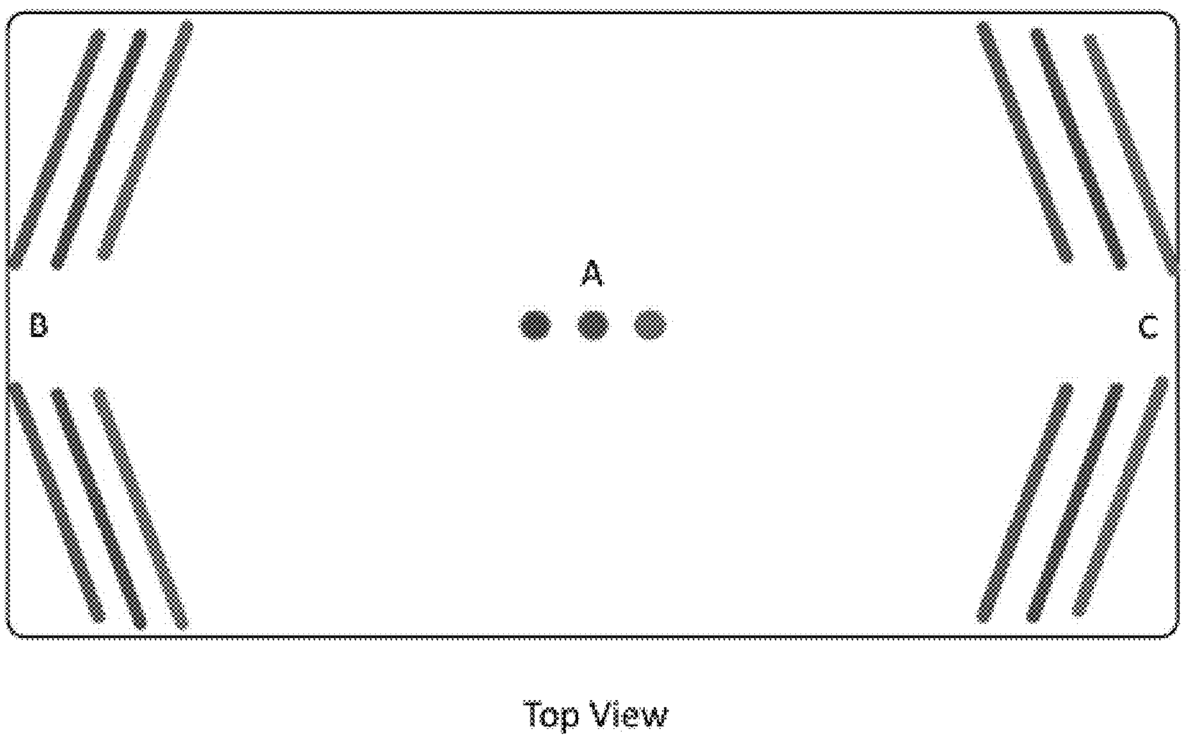
FIG. 60B illustrates a top view of the embodiment shown in FIG. 60A.

In one embodiment, illustrated in FIG. 60A, the transmitter antennas are oriented vertically, and the receiver antennas are oriented horizontally. This arrangement has greater clutter return from the ocean surface, but this is only an issue in shallow water surveys of <15 m (49.2 ft). The major advantage of this arrangement is the ability to maintain good electrical isolation between the Tx and Rx antennas while keeping the Tx antennas short. Shorter antennas reduce the overall weight of the sensor head, which is operationally desirable. The system is operable to provide, in real time or near-real time, the direction of the target object relative to the sensor track (e.g., left or right of track). This embodiment produces separate range measurements on the object that reduces the number of runs over the target necessary to produce high-quality 3D maps of the sub-surface metal objects. In one embodiment, the sensor head is about 1 m (3.28 ft) to about 2 m (6.56 ft) wide, about 4.5 m (14.75 ft) long, and about 0.64 m (2.1 ft) tall. FIG. 60B lists the labels in FIG. 60A.

Figure 61A:
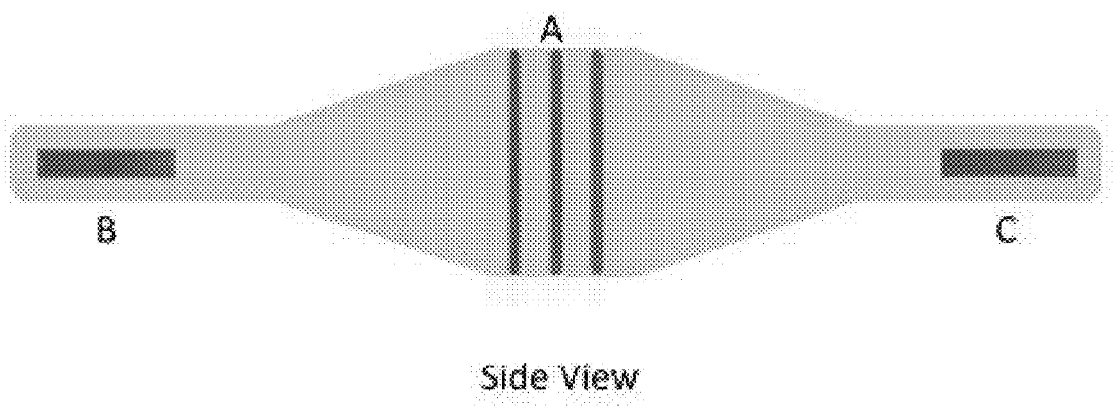
FIG. 61A illustrates a side view of one embodiment of the radar system that uses vertical transmit antennas and horizontal receive antennas to provide improve polarization rejection of the direct path signal, provide real-time target location to left or right of survey track, and provide enhanced 3D geolocation and mapping of sub-ocean floor metals.
Figure 61B:
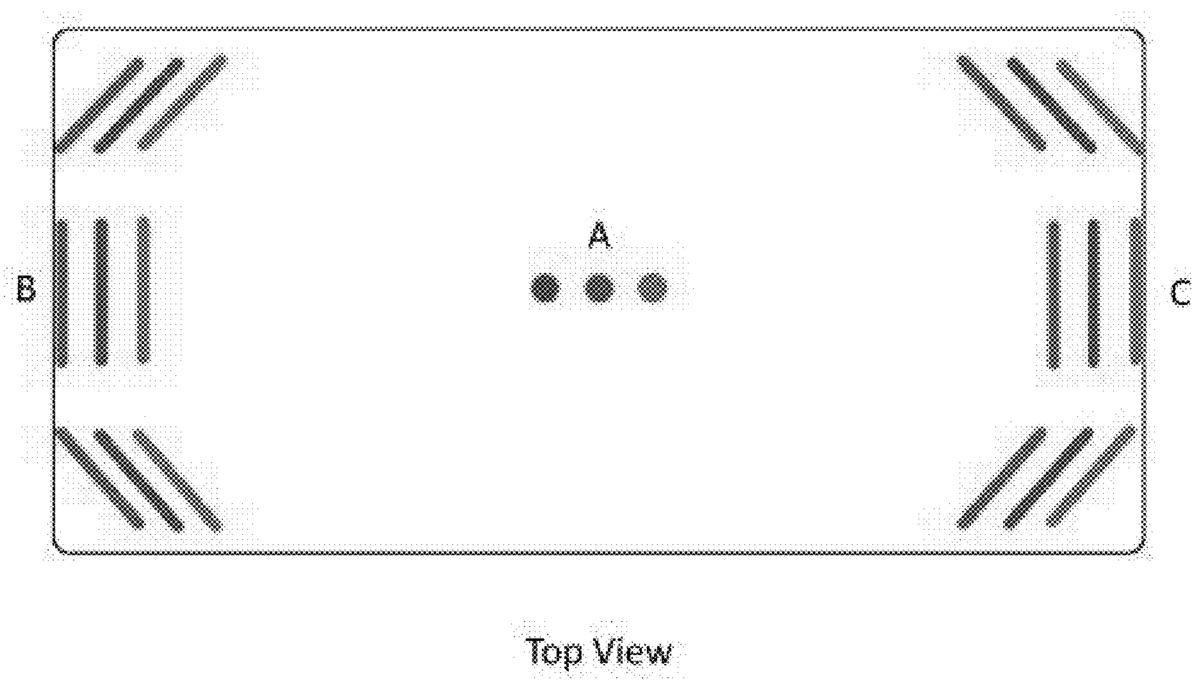
FIG. 61B illustrates a top view of the embodiment shown in FIG. 61A.

In one embodiment, illustrated in FIG. 61A, the transmitter antennas are oriented vertically and the receiver antennas are oriented horizontally. This arrangement has greater clutter return from the ocean surface, but this is only an issue in shallow water surveys of <15 m (49.2 ft). The major advantage of this arrangement is the ability to maintain good electrical isolation between the Tx and Rx antennas while keeping the Tx antennas short. Advantageously, using three receiver arrays operates to provide data needed to calculate and display extremely high detailed 3D maps of the sub-surface distribution of metal objects. The system is operable to create maps with <0.3 m (1 ft) resolution. Shorter antennas reduce the overall weight of the sensor head, which is operationally desirable. In one embodiment, the sensor head is about 1 m (3.28 ft) to about 2 m (6.56 ft) wide, about 4.5 m (14.75 ft) long, and about 0.64 m (2.1 ft) tall. FIG. 61B lists the labels in FIG. 61A.

In one embodiment, the system includes antennas other than simple dipole antennas. In one embodiment, the system includes loop antennas (e.g., cross-polarized loop antennas). In one embodiment, the loop antennas are arranged horizontally and separated along the direction of travel. Advantageously, the loop antennas are operable to expand the sensitivity of the system to magnetic field direction as well as the current electric field detection of the dipole antennas. The electronics of the receiver are operable to block in the direction of the circular polarization of the transmitter to provide electrical separation. Higher gain antennas (e.g., Yagi-Uda) are operable to be implemented in at least one Tx antenna and/or at least one Rx antenna. Phased array antennas are operable to be implemented to improve power at the target and/or receiver sensitivity. The multi-transmit/multi-receive design described above is an ideal configuration to implement phased array techniques.

In another embodiment, polymer antennas with reasonable conductivity (e.g., >10,000 Siemens/meter (S/m)) are operable to be used for the receiver antennas. Polymer antennas are operable to be simply formed into dipole antennas. The lower conductivity, relative to metal, results in a slower propagation of the current and voltage along the length of the polymer. As a result, the standing wave is operable to form in a much shorter distance. Antennas suitable for a towed platform are operable to be formed easily for any conductivity above 10,000 S/m. For values lower than that, other antenna designs are operable to be used that are more compact (e.g., see description of electrically short antennas, infra). An example material is stretch oriented polyacetylene which has conductivity values of approximately 80,000 S/m, and a ½ wave dipole antenna is operable to be fabricated with a center frequency of 200 Hz that is only 88 mm long. The advantage of polymer antennas is the ability to provide greater transmit power when compared to electrically short antennas. Some electrically short antennas are less than 1% efficient, while polymer antennas have the potential to reach closer to the 50% theoretical limit. Polymer antennas also promise the ability for fabrication of a smaller sensor, reducing the overall footprint of the system on the towing vessel and the required size of a ROV and/or AUV needed to tow the sensor.

In another embodiment, polymer antennas are operable to be used for the transmitter antennas instead of electrical short antennas.

In another embodiment, polymer antennas are used for both the receive and transmit antennas.

As previously described, in one embodiment, the system includes at least one electrically short antenna. In one embodiment, the at least one electrically short antenna includes a nanomechanical magnetoelectric (ME) antenna, a Goubau antenna, a Foltz antenna, and/or a Rogers cone antenna.

The system is operable to use any antenna configuration that allows for and provides electrical isolation between the Tx and the Rx.

However, electrical isolation is not necessary if the receiver is designed such that the receiver is not jammed by the transmit signal. Methods to prevent the receiver from being jammed by the transmit signal include, but are not limited to, logarithmic digitizing circuits, cascade digitizer circuits, dual offset-bias digitizers, and/or high bit digitizers paired with compression circuits (e.g., multimodal logarithmic, mu law, Voltage Controlled Amplifiers (VCA), optical compression, etc.) are compatible with the present invention. These methods make the direct path signal small, while preserving the sensitivity to sense the small constructive or destructive signals imparted to the receive signal by a target return.

Figure 49:
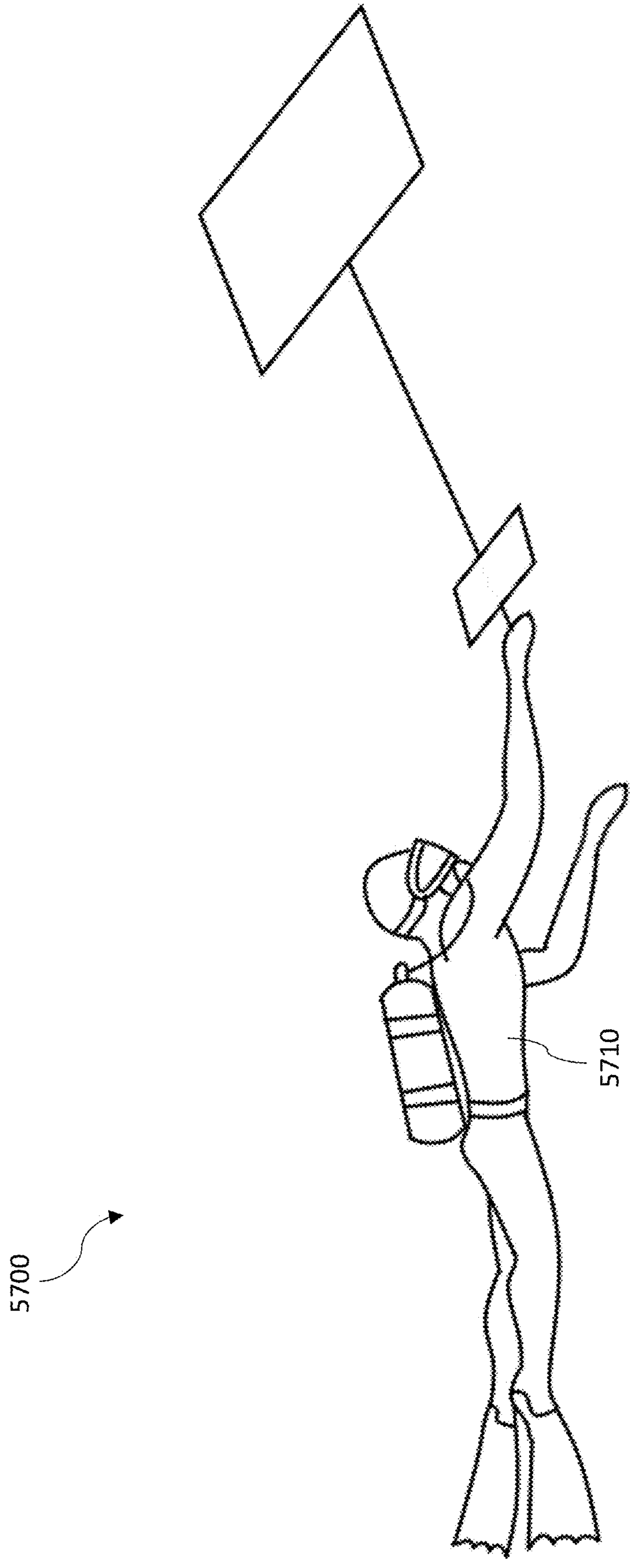
FIG. 49 illustrates one embodiment of a handheld radar system.

In one embodiment, the radar system (e.g., the CW radar system) includes antennas of a small length and/or a small diameter (e.g., less than 1 m (3.3 ft)). In one embodiment, the antennas have a length and/or a diameter of about 15.2 cm (6 in) to about 30.5 cm (12 in). Advantageously, using antennas of a small length and/or a small diameter allows for a diver to use the radar system (e.g., the CW radar system). FIG. 49 illustrates one embodiment of a handheld radar system 5700. The handheld radar system 5700 is operable to be used by a diver 5710. The handheld radar system 5700 includes an indicator 5720, a pole 5730, and a radar system 5740. In one embodiment, the indicator 5720 is a visual, audible, and/or tactile mechanism. In one embodiment, the indicator 5720 includes a liquid crystal display (LCD). In another embodiment, the indicator 5720 includes at least one light-emitting diode (LED). In one embodiment, the at least one LED includes at least one red LED, at least one yellow LED, and/or at least one green LED. In one embodiment, the indicator (e.g., at least one LED, the LCD) is operable to indicate a species. In one embodiment, the indicator is operable to indicate a direction of an underwater object. For example, and not limitation, the indicator is operable to indicate a proximity (e.g., nearer, farer) based on movement of the radar system (e.g., by the diver).

Figure 50:
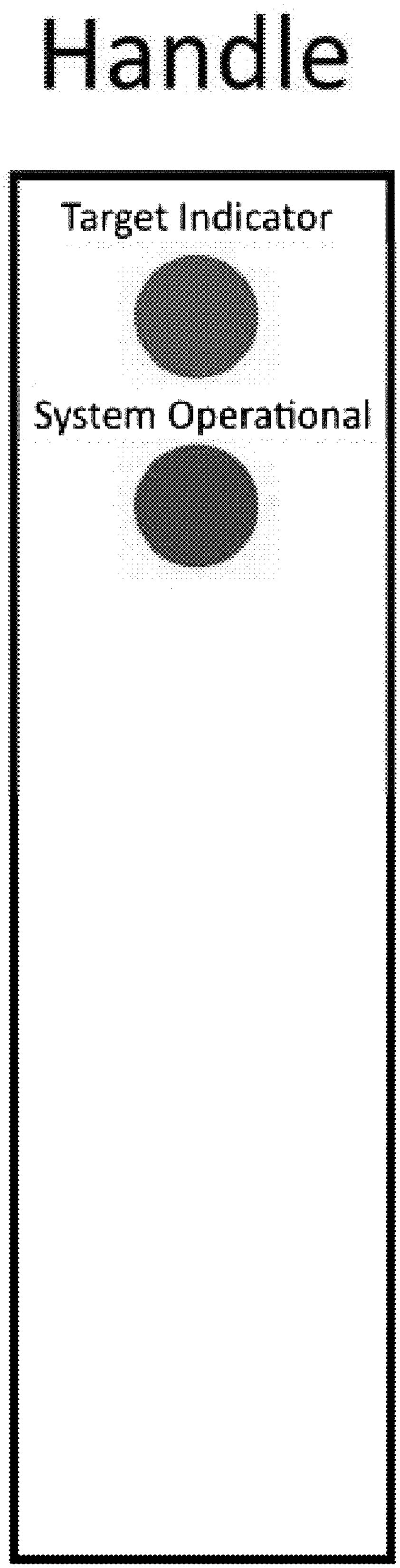
FIG. 50 illustrates one embodiment of a control handle of a handheld radar system.

The LED indicator illustrated in FIG. 50 consists of a simple two light system and is operable to be mounted on the handle of the sensor. In one embodiment, a blinking green light indicates the presence of a metal within a detection range of the sensor. In one embodiment, a rate at which the light blinks indicates a strength of the signal. In one embodiment, a red LED indicates a normal condition of the system being operational but no metallic targets are detected. Alternately, an acoustic indicator, as used in many handheld metal detectors, is operable to be used, wherein the strength of the tone is directly correlated with the strength of the signal. The advantage of the technology of the present invention over the current metal detectors on the market is related to the background noise caused by moving a conventional metal detector through a conducting medium (e.g., saltwater). The faster the detector head is moved, the louder the background signal and the background tone will be. This dramatically limits the search rate of a diver using a traditional metal detector. The present invention does not suffer from this background noise, regardless of speed of search.

Figure 51:
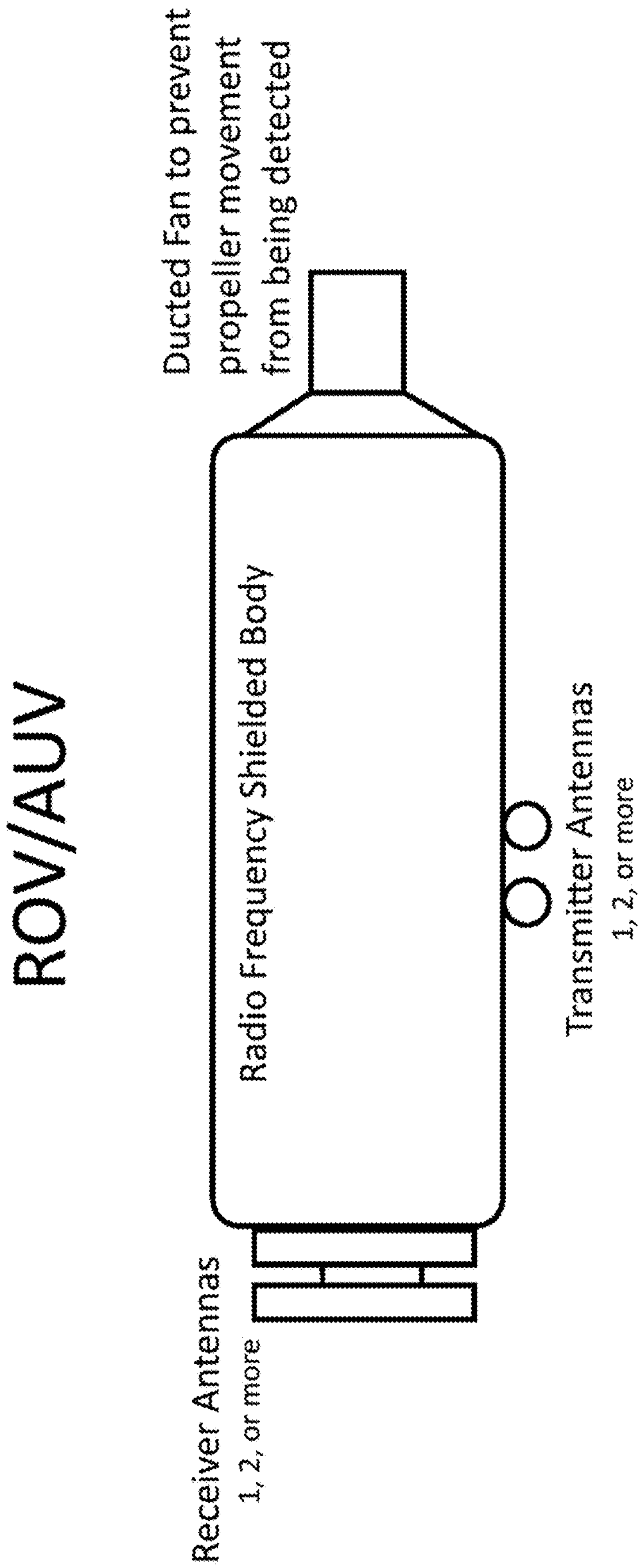
FIG. 51 illustrates one embodiment of an ROV or AUV mounted radar system.

In one embodiment, the radar system (e.g., the CW radar system) is mounted on an underwater vessel (e.g., a submarine). In one embodiment, illustrated in FIG. 51, the radar system (e.g., the CW radar system) is mounted on a fin of the underwater vessel. The underwater vessel is operable to be manned or unmanned. Propellors and/or motors of the underwater vessel are preferably radio frequency shielded to avoid interference with the radar system (e.g., the CW radar system).

Figure 52:
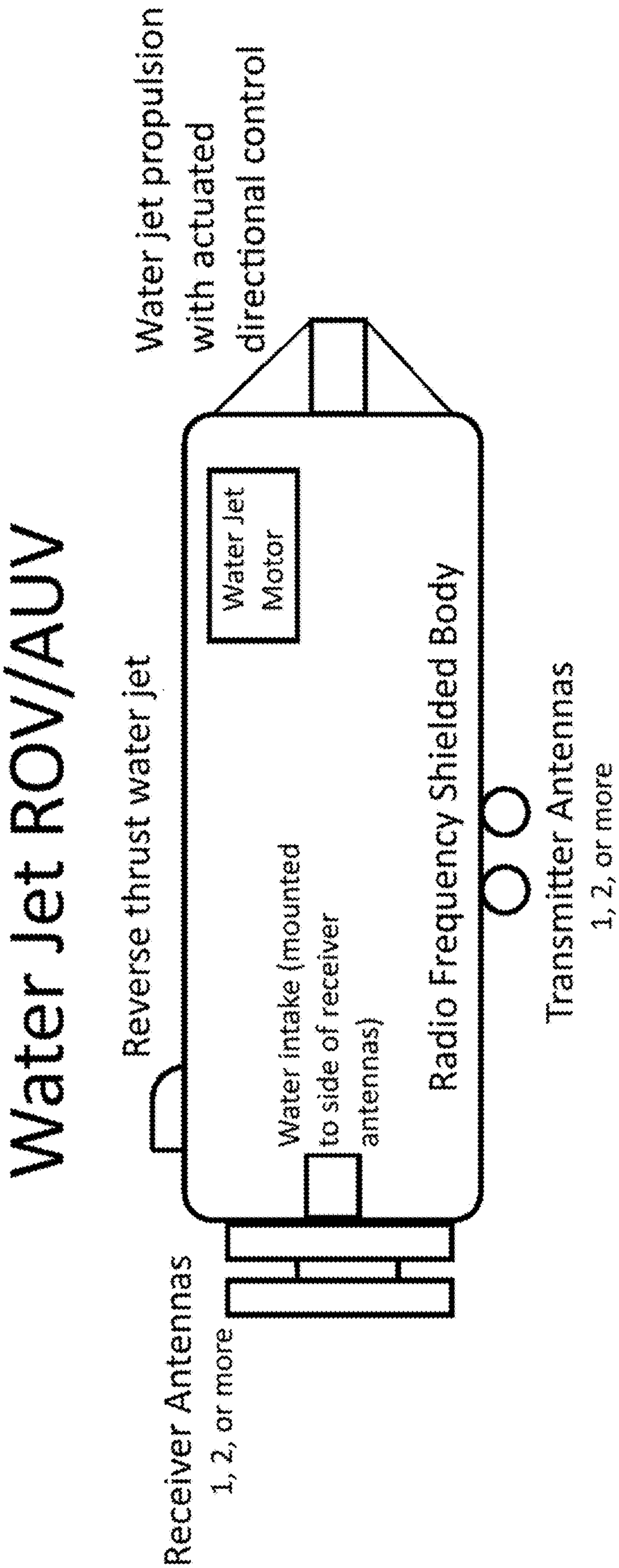
FIG. 52 illustrates one embodiment of an ROV or AUV mounted radar system with reduced mechanical noise sources.

FIG. 52 illustrates an embodiment of the present invention incorporating water jet-based propulsion, which allows the electric motors creating the jet to be buried within the hull of the vessel. The only moving exterior part to the vessel hull is the drive jet nozzle.

Figure 53:
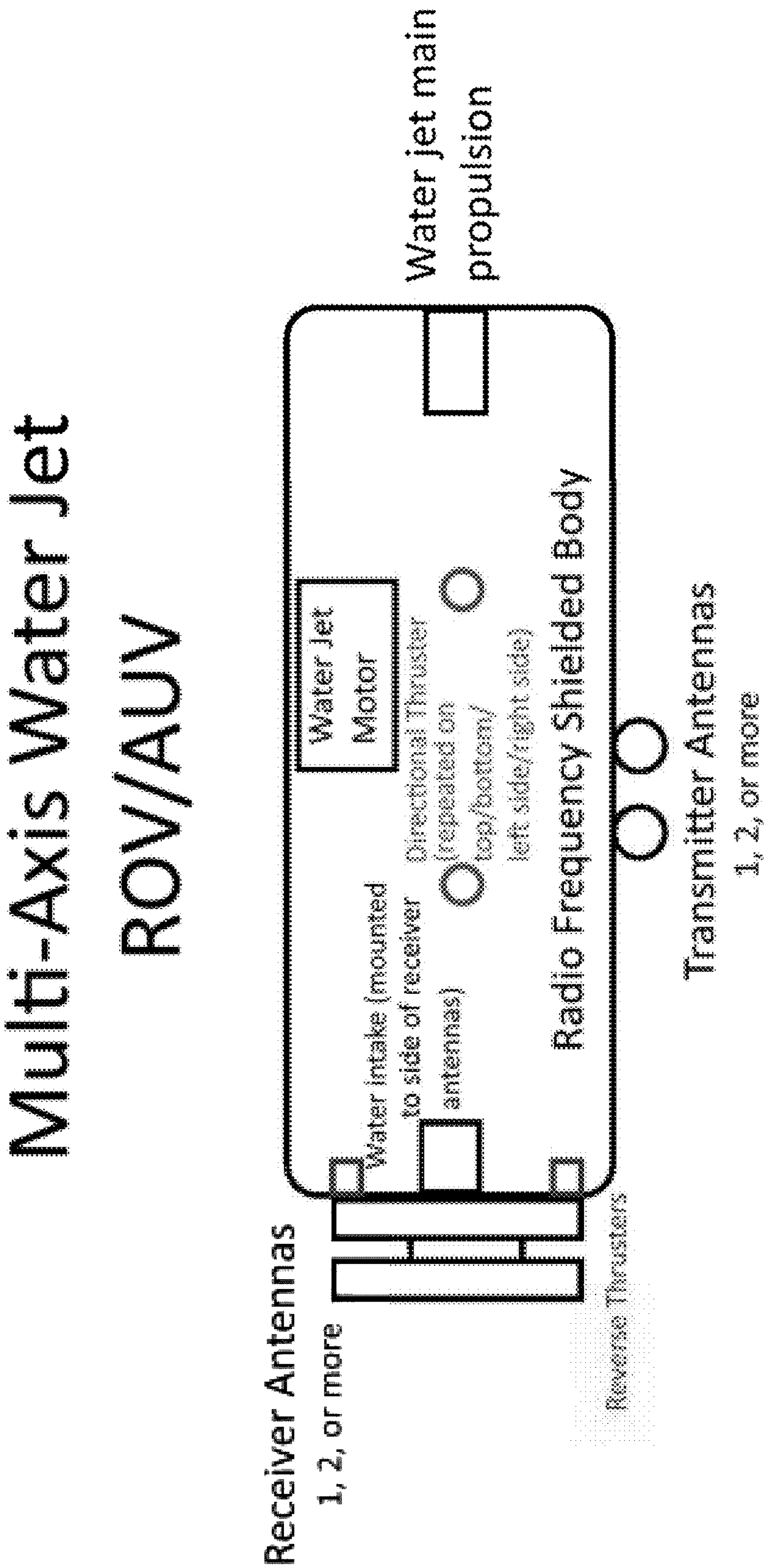
FIG. 53 illustrates one embodiment of an ROV or AUV mounted radar system with all external noise sources removed.

Alternatively, an even more preferable vessel, illustrated in FIG. 53, incorporates multiple ports built into the vessel for different drive and maneuver jets to exit the radio frequency sealed hull of the vessel.

Figure 8:
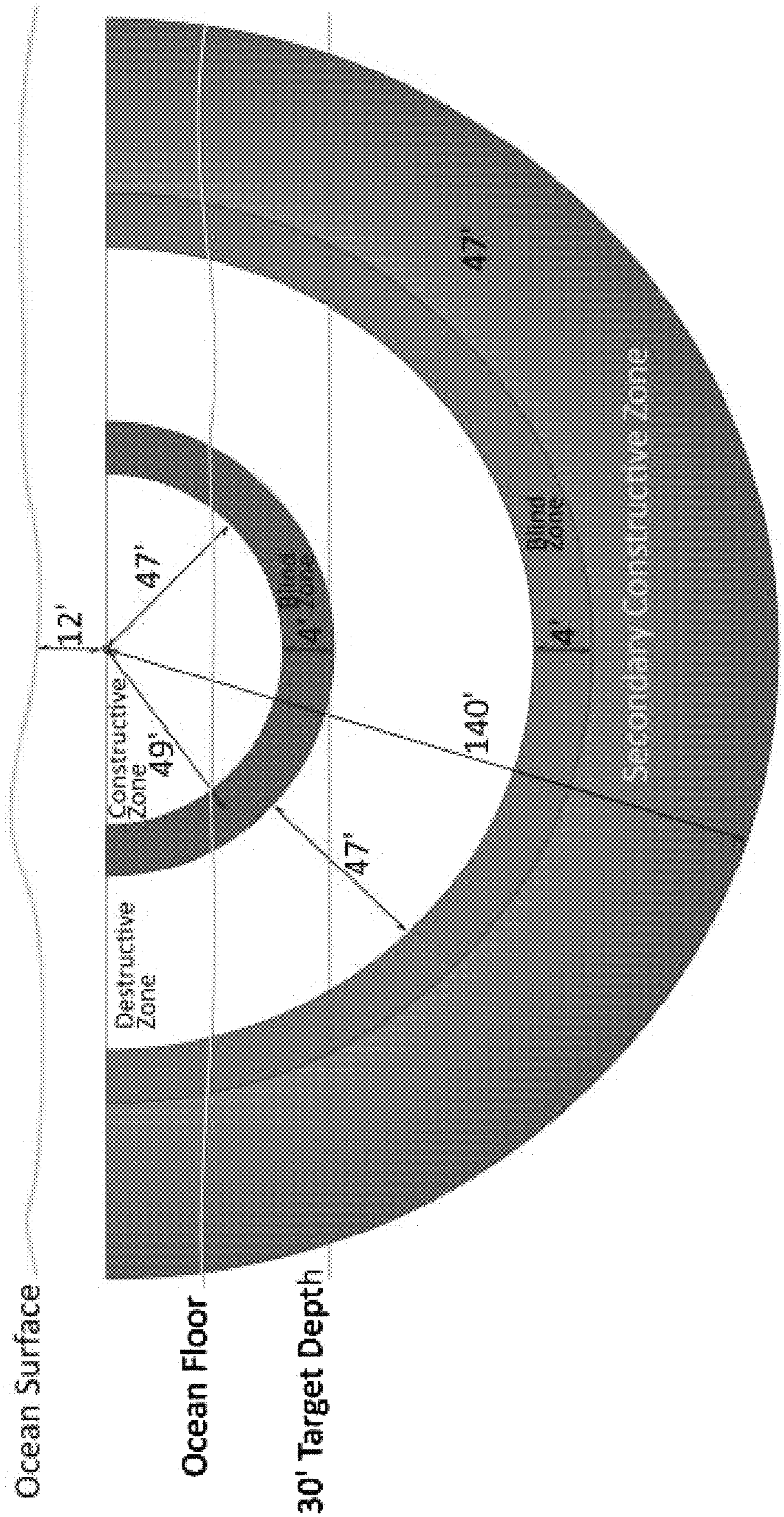
FIG. 8 illustrates object detection ranges for a radar system (e.g., a CW radar system) that result from constructive and destructive zones according to one embodiment of the present invention.

With multiple frequencies being transmitted from a single band radar system or a dual band radar system transmitting two distinct frequencies, the result is that each frequency has its own set of constructive and destructive zones that differ in range based on the frequency (wavelength) of transmission, as illustrated in FIG. 8. By using multiple, simultaneous frequencies, the radar system (e.g., the CW radar system) is operable to provide the exact distance to an object and/or target. As the distance between the object and/or target and the sensor head of the radar system (e.g., the CW radar system) changes, the signals received by the Rx antenna or antennae of the radar system (e.g., the CW radar system) transition between constructive and destructive interference. These transitions depend on the frequency of the transmitted signals and are used to measure overall distance between the radar system (e.g., the CW radar system) and an object and/or target. The use of multiple frequencies allows for the radar system (e.g., the CW radar system) to detect and identify an object and/or target with more detail.

In a pulsed system, distance is calculated in part from the time that it takes for a sent Tx antenna pulse to reach the Rx antenna after interacting with an object and/or target. However, with continuous wave systems, there is no measure of time because the Tx antenna is always sending out a signal. The radar system (e.g., the CW radar system) of the present invention solves this distance measurement issue associated with current CW radar systems by employing different frequencies with different constructive and destructive zone lengths, as illustrated in FIG. 8. The combination of received signals of varying frequencies that have passed through respective constructive and/or destructive zones after being reflected off an object and/or target allows the radar system (e.g., the CW radar system) to precisely identify each return signal, as well as the location of an object and/or target as well as its composition. The radar system (e.g., the CW radar system) also uses the phase shift and relative signal strengths of the returning signals to compute distance, metal type, and precise location measurements.

Furthermore, the use of multiple frequencies by the radar system (e.g., the CW radar system) of the present invention enables the system to detect and/or penetrate steel and iron plate (e.g., relatively thin steel and iron plate). In the oil and gas industries, a process known as "Pigging" is used to locate a sensor inside a steel pipe. The sensor transmits a frequency low enough to penetrate a steel walled pipe. The radar system (e.g., the CW radar system) of the present invention is operable to create these same frequencies by either directly transmitting a frequency that is low enough to penetrate a steel-walled pipe or by transmitting two separate frequencies, wherein the beat frequency of the two separate frequencies is low enough to penetrate a steel-walled pipe. For example, if the two frequencies being transmitted from a single radar system are approximately 311 Hz and approximately 333 Hz, respectively, there is a third signal with a beat frequency also being transmitted at the difference between the two frequencies. In this example, this beat frequency is approximately 22 Hz (333 Hz-311 Hz). This third frequency value, 22 Hz, is the typical frequency used in "Pigging." It transmits through steel and is operable to be detected by the dipole antennas of the radar system (e.g., the CW radar system) of the present invention.

In one embodiment, the radar system (e.g., the CW radar system) is operable to perform deep water surveys (i.e., depths >about 305 m (1000 ft)). The radar system (e.g., the CW radar system) preferably maintains the ability to survey in shallow water (i.e., depths <about 4.6 m (15 ft)). The radar system (e.g., the CW radar system) is a multiband continuous wave radar system.

Cross Polarization

The radar system (e.g., the CW radar system) of the present invention uses cross polarization to reduce the direct path energy from Tx to Rx antennas, which deflects any reflected energy from an object and/or target. Cross polarization using dipole antennas is accomplished through physical orientation. The Tx antenna is oriented 90 degrees from the Rx antenna(s).

Figure 2:
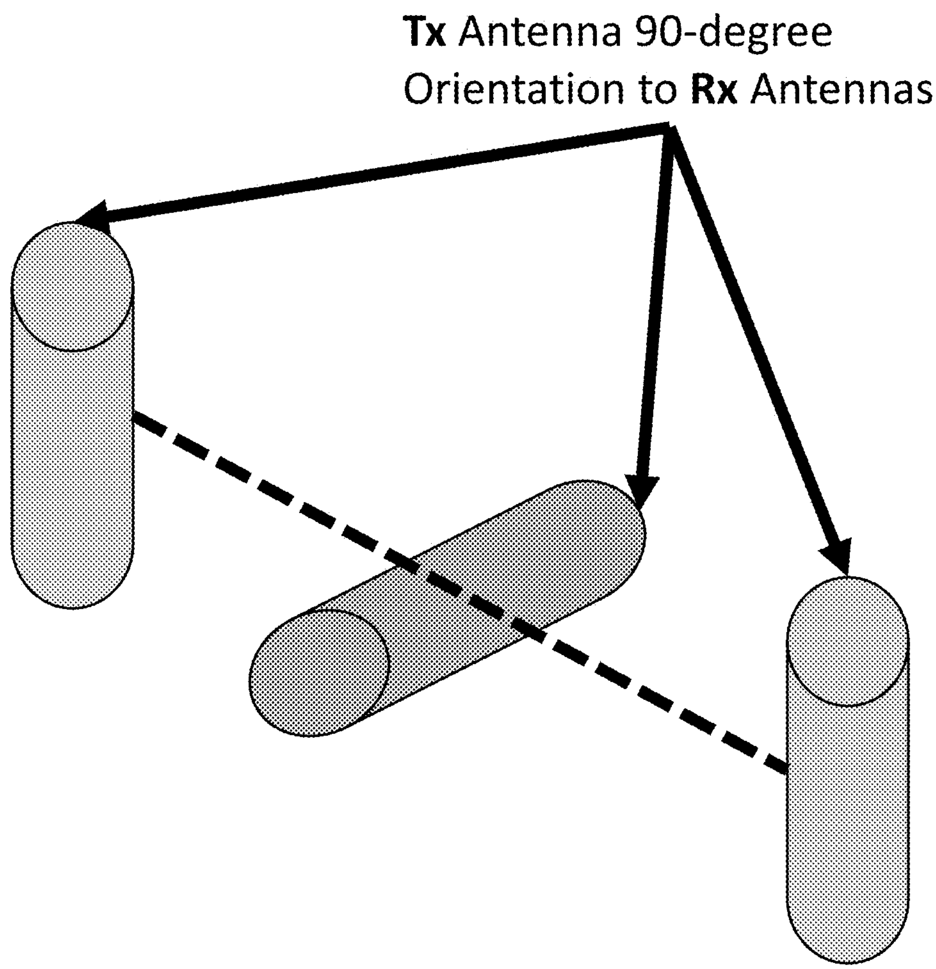
FIG. 2 illustrates an antenna setup for Transmitter (Tx) and Receiver (Rx) antennas for a radar system (e.g., a CW radar system) according to one embodiment of the present invention.

FIG. 2 illustrates an antenna setup for Tx and Rx antennas for a radar system (e.g., a CW radar system) according to one embodiment of the present invention. The Tx antenna is positioned between two Rx antennas. In addition, the Tx antenna is placed at a 90-degree angle in relation to the two Rx antennas.

An added benefit of this embodiment is the noise cancellation provided by the polarization characteristics of the Tx and Rx antennas. In current signals, there are several primary sources of noise. Sudden movements and/or jerking on any towing device(s) creates significant noise in the signal received by the Rx antennas, with greater noise created in any forward Rx antennas. Another source of noise includes vibration. As the radar system (e.g., the CW radar system) moves through water, the turbulence across the structure produces a large amount of noise via vibration. Moreover, any flexing of the radar system (e.g., the CW radar system) during towing and/or collecting causes a Doppler effect in the signal(s).

FIG. 3A illustrates a cross-polarization orientation for Transmitter (Tx) and Receiver (Rx) antennas according to one embodiment of the present invention. The Tx antenna is placed at a 90-degree angle in relation to all Rx antennas. In one embodiment, the Tx and Rx dipole antennas are between approximately 20.3 to 76.2 cm (8 to 30 inches) in length and have diameters between approximately 1.27 to 5.1 cm (0.5 to 2 inches). In a continuous radar system such as the present invention, the direct signal path from the Tx to the Rx antenna(s) is of much higher magnitude than that of the return signal that has interacted with an object and/or target. Typical radar systems used by the military and commercial communities use pulsed radar, wherein the Tx antenna sends out short, pulsed bursts of energy while the Rx antennas are turned off or electrically protected from the direct path energy to avoid the interference of the direct path energy. The Rx antennas are then turned on when the Tx antennas are turned off in order to receive only the return signal from the object and/or target. However, since the frequencies of the present invention are extremely low and the resulting wavelengths are long, pulsed radar systems will not work in the conditions where the radar system (e.g., the CW radar system) of the present invention is operable to function. Thus, the radar system (e.g., the CW radar system) uses cross polarization of the Tx and Rx antennas to eliminate the direct path energy from the Tx antenna(s) to the Rx antennas, enabling the system to detect distant targets and/or objects while the Rx antennas are located directly next to the bright and loud Tx antenna(s).

FIG. 3B illustrates a cross polarization orientation for Tx and Rx antennas according to another embodiment of the present invention. Cross polarization using dipole antennas is accomplished through physical orientation. The Tx antenna is oriented approximately 90 degrees from the Rx antennas. When using dipole antennas, multiple Tx antennas in close proximity to one another result in a transformer-like condition and loss of power will occur if the Tx antennas are too close to one another. In a transformer, energy from one Tx antenna will be absorbed by an adjacent Tx antenna such that none of the transmitted energy will propagate away from the Tx antenna. The result is a direct loss of power and a need to prevent this lost power from feeding back into the first Tx antenna's circuitry. In order to minimize these effects, the radar system (e.g., the CW radar system) of the present invention ensures a functional distance has been built into the structure holding the separate transmitters. This functional distance is a function of how much energy loss is acceptable and the specific signal frequencies being transmitted by the radar system (e.g., the CW radar system). In one embodiment, the radar system (e.g., the CW radar system) of the present invention separates Tx antennas by approximately 15.2 cm (6 inches) to approximately 91.44 cm (36 inches). Since the Rx antennas are also dipole antennas, the angle between the Tx antenna(s) and the Rx antennas is approximately 90 degrees, maximizing the benefits of cross-polarization.

FIG. 3C illustrates a cross polarization orientation for Tx and Rx antennas according to another embodiment of the present invention.

Figure 4:
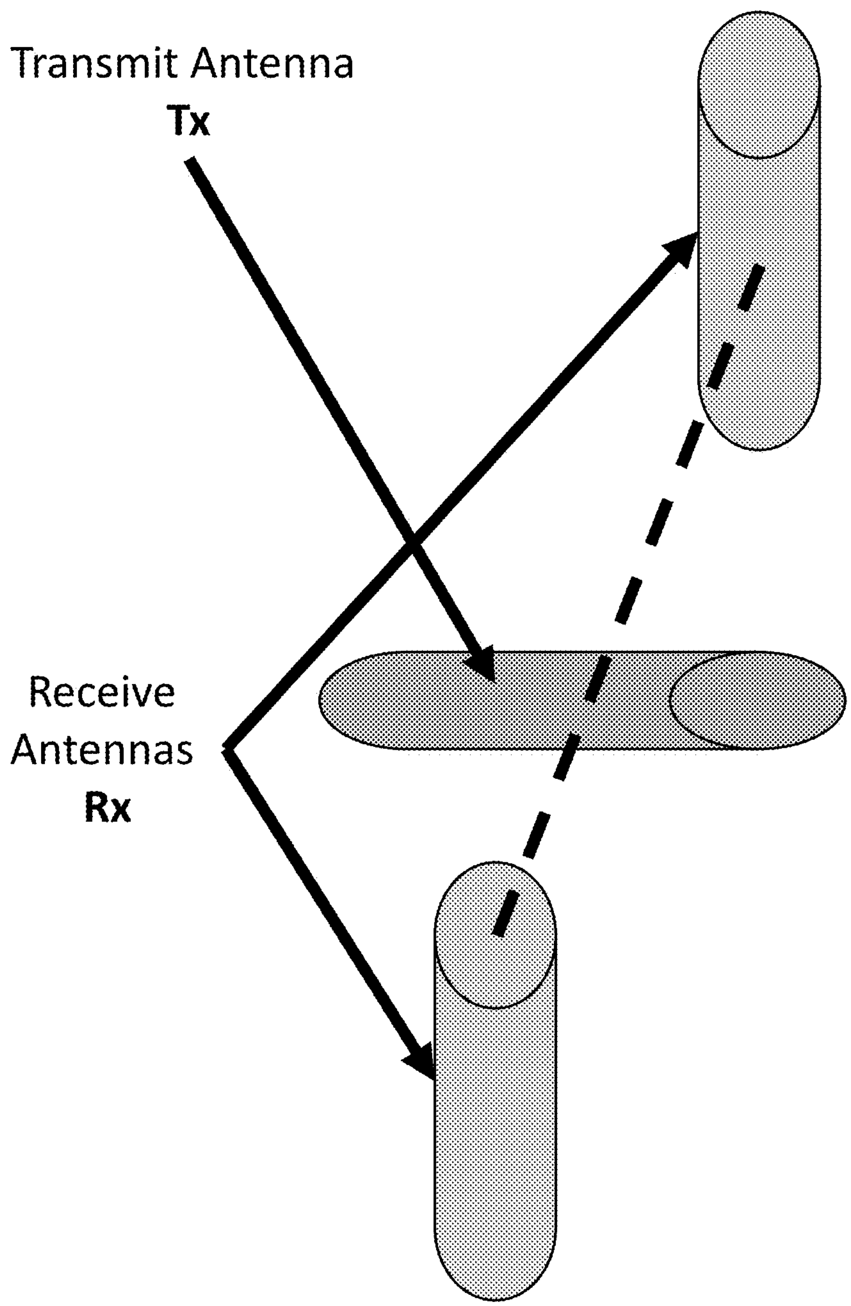
FIG. 4 illustrates an antenna setup for Tx and Rx antennas for a radar system (e.g., a CW radar system) according to one embodiment of the present invention.

FIG. 4 illustrates an antenna setup for Tx and Rx antennas for a radar system (e.g., a CW radar system) according to one embodiment of the present invention. The Tx antenna is positioned between two Rx antennas. The Tx antenna is placed at a 90-degree angle in relation to the two Rx antennas.

In addition, a third source of noise is the electronic equipment powering, controlling, connected to, and/or in close proximity to the radar system (e.g., the CW radar system). All electronics have noise associated with them and must be accounted for and/or corrected for. The largest source of drift seen in the system is thermal drift in the analog amplifiers. Without correction, drift values of over 3 dB have been observed during the duration of a survey. Strict temperature control of the amplifier boards and low thermal drift components reduce this effect until it is manageable in the collection phase and removable in the processing and analysis phase using a variety of statistical analysis techniques.

In one embodiment, a single Tx antenna is coupled with at least one Rx antenna (e.g., 1 Rx antenna, 2 Rx antennas). In a preferred embodiment, the single Tx antenna is mutually orthogonal with the at least one Rx antenna, making the system fully 3-dimensional (i.e., 3 axes).

In one embodiment, a pinpoint localization system (PLS) is placed (e.g., by a diver, by an AUV) on a pre-surveyed grid, which is based on detection and localization performed by the radar system (e.g., the CW radar system). The PLS is swept in power and frequency over a period of time (e.g., after the diver leaves). The PLS is moved to the next point in the grid and the process is repeated until all grid points are surveyed. Analysis of the strength of the target response to power and frequency is then used to localize the object relative to the grid in three dimensions and the difference in frequency response is used to type the material of the target (e.g., species identification).

Figure 42:
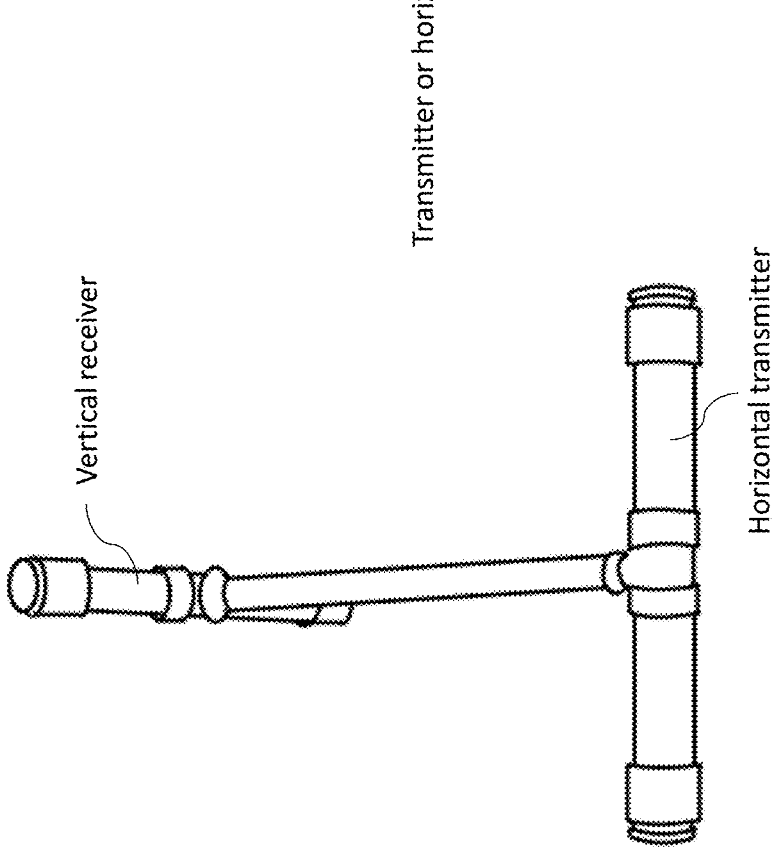
FIG. 42 illustrates one embodiment of a pinpoint localization system (PLS) with 2-axes.

FIG. 42 illustrates one embodiment of a PLS with 2-axes. The PLS includes a horizontal Tx antenna and a vertical Rx antenna. Alternatively, the PLS includes a vertical Tx antenna and a horizontal Rx antenna when the survey field is nominally >20 m (65.6 ft) below the surface of the ocean.

Figure 43:
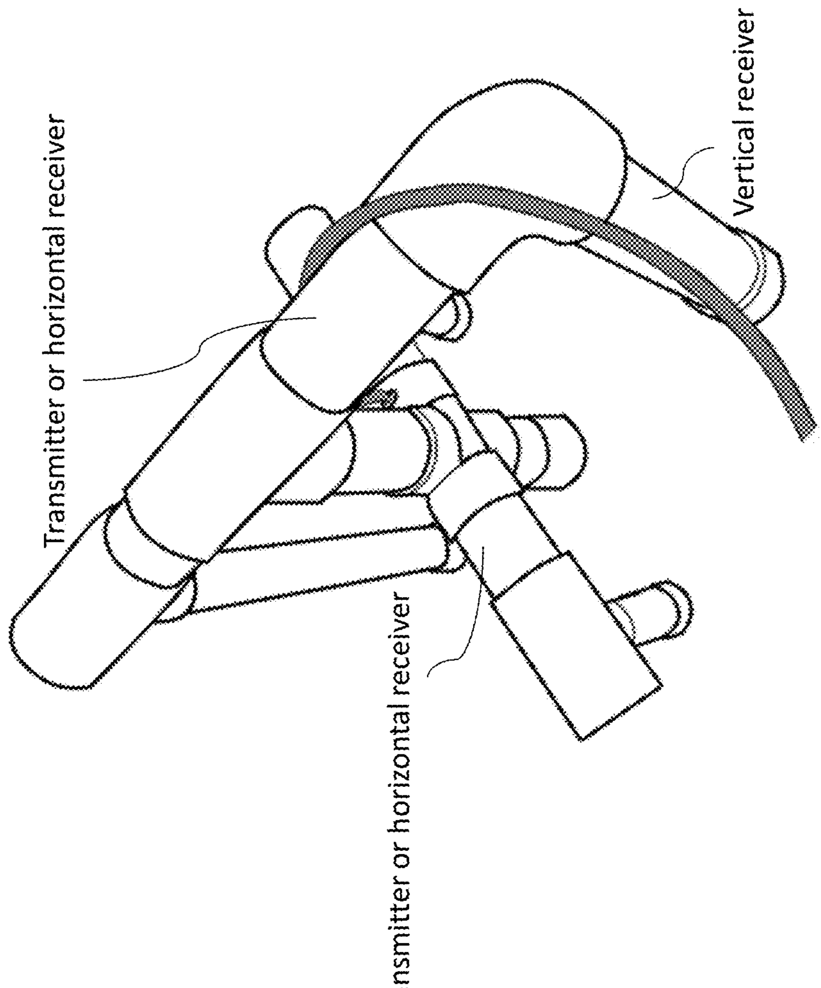
FIG. 43 illustrates one embodiment of a PLS with 3-axes.

FIG. 43 illustrates one embodiment of a PLS with three axes. The PLS includes a Tx antenna (e.g., horizontal Tx antenna), a horizontal Rx antenna, and a vertical Rx antenna. In one embodiment, the Tx antenna is a vertical Tx antenna. There is a balance between the lowest frequency used, the depth of the ocean floor below the ocean surface, the power level of the transmitter, and how long a sample is taken (e.g., longer sampling allows time averaging to remove wave effects).

Figure 54:
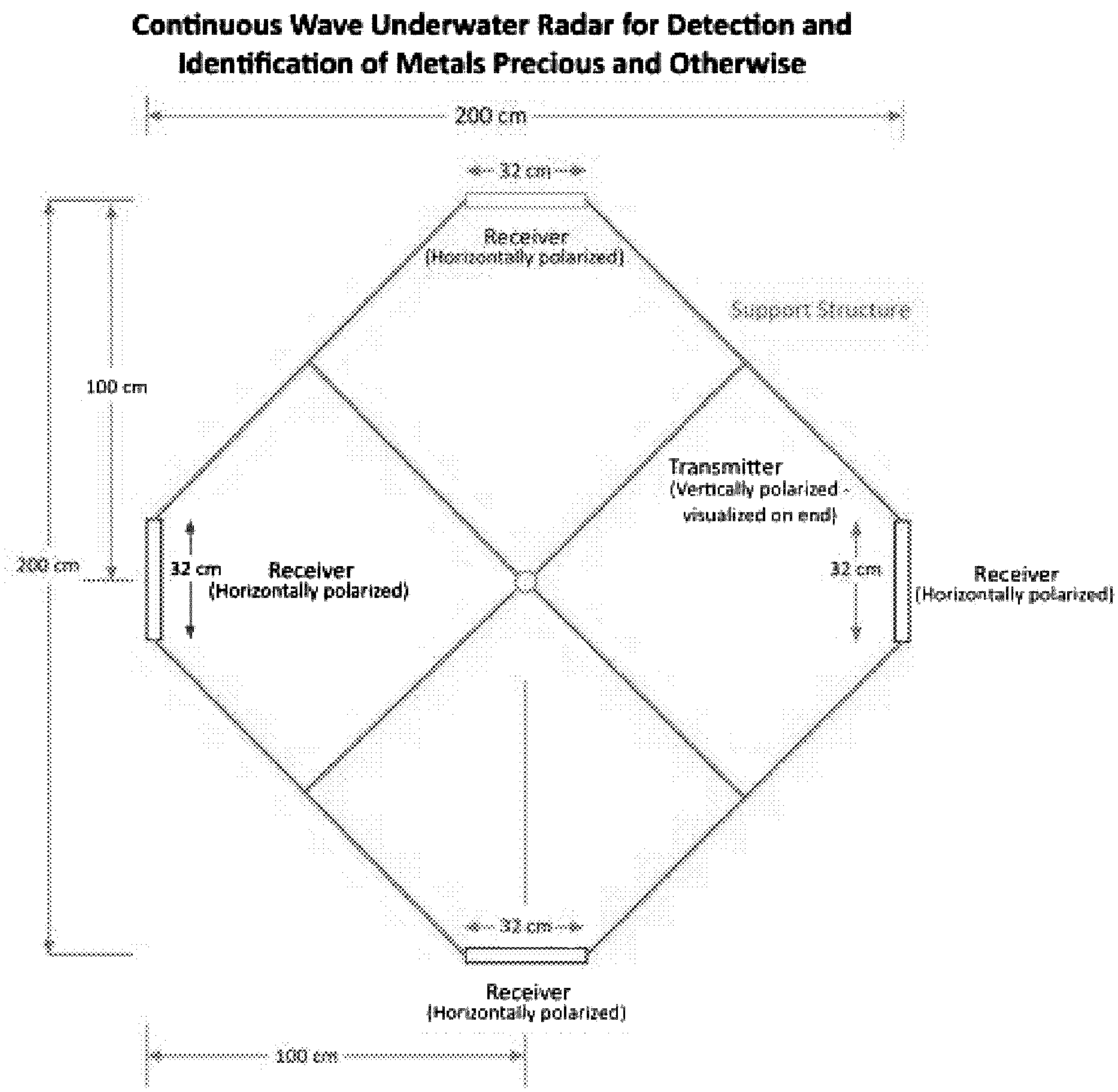
FIG. 54 illustrates one embodiment of a precision location device for deep sub-floor search, detection, location, and identification of sub-surface metals using a stationary radar system.

FIG. 54 illustrates one embodiment of a PLS with three axes. The PLS includes a vertical Tx antenna with four Rx antennas in a square around the Tx antenna. Unlike the prior embodiments, this embodiment allows for an area search of over 20 m (65.6 ft) in all directions (latitude, longitude, and depth). The system geolocates relative to the Tx antenna to <1 m in all three dimensions.

Figure 55:
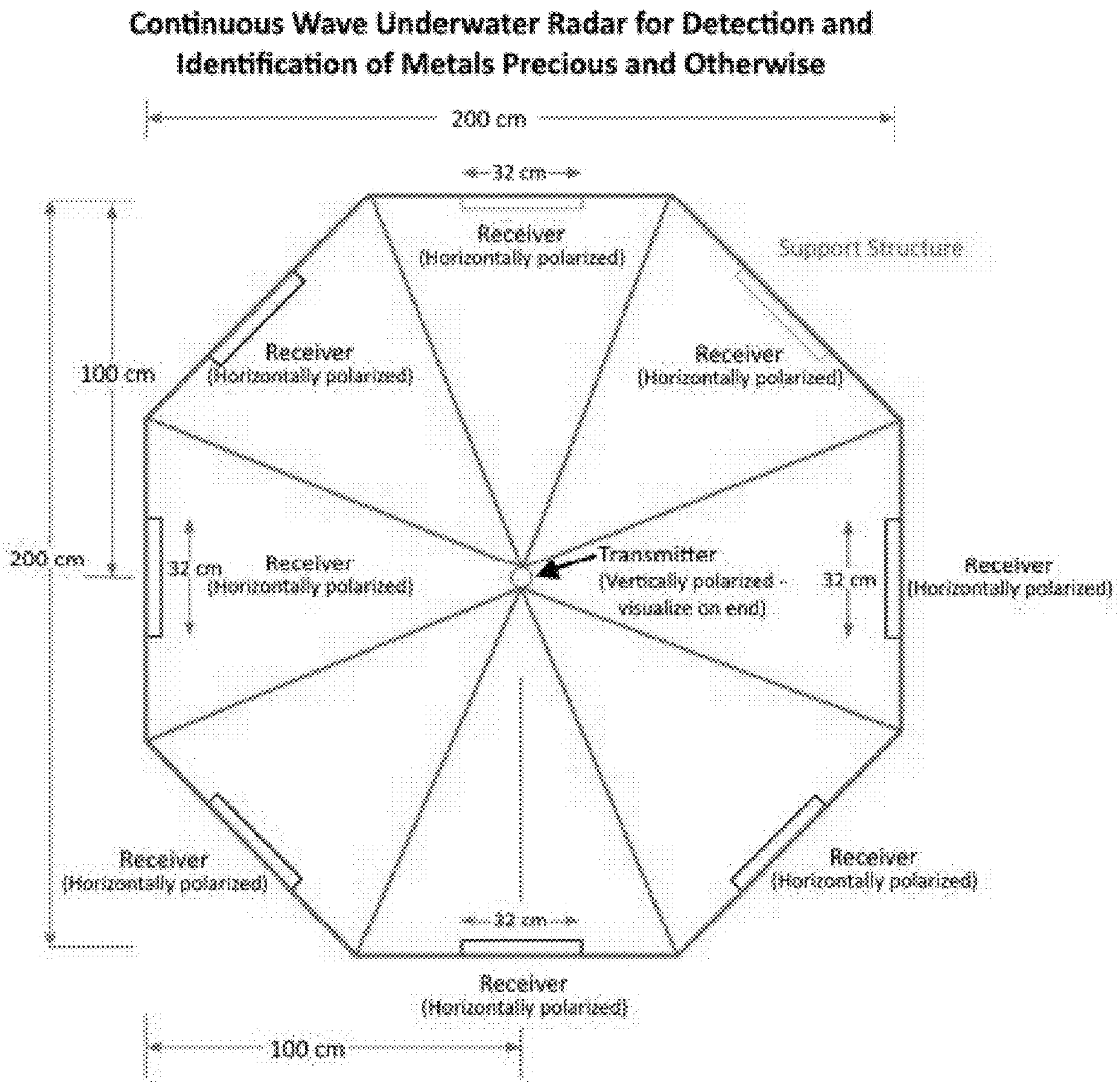
FIG. 55 illustrates one embodiment of a precision location device for deep sub-floor search, detection, location, and identification of sub-surface metals with enhanced geolocation and sensitivity.

FIG. 55 illustrates one embodiment of a PLS with three axes support and is fully target orientation independent. This embodiment allows for an area search of over 20 m (65.6 ft) in all directions (latitude, longitude, and depth). The system geolocates relative to the Tx antenna to <1 m in all three dimensions.

Figure 44:
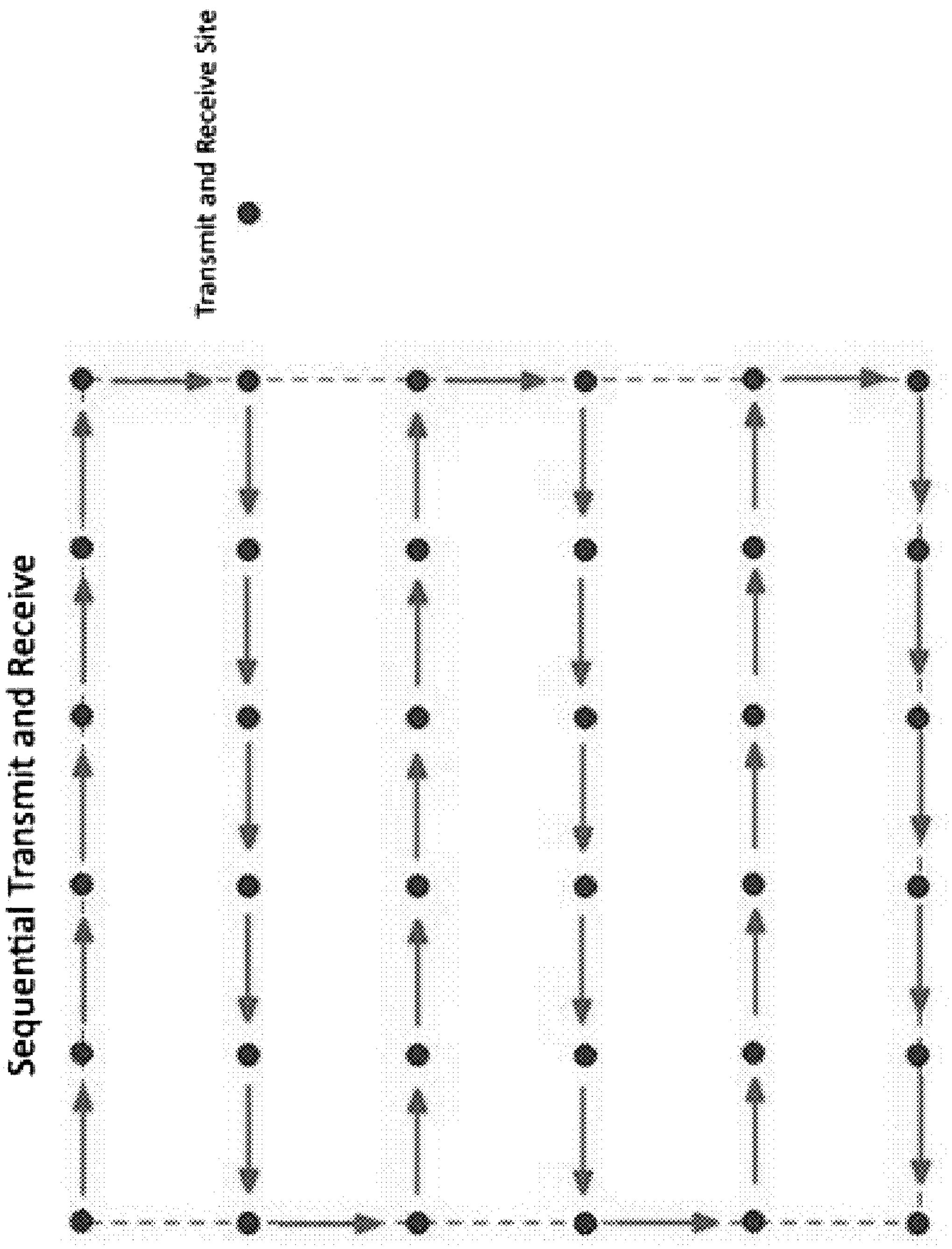
FIG. 44 illustrates one embodiment of a sequential transmit and receive system.

In one embodiment, the system includes a sequential transmit and receive as shown in FIG. 44. A first transmit and receive site transmits to a second transmit and receive site. The second transmit and receive site transmits to a third transmit and receive site, and so forth.

In one embodiment, the PLS frequencies are between 1 Hz to 1 MHz. In a preferred embodiment, the PLS frequencies are in the 1,000 Hz to 40,000 Hz range. The transmitted waveforms are operable to be continuous wave, swept, or pulsed. However, pulsed waveforms typically provide too low of an average power to positively localize an object in the normal survey time frame. Continuous wave provides the highest average power per frequency transmitted.

Figure 45:
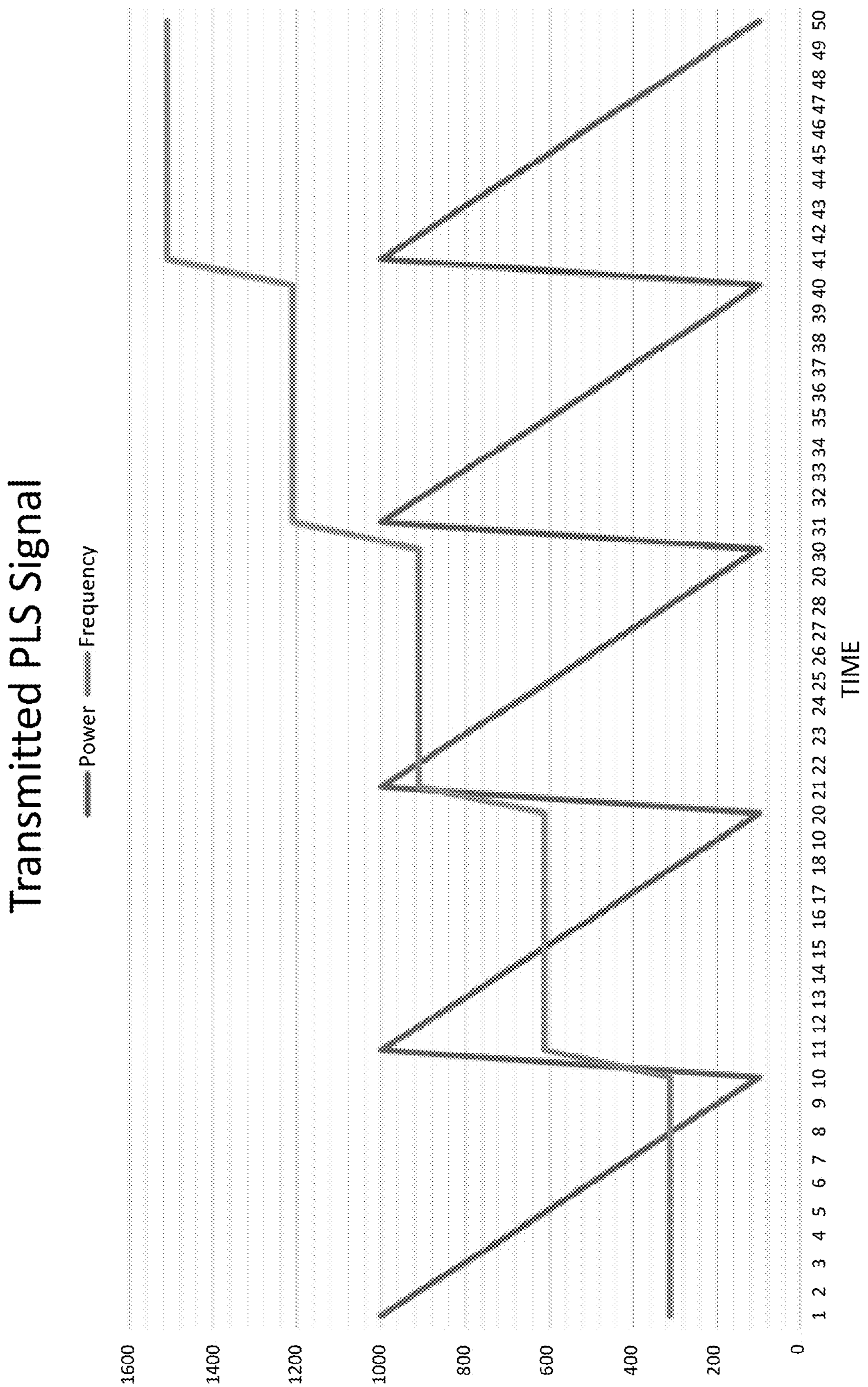
FIG. 45 illustrates one example of a continuous wave search signal for a PLS.

FIG. 45 illustrates one example of a continuous wave search signal for a PLS.

Frequency, power, and receiver sensitivity must be maintained with precision over length of the collection across the grid to allow for each survey point to be merged. This is a significant driver for the design of the receiver system as long-term stability in analog circuits may be difficult if not corrected. In one embodiment, grids are operable to have about 5 m to about 25 m in survey points. Other distances are compatible with the present invention.

Figure 46:
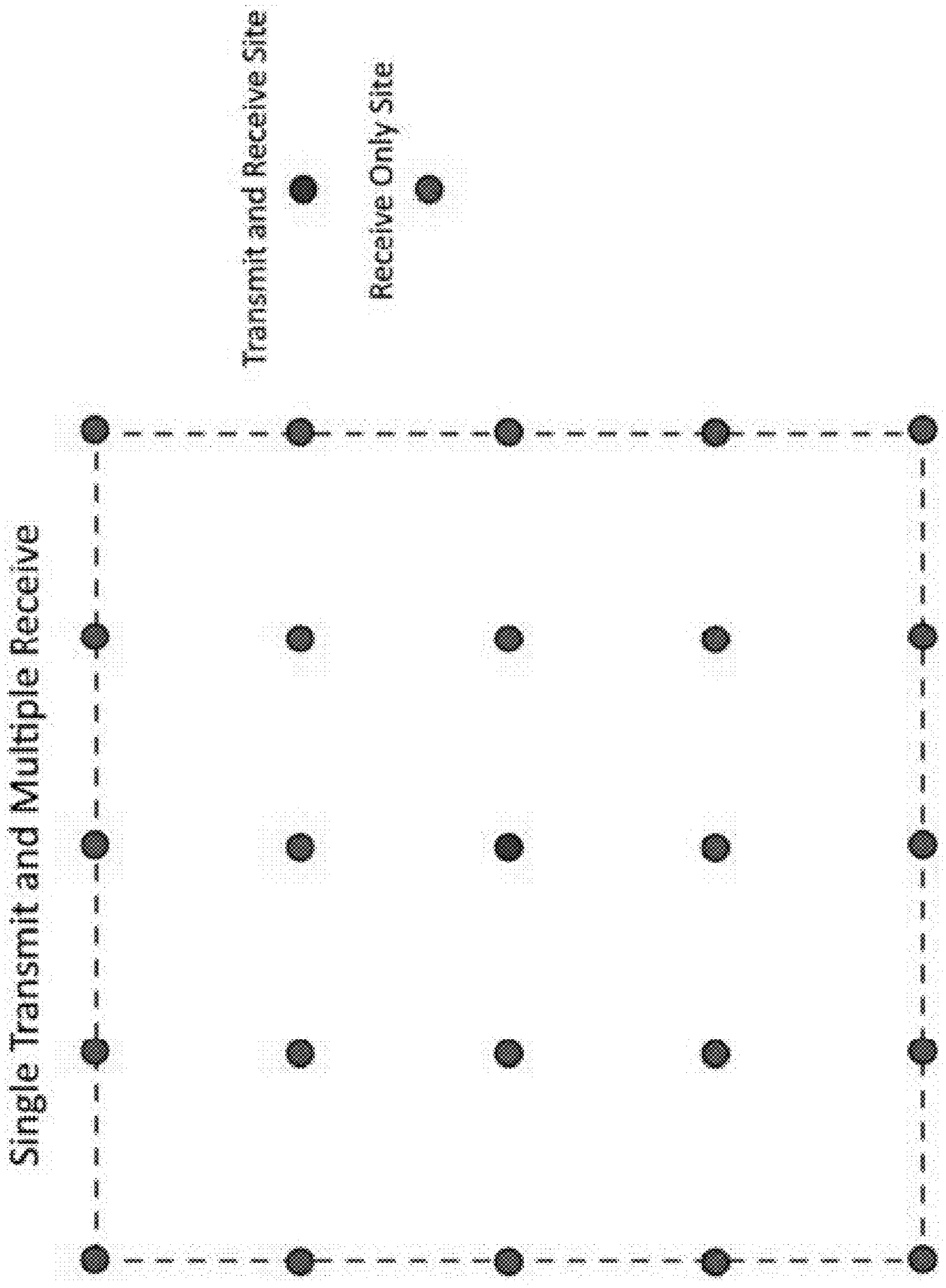
FIG. 46 illustrates one embodiment with a single Tx antenna with multiple Rx antennas.

In one embodiment, multiple PLS units are operable to be placed simultaneously. As attenuation between grid points is significant, even at 5 m, electrical isolation is maintained. Using about 9 to 25 or more units (e.g., with 5 m grids), it is possible to have a single transmitter acting as the source for all PLS units. FIG. 46 illustrates one embodiment with a single Tx antenna with multiple Rx antennas.

Figure 47:
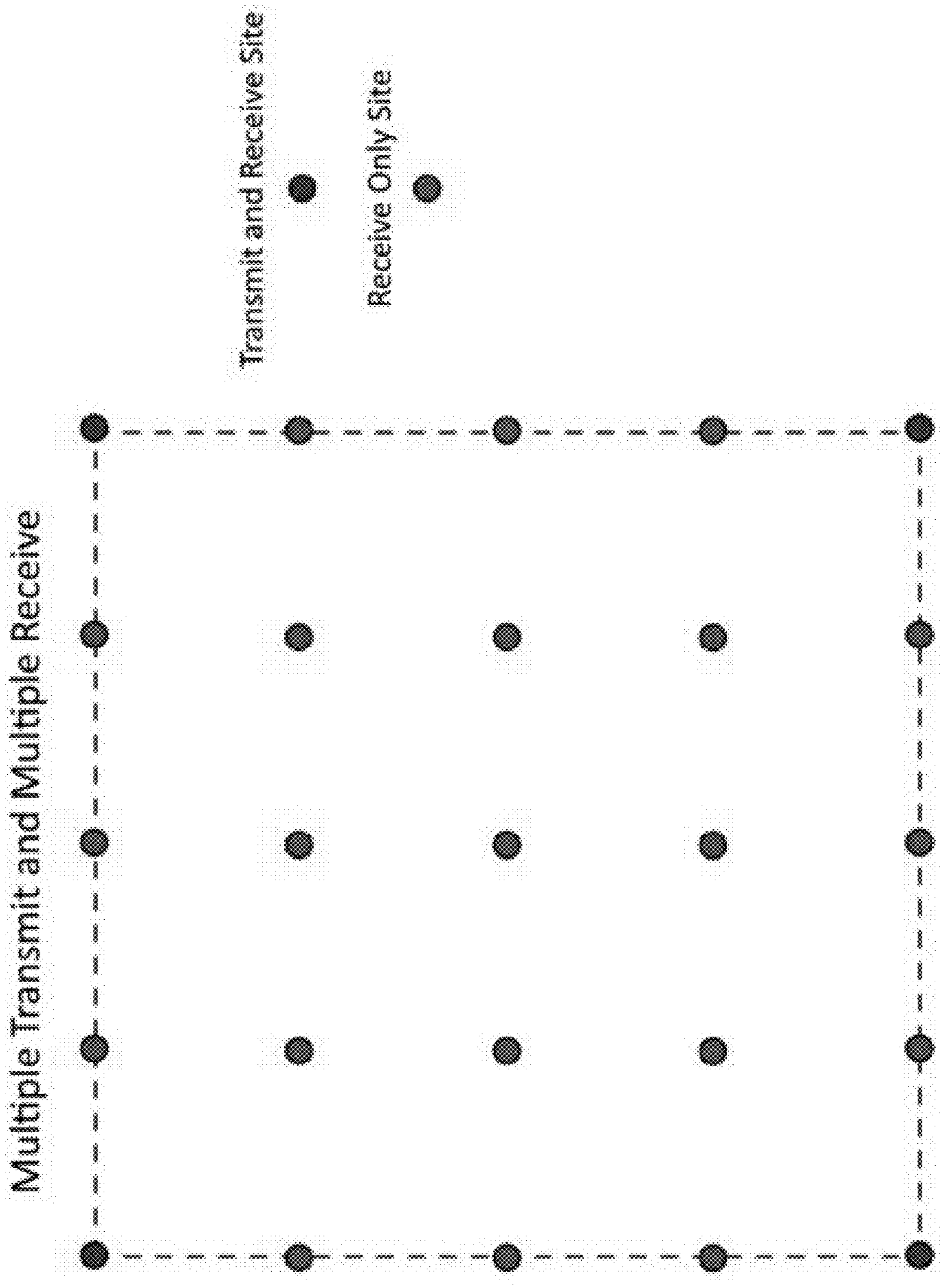
FIG. 47 illustrates one embodiment with multiple Tx antennas and multiple Rx antennas.

In another embodiment, the Tx antennas at various locations within the grid (array) are operable to be active (e.g., on the corner of the array) and the receivers are all operable to be active. Changing the relative phase of the Tx antennas changes the focus of the energy in the sub-bottom, allowing scanning with high precisions. Grid spacing is operable to be optimized for the location of the Tx antennas and the Rx antennas. FIG. 47 illustrates one embodiment with multiple Tx antennas and multiple Rx antennas.

Figure 48:
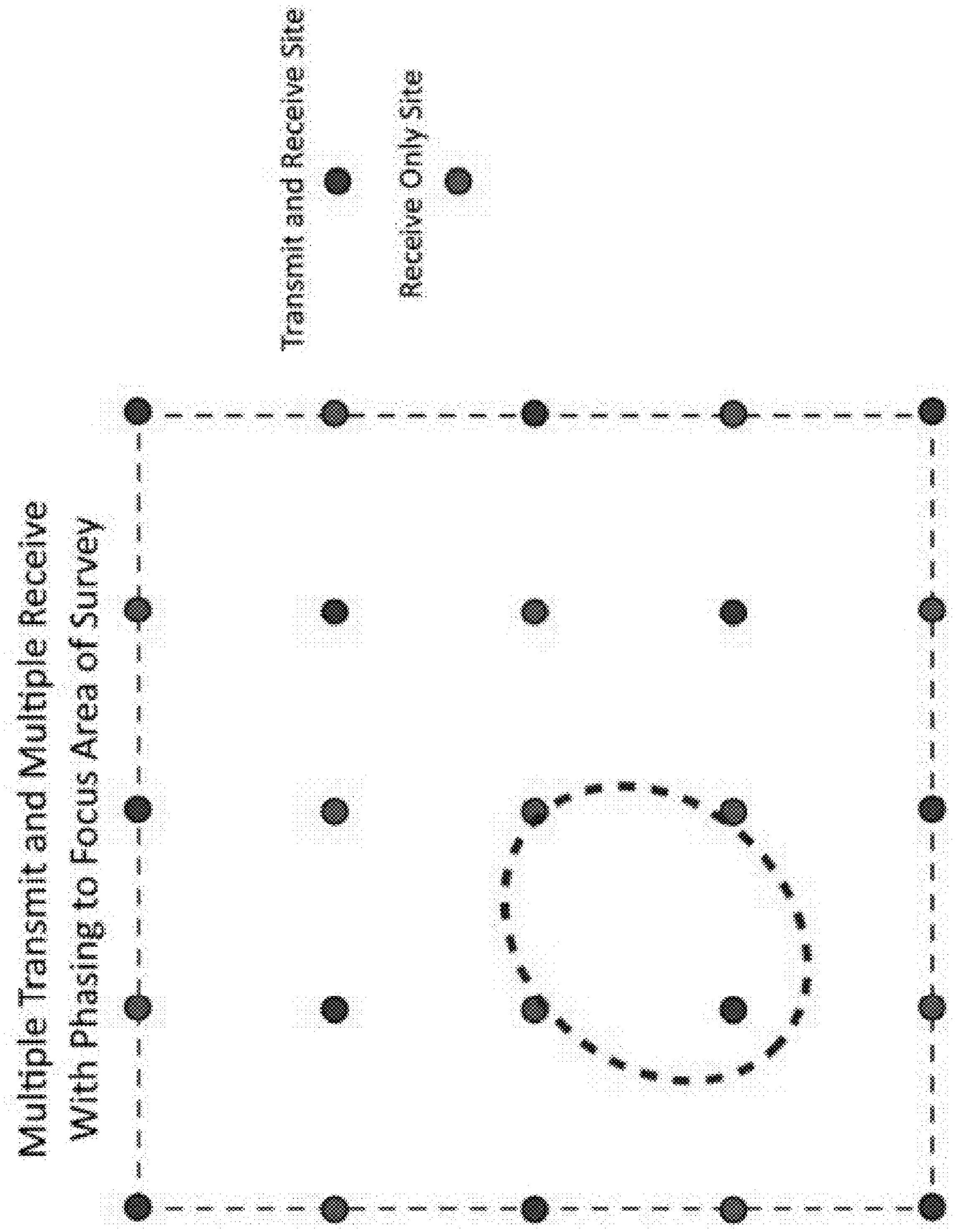
FIG. 48 illustrates one embodiment of multiple Tx antennas and multiple Rx antennas with phasing for focus an area of survey.

In yet another embodiment, all PLS units are operable to be active. In one embodiment, relative phase changes focus the antenna with the potential for power on the target. FIG. 48 illustrates one embodiment of multiple Tx antennas and multiple Rx antennas with phasing for focus an area of survey.

In still another embodiment, multiple PLS units are operable to be positioned where all PLS units transmit, but each PLS unit has an assigned frequency offset. Advantageously, this embodiment allows for identification of the Tx antenna and its location relative to every other unit. In one embodiment, offsets (e.g., ≥1 Hz) are operable to provide sufficient separation to identify each Tx antenna. A significant advantage of multiple PLS systems operating simultaneously (e.g., either one Tx antenna or multiple Tx antennas operating simultaneously) is the significant reduction in the stability requirements on the Rx antennas. Because the entire field is surveyed simultaneously, the length of survey drops from hours to minutes dramatically reducing the drift per unit time requirements on the receiver analog circuitry.

Drift current, or electronics drift, is caused by electric force, i.e., charged particles get pushed by an electric field. Electrons, being negatively charged, get pushed in the opposite direction of the electric field, but the resulting conventional current points in the same direction as the electric field. The radar system (e.g., the CW radar system) of the present invention must account for drift current from elements including, but not limited to, temperature, vibrations, and/or system electronics. These elements have a natural drift state. If unaccounted for, excess noise is created within the system and electronic saturation from the noise will effectively overpower the target signal strength. Therefore, it is important for the radar system (e.g., the CW radar system) to maintain a balanced signal-to-noise ratio. The CW radar uses multiple elements to reduce or control electronic drift. The first is through DC (Direct Current) biasing control. The second is through Analog Filtering. The third is through climate control of the electronic boards/elements during operations. The electronic components are mounted in thermal electric coolers/heaters to maintain constant temperatures during operations. Environmental temperature fluctuations are maintained to less than approximately 1° Celsius (C) through a combination of heating and cooling. In one embodiment, the radar system (e.g., the CW radar system) is operated at a temperature range of approximately 4° C. to 22° C. to avoid thermal drift.

Additionally, several sources of signal clutter must be accounted for. These include, but are not limited to, the reflection of the transmitted signal off the surface of the water above the radar system (e.g., the CW radar system) and the reflection of the transmitted signal off the bottom of the ocean. Regarding the reflection off the surface of the water, if the surface was perfectly flat, energy from the Tx antenna(s) would be completely absorbed at the surface. However, the surface is almost never perfectly flat due to wave action, ocean swells, wakes caused by other objects, winds, currents, etc., which result in disturbances that create a reflection at the air-water boundary, bouncing energy towards the Rx antenna(s). This is operable to amount to approximately 0.00001 to as much as approximately 0.01 Watt of variance in signal from the surface reflection. In one embodiment, the signal reflection off the surface of the water is most noticeable when the radar system (e.g., the CW radar system) is within 15.2 m (50 ft) of the surface of the water.

The reflection off the bottom of the ocean is a second source of clutter, but much less so than the reflection off the surface of the ocean. Because sand is typically a mixture of water and rock, the boundary layer effects are minimal. In the case of reef environments, or other rock formations, the boundary layer effects are also minimal, but are also operable to create noise components that need to be accounted for during post-processing.

Figure 62A:
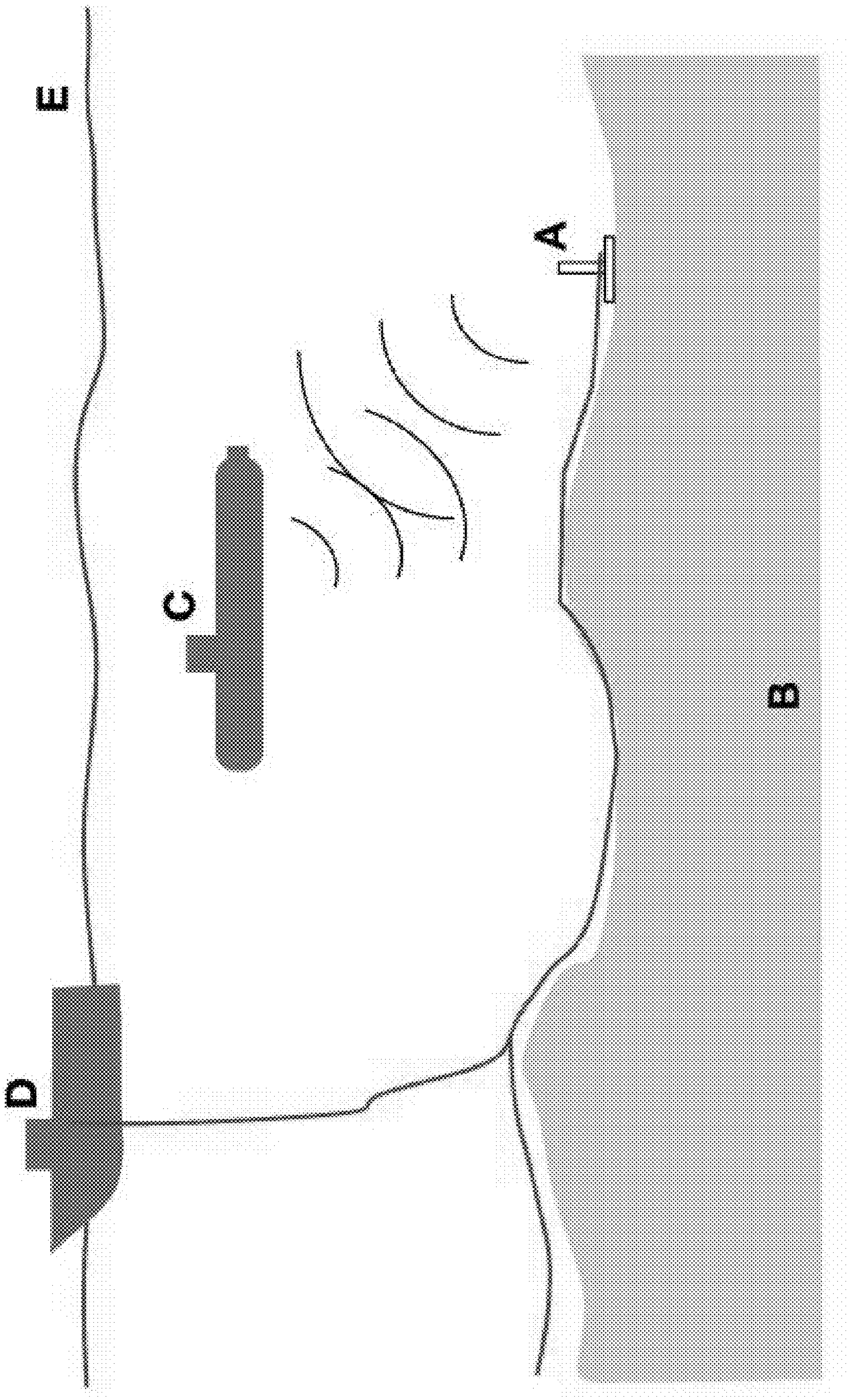
FIG. 62A illustrates one embodiment with at least one transmitter and at least one receiver located in a fixed position on the ocean floor.

In another embodiment of the invention, as illustrated in FIG. 62A, at least one transmitter and at least one receiver are located in a fixed position on the ocean floor. The Tx and Rx antennas are cross-polarized if collocated as a means of reducing direct-path saturation of the receiver, or the antennas are otherwise electrically isolated by separation and/or cross-polarization. The radar system (e.g., the CW radar system) continuously emits at least one frequency when a moving metal object enters the detection range of the system. The Rx antenna and receiver system detects the change in signal level, either constructive or destructive, and reports the detection to a vessel in the area via fiber-optic or wire. FIG. 62B lists all the labels in FIG. 62A.

Figure 63A:
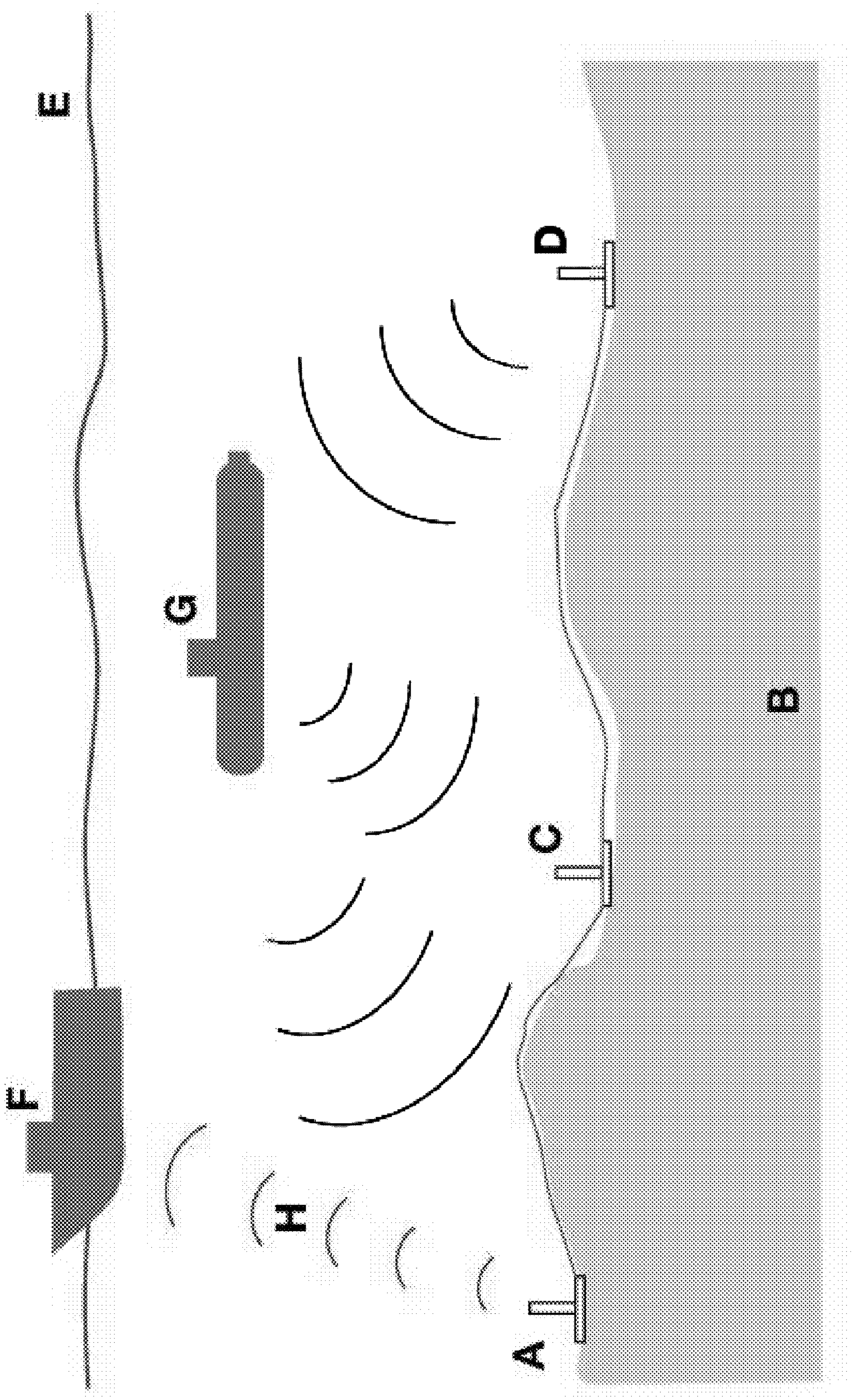
FIG. 63A illustrates one embodiment with multiple transmitter and receiver antennas deployed in an area to act as a detection fence-line.

In another embodiment, multiple Tx and Rx antennas are operable to be deployed in an area to act as a detection fence-line. One embodiment is illustrated in FIG. 63A where multiple Tx/Rx nodes are linked via fiber-optic or wire. Each node is operable to act independently using a different set of frequencies or they are operable to act in concert using the same frequency and/or frequencies. The nodes process the returns on-board and relay detection information to a hub for rebroadcast to a surface vessel. This is operable to be either by RF communications which are highly covert or by fiber-optic or wired tether. Making use of detections from multiple nodes allows the determination of the position and direction of motion of the surface and/or sub-surface targets. FIG. 63B lists all the labels in FIG. 63A.

Figure 64A:
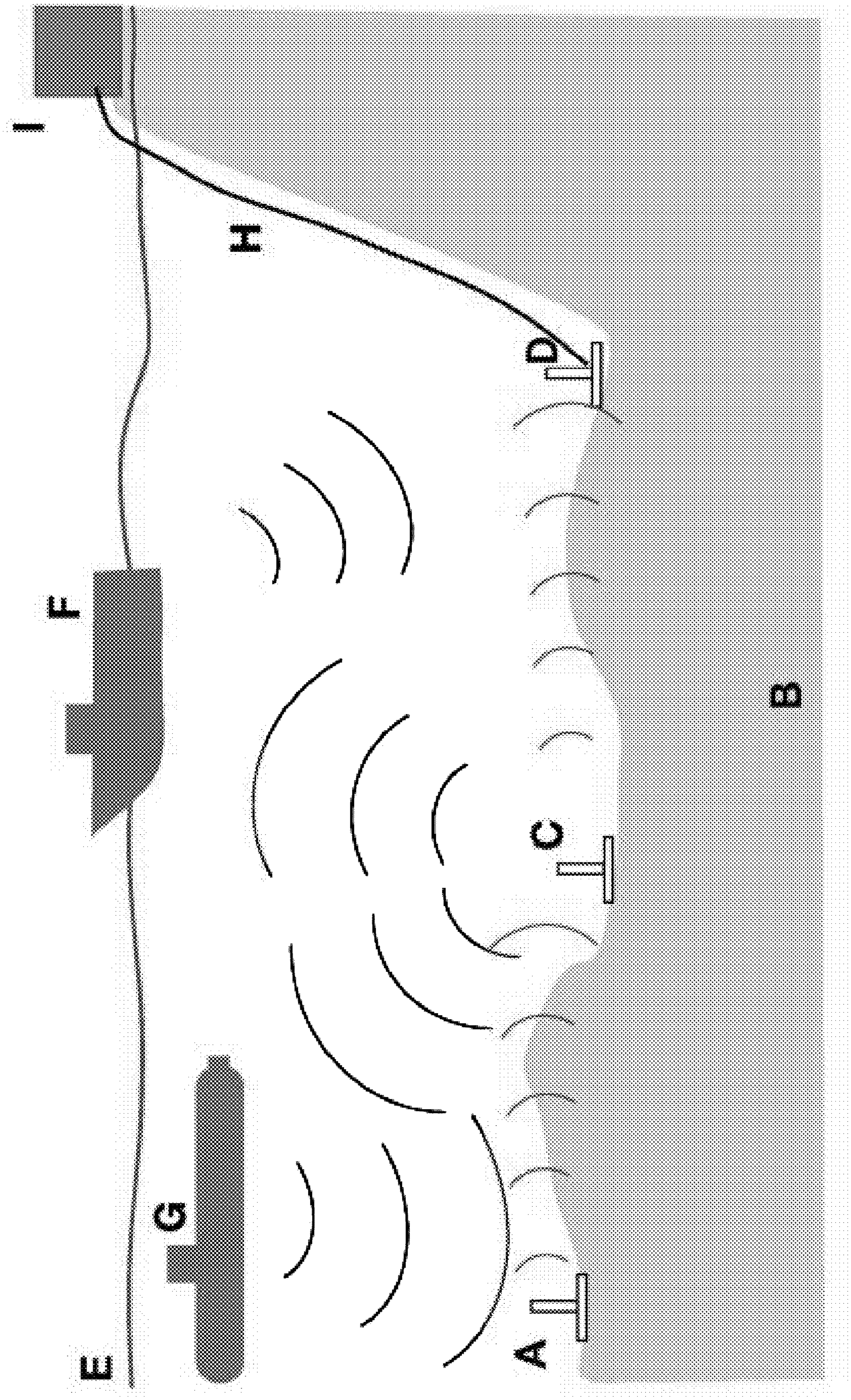
FIG. 64A illustrates one embodiment with multiple systems interconnected via radiofrequency communication.

In another embodiment, illustrated in FIG. 64A, multiple systems are interconnected via RF communication. The systems are deployed in such a way to identify the location and direction of travel of surface and sub-surface vessels (manned or unmanned) and/or divers. The nodes are operable to work at the same frequency or set of frequencies or different frequency or frequencies. Detection information is relayed from each node, possibly being relayed through a number of intermediary nodes until the information reach the hub node which relays the information to a land-based control system. FIG. 64B lists all the labels in FIG. 64A.

Figure 65A:
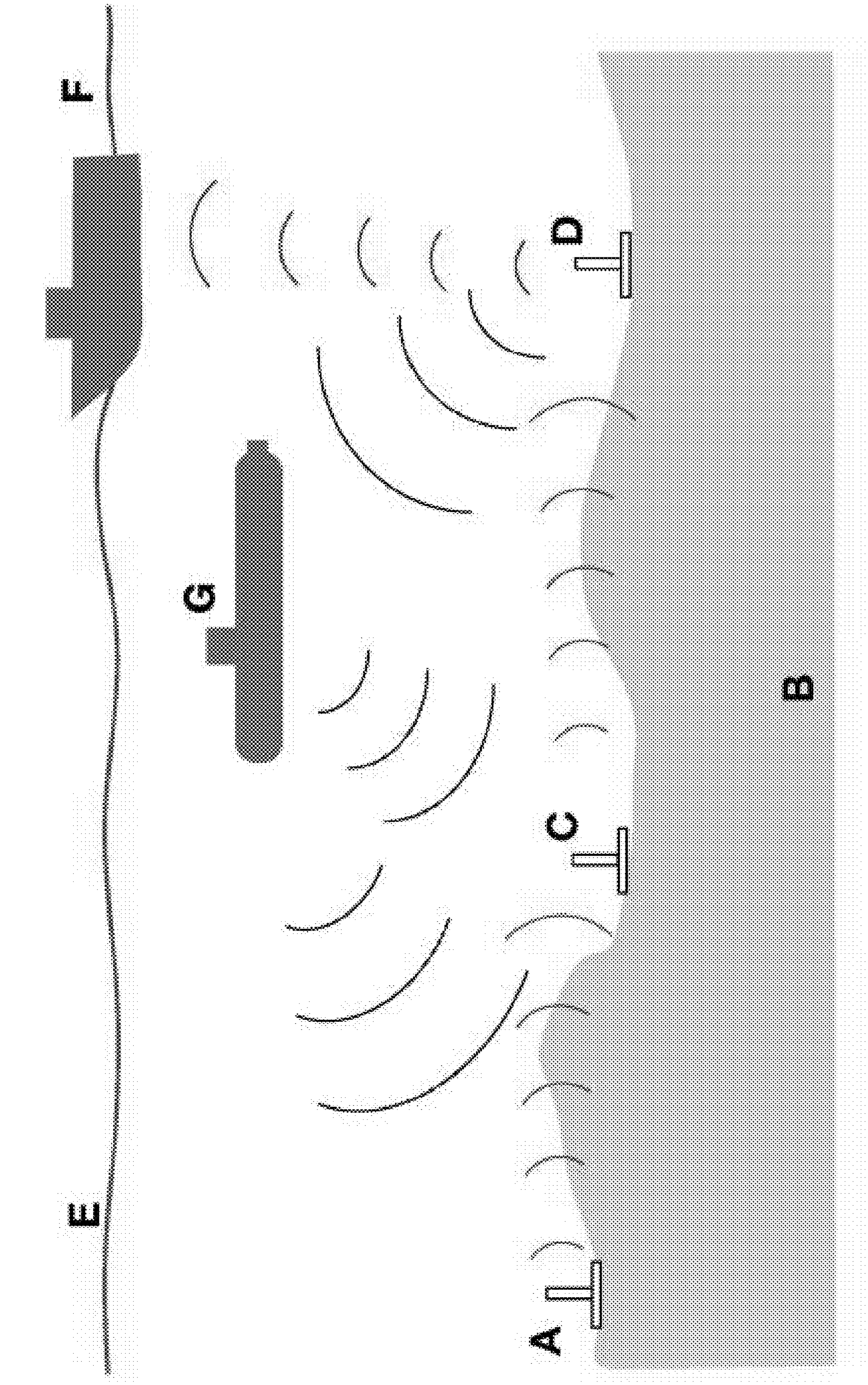
FIG. 65A illustrates one embodiment with a plurality of nodes deployed in a pattern to surveil a specific region.

In another embodiment, illustrated in FIG. 65A, multiple nodes (e.g., Tx only, Rx only, Tx/Rx combined) are deployed in a pattern to surveil a specific region. The nodes perform autonomous on-board detection and relay detection information (e.g., signal strength, frequency, time of detection, raw data from the detection window, etc.) via RF communication links which are inherently covert and secure. Detection information is eventually relayed to a hub node which is operable to rebroadcast the information to a surface vessel. FIG. 65B lists all the labels in FIG. 65A.

In another embodiment, the nodes are replaced with nodes similar to those shown in FIG. 54 and FIG. 55. These nodes provide direction as well as range information.

Phase Shift

When using multiple Rx antennas of differing electrical path lengths in conjunction with continuous wave (CW) transmissions, a phase shift occurs in the signals between each Rx antenna. If the path lengths from the Tx transmitter antenna to the target and then to the Rx antennas for the multiple Rx antennas were identical, there would be no phase difference between the signals received by each antenna. This phase shift occurs only under a very precise set of conditions, including when multiple Rx antennas are placed perpendicular (90 degrees) or near perpendicular to the direction the system is being towed. In one embodiment, one transmitter has four receivers, two forward and two aft, with each spaced between approximately 1-3 meters away from the Tx. In another embodiment, one transmitter has two receivers, one forward and one aft, with each spaced between approximately 1-3 meters apart.

Figure 5:
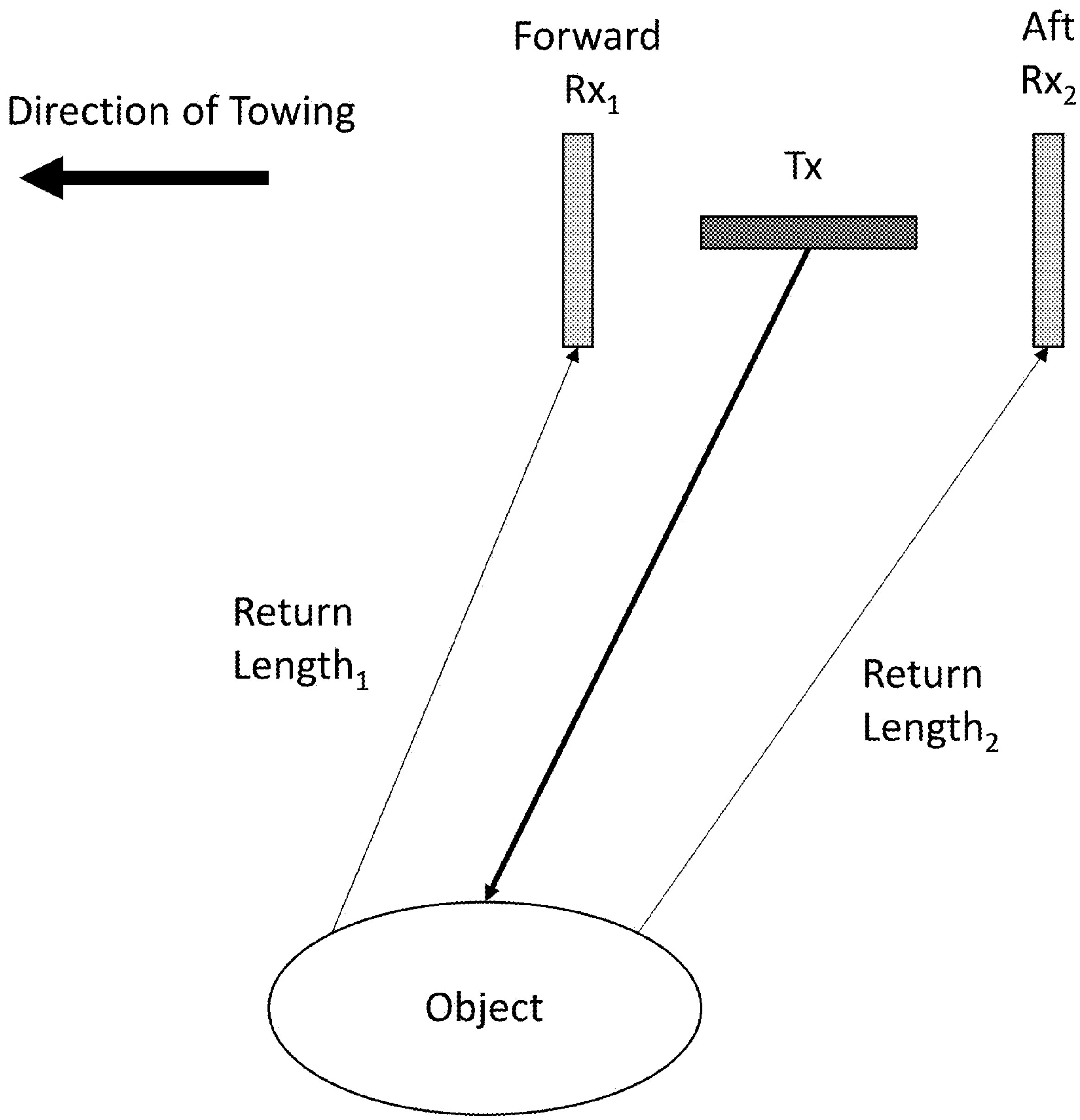
FIG. 5 illustrates an antenna setup for Tx and Rx antennas with an indication of return length differences between Rx antennas for a radar system (e.g., a CW radar system) according to one embodiment of the present invention.

FIG. 5 illustrates an antenna setup for Tx and Rx antennas with an indication of the return length differences between Rx antennas for a radar system (e.g., a CW radar system) according to one embodiment of the present invention. The Tx antenna sends out a signal in search of objects in a saltwater environment. Once detected, the signal is first received by the forward Rx antenna, traversing a first return path length ($Rx_1$). As the radar system (e.g., the CW radar system) passes over the detected object, the signal is received by the aft Rx antenna, traversing a second return path length ($Rx_2$). Because the system is a CW transmission and the return path lengths of the two Rx antennas are different, there is a phase difference between the signals received by the respective Rx antennas. The phase shift is used to distinguish an object and/or target from background noise and approximate the distance between the at least one Tx antenna and the at least one Rx antenna and the object(s) and/or target(s).

In one embodiment, the radar system (e.g., the CW radar system)'s configuration enables the use of two separate transmitters. In order to accommodate this, the frequency range between the two transmitters needs to be large enough so that the cutoff frequencies block the two transmitters from saturating the other's receivers. Because the two transmitters are perpendicular, the receivers from one transmitter are parallel to the other transmitter and only the frequency cutoff of the antennas will block the opposing transmitter's signal.

Figure 6:
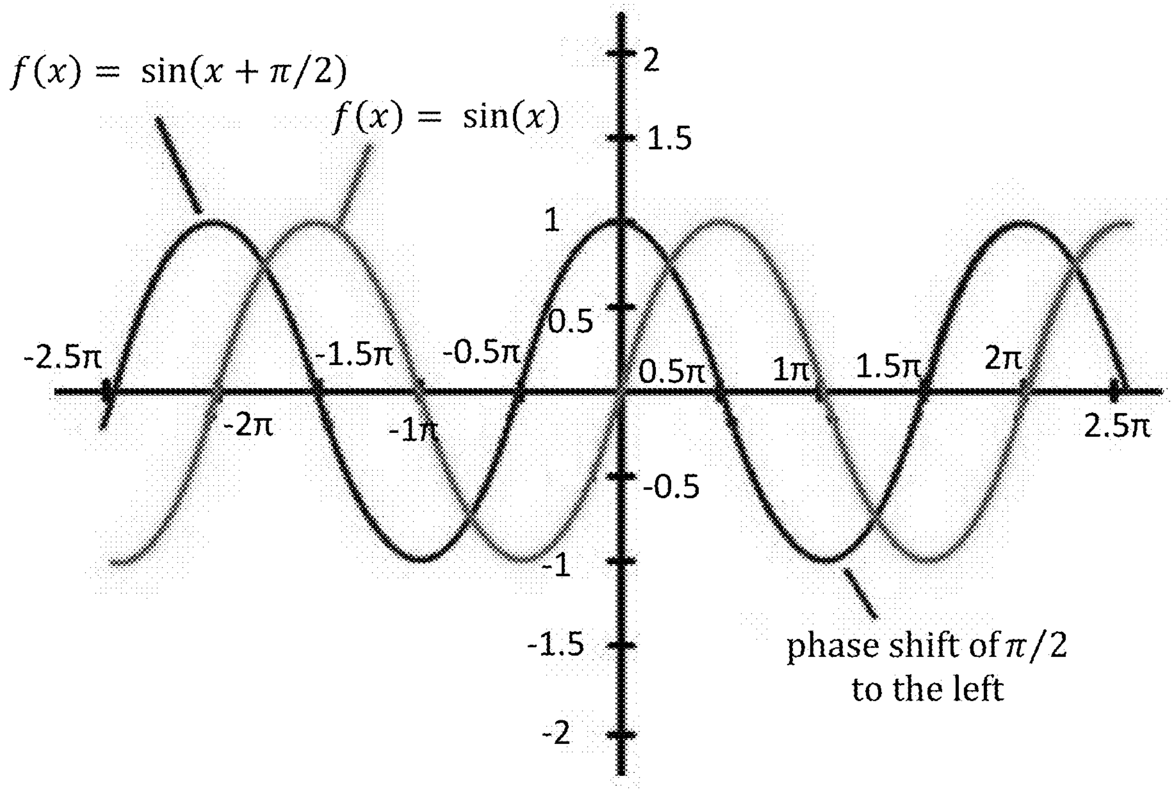
FIG. 6 illustrates a phase shift between Rx antennas for a radar system (e.g., a CW radar system) according to one embodiment of the present invention.

FIG. 6 illustrates a phase shift between Rx antennas for a radar system (e.g., a CW radar system) according to one embodiment of the present invention. The radar system (e.g., the CW radar system) of the present invention looks for the blue channel ($Rx_1$) to lead to the red channel ($Rx_2$) in either an increase in signal strength (constructive) or a decrease in signal strength (destructive) as the system gets closer to an object and/or target. However, it is possible for some signals to simultaneously experience constructive interference on one Rx antenna and destructive interference on the other Rx antenna. When detecting multiple targets at various ranges, it is possible for some signals to be constructive and others to be destructive due to distance and orientation from the system. In order to compare the blue channel ($Rx_1$) to the red channel ($Rx_2$), the radar system (e.g., the CW radar system) normalizes the signals using data recorded in the previous few minutes and subtracts this signal data from the current signal. The previous few minutes of data serves as a baseline for the radar system (e.g., the CW radar system). As more data is collected, the baseline is adjusted. This dynamic baseline adjustment accounts for all sources of signal noise and variation and ensures that all signals from the radar system (e.g., the CW radar system) are normalized, improving system accuracy and efficiency. If no targets were present, both channels would indicate signal readings of zero after normalization. Due to fluctuations in electronics and other equipment, the radar system (e.g., the CW radar system) is operable to detect approximately −70 to approximately −179 decibel watts (dBW) of signal from the combined noise inputs. This equates to an overall detection sensitivity of approximately $1/1\times10^{17.9}$ Watt of signal, or it represents a minimum detectable signal of 1.032 nV in voltage. In one embodiment, the signal received by the radar system (e.g., the CW radar system) in the presence of an object and/or target is at least 45 dB above the combined noise floor after post processing.

The phase (φ) difference between the multiple Rx antennas is a composite relationship between the direct path signal, the condition of the ocean surface, the vibration in the system's structure, variations occurring at the tow line, and the object and/or target being detected. The magnitude of the signal is proportional to the phase difference between the two signals such that a larger phase difference results in a stronger signal. Therefore, in effect the phase and magnitude of the time difference signal are the same measurement, where one is easier to identify at various times. In one embodiment, the system uses the change in phase signal to detect an object and/or target. In another embodiment, the system uses the change in signal strength to detect an object and/or target.

The wavelength in the Rx antenna(s) is equal to the wavelength in the Tx antenna, only with a phase shift based on the distance from the Tx antenna, the object/target, and the Rx antenna(s). In one embodiment of the present invention, when this distance is between approximately 31 meters (m) and approximately 119.4 m, the signals create a destructive interference, decreasing the total signal strength below the direct path.

The wavelength (c(f)/frequency, where c(f) represents the speed of propagation of the electromagnetic wave which also changes as a function of frequency, temperature, and/or salinity when in saltwater) in the Rx antennas is equal to wavelength in the Tx antenna(s), but the signals are phase-shifted based on the distance from the Tx antenna(s) to the object and/or target and back to the Rx antennas. Thus, the phase shift is associated with the difference in distance that the two Rx antennas are perceiving.

For example, if the CW radar system is transmitting at approximately 283 Hz, the perceived wavelength is equivalent to approximately 59.7 m assuming water salinity of approximately 4.95 Siemens, as opposed to approximately 1,000,000 m if transmitted in open air. The path length is a measurement from Tx antenna-to-object/target-to-Rx antennas. In this embodiment, the path length is equal to two-thirds of the wavelength, or approximately 38.6 m, and produces constructive interference in any signal returning from the object/target to the Rx antennas. The result is a direct signal strength of approximately 3.5 dBW from the Tx antenna to either Rx antenna, after amplification from the CW radar system of the present invention. The return signal from an object and/or target that is less than approximately 10 m away will cause the signal in the Rx antennas to increase by more than approximately 1 dBW due to constructive interference. Destructive interference will have the opposite effect and cause the signal to be lower in signal strength.

In another example, if the radar system (e.g., the CW radar system) is transmitting at approximately 180 Hz, the perceived wavelength is equivalent to approximately 74.8 m assuming water salinity of approximately 4.96 Siemens, as opposed to approximately 1,670,000 m if transmitted in open air. The path length is a measurement from Tx antenna-to-object/target-to-Rx antennas. In this embodiment, the path length is equal to two-thirds of the wavelength, or approximately 49.9 m, and produces constructive interference in any signal returning from the object/target to the Rx antennas. The result is a direct signal strength of approximately 3.5 dBW from the Tx antenna to either Rx antenna, after amplification from the radar system (e.g., the CW radar system) of the present invention. The return signal from an object and/or target that is less than approximately 10 m away will cause the signal in the Rx antennas to increase by more than approximately 0.1 to 0.5 dBW due to constructive interference. Destructive interference will have the opposite effect and cause the signal to be lower in signal strength.

The radar system (e.g., the CW radar system) of the present invention detects a plurality of phase shift samples from a plurality of samples. In one embodiment, the radar system (e.g., the CW radar system) is operable to detect between approximately 500 to 2000 samples of phase shift for every 250,000 samples recorded depending on the transmitted frequency. Additionally, multiple effects are detected in the current system in addition to phase shift between antennas. These include, but are not limited to, differences in signal strength between the Rx antennas and variations in frequency of the signals at each Rx antenna. Although the Tx antenna is producing a constant tone/frequency, there are Doppler effects that occur due to vibrations in the physical structure of the system that result in signal differences between each Rx antenna.

Figure 7A:
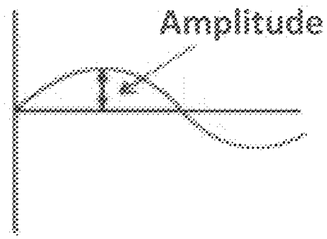
FIG. 7A illustrates variances in signal strength between $Rx_1$ and $Rx_2$ antennas for the $Rx_1$ antenna according to one embodiment of the present invention.

FIG. 7A illustrates variances in signal strength between $Rx_1$ and $Rx_2$ antennas for the $Rx_1$ antenna according to one embodiment of the present invention.

Figure 7B:
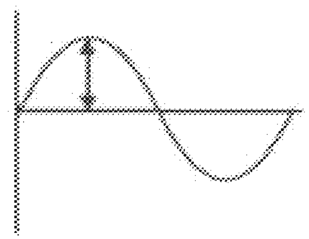
FIG. 7B illustrates variances in signal strength between $Rx_1$ and $Rx_2$ antennas for the $Rx_2$ antenna according to one embodiment of the present invention.

FIG. 7B illustrates variances in signal strength between $Rx_1$ and $Rx_2$ antennas for the $Rx_2$ antenna according to one embodiment of the present invention.

Figure 7C:
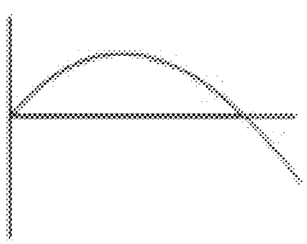
FIG. 7C illustrates variances in frequency using a lower frequency according to on embodiment of the present invention.

FIG. 7C illustrates variances in frequency using a lower frequency according to on embodiment of the present invention.

Figure 7D:
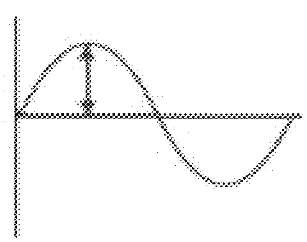
FIG. 7D illustrates variances in frequency using a Tx frequency according to one embodiment of the present invention.

FIG. 7D illustrates variances in frequency using a Tx frequency according to one embodiment of the present invention.

Figure 7E:
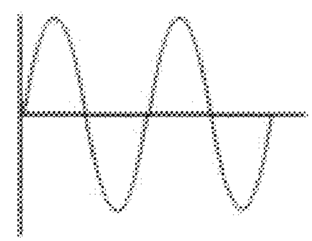
FIG. 7E illustrates variances in frequency when using a higher frequency according to one embodiment of the present invention.

FIG. 7E illustrates variances in frequency when using a higher frequency according to one embodiment of the present invention.

Location and Classification

In one embodiment, the radar system (e.g., the CW radar system) of the present invention is active sensor-based using electrical conductivity. With an active sensor, signal strength, frequency, and direction are operable to be increased and/or controlled based on the Tx's inputs, polarization, and physical characteristics. An active sensor system increases its operating range by controlling both Tx and Rx characteristics. Ferrous material, including, but not limited to, iron and steel, and non-ferrous material, including, but not limited to, gold, silver, copper, and/or aluminum, are actively excited by the Tx and the EM waves. This creates an electrical current due to the material's conductivity. The physical shape of an object and/or target will produce a return EM wave that is detected by the radar system (e.g., the CW radar system)'s Rx antennas. The characteristics of the return EM wave are a result of the relationship between the Tx antennas and signals, the Rx antennas and signals, and all conductive material composing and surrounding the total system. Material, such as sand, soil, and/or rock, has such low conductivity that they appear transparent to the Rx antennas, while all conductive materials will produce some level of detection in the Rx antennas.

TABLE 1

Conductivity of Non-Ferrous & Ferrous Metals

| Material | Conductivity (S/m) |
|---|---|
| Sliver | 6.3E+07 |
| Copper (annealed) | 5.80E+07 |
| Gold | 4.11E+07 |
| Aluminum | 3.77E+07 |
| Brass (66% Cu, 34% Zn) | 2.56E+07 |
| Copper (annealed) Carbon | |
| Tungsten | 1.79E+07 |
| Zinc | 1.67E+07 |
| Cobalt | 1.60E+07 |
| Nickel | 1.43E+07 |
| Iron | 1.03E+07 |
| Platinum | 9.52E+06 |
| Tin | 9.17E+06 |
| Lead | 4.57E+06 |
| Titanium | 2.38E+06 |
| Stainless Steel | 1.45E+06 |
| Mercury (liquid) | 1.04E+06 |
| Bismuth | 8.70E+05 |
| Carbon | 2.00E+05 |
| Distilled Water | 1.00E−04 |
| Dry sandy soil | 1.00E−03 |
| Fresh water | 1.00E−02 |
| PET | 1.00E−21 |

In one embodiment, the radar system (e.g., the CW radar system) transmits a signal from the Tx antenna(s) by creating a specific frequency through the use of a signal generator. In one embodiment, the signal generator functionality includes, but is not limited to, dual channel output, a sampling rate of approximately 1.5 Mega Samples per second (MSa/s), generation of lower-jitter Pulse waveforms, support for analog and digital modulation types, sweep and burst functions, a harmonics generator function, a high precision frequency counter, standard interface compatibility (e.g., universal serial bus (USB) Host, USB device, local area network (LAN), etc.), a display, channel duplication functionality, and/or remote control operability. In one embodiment, the radar system (e.g., the CW radar system) uses a SIGLENT SDG-1025 signal generator. In one embodiment, the radar system (e.g., the CW radar system) uses a RIGOL DG-1022 signal generator. In another embodiment, the radar system (e.g., the CW radar system) uses a SIGLENT SDG-1032X signal generator. In another embodiment, the radar system (e.g., the CW radar system) uses a waveform signal generator. In another embodiment, the radar system (e.g., CW radar system) uses a PC computer controlled Digital-to-Analog Converter on a PCIe bus mounted card capable of generating two or more simultaneous signals which are operable to be simple tones (e.g., differential or single-ended) or complex time-frequency dependent waveforms. The normal operating condition is to generate a single tone per board output as this maximizes transmitted power.

In one embodiment, the radar system (e.g., the CW radar system) transmits a signal from the Tx antenna(s) by using a transmitter computer to create a digital, differential sinewave signal, which is operable to be sent to a digitizer board. A low voltage (+/−1V) sinewave is produced and is then used as an input into a sound stereo amplifier. In one embodiment, the sound power amplifier is operable to amplify the low voltage signal, thereby producing an output signal with power between approximately 3500 watts (W) and approximately 5000 W, and is further operable to produce an output signal with amplitude between approximately +/−20 V and approximately +/−600 V. The voltage (power output) limitations of the Tx signals is restricted by the properties of the wires within the Tx antennas. In one embodiment, the Tx antenna uses larger gauge wires and is operable to produce voltages in excess of 600V. In another embodiment, the Tx antenna produces signals between approximately 5-20V.

In one embodiment, the output from the transmitter computer is a differential output (i.e., two signals) that are 180 degrees out of phase from one another. Together, these two signals make up a sinusoidal wave. The computer outputs are sent to the power amplifier where the computer outputs are amplified in a balanced fashion such that the outputs from the power amplifier channels are still equal magnitude and opposite phase.

In another embodiment, the computer generates single-ended low-voltage sinewaves (tones). The tones are different for each output channel. The low-voltage signals are sent to a multi-channel power amplifier which amplifies the signal that is then transmitted to the vicinity of the transmit antennas using coaxial cables. Near the transmitter antenna, the single-ended, unbalanced signal is converted into a balanced signal using a BALUN which then drives the antenna.

The returning signal from the Rx antenna(s) is also a differential signal. The return signal is sent from the radar system's (e.g., the CW radar system's) sensor head up through a data cable to a dinghy. The dinghy contains a global positioning system (GPS) that sends a GPS position through the data cable, along with all the differential signals from each Rx antenna, back to a towing vessel. The incoming signals to the towing vessel are received by at least one impedance matching board that matches the Rx antenna impedance to that of the amplifier boards, which then pass the signal to the receiving computer's digitizer board after amplification. In one embodiment, the impedance is fine-tuned for the radar system (e.g., the CW radar system) setup instead of having a set resistor value. In one embodiment, the impedance matching does not drift and does not need to be readjusted once it is matched. The incoming analog signal from the Rx antenna(s) is digitized in order to be used by the radar system (e.g., the CW radar system)'s source code. In one embodiment, the GPS device used on the dinghy and the towing vessel are differential GPS devices.

FIG. 8 illustrates object detection ranges for a radar system (e.g., a CW radar system) according to one embodiment of the present invention. The dot at the center represents the radar system (e.g., the CW radar system). A combination of constructive and/or destructive alternating bands indicate which zone the object/target is located in based on the object/target's distance from the Tx/Rx antenna system. In one embodiment, the signal received by the outer channel ($Rx_1$ channel) is used to analyze the signal received by the inner channel ($Rx_2$ channel) to determine an upward rise in signal strength (constructive) and/or a downward drop in signal strength (destructive) as the radar system (e.g., the CW radar system) is towed/pulled over the object/target. In order to compare the $Rx_1$ and $Rx_2$ channels, the signals are normalized using a previously selected time interval of data collected in the absence of an object/target, which is then subtracted from the current signal data. If no objects/targets were located or present, both channels would equate to zero.

In one embodiment, the radar system (e.g., the CW radar system) of the present invention uses three principal time domain signals in order to locate objects/targets: signals in the forward Rx antenna, signals in the aft Rx antenna, and the signal difference between the forward and aft Rx antennas. These three signals are then analyzed with respect to energy, power, standard deviation, and phase. All signals are coming from the variation of signals in the time domain.

By using multiple frequencies, the radar system (e.g., the CW radar system) of the present invention is able to not only detect and locate objects and/or targets, but classify them as well. This is performed using the relative signal strength and phase between signals of different frequencies, enabling the radar system (e.g., the CW radar system) to distinguish between materials including, but not limited to, all ferrous and non-ferrous metals (e.g., gold and/or silver objects). Signals of any frequency are operable to be used to detect all metal objects, but the spectral response or relationship between the frequencies determines the type of metal the object is made of. If an object(s) is made from multiple metal types, the return signal of the radar system (e.g., the CW radar system) is a pattern that indicates the individual metals associated with an object and/or target. Because different metals have different conductivities, they will reflect each frequency differently. The signal response from an object and/or target also depends on if the object and/or target is located in a constructive or destructive interference zone. The location and width of the constructive and destructive zone is different for each frequency. Therefore, the radar system (e.g., the CW radar system) is operable to detect and classify objects and/or targets using the spectroscopy response of objects and/or targets using multiple frequencies.

In another embodiment, using three frequencies, the radar system (e.g., the CW radar system) uses the center frequency to baseline the signal response of the target object. This embodiment effectively removes the impact of the size of the object on the return strength. The change in the signal strength between the center frequency and the upper and lower frequencies when taken independently and then compared indicate the conductivity of the material causing the return signal.

In another embodiment, using 3D imaging (discussed infra), the radar system (e.g., the CW radar system), first determines a precise location of the object in three dimensions either in an absolute or a relative coordinate system. Next, the return of each survey line is adjusted for the range affects (e.g., frequency dependent attenuation) between the radar system and the object and also for the size effects on the return (e.g., Rayleigh region radar cross section correction of the return).

Figure 9:
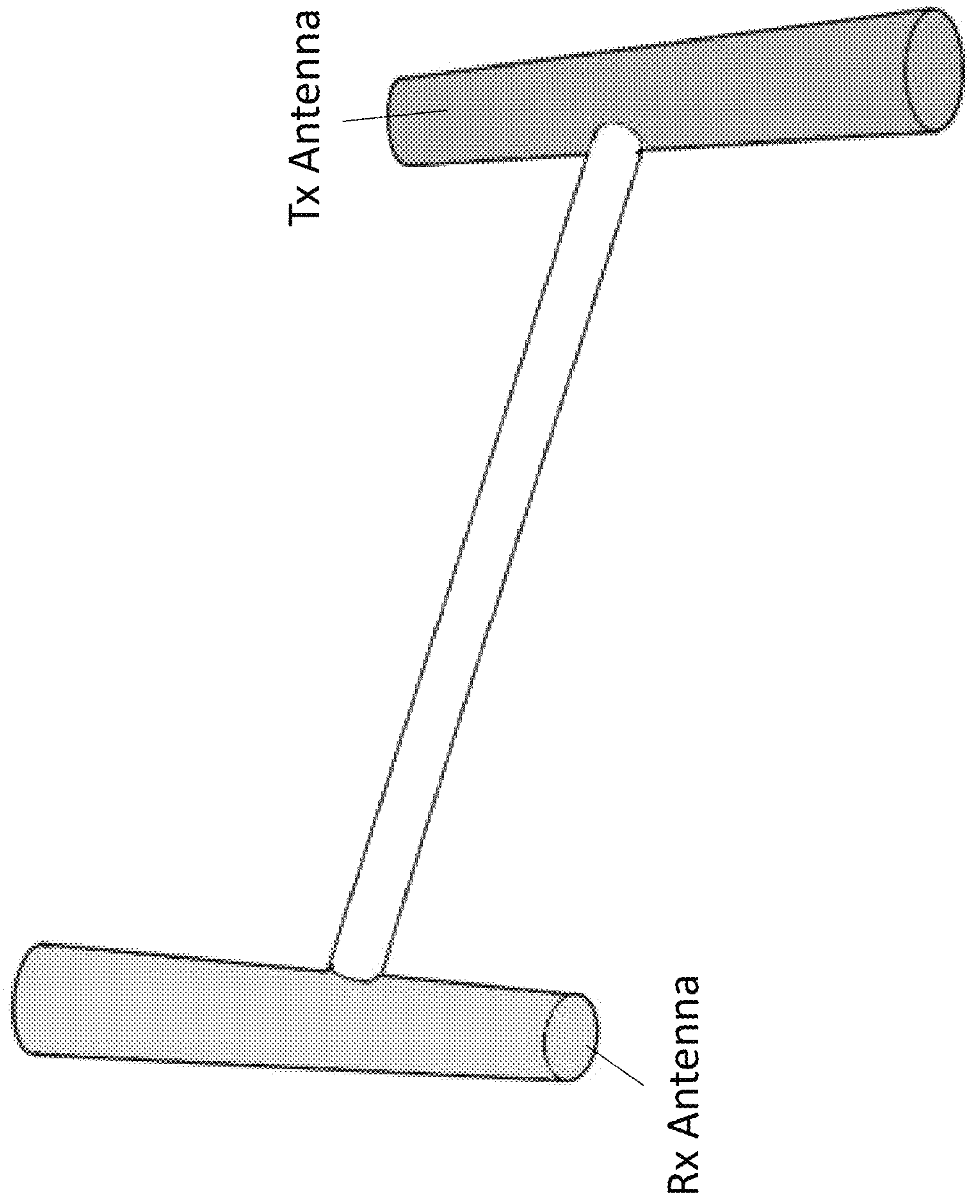
FIG. 9 illustrates a precision detector for a radar system (e.g., a CW radar system) according to one embodiment of the present invention.
Figure 10:
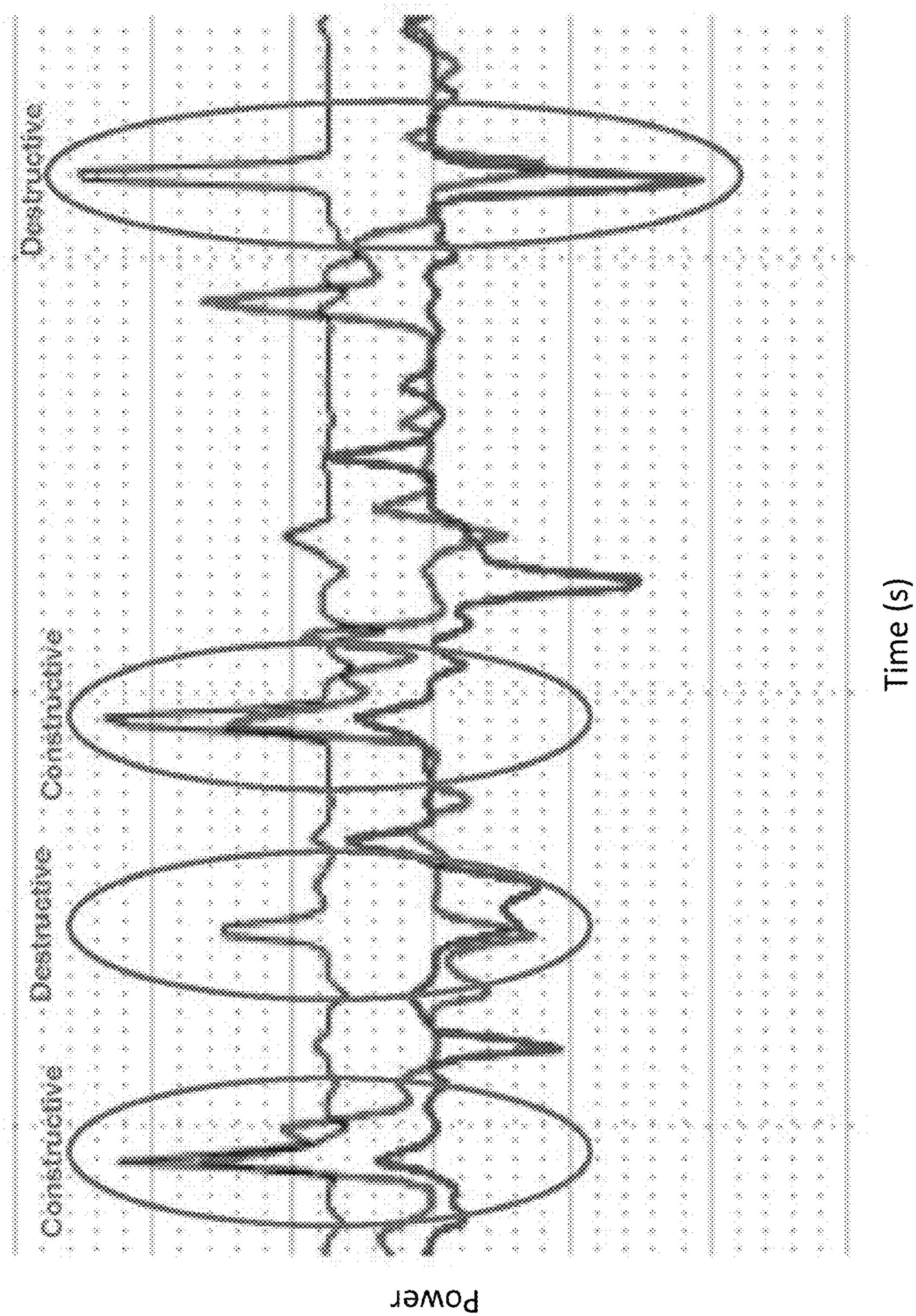
FIG. 10 illustrates a graph indicating constructive and destructive zones associated with locating an object in a saltwater environment according to one embodiment of the present invention.

FIG. 9 illustrates a precision detector for a radar system (e.g., a CW radar system) according to one embodiment of the present invention. The radar system (e.g., the CW radar system) is capable of using a single Tx antenna and a single Rx antenna to precisely locate objects and/or targets. The single Tx antenna and the single Rx antenna are connected to one another via a non-conducting pipe/rigid structure. When the radar system (e.g., the CW radar system) is stationary, this antenna setup is operable to locate and detect objects and/or targets. In a stationary state, power and frequency will vary across the radar system (e.g., the CW radar system) while data is being collected. Moreover, by using a single Tx antenna and a single Rx antenna when the radar system (e.g., the CW radar system) is stationary, the radar system (e.g., the CW radar system) is operable to pinpoint an object and/or target and determine the object's and/or target's precise depth. In one embodiment, the single Tx antenna and single Rx antenna are the same antennas already incorporated within the radar system (e.g., the CW radar system). In another embodiment, the single Tx and single Rx antenna setup is a separate, detachable antenna setup from the main body of the radar system (e.g., the CW radar system).

The constructive and destructive zones for the radar system (e.g., the CW radar system) of the present invention are determined using the distance from the radar system (e.g., the CW radar system) to an object/and or target and the return path of the Tx signal to the Rx antennas. This distance represents the total distance associated with a signal from its transmission from the Tx antenna, to its reception by the Rx antenna(s). This distance accounts for frequencies in use by the radar system (e.g., the CW radar system) as well.

FIG. 8 illustrates a graph indicating constructive and destructive signals associated with locating an object in a saltwater environment according to one embodiment of the present invention. When an object and/or target is detected by the radar system (e.g., the CW radar system) in a constructive zone, an increase in signal strength is detected as the radar system (e.g., the CW radar system) approaches the object and/or target, and a decrease in signal strength is detected as the radar system (e.g., the CW radar system) moves away from the object and/or target. When an object and/or target is detected by the radar system (e.g., the CW radar system) in a destructive zone, a decrease in signal strength is detected as the radar system (e.g., the CW radar system) approaches the object and/or target, and an increase in signal strength is detected as the radar system (e.g., the CW radar system) moves away from the object and/or target.

In one embodiment, this appears on a graph as a double-hump shape, indicating that all Rx antennas detected the object and/or target.

Figure 11A:
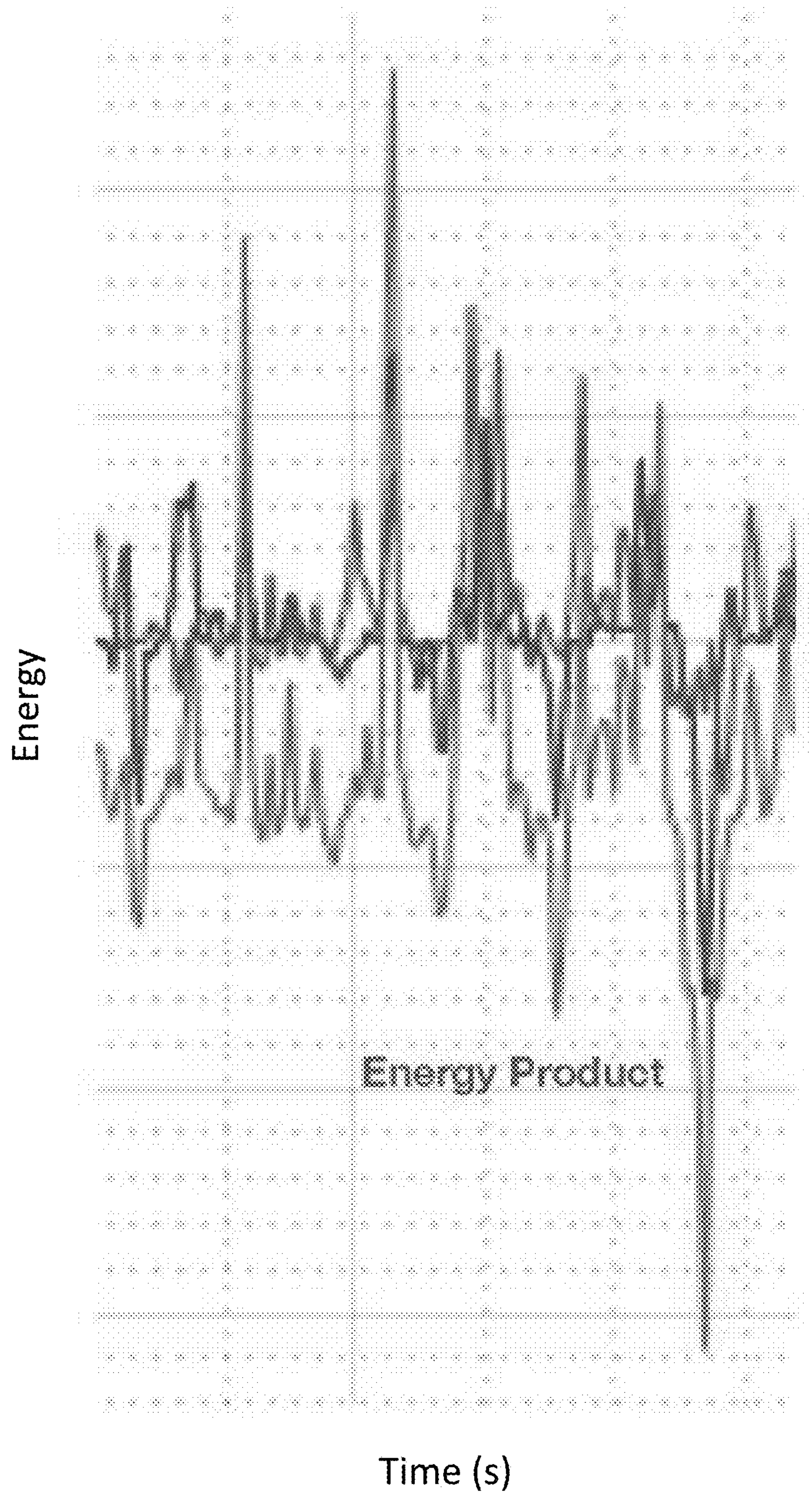
FIG. 11A illustrates a graph indicating the energy product for a radar system (e.g., a CW radar system) according to one embodiment of the present invention.

FIG. 11A illustrates a graph indicating constructive and destructive zones over time created by the signals collected using the sensor head, a tow vessel, and a dinghy associated with locating an object in a saltwater environment according to one embodiment of the present invention. The movement of the sensor head associated with a towing by the vessel system determines when and where signals are transmitted and received by the corresponding Tx and Rx antennas. The radar system (e.g., the CW radar system) must monitor its output power product and the change in received power at the fore and aft receiver antennas to determine whether the power product result is constructive, destructive, or clutter.

Figure 11B:
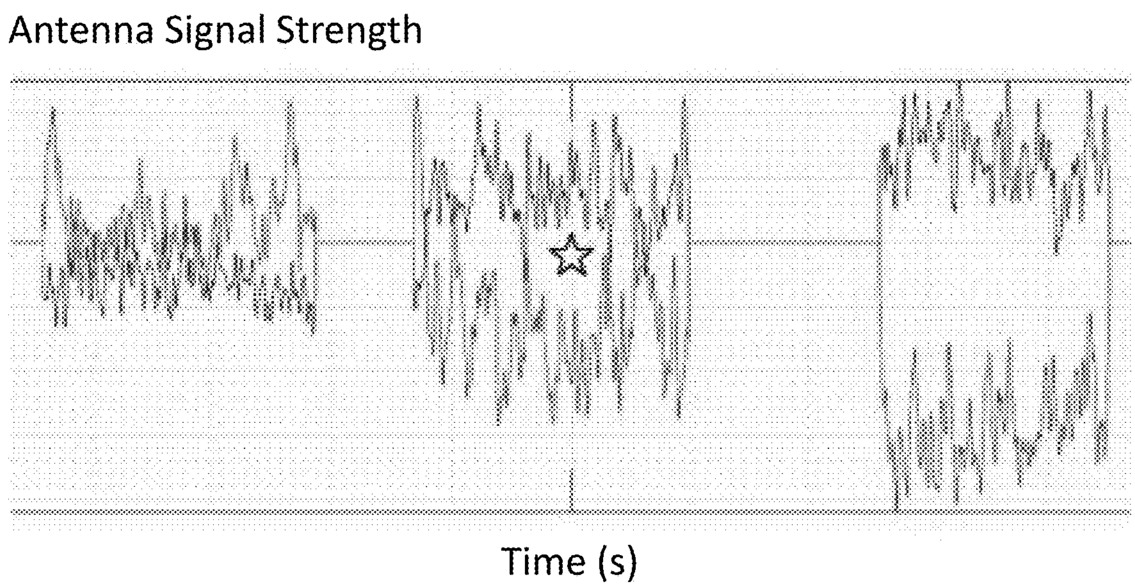
FIG. 11B illustrates a graph indicating antenna signal strength associated with constructive and destructive zones of a radar system (e.g., a CW radar system) according to one embodiment of the present invention.

FIG. 11B illustrates a graph indicating the energy product for a radar system (e.g., a CW radar system) according to one embodiment of the present invention.

Figure 11C:
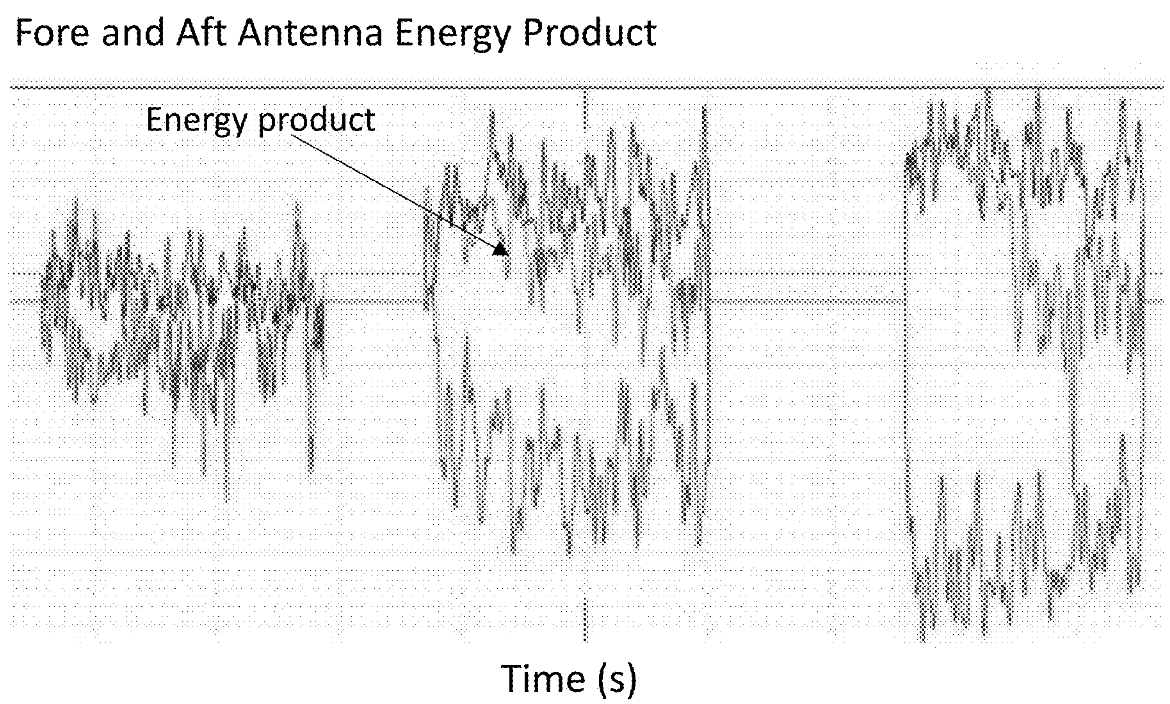
FIG. 11C illustrates a graph indicating a fore and aft antenna energy product associated with constructive and destructive zones of a radar system (e.g., a CW radar system) according to one embodiment of the present invention.

FIG. 11C illustrates a graph indicating antenna signal strength associated with constructive and destructive zones of a radar system (e.g., a CW radar system) according to one embodiment of the present invention.

In one embodiment, a towing vessel attaches a tow line and/or tow cable to a dinghy, wherein the dinghy is attached, via a second tow line and/or tow cable, to the sensor head of the radar system (e.g., the CW radar system) of the present invention. In one embodiment, the radar system (e.g., the CW radar system) includes a tow line and/or tow cable for connecting the towing vessel to the dinghy and a tow line and/or tow cable for connecting the dinghy to the radar system (e.g., the CW radar system) as well as a data tow line and/or data tow cable connecting the towing vessel to the dinghy and a data tow line and/or data tow cable connecting the dinghy to the radar system (e.g., the CW radar system). In one embodiment, the dinghy includes a global positioning system (GPS) receiver. Because the radar system (e.g., the CW radar system) is located underwater, the GPS receiver must be placed on the attached dinghy and not the radar system (e.g., the CW radar system). An initial calibration of the radar system (e.g., the CW radar system) components is performed and a baseline for object and/or target geolocation data is established. In one embodiment, the baseline signal for a constructive zone is louder and the signal is elevated. In one embodiment, the negative energy in a destructive zone is quieter. The towing vessel travels in a line over a target survey area at an optimum speed. The radar system (e.g., the CW radar system) is operable at speeds between approximately 0 to >30 kts. In one embodiment, the optimum speed of the towing vessel is between approximately 3 kts to 8 kts to reduce vibrational noise interference. Once the towing vessel, the dinghy, and the radar system (e.g., the CW radar system) have traveled over the target survey area, the towing vessel turns approximately 90° and specifies a new line of travel over the target survey area. In one embodiment, the towing vessel turns clockwise. In another embodiment, the towing vessel turns counterclockwise. This new line is covered by the towing vessel, the dinghy, and the radar system (e.g., the CW radar system). In one embodiment, the radar system (e.g., the CW radar system) is operable to send and receive signals within a range of approximately 30-100 m from each side of the radar system (e.g., the CW radar system) when traveling in a line, resulting in a total swath width of approximately 60-200 m in one pass. In another embodiment, the radar system (e.g., the CW radar system) is operable to send and receive signals within a range of 200 m from either side of the radar system (e.g., the CW radar system) when traveling in a line, resulting in a total swath width of 400 m per pass. In one embodiment, the lines of travel taken by the towing vessel, the dinghy, and the radar system (e.g., the CW radar system) over the target survey area are approximately 100 m apart from each other.

In one embodiment, the towing vessel, the dinghy, and the radar system (e.g., the CW radar system) traverse the same part of the target survey area multiple times in order to more accurately identify the size, structure, shape, and composition of the object and/or target. This process is repeated in a set pattern until the target survey area has been completely mapped by the towing vessel, the dinghy, and/or the radar system (e.g., the CW radar system). By travelling over the target survey area in a designated pattern using the towing vessel, the dinghy, and the radar system (e.g., the CW radar system), the radar system (e.g., the CW radar system) collects data that are operable to be associated with the geolocation of underwater ferrous and/or non-ferrous objects. This is because when the radar system (e.g., the CW radar system) travels over an object and/or target, a change in signal strength is detected followed by a change in signal strength in the opposite direction as the towing vessel, the dinghy, and the radar system (e.g., the CW radar system) moves away from a detected object and/or target. When the data has been processed, the radar system (e.g., the CW radar system) returns Gaussian-like curves in the area where an object and/or target has been located, indicating detection from the front and rear antennas of the radar system (e.g., the CW radar system). In one embodiment, the radar system (e.g., the CW radar system) returns lines and/or scatter trails indicating an object and/or target. The radar system (e.g., the CW radar system) passes over an area multiple times in order to generate tighter lines around the object and/or target. In one embodiment, the radar system (e.g., the CW radar system) is connected directly to the towing vessel via a single tow line, without the use of a connecting dinghy.

In one embodiment, the radar system (e.g., the CW radar system) detects changes in signal strength the first time it passes over an object and/or target. The radar system (e.g., the CW radar system) then passes over the same area again and varies the power level of the signal in order to collect more data on the object and/or target. A lower power signal provides more detail and higher fidelity images of the object and/or target. In one embodiment, the power level of the signal depends on the pattern used to survey the area. In one embodiment, the radar system (e.g., the CW radar system) makes tighter passes over the same part of the target survey area in order to detect more information about an object and/or target in that part of the target survey area. In one embodiment, the pattern that the radar system (e.g., the CW radar system) takes over the target area and the power variations in the signal are set before the radar system (e.g., the CW radar system) begins traversing the target area in order to capture full detail of the target area. In another embodiment, the pattern that the radar system (e.g., the CW radar system) takes over the target area and the power variations in the signal are dependent on the readings of the Rx antenna. When the radar system (e.g., the CW radar system) detects changes in signal strength the first time it passes over an object and/or target, it modifies the subsequent path and signal transmission in order to obtain further information about the detected object and/or target. In one embodiment, the power level of the signal used to identify the object and/or target is controlled by the gain of the Rx amplifier board. In another embodiment, the power level of the signal used to identify the object and/or target is controlled by the Tx antennas. In yet another embodiment, the power level of the signal used to identify the object and/or target is controlled by both the Tx and the Rx antennas. In one embodiment, the radar system (e.g., the CW radar system) is operable to identify the size, structure, and shape of an object and/or target with multiple radar readings. For example, the radar system (e.g., the CW radar system) is operable to identify ribs on a barge and brass shells in an underwater environment.

In one embodiment, the radar system (e.g., the CW radar system) includes at least two Tx antennas, at least two Rx antennas forward of the Tx antennas, and at least two Rx antennas aft of the Tx antennas transmitting at least two different frequencies and is used to create three-dimensional maps of the ocean floor sub-surface. In one embodiment, the three-dimensional maps of the ocean floor sub-surface are to a depth under the ocean floor of at least 15 m (49.2 ft). The radar system is towed across the survey area in a structured pattern at least four times and as many as 20 or more. The surveys are combined to create three-dimensional maps of the metallic objects in the survey area buried under the ocean floor.

Figure 12A:
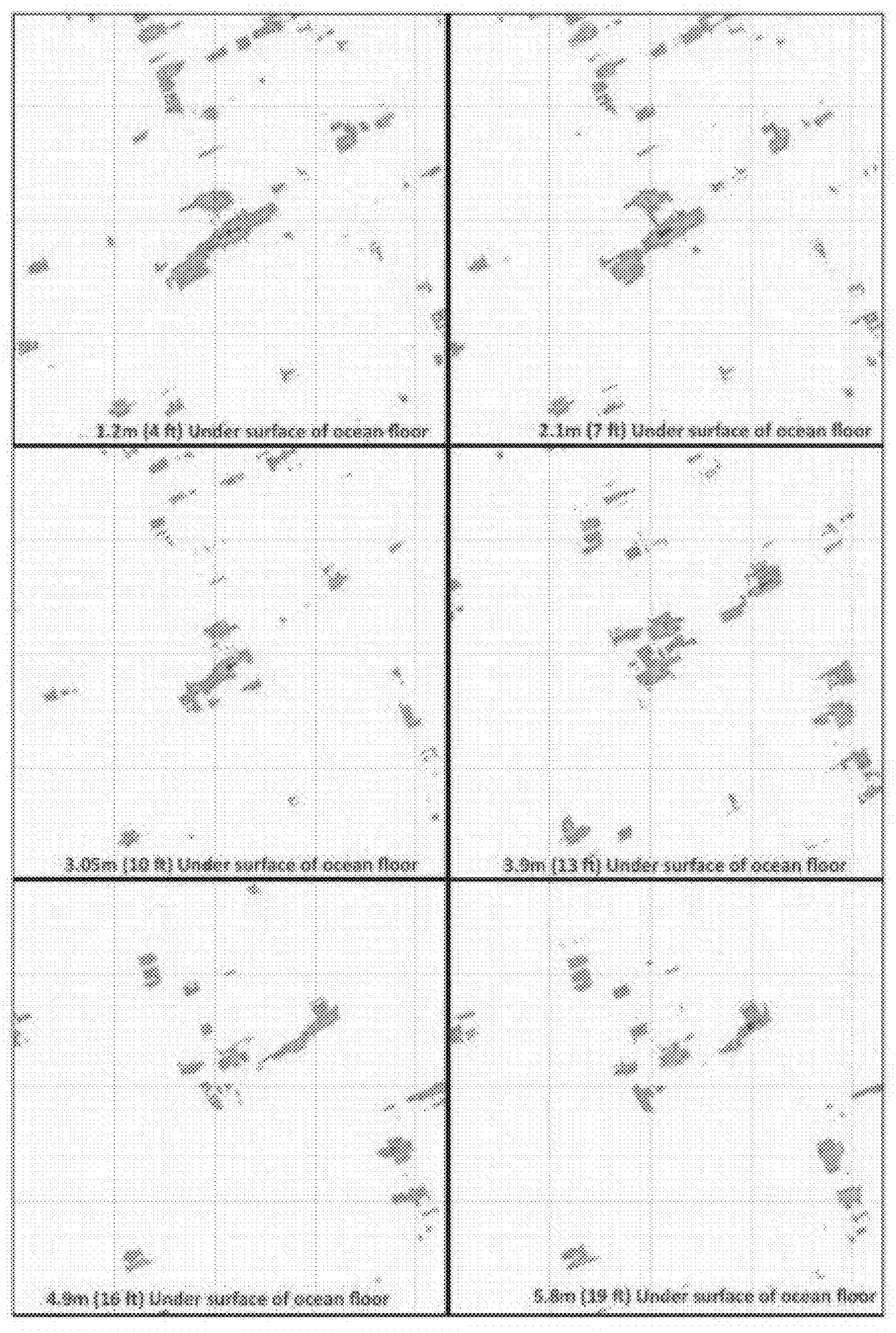
FIG. 12A illustrates a three-dimensional (3D) underwater depth map indicating numerous objects detected by a radar system at multiple depths below the ocean floor (e.g., a CW radar system) according to one embodiment of the present invention.

FIG. 12A illustrates a three-dimensional (3D) map shown as two-dimensional slices in the ocean floor at different depths.

Figure 12B:
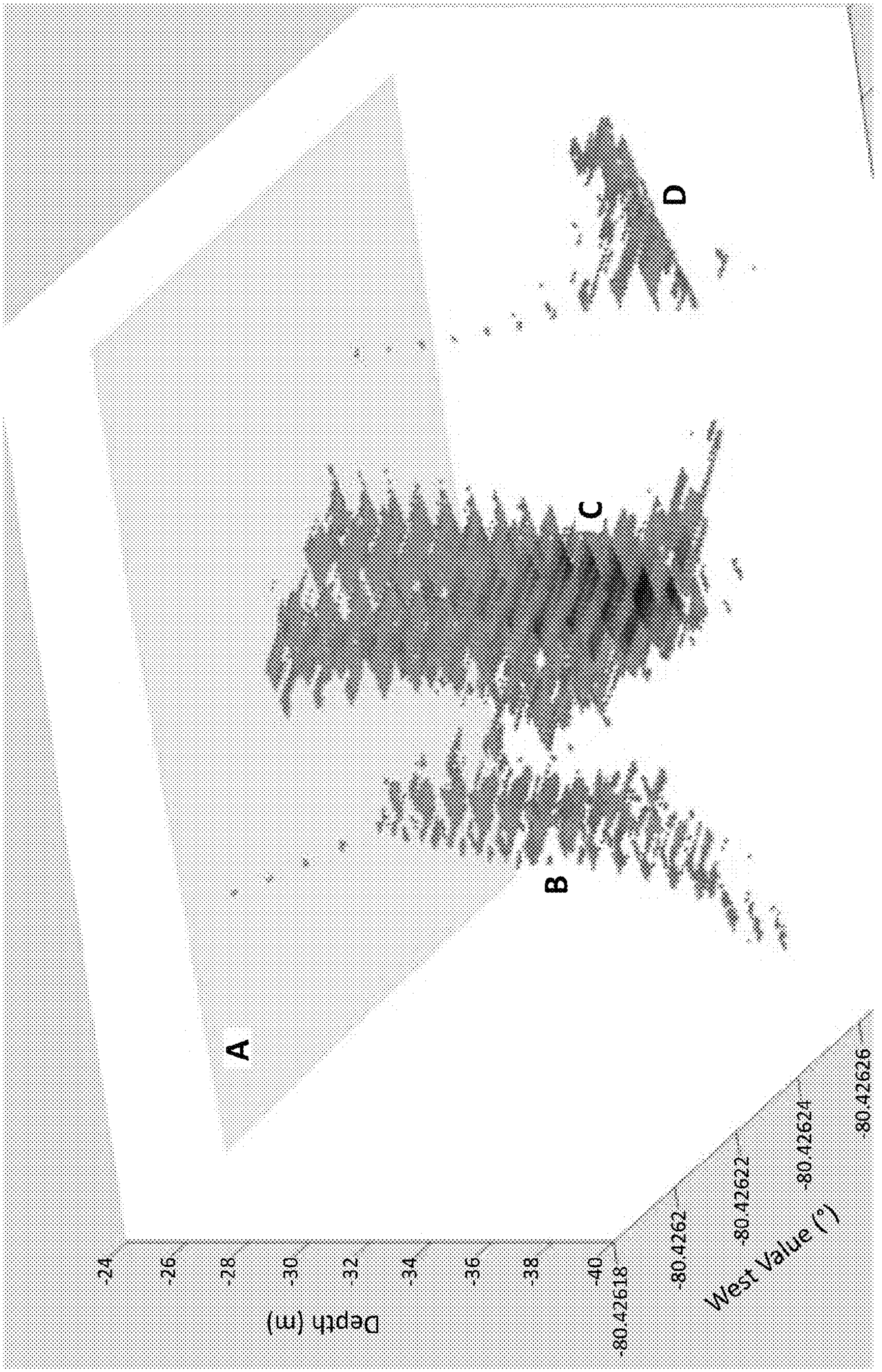
FIG. 12B illustrates a 3D underwater depth map indicating multiple objects detected by a radar system (e.g., a CW radar system) according to one embodiment of the present invention.

FIG. 12B illustrates a 3D map indicating multiple detected objects of various sizes at various depths by a radar system (e.g., a CW radar system) according to one embodiment of the present invention. Label "A" in FIG. 12B indicates the ocean floor. Label "B" in FIG. 12B indicates a small slender vertically oriented target roughly 1.22 to 1.83 m (4 to 6 feet) in length. Label "C" in FIG. 12B indicates a large object roughly 1.83 m (6 feet) tall and 0.91 to 1.22 m (3 to 4 feet) wide at the widest points. The object is buried with the top approximately 6 feet down. Label "D" in FIG. 12B indicates a small object roughly 3.66 m (12 feet) below the surface of the ocean floor.

Figure 13A:
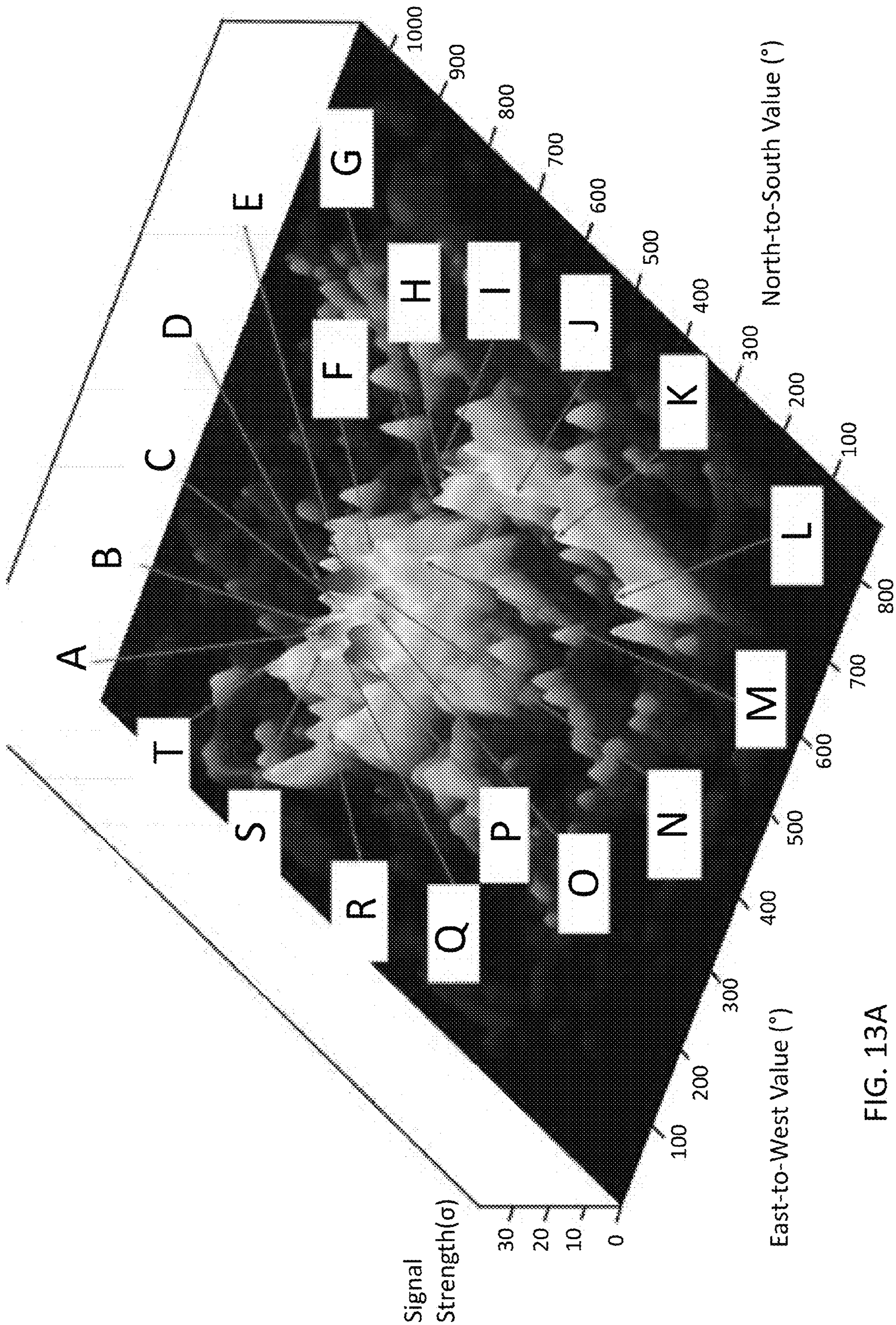
FIG. 13A illustrates a 3D underwater heat map indicating the location of objects according to one embodiment of the present invention.

FIG. 13A illustrates a 3D underwater heat map indicating the location of objects according to one embodiment of the present invention. Once a survey for a target area is performed using the radar system (e.g., the CW radar system) of the present invention, the collected data is operable for display via mapping software. In one embodiment, the collected data indicates information including, but not limited to, an object and/or target signal strength, a geolocation for an object and/or target, a north value, a west value, an east value, and/or a south value. In one embodiment, the geolocation for an object and/or target is a set of coordinate points.

FIG. 13B lists all the labels in FIG. 13A representing different geographic locations for detected objects according to one embodiment of the present invention.

Figure 14:
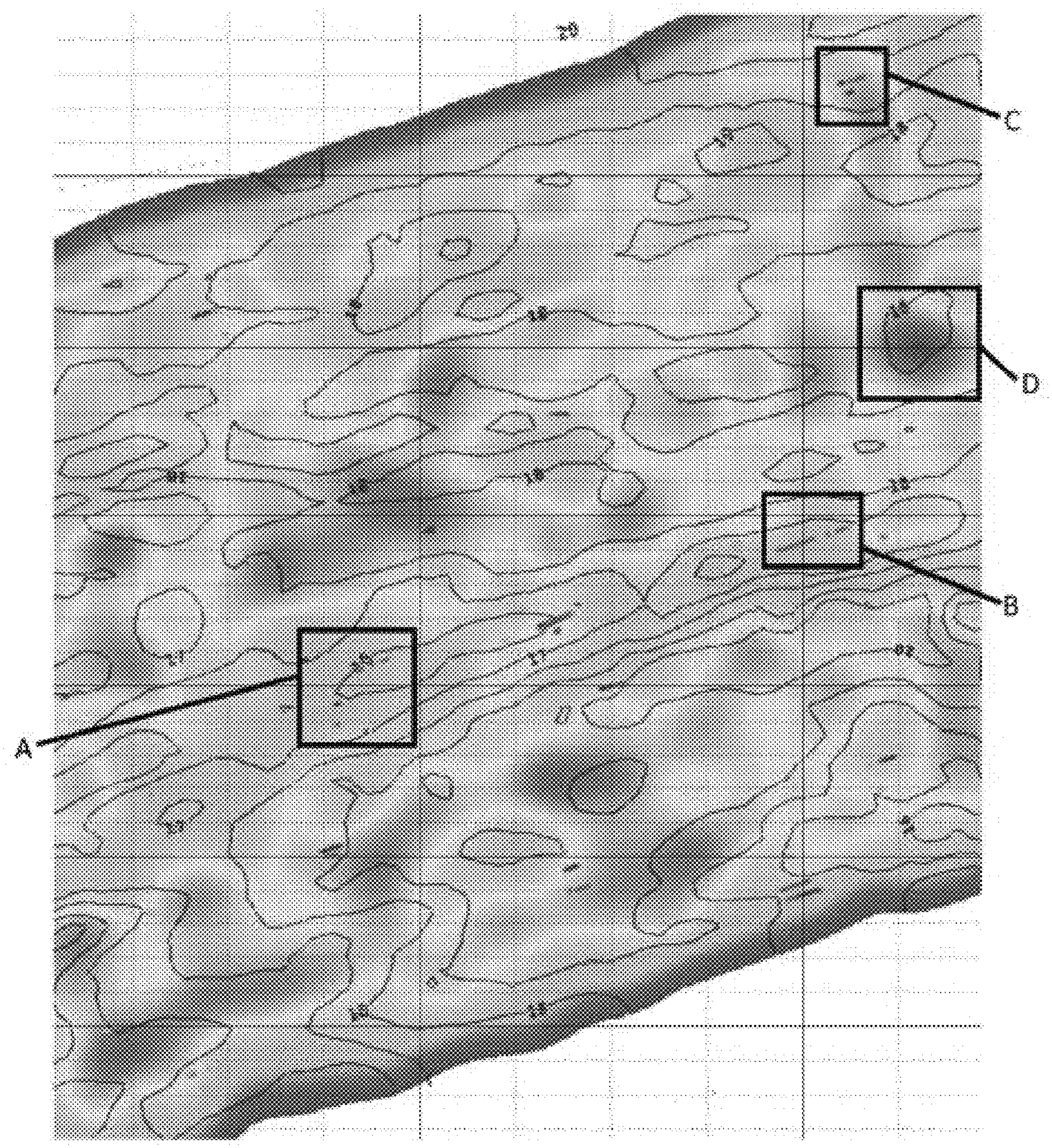
FIG. 14 illustrates a two-dimensional (2D) underwater heat map indicating location coordinates for a detected object according to one embodiment of the present invention.

FIG. 14 illustrates a two-dimensional (2D) heat map indicating the radar signal strength returned from the area providing an estimated location coordinates for a detected object according to one embodiment of the present invention. This underwater heat map indicates a sampling region for the radar system (e.g., the CW radar system). The 2D underwater depth map is shown from a South-to-North and West-to-East perspective. FIG. 14 is a fused product showing magnetometer data and ocean floor topography collected using SONAR. Area "A" labeled in FIG. 14 indicates numerous magnetometer detections with little or no radar returns. This indicates that the material is ferrous and ancient, having very poor conductivity, but strong magnetic properties. Iron canon from the early 1700s is known to be in this vicinity. Area "B" in FIG. 14 illustrates two large magnetometer detections with little or no radar returns (e.g., similar to area "A"). Area "C" in FIG. 14 illustrates a magnetometer detection likely of a single object of relatively small mass. Radar returns in the vicinity indicate the object is likely a modern iron object or steel. Area "D" in FIG. 14 illustrates the strongest radar return in the area with no indication of magnetometer detection, indicating non-ferrous metal in this vicinity.

Figure 15A:
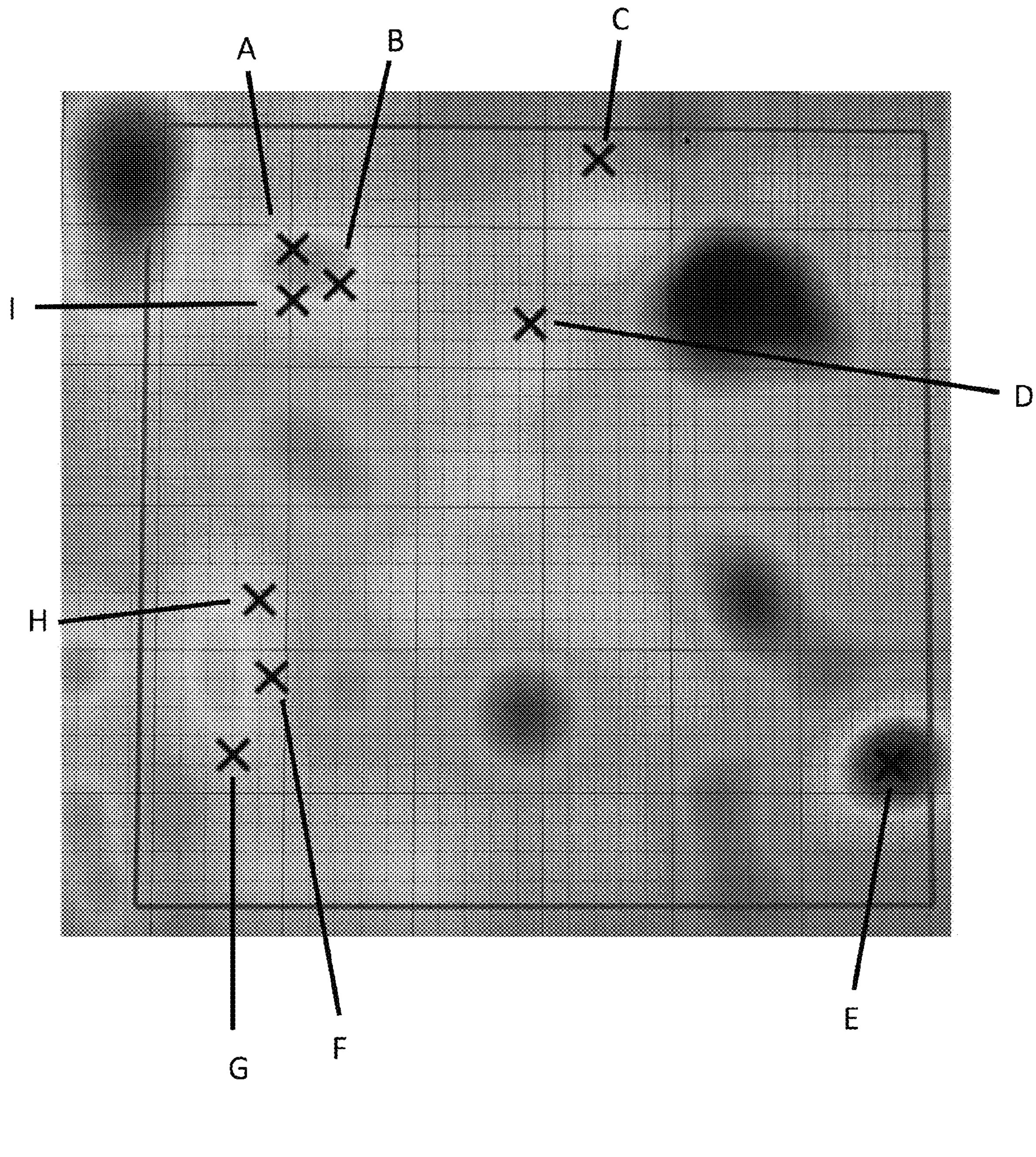
FIG. 15A illustrates a 2D underwater depth map indication location coordinates for detected objects according to another embodiment of the present invention.

FIG. 15A illustrates a 2D underwater heat map indication location coordinates for detected objects according to another embodiment of the present invention.

FIG. 15B lists all the labels in FIG. 15A representing different geographic locations for detected objects according to one embodiment of the present invention.

Figure 16A:
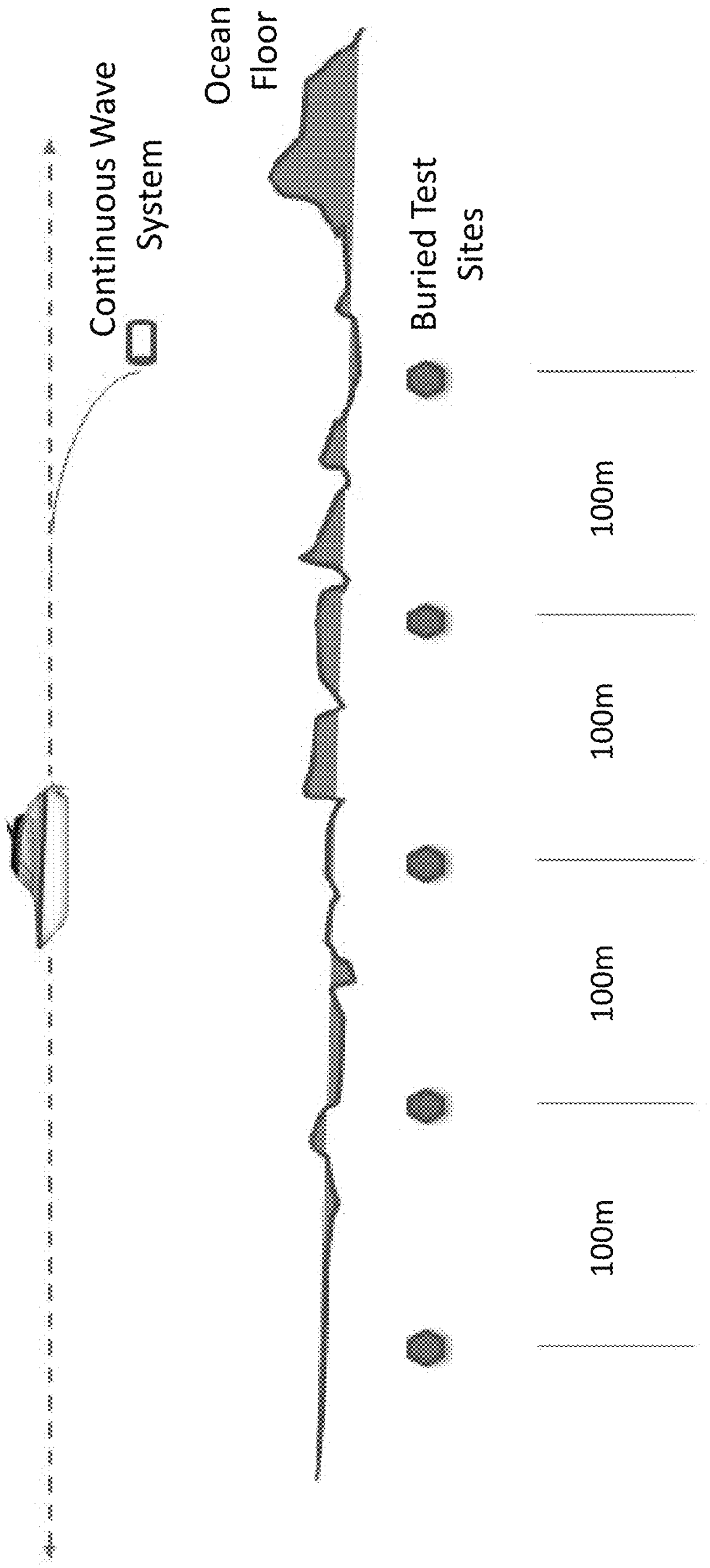
FIG. 16A illustrates a surveying operation with a radar system (e.g., a CW radar system) according to one embodiment of the present invention.

FIG. 16A illustrates a surveying operation with a radar system (e.g., a CW radar system) according to one embodiment of the present invention. The radar system (e.g., the CW radar system) is connected to a towing vessel. As the radar system (e.g., the CW radar system) travels over ferrous and/or non-ferrous metal objects, the radar system (e.g., the CW radar system) is operable to identify a plurality of buried test sites.

Figure 16B:
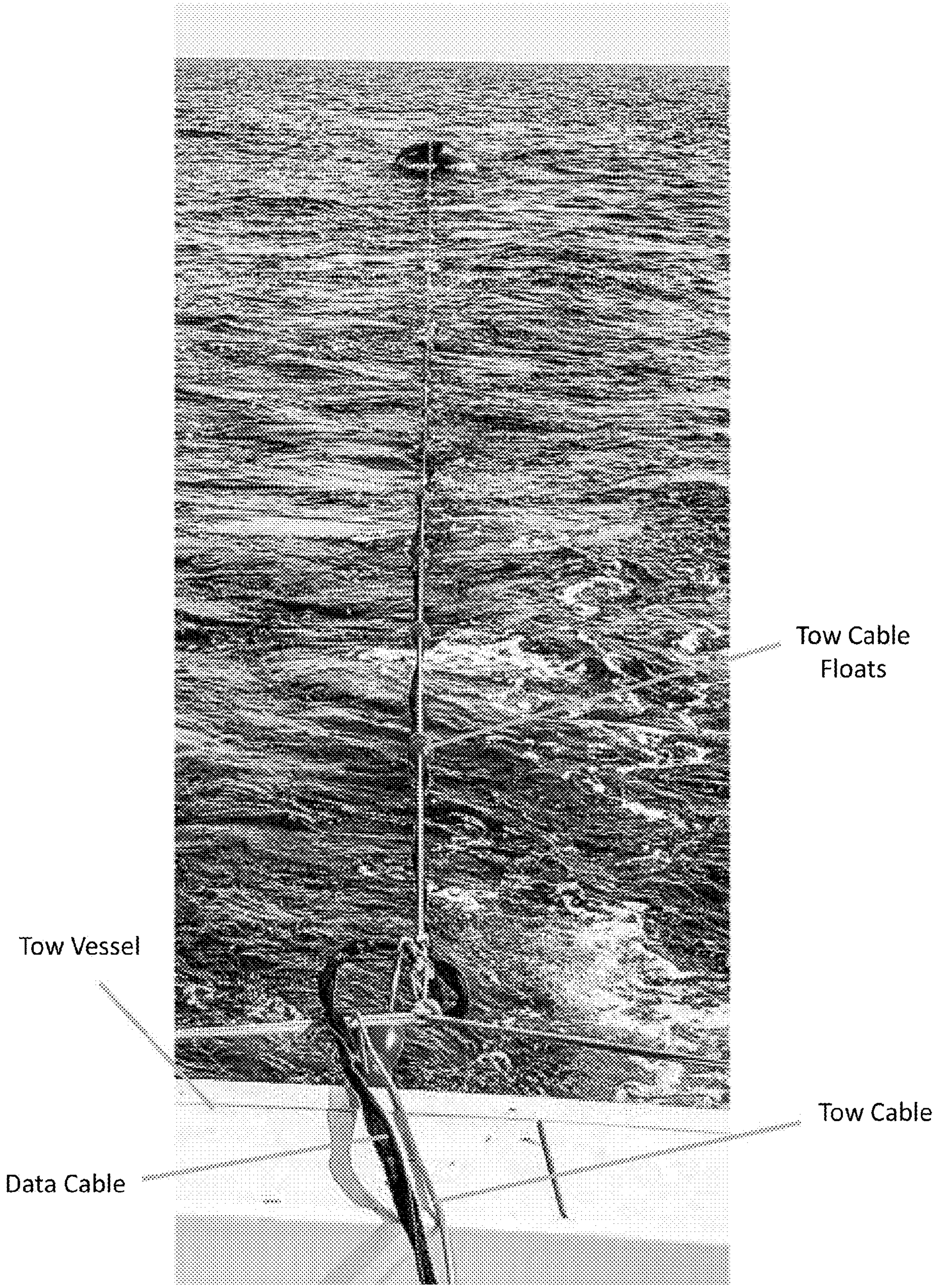
FIG. 16B illustrates a surveying operation with a radar system (e.g., a CW radar system) connected to a towing vessel according to one embodiment of the present invention.

FIG. 16B illustrates a surveying operation with a radar system (e.g., a CW radar system) connected to a towing vessel according to one embodiment of the present invention. The radar system (e.g., the CW radar system) is connected to the towing vessel via a tow cable and at least one data cable. The tow cable includes a plurality of tow cable floats, wherein the plurality of tow cable floats are operable to prevent the tow cable and the at least one data cable from sinking below the surface of the water when the towing vessel is not moving.

Figure 17A:
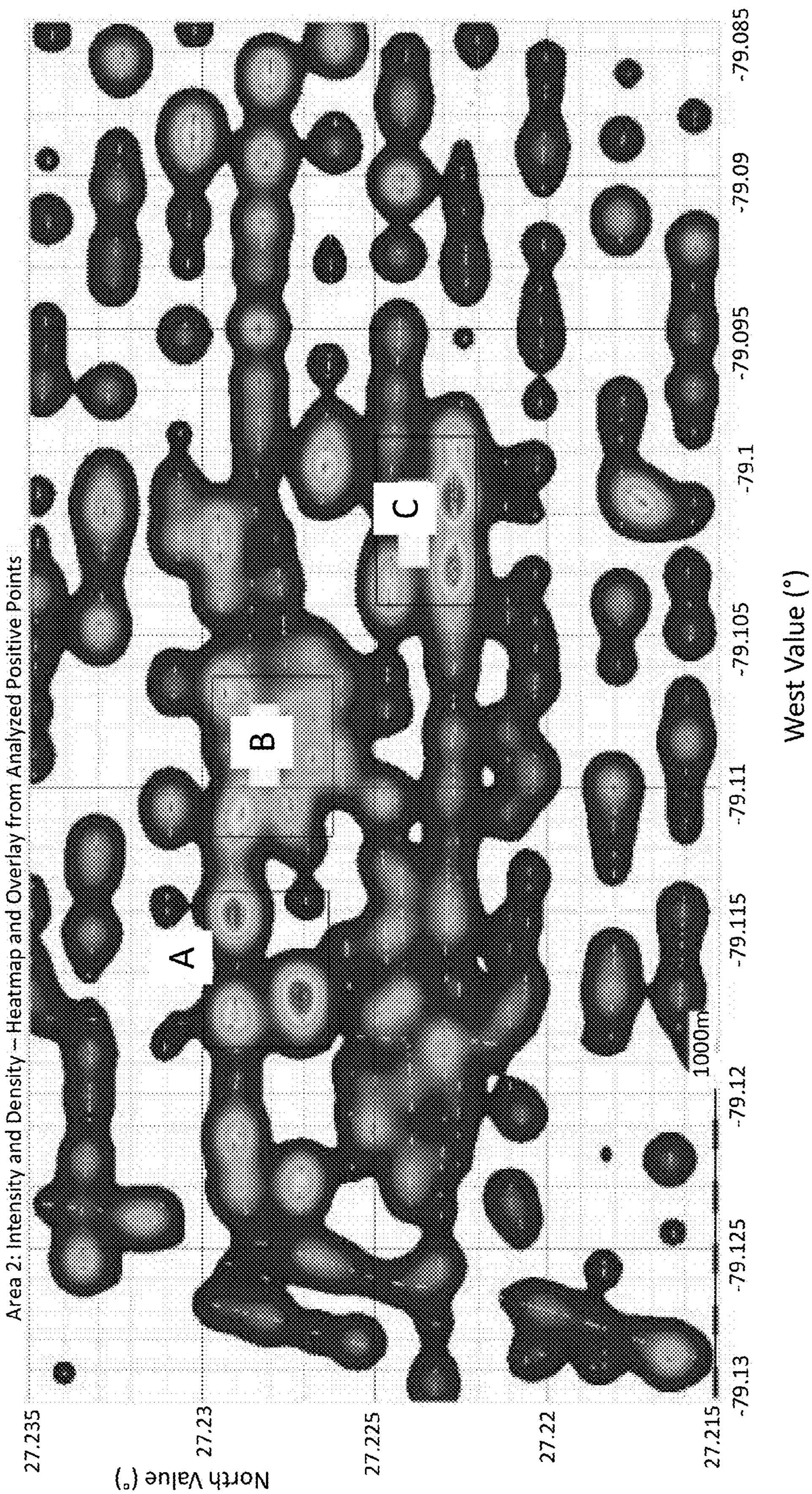
FIG. 17A illustrates a 2D underwater heatmap indicating the geolocation of detected objects according to one embodiment of the present invention.

FIG. 17A illustrates a 2D heatmap indicating the geolocation of detected objects according to one embodiment of the present invention. The 2D underwater heatmap further includes an indication of density and/or intensity. In one embodiment, the 2D underwater heatmap is overlayed with magnetometer search tracks as illustrated in FIG. 14. When overlayed with the magnetometer, the radar system (e.g., the CW radar system) is able to locate all metal objects and/or targets, while simultaneously eliminating the ferrous objects and/or targets. In one embodiment, the return phase and amplitude differences in each heat map are used to distinguish between specific metal types. In one embodiment, the identification of different metal types is done automatically and in near real-time.

FIG. 17B lists all the labels in FIG. 17A representing different priority zones on a 2D underwater heatmap for a radar system (e.g., a CW radar system) according to one embodiment of the present invention, where priority zones represent areas where at least one or more object(s) and/or target(s) were detected by the radar system (e.g., the CW radar system).

Figure 18:
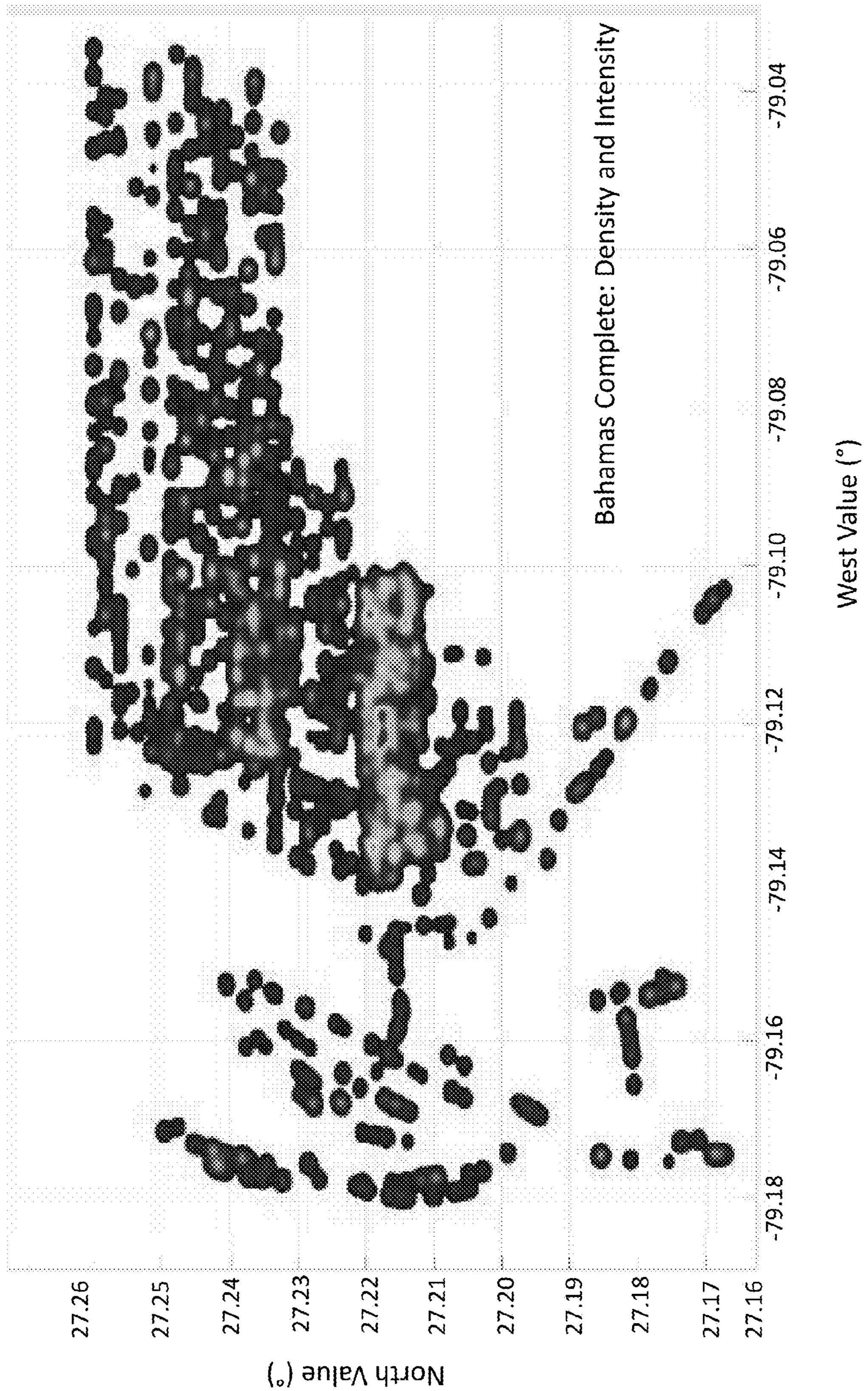
FIG. 18 illustrates a 2D underwater heatmap indicating the geolocation of detected objects according to another embodiment of the present invention.

FIG. 18 illustrates a 2D underwater depth map indicating the geolocation of detected objects according to another embodiment of the present invention.

Figure 19A:
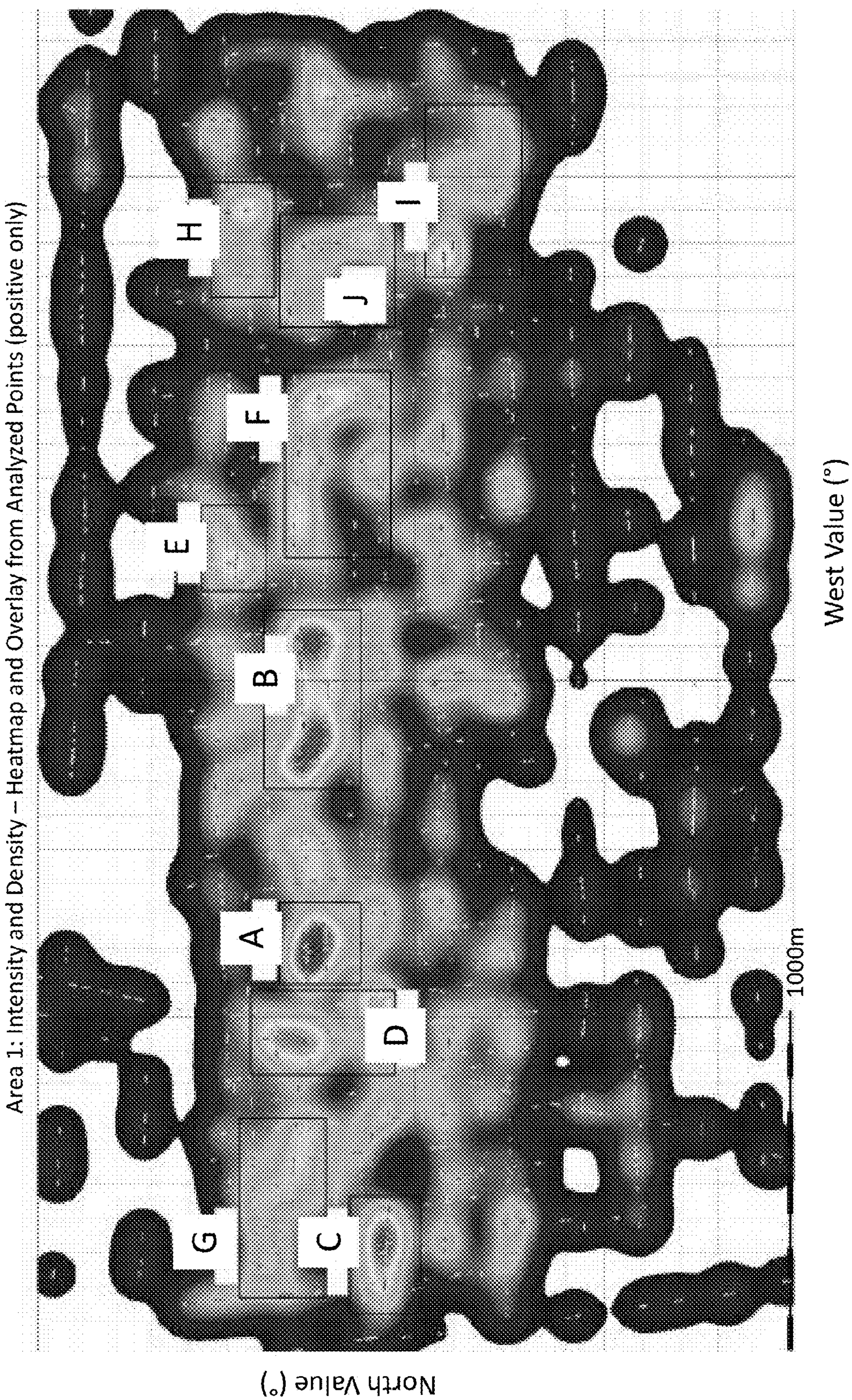
FIG. 19A illustrates a 2D underwater heatmap indicating the geolocation of detected objects according to another embodiment of the present invention.

FIG. 19A illustrates a 2D underwater heatmap indicating the geolocation of detected objects according to another embodiment of the present invention. The 2D underwater heatmap includes a plurality of priority zones, indicating analyzed areas with detected objects. In addition, the 2D underwater heatmap further includes a density and/or an intensity for each priority zone.

FIG. 19B lists all the labels in FIG. 19A representing different priority zones on a 2D underwater heatmap for a radar system (e.g., a CW radar system) according to one embodiment of the present invention.

Figure 20A:
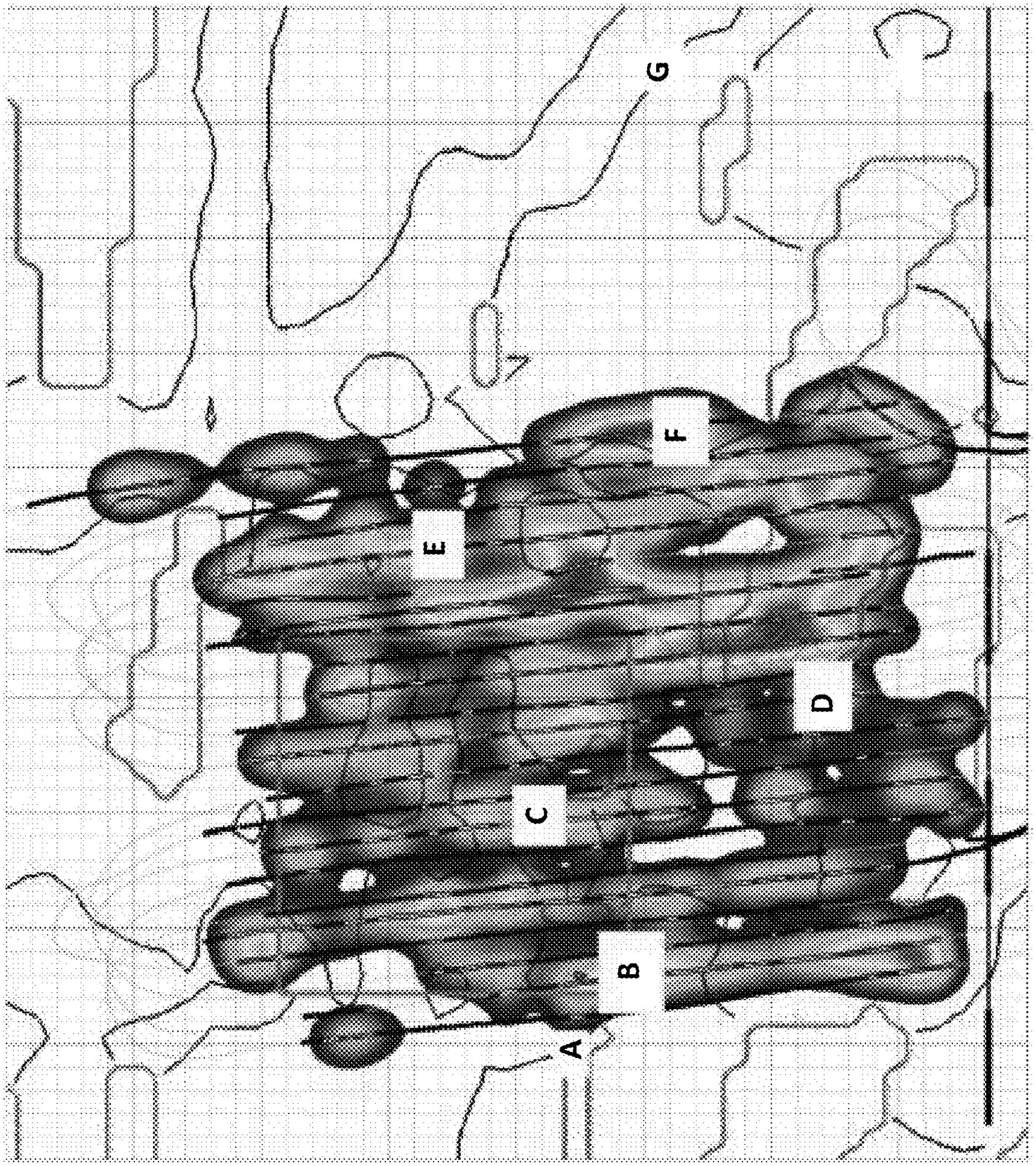
FIG. 20A illustrates a 2D underwater heatmap indicating a radar system (e.g., a CW radar system) traveling path and the geolocation of detected objects according to another embodiment of the present invention.

FIG. 20A illustrates a 2D underwater heatmap indicating a radar system (e.g., a CW radar system) traveling path and the geolocation of detected objects according to another embodiment of the present invention. The 2D underwater heatmap indicates priority zones detected by the radar systems (e.g., the CW radar systems). The 2D underwater heatmap further includes an indication of intensity and/or density for each priority zone and/or detected object and/or target.

FIG. 20B lists all the labels in FIG. 20A representing different geographic locations for detected objects according to one embodiment of the present invention.

Figure 21A:
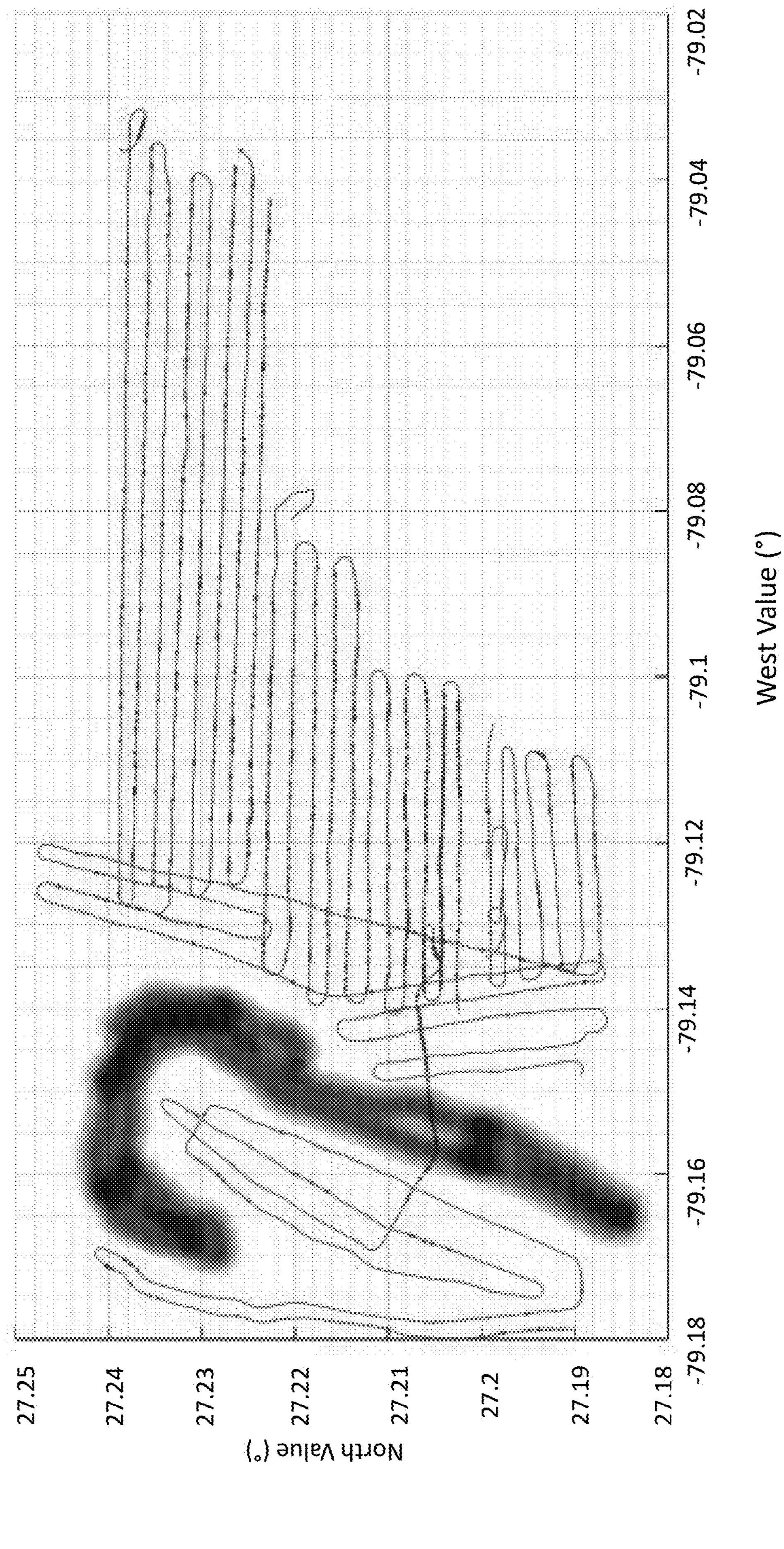
FIG. 21A illustrates a 2D graph indicating a land mass and a travel route for a radar system (e.g., a CW radar system) according to one embodiment of the present invention.

FIG. 21A illustrates a 2D graph indicating underwater reef and submerged sandbars (in dark brown) and a travel route for a radar system (e.g., a CW radar system) according to one embodiment of the present invention. At the beginning of a surveying operation, a target region is established. With the target region established, a towing vessel begins towing the radar system (e.g., the CW radar system) in a line pattern (i.e., the travel route) over the target region. In one embodiment, the towing vessel is connected to the radar system (e.g., the CW radar system) via a dinghy. A towing cable and a data cable connect the towing vessel to the dinghy, and the dinghy connects to the radar system (e.g., the CW radar system) via a towing cable and/or data cable. In one embodiment, the towing vessel is connected to the radar system (e.g., the CW radar system) via a towing cable and/or data cable in addition to a dynamic winch system. The dynamic winch system is operable to facilitate the sensor head depth during towing. In one embodiment, the towing vessel is connected to the radar system (e.g., the CW radar system) via a towing cable and/or data cable in addition to the use of a dynamic down plane system on or ahead of the sensor head. The dynamic down plane system is operable to facilitate the sensor head depth during towing.

Figure 21B:
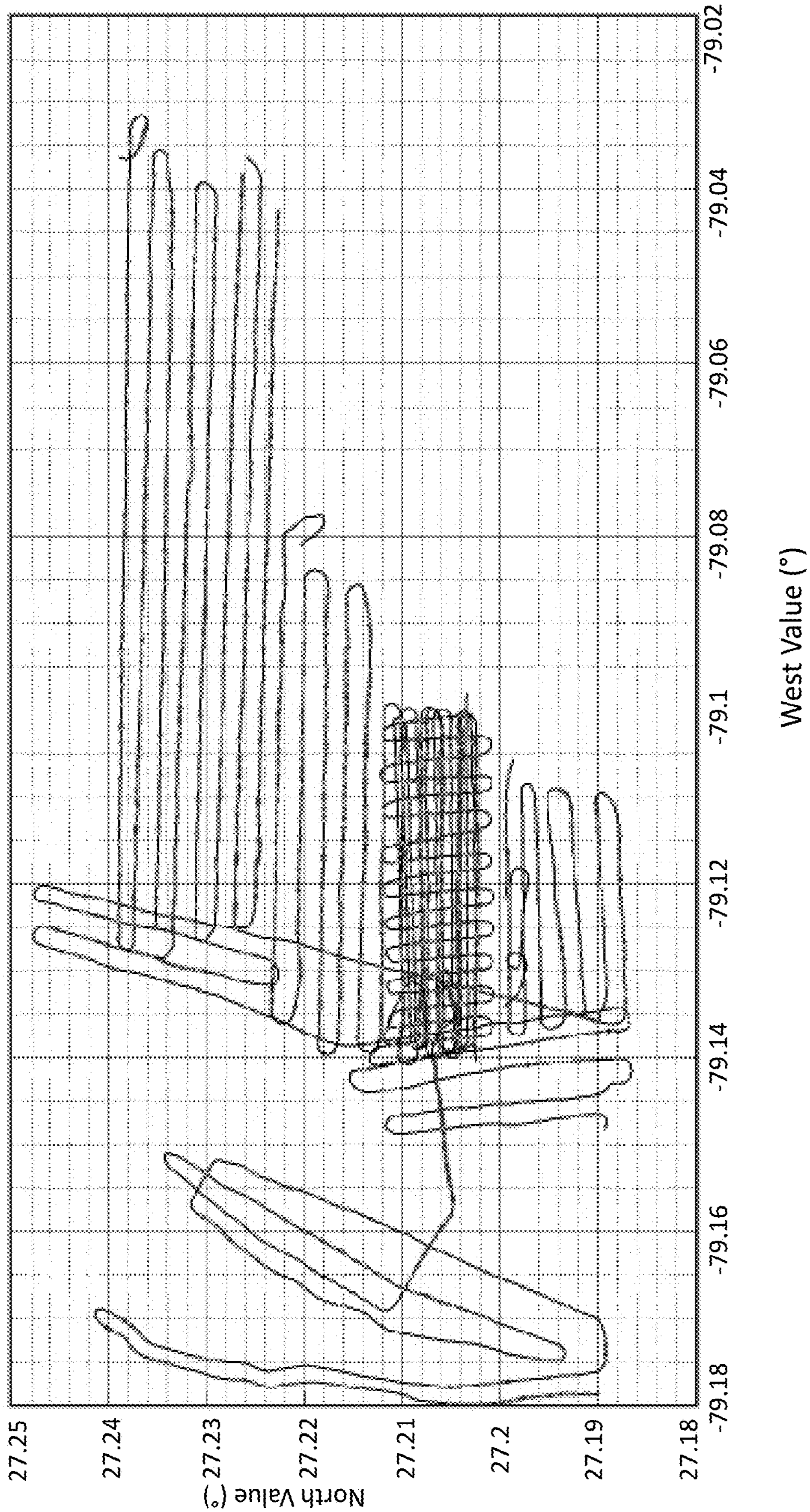
FIG. 21B illustrates a 2D heatmap graph indicating a travel route for a radar system (e.g., a CW radar system) according to one embodiment of the present invention.

FIG. 21B illustrates a 2D heatmap graph indicating a travel route for a radar system (e.g., a CW radar system) according to one embodiment of the present invention. By repeatedly crossing over a target region, the radar system (e.g., the CW radar system) is operable to detect objects and/or targets with greater accuracy. This is possible using the combination of the bow and aft Rx antennas of the radar system (e.g., the CW radar system), providing multiple opportunities for object and/or target detection.

Figure 56A:
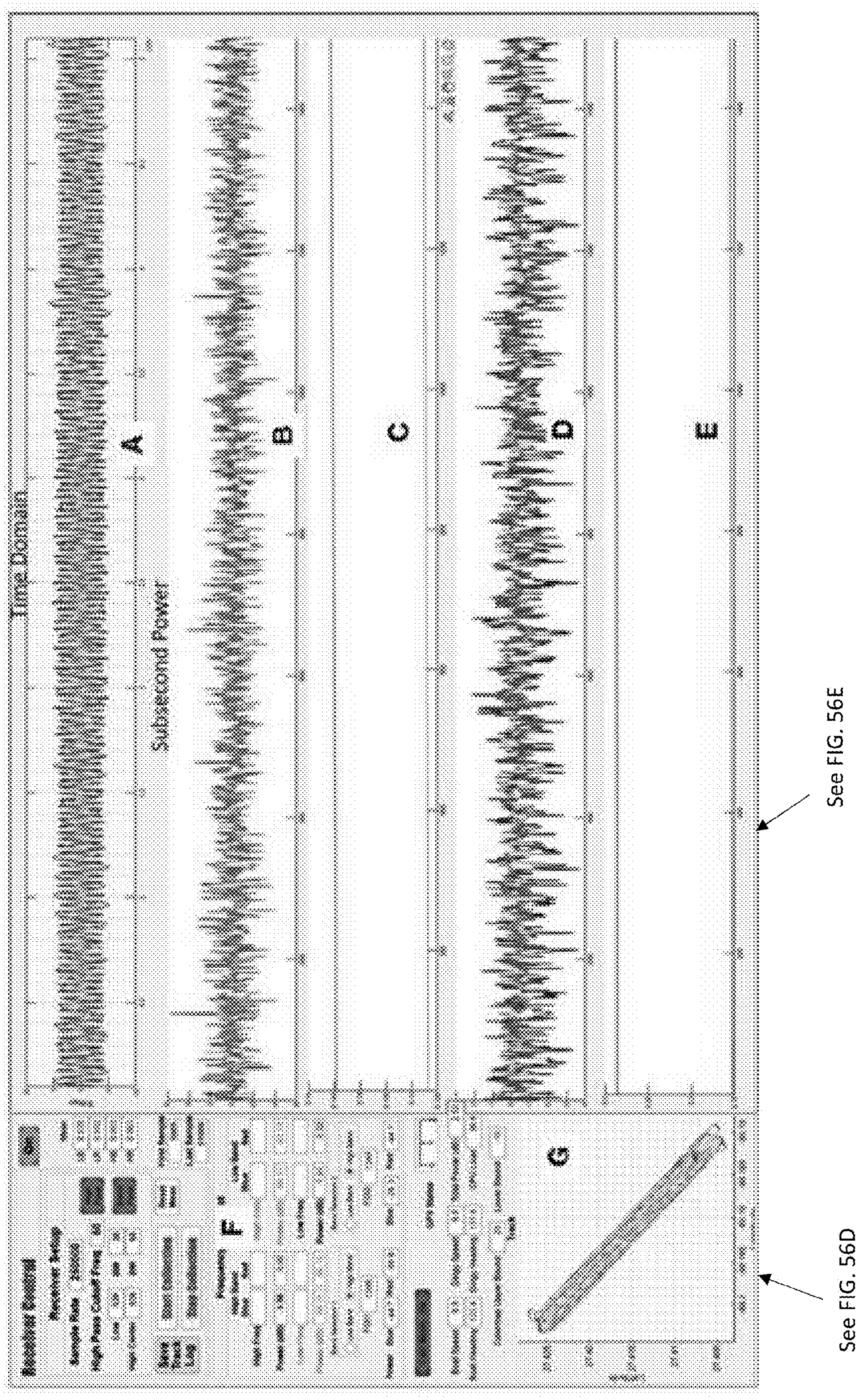
FIG. 56A illustrates a partial view of a real-time control and monitoring GUI.
Figure 56B:
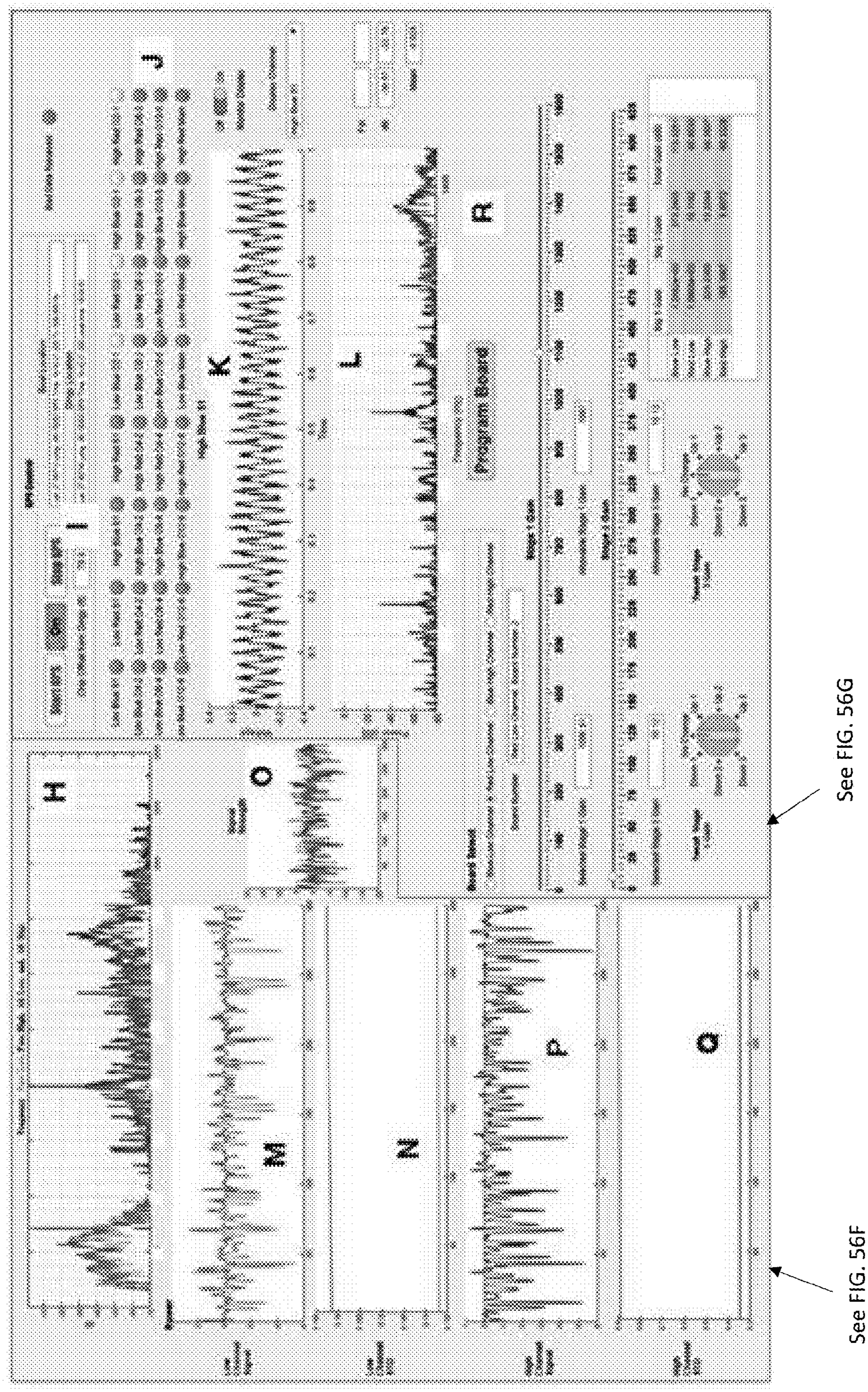
FIG. 56B illustrates the remaining portion of the real-time control and monitoring GUI continued from FIG. 56A.

FIGS. 56A-56B illustrate one embodiment of the Rx control and monitoring GUI for data collection. The portion of FIG. 56A boxed in orange is shown in detail in FIG. 56D. The portion of FIG. 56A boxed in green is shown in FIG. 56E. The portion of FIG. 56B boxed in orange is shown in detail in FIG. 56F. The portion of FIG. 56B boxed in purple is shown in FIG. 56G. The raw data from the digitizers as well as processed real-time data are displayed to the operator. Based upon what is shown on the GUI, the gains of the individual analog amplifier boards are operable to be tuned (e.g., by the operator).

FIG. 56C lists all labels in FIGS. 56A-56B representing the various monitoring, control, and real-time analysis data and information available in the GUI.

Figure 56D:
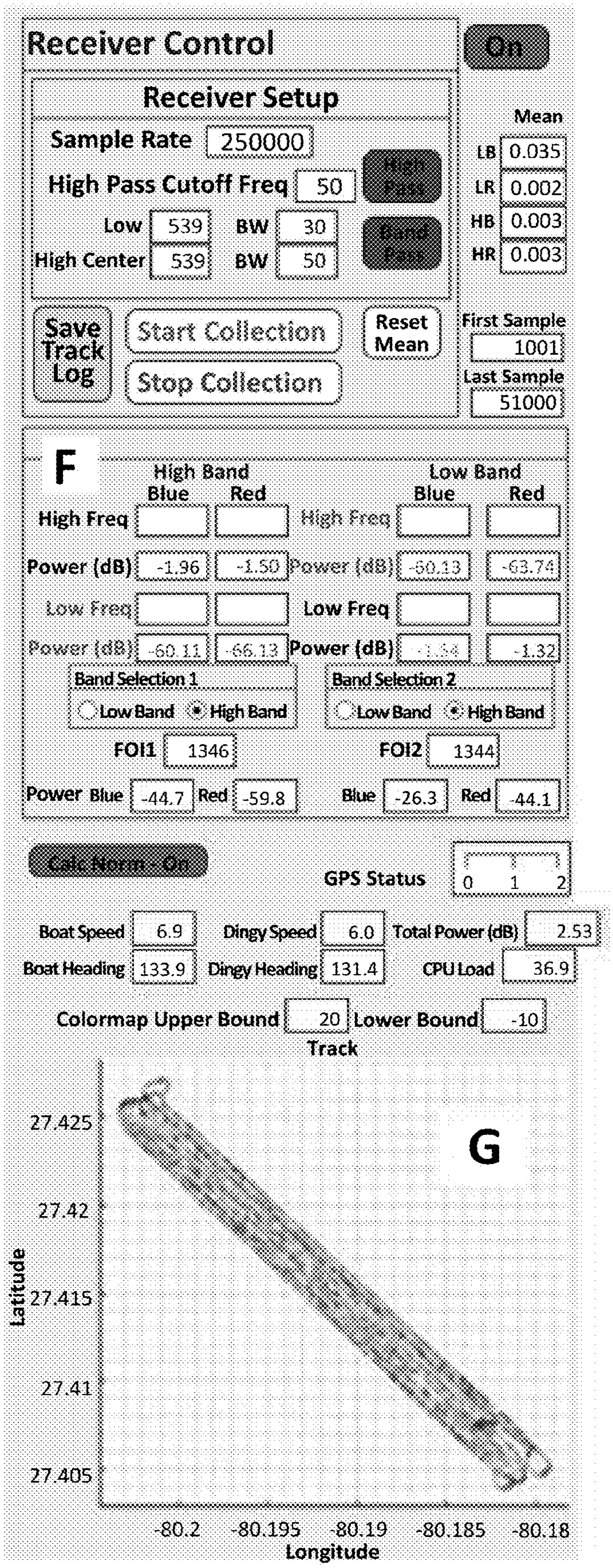
FIG. 56D illustrates a detailed view of the left side of the real-time control and monitoring GUI from FIG. 56A.
Figure 56E:
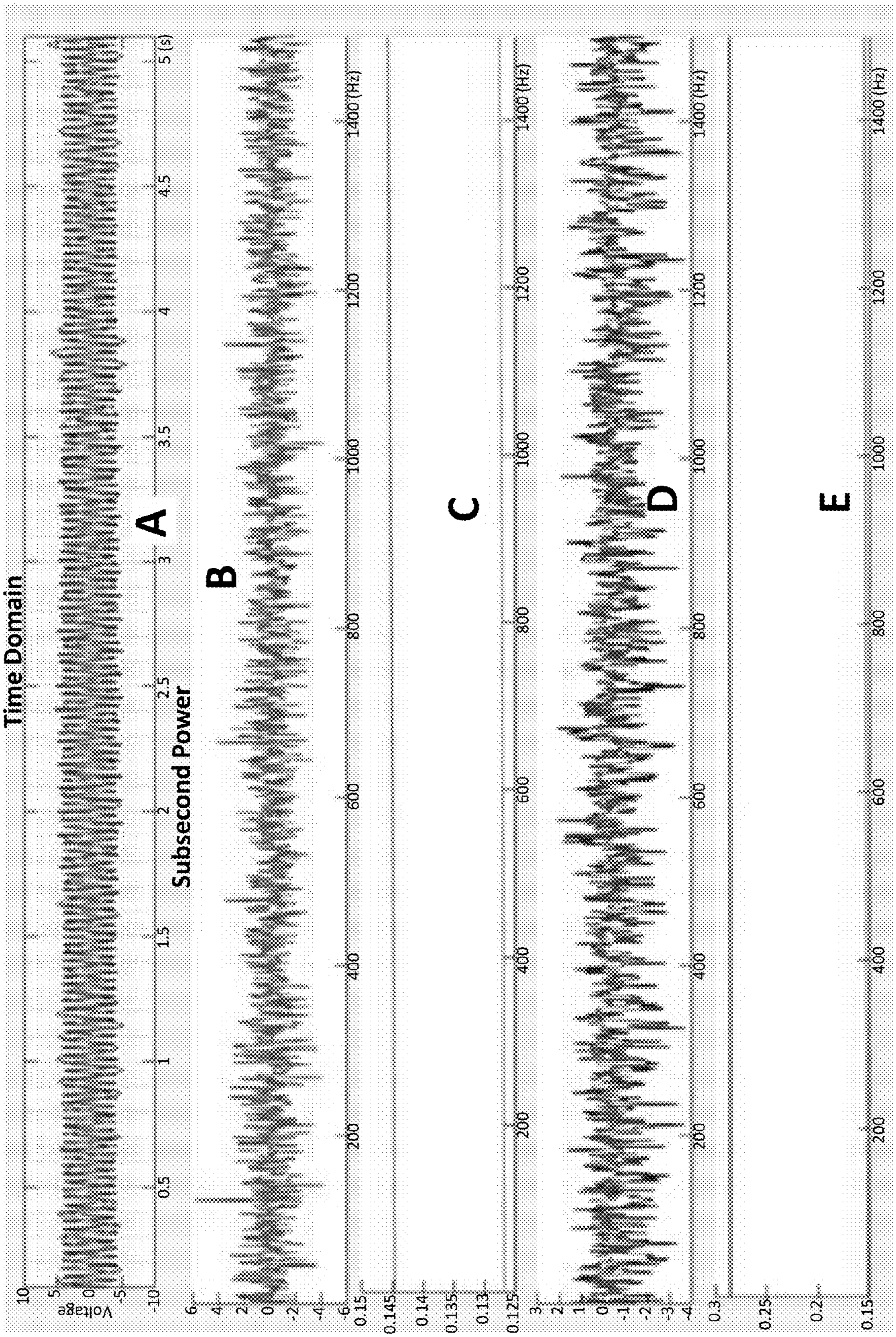
FIG. 56E illustrates a detailed view of the right side of the real-time control and monitoring GUI from FIG. 56A.

FIG. 56D illustrates a detailed view of the left side of the real-time control and monitoring GUI from FIG. 56A.

FIG. 56E illustrates a detailed view of the right side of the real-time control and monitoring GUI from FIG. 56A.

Figure 56F:
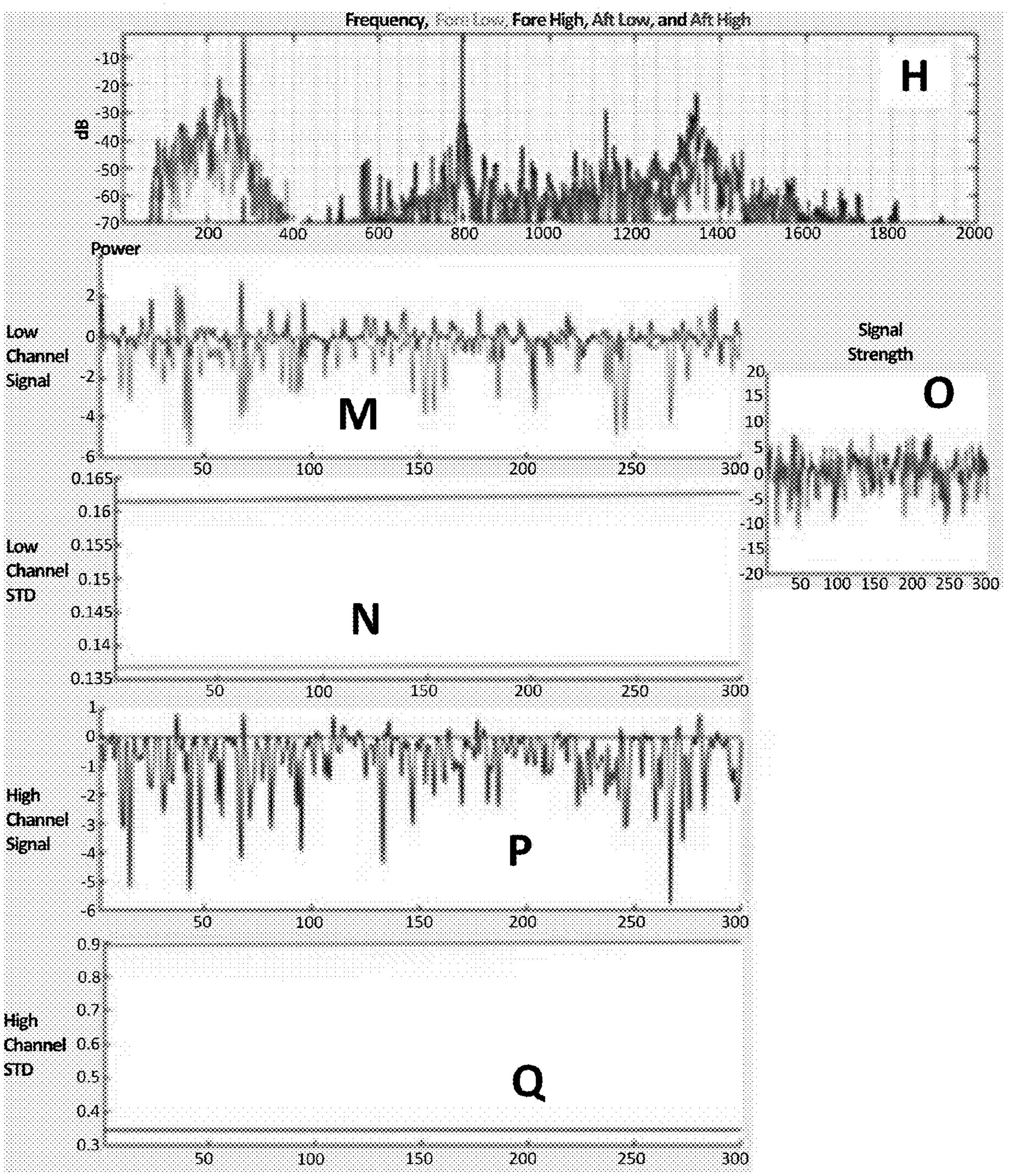
FIG. 56F illustrates a detailed view of the left side of the real-time control and monitoring GUI from FIG. 56B.
Figure 56G:
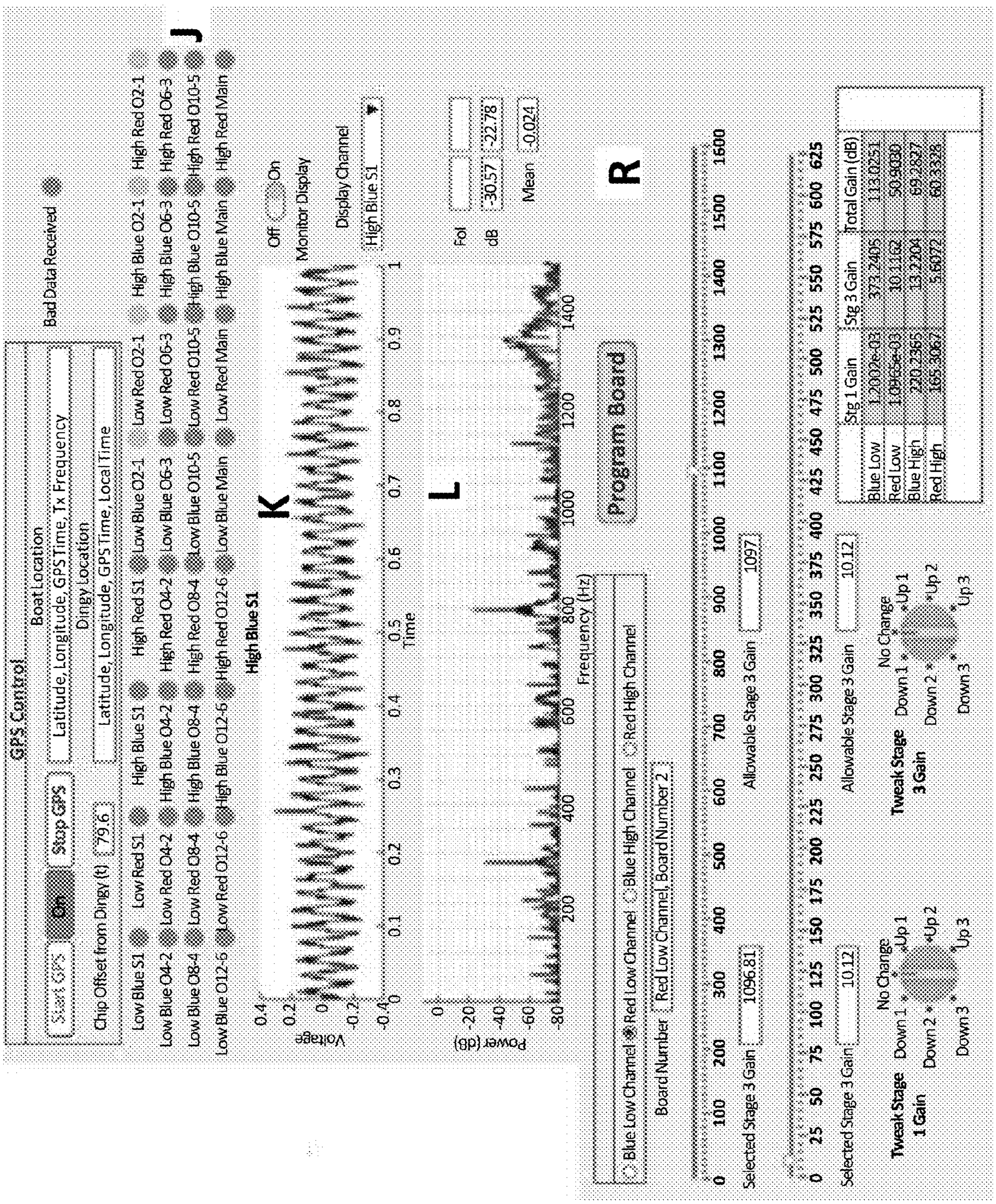
FIG. 56G illustrates a detailed view of the right side of the real-time control and monitoring GUI from FIG. 56B.

FIG. 56F illustrates a detailed view of the left side of the real-time control and monitoring GUI from FIG. 56B.

FIG. 56G illustrates a detailed view of the right side of the real-time control and monitoring GUI from FIG. 56B.

The radar system (e.g., the CW radar system) of the present invention includes at least one amplifier board. Current commercially-available amplifier boards are unable to meet the amplification and dynamic range requirements of the present invention. Commercially available amplifier boards typically amplify at specific levels or ranges (e.g., 20-40 dB, 40-60 dB, 60-80 dB, etc.). More specifically, these commercial amplifier boards only enable a user to step through each decibel range at limited levels (e.g., by 10 or 20 dB at each one of the available levels). Thus, these commercial amplifier boards are not sensitive enough and/or do not offer enough dynamic and detailed control for the radar system (e.g., the CW radar system) of the present invention. The radar system (e.g., the CW radar system) requires a step size of approximately −19 decibels (dB) (e.g., gain steps of 0.108×, meaning if gain is 10×, the next gain step if 10.108; if gain is 100×, next step is 100.108×; etc.), which is not available with commercial amplifiers and amplifier boards.

In one embodiment, the at least one Rx antenna is connected to at least one amplifier board using at least one discrete resistor network arranged in a parallel and/or series configuration. The at least one amplifier board is controlled by at least one switch (e.g., mechanical switch) and/or at least one computer-controlled relay (e.g., autonomously via optimization software, operator action) to adjust gain of at least one amplifier on the at least one amplifier board. The at least one amplifier is preferably ultra-low distortion and includes extremely fine selection of gain (e.g., −16.4 dB per step or smaller).

Figure 66A:
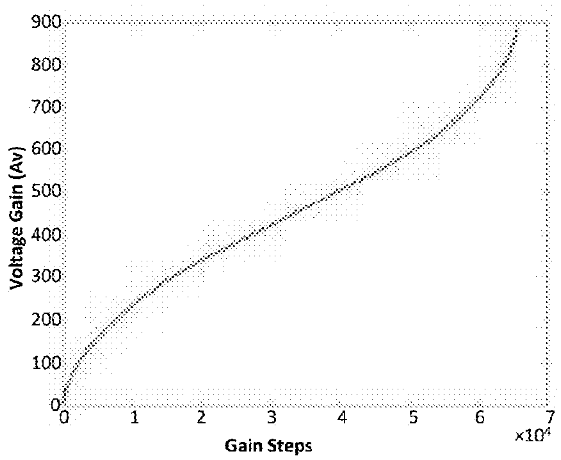
FIG. 66A shows the possible gain states of for an operational amplifier using 16 resistors in series configuration.
Figure 66B:
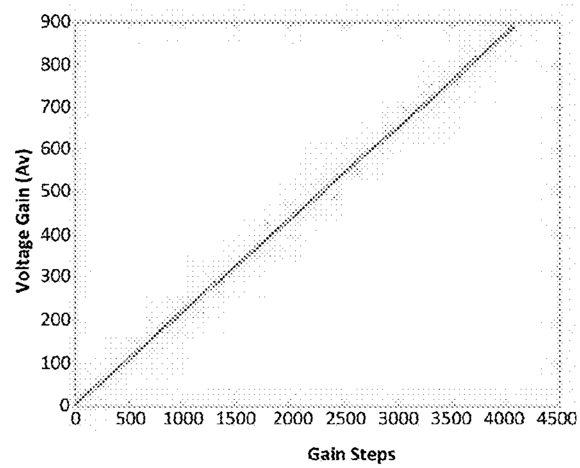
FIG. 66B shows a subset of the possible gains that are selected based upon linear gain steps.
Figure 66C:
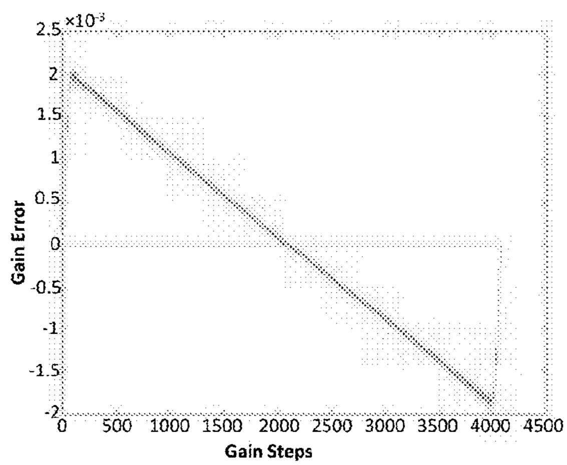
Figure 66D:
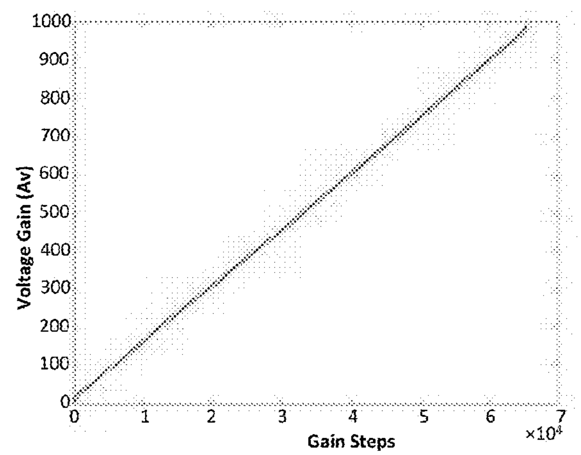
Figure 66E:
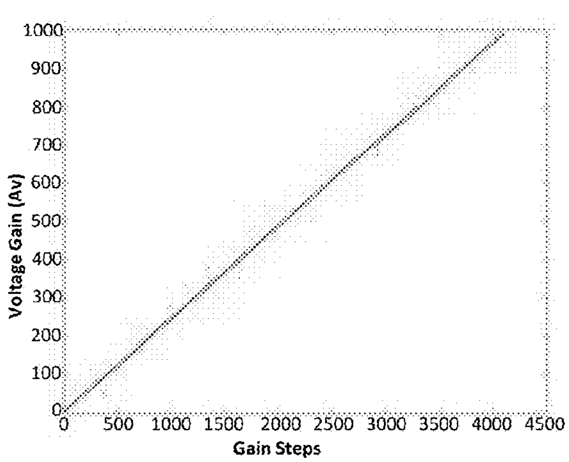
Figure 66F:
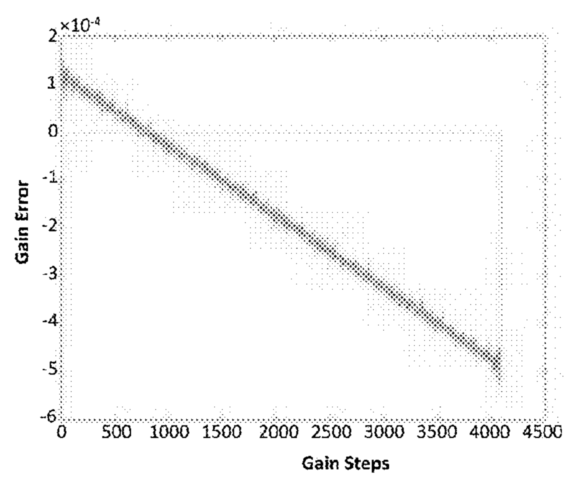

The amplifiers must be ultra-low distortion, meaning integrated circuit (IC) digital potentiometers, mechanical potentiometers, IC discrete switching resistors, IC multiplexers and switches cannot be used as they are either insufficiently controllable or introduce significant distortion in the alternating current (AC) signal coming from the Rx Antennas. In a preferred embodiment, the present invention makes use of custom designed amplifiers wherein at least one switch is used to control banks of parallel and/or series resistors to control the gain of the amplifier stages. In one embodiment, the at least one switch includes a mechanical dual in-line package (DIP) switch connecting individual resistors to the amplifier control circuit. In another embodiment, the at least one switch includes a digitally controlled low signal relay switch. FIG. 66A shows the possible gain states of for an operational amplifier using 16 resistors in series configuration. A total of 65,536 values are possible. FIG. 66B shows a subset of the possible gains that are selected based upon linear gain steps. Just over 4,000 unique gain values are evenly distributed between the minimum possible gain and the maximum possible gain. FIG. 66C shows the error between the actual gain settings and a theoretical perfectly linear distribution of gain settings. FIG. 66D shows the possible gain settings for an Instrument Amplifier using a parallel resistor network. FIG. 66E shows the actual gain setting used which are selected based upon linear gain steps. Just over 4,000 unique gain values are evenly distributed between the minimum possible and maximum possible gains. FIG. 66F shows the error between the actual gain values that were selected and a theoretical perfectly linear distribution of gain settings.

In one embodiment, the ultra-low distortion amplifier boards have a Total Harmonic Distortion (THD) of −123.7 dBc (0.000065%). This is accomplished using low distortion components on the amplifier board and implementing bandpass filters internal to the amplifier stages to restrict the propagation harmonics from initial stages of the amplifier and make the overall THD dependent mostly upon the final amplification stage, which is selected to have very good overall performance (e.g., ultralow noise, ultralow THD, good Gain Bandwidth Product, good slew rate, etc.).

Moreover, commercial amplifier boards experience difficulties when balancing two antennas within close proximity to one another, including, but not limited to, issues balancing the signal-to-noise ratio and/or issues relating to overall power output for a radar system. Traditional amplifier boards cannot reach the decibel ranges required of the radar system (e.g., the CW radar system) of the present invention. The radar system (e.g., the CW radar system) requires the amplifier board to be able to operate between approximately 60 dB to approximately 120 dB. The radar system (e.g., the CW radar system) also requires the amplifier board to compensate for the DC biasing offset voltage without losing system gain. These functions are accomplished through hardware circuitry design and software control logic.

Figure 22A:
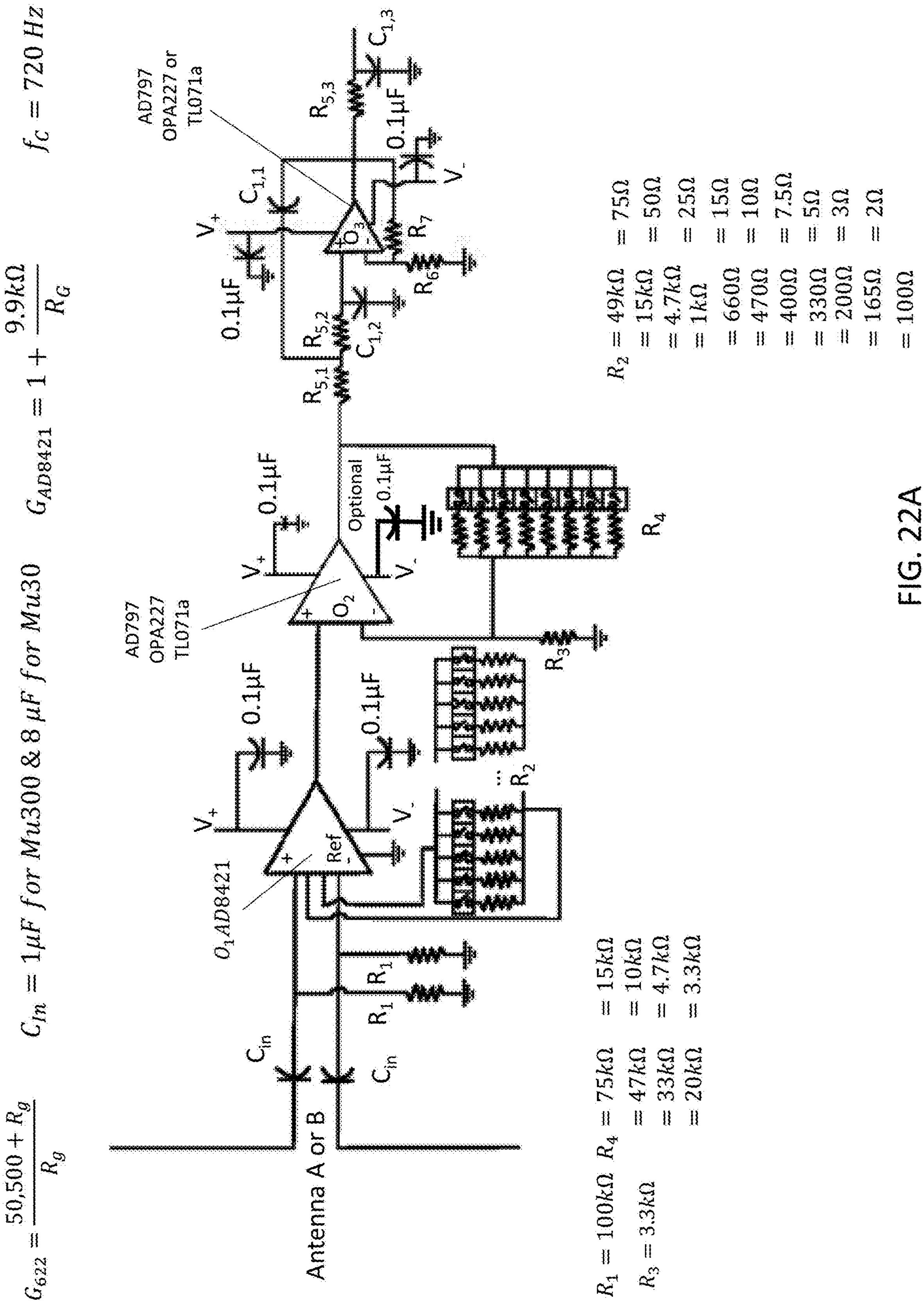
FIG. 22A illustrates a circuit diagram of an amplifier board for a radar system (e.g., a CW radar system) according to one embodiment of the present invention.

FIG. 22A illustrates an amplifier board for a radar system (e.g., a CW radar system) according to one embodiment of the present invention. The amplifier board includes, but is not limited to, an output stage and/or an input stage. The amplifier board is operable to handle output voltages between approximately −10 V to approximately 10 V. In one embodiment, the amplifier board of the present invention is a three-stage circuit. The first stage is an in-amp (instrumentation amplifier), that amplifies the differential voltage between input wires. A differential voltage is used to create the signal because the input to the amplifier board comes from a dipole antenna that is not grounded to the amplification board. The first stage is operable to provide up to approximately 80 decibels (dB) of gain. In one embodiment, the first stage in-amp is operable to provide more than approximately 60 dB of gain. The second stage is an operational amplifier (op-amp), operable to provide up to approximately 40 dB of gain. In one embodiment, the second stage op-amp is operable to provide approximately 60 dB of gain. The third stage is a band-pass filter, operable to provide approximately 2 dB of gain. In one embodiment, the third stage band-pass filter is operable to provide more than approximately 2 dB of gain.

In another embodiment, the amplifier board contains a multi-stage filter between the input stage (the in-amp) and the output gain stage. In one embodiment, the filter is a sixth order low pass filter combined with a twelfth order high pass filter. Alternatively, the filter is a twelfth order low pass filter with a sixth order high pass filter. In one embodiment, the first filter is used on the low transmission frequency receivers to filter out the high frequency transmission signal, and the second filter is used on the high transmission frequency receivers to filter out the low frequency transmission signal.

In another embodiment, the amplifier board has six impedance buffered filter stages. In a preferred embodiment, each filter stage is second order with a quality factor (Q) of about 1.05 to about 1.1 to increase the rate at which the rejection band cuts in. This underlying design approach has a multitude of different specific implementations. Two different designs are operable to be used to isolate a high frequency from a low frequency and/or a low frequency from a high frequency. In the first case, four of the filter stages are high pass and two are low pass. In the second case, four of the filter stages are low pass and two are high pass. Each configuration uses different cutoff frequencies to perform their isolation functions. In another embodiment, three different designs are operable to be used: four low pass/two high pass, three low pass/three high pass, and two low pass/four high pass. In this embodiment, the receivers are operable to be configured for a low band, mid band, and high band. Without much difficulty, it is possible to configure these filters such that the maximum out of band signal seen by any band is less than 2% of the intended receive frequency. This is done with the transmit frequencies being an octave or less in separation.

In another embodiment, the amplifier boards have eight impedance buffered second-order filters which allow a minimum of four simultaneous transmission frequencies to be used. Performance is similar to that described in the previous paragraph.

In another embodiment, the amplifier boards have more than eight impedance-buffered second and third-order filters which allow more than five simultaneous transmission frequencies.

In another embodiment, both fore and aft antennas for a band are routed to a single amplifier board. The signals are passed through individual analog filters and then combined in an analog difference amplifier to perform time-domain signal combination and phase differencing.

Figure 22B:
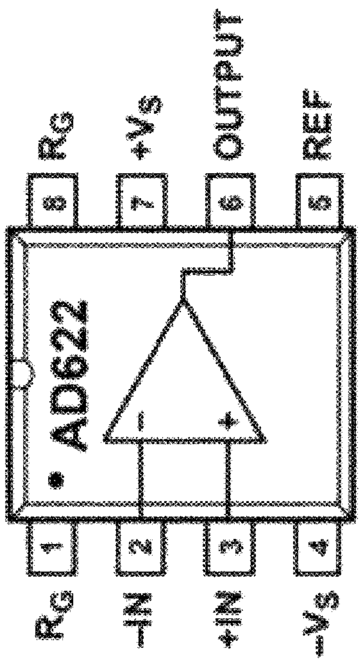
FIG. 22B illustrates a pin configuration diagram for an amplifier board for a radar system (e.g., a CW radar system) according to one embodiment of the present invention.

FIG. 22B illustrates a pin configuration diagram for an amplifier board for a radar system (e.g., a CW radar system) according to one embodiment of the present invention. In one embodiment, the amplifier is an AD622 amplifier board. AD622 amplifiers require only one external resistor to set any gain between approximately 2 dB and approximately 100 dB. For a gain of 1 dB, no external resistor is required.

Figure 22C:
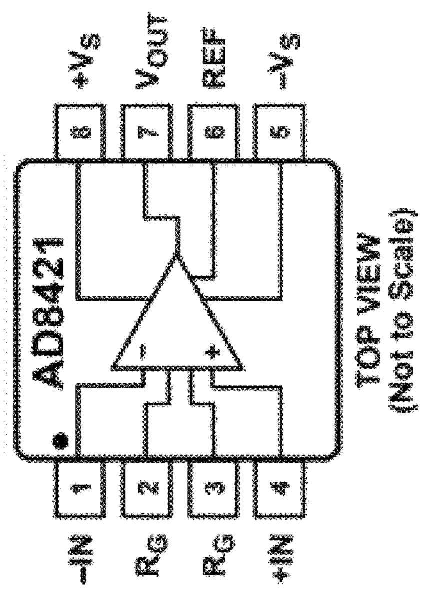
FIG. 22C illustrates a pin connection diagram for an amplifier board for a radar system (e.g., a CW radar system) according to one embodiment of the present invention.

FIG. 22C illustrates a pin connection diagram for an amplifier board for a radar system (e.g., a CW radar system) according to one embodiment of the present invention. In one embodiment, the amplifier board is an AD8429 amplifier board. AD8429 amplifier boards operate at a low cost, low power, extremely low noise, ultralow bias current, and include high speed instrumentation suited for signal conditioning and data acquisition applications.

Figure 22D:
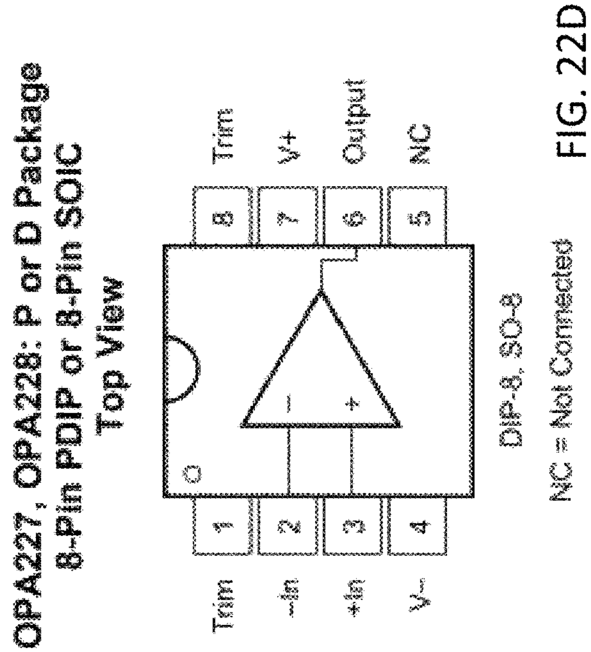
FIG. 22D illustrates a pin configuration and function diagram for an amplifier board for a radar system (e.g., a CW radar system) according to another embodiment of the present invention.

FIG. 22D illustrates a pin configuration and function diagram for an amplifier board for a radar system (e.g., a CW radar system) according to another embodiment of the present invention.

Figure 22E:
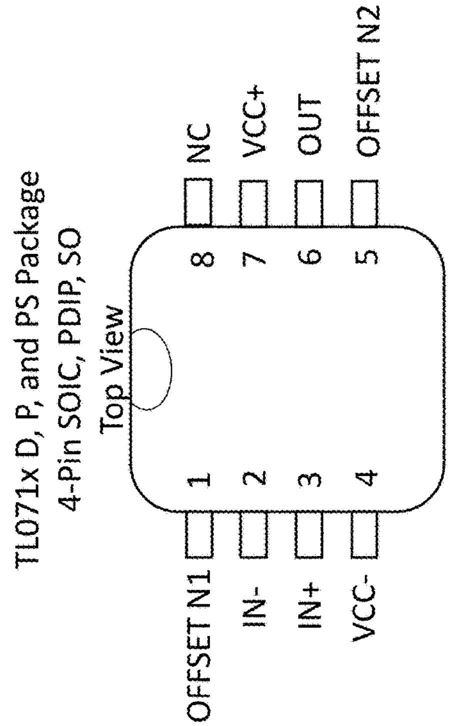
FIG. 22E illustrates a pin configuration and function diagram for an amplifier board for a radar system (e.g., a CW radar system) according to another embodiment of the present invention.

FIG. 22E illustrates a pin configuration and function diagram for an amplifier board for a radar system (e.g., a CW radar system) according to another embodiment of the present invention.

Figure 22F:
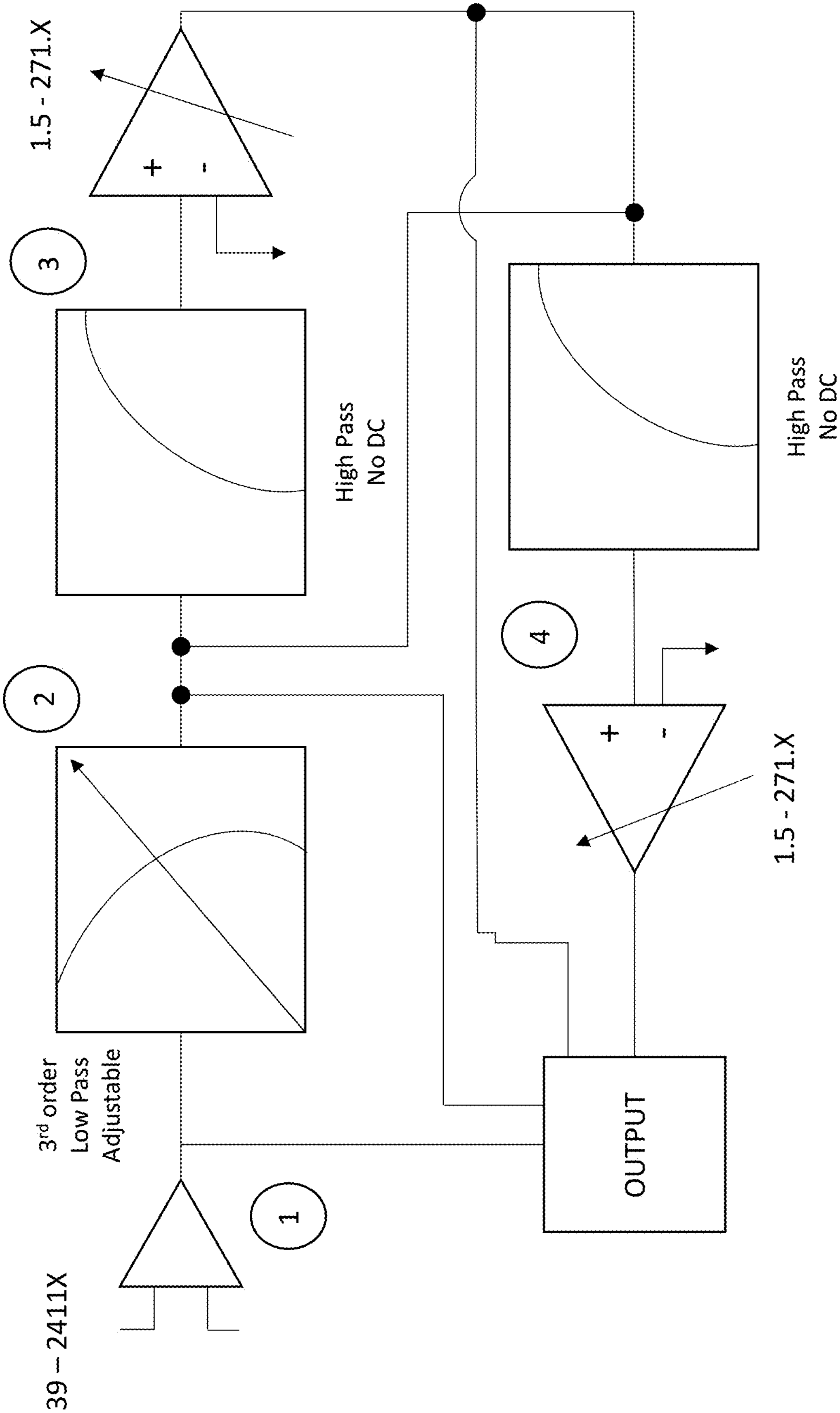
FIG. 22F illustrates a chart depicting the flow of signal through an amplifier board for a radar system (e.g., a CW radar system) according to one embodiment of the present invention.

FIG. 22F illustrates a chart depicting the flow of signal through an amplifier board for a radar system (e.g., a CW radar system) according to one embodiment of the present invention. The chart depicts four stages of signal flow throughout the amplifier board. While stage one is always required, the signal flow is operable to flow through any combination of the remaining stages. By eliminating a stage from the signal flow, the overall noise added to the radar system (e.g., the CW radar system) is reduced. In one embodiment, the flow of signal through the amplifier board is multi-stage and the amplification values and stages used are all computer controlled. The amplifier board further includes a wiring harness operable to read all amplifier board inputs and settings, and then send the proper setting signals in order to calibrate each board in the system. Each wiring harness includes a plurality of output control cables to Rx antennas and at least one computer input side. In one embodiment, the flow of the signal through the amplifier board depends on the location of the boat and the presence of radiofrequency interference and noise from external sources. When the boat is closer to a populated land mass, there is increased interference from power grids and other signal sources. In one embodiment, the power grid interference includes a 60 Hz signal. In another embodiment, additional harmonics cause further interference in the system. In one embodiment, the four-stage amplifier board is operable to eliminate the interference via a series of filters. In another embodiment, the signal does not flow through all four stages of the amplifier board. In one embodiment, the stages of amplification are chosen to reduce the amount of overall noise added to the radar system (e.g., the CW radar system).

FIG. 23 is a table for a primary gain stage of an amplifier board for a radar system (e.g., a CW radar system) according to one embodiment of the present invention. The primary gain stage includes resistor combinations and settings for an Rx antenna gain controller.

FIG. 24 is a table for a secondary gain stage of an amplifier board for a radar system (e.g., a CW radar system) according to one embodiment of the present invention. The secondary gain stage includes resistor settings for an Rx antenna gain controller. The various stage settings are measured in units of ohms (Ω). In addition, the stage settings include resistor settings for an Rx antenna gain controller.

FIG. 25 is a table for Stage One and Stage Two gain settings for an amplifier board for a radar system (e.g., a CW radar system) according to one embodiment of the present invention. The various stage settings are measured in units of kiloohms (kΩ). In addition, the stage settings include resistor settings for an Rx antenna gain controller.

The amount of gain provided by the three-stage circuit setup is individually determined for each Rx antenna. While the antennas used, both Tx and Rx, are interchangeable, they each have their own capacitance and performance curves. In addition, corresponding logic-controlled circuitry enables capacitance matching between the transmitter, amplifier, and antenna(s). This requires that each antenna have its own amplification settings, or gain, when used as a Rx antenna. In addition to this gain, the system of the present invention uses oversampling to provide an improvement in system signal-to-noise (SNR) due to processing gain. In one embodiment, the oversampling is operable to provide approximately 24 dB of SNR gain. In one embodiment, the radar system (e.g., the CW radar system) is operable to sample at approximately 250,000 times a second. In addition, the amplifier board includes both low and high frequency pass filters, with gain controls from less than approximately 2 dB to more than approximately 130 dB.

FIG. 26 is a table for gain calculations for an amplifier board for a radar system (e.g., a CW radar system) according to one embodiment of the present invention. The stage settings are measured in units of ohms (Ω). In addition, the stage settings include resistor settings for an Rx antenna gain controller.

FIG. 27 is a table for Stage One and Stage Two gain settings for an amplifier board for a radar system (e.g., a CW radar system) according to another embodiment of the present invention.

FIG. 28A is a table for resistance values for an amplifier board for a radar system (e.g., a CW radar system) according to one embodiment of the present invention.

FIG. 28B is a table for additional resistance values for an amplifier board for a radar system (e.g., a CW radar system) according to one embodiment of the present invention.

FIG. 28C is a table for additional resistance values for an amplifier board for a radar system (e.g., a CW radar system) according to one embodiment of the present invention.

In one embodiment, the amplifier board(s) of the radar system (e.g., the CW radar system) of the present invention operate in four stages. The first stage requires the radar system (e.g., the CW radar system) to turn multiple signals into a single signal, used for object and/or target geolocation. Next, a low-pass anti-aliasing filter is applied to the single signal. This low-pass filter removes unnecessary frequencies from the system. The third and fourth stages are identical, and involve the removal of noise associated with any direct current (DC) offset in order to isolate the signal. Each stage introduces between approximately 1.5 dB to approximately 271 dB gain per stage. Once the signal is isolated, the various Tx and Rx antennas are balanced, resulting in an output indicating the geolocation of an object and/or target. In one embodiment, the amplifier board is digitally controlled. In one embodiment, the amplifier board is automatically controlled. In another embodiment, the amplifier enables a user to select the cutoff frequency from a range of approximately 106 Hz to approximately 3,000 Hz. For low-band frequencies, the cutoff frequency is between approximately 106 Hz and approximately 280 Hz. For mid-band frequencies, the cutoff frequency is between approximately 220 Hz and approximately 650 Hz. For high-band frequencies, the cutoff frequency is between approximately 500 Hz and approximately 3,000 Hz.

The raw signals received by the Rx antennas are on the order of 30 nanovolts. These ultra-faint signals are amplified by between approximately 70 dB and approximately 120 dB of gain, with a maximum board gain capability of more than approximately 155 dB. In one embodiment, the typical gain of the system is between approximately 100-110 dB in order to avoid saturation. In one embodiment, the amplification of the at least one amplifier board optimizes the signal-to-noise ratio (SNR) to minimize noise from vibrations and other sources. In one embodiment, the at least one amplifier board is contained in a two-step noise reduction system. First, impedance matching and receiver amplifier boards are housed inside shielded and grounded metal boxes functioning as a Faraday cage, preventing electromagnetic interference (EMI). Second, each box is housed inside a thermoelectric cooler and/or heater in order to maintain a near constant operating temperature. This prevents thermal noise drift from altering the performance of the amplifier boards in any environmental condition.

All connectors entering the EMI boxes are shielded and grounded. In addition, any openings present on the EMI boxes are covered with an aluminum mesh, wherein the mesh is also grounded to the EMI box. In another embodiment, the mesh is a copper mesh. At the frequencies used by the radar system (e.g., the CW radar system), the aluminum mesh visually appears "open," but in reality, is an electrical barrier to all frequencies below approximately 10 GHz. Without EMI shielding, the amplification process is reduced by approximately 30-60 dB which is insufficient for the signals coming from the Rx antennas. In one embodiment, each Rx antenna in the radar system (e.g., the CW radar system) has its own EMI box. Each EMI box is then placed inside a refrigerated container for climate control. In one embodiment, the frequencies used by the radar system (e.g., the CW radar system) are approximately 3,000 Hz or less.

In one embodiment, amplification occurs in two stages. The first stage involves direct current (DC) removal and isolation. The DC removal and isolation techniques are described in Kresimir Odorcic (2008). "Zero DC offset active RC filter designs," *ThinkIR: The University of Louisville's Institutional Repository*, which is incorporated herein by reference in its entirety. Stage two represents the digitally-controlled amplification stage. By using digital relays in conjunction with fixed resistors in series-parallel networks, the radar system (e.g., the CW radar system) is able to digitally change amplification values. These stages include approximately 1,000,000 linear gain steps that are capable of amplification from approximately 35 dB to approximately 156 dB.

The amplifier boards used in the present invention account for all amplification processes, DC offset issues, low-pass filtering, and/or high-pass filtering requirements.

The radar system (e.g., the CW radar system) requires the use of a digitizer, a hardware device that receives analog information, including light and/or sound, and records it digitally. This process is known as digitization. The digitizer board includes a connector box, an input device for receiving input from a transmitter computing device, and/or an output device for sending output to a receiver computer device.

Digitizer boards used in the present invention are operable to take between approximately +10 volts (V) and approximately −10V. During operation of the radar system (e.g., the CW radar system), power levels fluctuate due to clutter and noise issues. By operating between approximately +10V and approximately −10V, the radar system (e.g., the CW radar system) is able to avoid saturation that occurs at voltages greater than approximately +10V and less than approximately −10V. In addition, operating between the range of approximately +10V and approximately −10V requires approximately 3.5 decibel watt (dBW) in power. When a detection and/or collection operation begins, the Rx antenna(s) start with a signal measuring approximately 50 nanovolts (nV) with no object and/or target detected.

All of the hardware components of the radar system (e.g., the CW radar system) of the present invention are subject to constant temperature regulation as well. While no specific temperature is required, the system must operate at a single, constant and/or near-constant temperature. In one embodiment, the temperature of the radar system (e.g., the CW radar system) is maintained using a thermally-controlled refrigerator, containing the EMI-shielded amplifier boxes. The radar system (e.g., the CW radar system) temperature is maintained using cooling and/or heating. The refrigerator(s) holding the EMI-shielded amplifier boxes are operable to cool and/or heat the air around the amplifier boxes in order to reduce the amount of thermal drift in the impedance matching and amplifier electronics. By maintaining the temperature of the radar system (e.g., the CW radar system) at a constant and/or near-constant temperature, the system avoids experiencing large temperature swings which are operable to decrease system accuracy, efficiency, and/or operability.

In addition to temperature issues, the radar system (e.g., the CW radar system) of the present invention also accounts for alternating current (AC) power issues. Because the radar system (e.g., the CW radar system) is towed, in a saltwater environment, from a vessel, the vessel presents a grounding problem to the system. On land, grounding issues are simple: AC wiring systems including a green grounding wire, preventing shocks and electrocution. The ground connection is completed by clamping the AC wiring system to a metal water pipe or by driving a long copper stake into the ground. However, water-based vessels are not grounded the same. Many water-based vessels make use of a plate enabling the vessel to ground itself to the ocean. Grounding for water-based vessels represents an additional source of noise that the radar system (e.g., the CW radar system) of the present invention must account for.

Post Processing

Post processing software is used in conjunction with the radar system (e.g., the CW radar system) of the present invention. Post processing software functionality includes, but is not limited to, eliminating variances in boat speed, eliminating GPS timing differences across all GPS receivers used during collection, eliminating variances in computer timing across all computers used during collection, eliminating variances associated with the depth of the radar system (e.g., the CW radar system), real-time or near real-time object and/or target detection, survey automation, adjusting controls related to a towing vehicle's navigational capabilities, object and/or target classification, and/or automated object and/or target identification. Object and/or target classification includes, but is not limited to, size, location, and a potential material type. In one embodiment, the post processing software used is MATLAB (available from MATHWORKS). In one embodiment, the post processing software used is PYTHON. In one embodiment, the post processing software used is C/C++. In one embodiment, the post processing software used is JAVA. In one embodiment, the post processing software is operable to detect objects and/or targets and their compositions in real time. In another embodiment, the post processing software is operable to detect objects and/or targets and their compositions in near real time.

Post processing must also account for a direct current (DC) offset. DC offset occurs when hardware components add DC voltage to audio signals. For example, an amplifier board of the present invention emits an additional DC microvolt into the signals received by the Rx antenna(s). Due to the sensitivity of the system, this additional microvolt represents a major positive or negative shift in signal reception. This shift leads to a saturation in signal reception.

In addition, the radar system (e.g., the CW radar system) makes use of a multi-step process for specifically identifying objects and/or targets of interest, as well as the material each object and/or target is made of. In one embodiment, the multi-step process includes, but is not limited to, raw data collection, frequency offset, frame stitching, narrow band filtering, and/or elimination of discontinuities.

Raw data collection refers to the continuous stream of data coming from the Rx antenna amplifier boards, as well as corresponding GPS location data using a towing vessel and a dinghy. In one embodiment, every $1/5^{th}$ second of data from the Rx antenna amplifier boards and the corresponding GPS location data are recorded. This raw data collection is performed using the above-mentioned digitizer boards. In one embodiment, the digitizer boards are operable to digitize the raw data at a rate of approximately one million bits per second. The radar system (e.g., the CW radar system) further oversamples the raw data in order to increase the overall signal-to-noise ratio. In one embodiment, oversampling at a rate of approximately 250,000 samples per channel yields an increase in gain for the system between approximately 18 dB and approximately 26 dB.

As the radar system (e.g., the CW radar system) of the present invention detects both amplitudes and phase returns from objects and/or targets on or under the ocean floor, the frequency offset must be constantly monitored and corrected for. Any transmit frequency will vary slightly with time and environmental changes due to the electronic equipment used. Therefore, the frequency offsets in the return signal in the Rx antennas must be continually adjusted. A constant frequency offset function is applied to the raw data as it is collected by the radar system (e.g., the CW radar system) in order to balance out the transmit frequency variations.

The frame stitching process involves stitching the individual data files collected by the radar system (e.g., the CW radar system) into an array, covering hours of data collection. This frame stitching process additionally solves for GPS and timing discontinuities. If a single micro-second of data is lost, this results in a discontinuity in the phase shifting, causing false signals to be inserted into the collected data. In order to solve this problem, in one embodiment the radar system (e.g., the CW radar system) uses at least one GPS receiver in order to reduce the loss of GPS data when closing one second of array data and starting a new second of array data.

Once the raw data has been stitched together, a narrow band filter is applied to the digital signal in order to eliminate the vibration and motion of the sensor head through the water. The narrow band filter is adjustable depending upon the environmental conditions including, but not limited to, sea-state, towing speed, depth, and/or a tow distance of the radar system (e.g., the CW radar system) behind a towing vessel and/or dinghy.

The last post-processing step eliminates any discontinuity associated with last data in the large, multi-hour array of signal data. Once discontinuities are eliminated, the radar system (e.g., the CW radar system) creates a filtered data set. Using this filtered data set, any motion or interference effects are eliminated by taking a moving sixty-second window of data and further processing the center thirty seconds of data in the sixty-second window. The edges of the sixty-second data file are where the aliasing effects manifest, meaning the center thirty-seconds of data are free of these effects. In addition, the filtered data set is used to correct the phase offset between the bow Rx antenna(s) of a specific band when compared against the aft Rx antenna(s) of the same specific band.

In an alternate embodiment, the entire data set is filtered using a two-second-long filter. The digital data is taken as a single data stream from each antenna and not block processed as referenced above. This process is significantly faster than the methodology described above using the narrow band filter, and provides equivalent quality when used on later model sensor heads that use smoothing design techniques to reduce vibration and jerky motion encountered with bare frame sensor head designs.

Once the filtered data set has been phase offset corrected, the compiled data array is used to analyze the surveyed area. Any statistical data is also stored along with the compiled array, which are both then used in conjunction with the sensor head's GPS position with respect to the surveyed area. In order to simplify the post-processing functions, areas before, during, and after a turn in a surveyed area are marked and set aside. This is because during a turn, the path of the radar system (e.g., the CW radar system) through the water varies not only in direction, but also in speed, depth, and physical orientation relative to the surface of the water. This variance in shallow depth surveys (i.e., surveys in a body of water with a depth less than 30.5 m (100 ft)) causes a rotation of the radar system (e.g., the CW radar system) when being towed from a towing vessel, such that the surface reflections from the ocean and any wave action cause excessive noise and/or false targeting within the collected data.

In one embodiment, the software of the radar system (e.g., the CW radar system) includes at least one graphical user interface (GUI). The at least one GUI is operable to display information including, but not limited to, Tx antenna health, Rx antenna health, object and/or target geolocation, a geolocation for the radar system (e.g., the CW radar system), a geolocation for a dinghy, a system temperature indicator, a vessel status indicator, a speed indicator, an environmental temperature indicator, an object/and or target depth indicator, an object and/or target material, an object and/or target size, a Tx antenna signal status, and/or a Rx antenna signal status.

This functionality is achieved using a combination of the radar system (e.g., the CW radar system)'s amplifier board and impedance matching boards. Impedance matching refers to designing input impedance of an electrical load and/or the output impedance of its corresponding signal source in order to maximize the power transfer and/or minimize signal reflection from the electrical load. The electrical and antenna components of the present invention have a corresponding impedance (i.e., impedance going out from the amplifier output signal). When transmitting a specific signal, the radar system (e.g., the CW radar system) of the present invention verifies that the impedance associated with the electrical equipment sending the specific signal matches the impedance of the Tx antenna sending out the signal. In addition, the return signal from the Rx antenna(s) must also match its impedance.

Figure 29A:
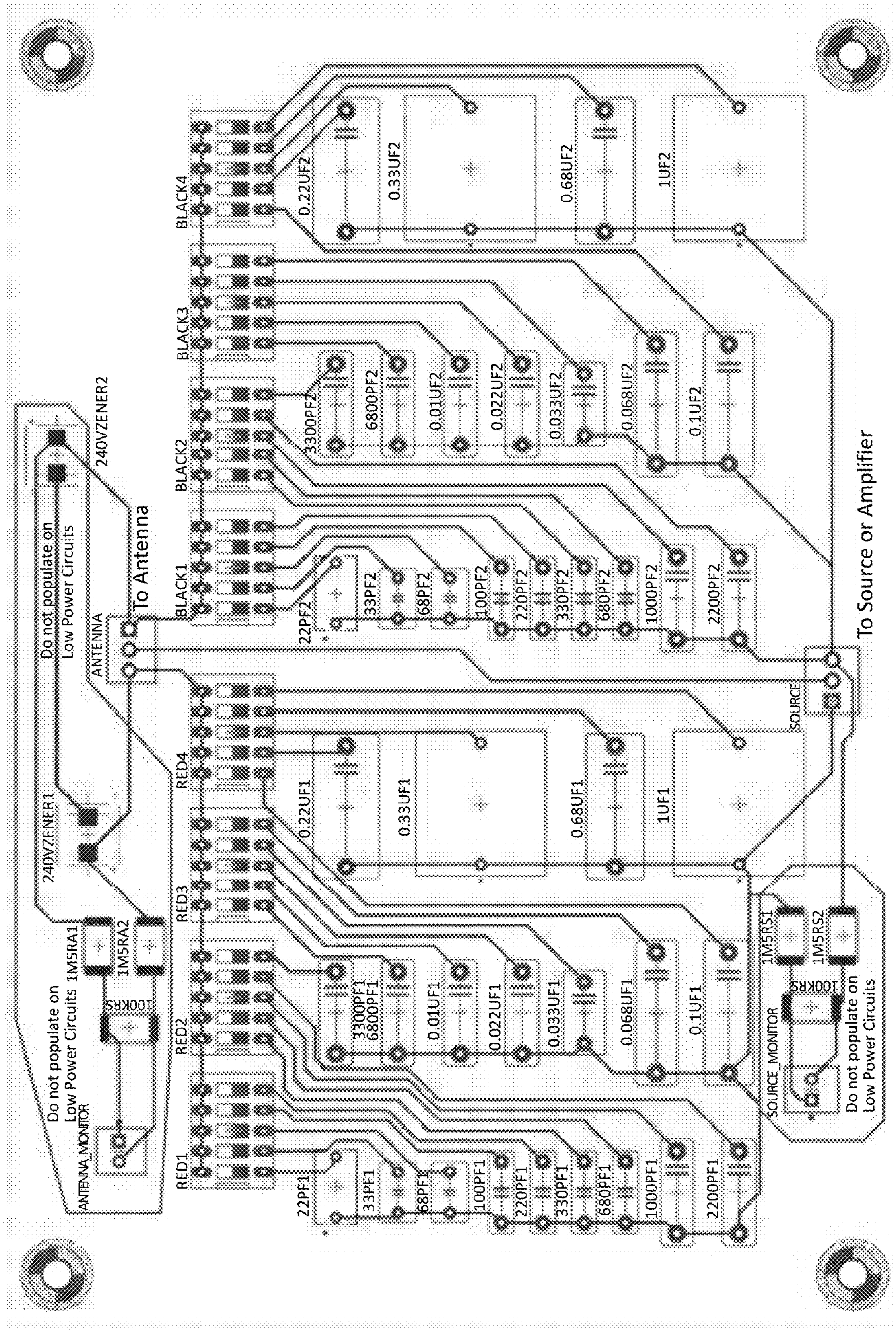
FIG. 29A illustrates the top of an impedance matching board for a radar system (e.g., a CW radar system) according to one embodiment of the present invention.

FIG. 29A illustrates the top of an impedance matching board for a radar system (e.g., a CW radar system) according to one embodiment of the present invention.

Figure 29B:
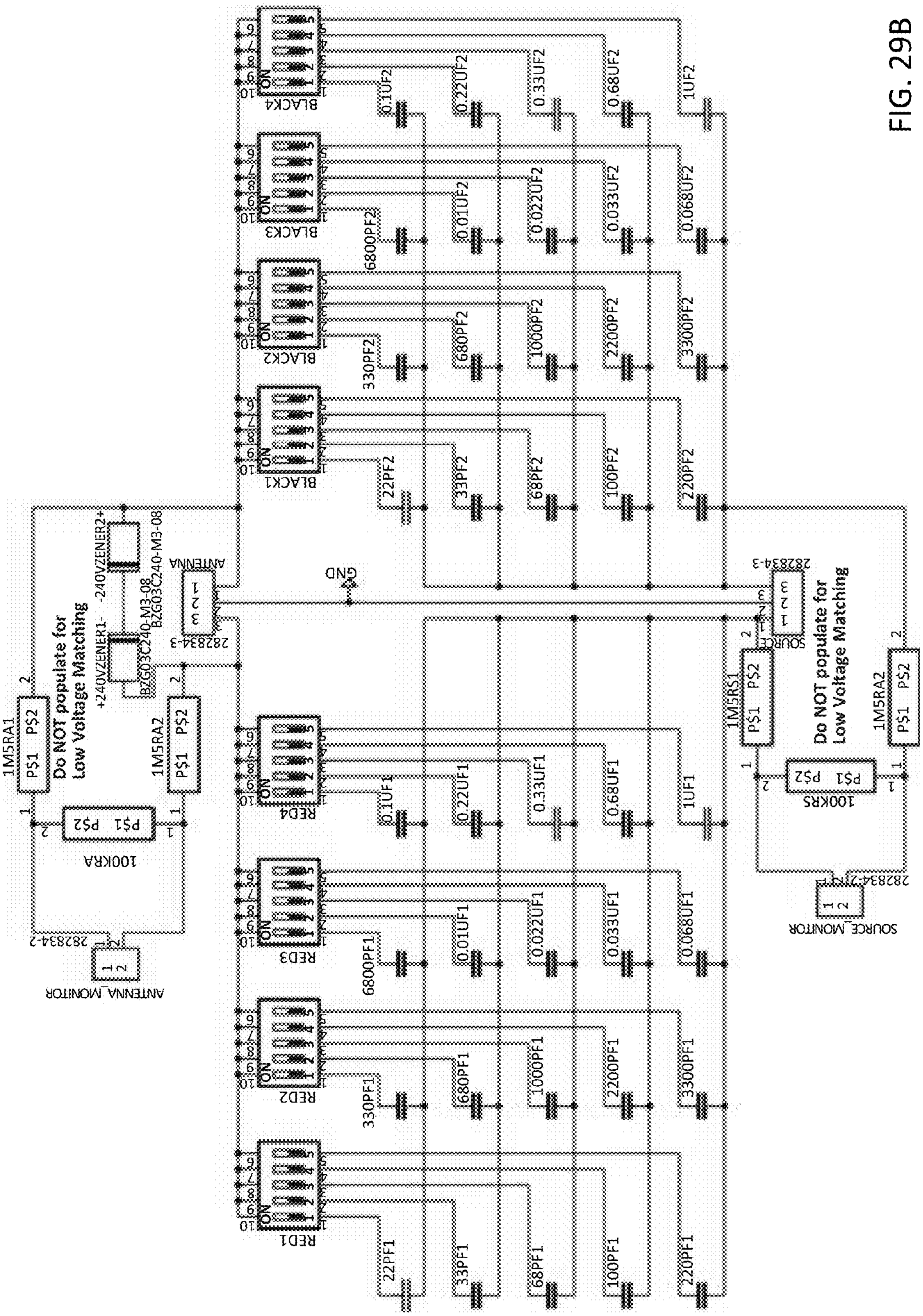
FIG. 29B illustrates the schematic of an impedance matching board for a radar system (e.g., a CW radar system) according to one embodiment of the present invention.

FIG. 29B illustrates the schematic of an impedance matching board for a radar system (e.g., a CW radar system) according to one embodiment of the present invention.

The Tx antennas require their own specialized impedance matching board. The input to this impedance matching board comes from a sound system amplifier and the output goes directly to the Tx antennas via a data cable.

In one embodiment, the amplifier and impedance matching boards are all computer controlled. This enables the system to automatically and/or autonomously balance all of the values present in order to maximize the signal going out to the Tx antennas and the signal coming back from the Rx antennas.

As previously mentioned, the radar system (e.g., the CW radar system) of the present invention includes a multiplicity of graphical user interfaces (GUIs), with GUIs including, but not limited to, three-dimensional (3D) maps for an underwater environment, sonar transmission and receiving, object and/or target detection mapping, receiver controls, transmission controls, and/or two-dimensional (2D) maps for an underwater environment.

Figure 30:
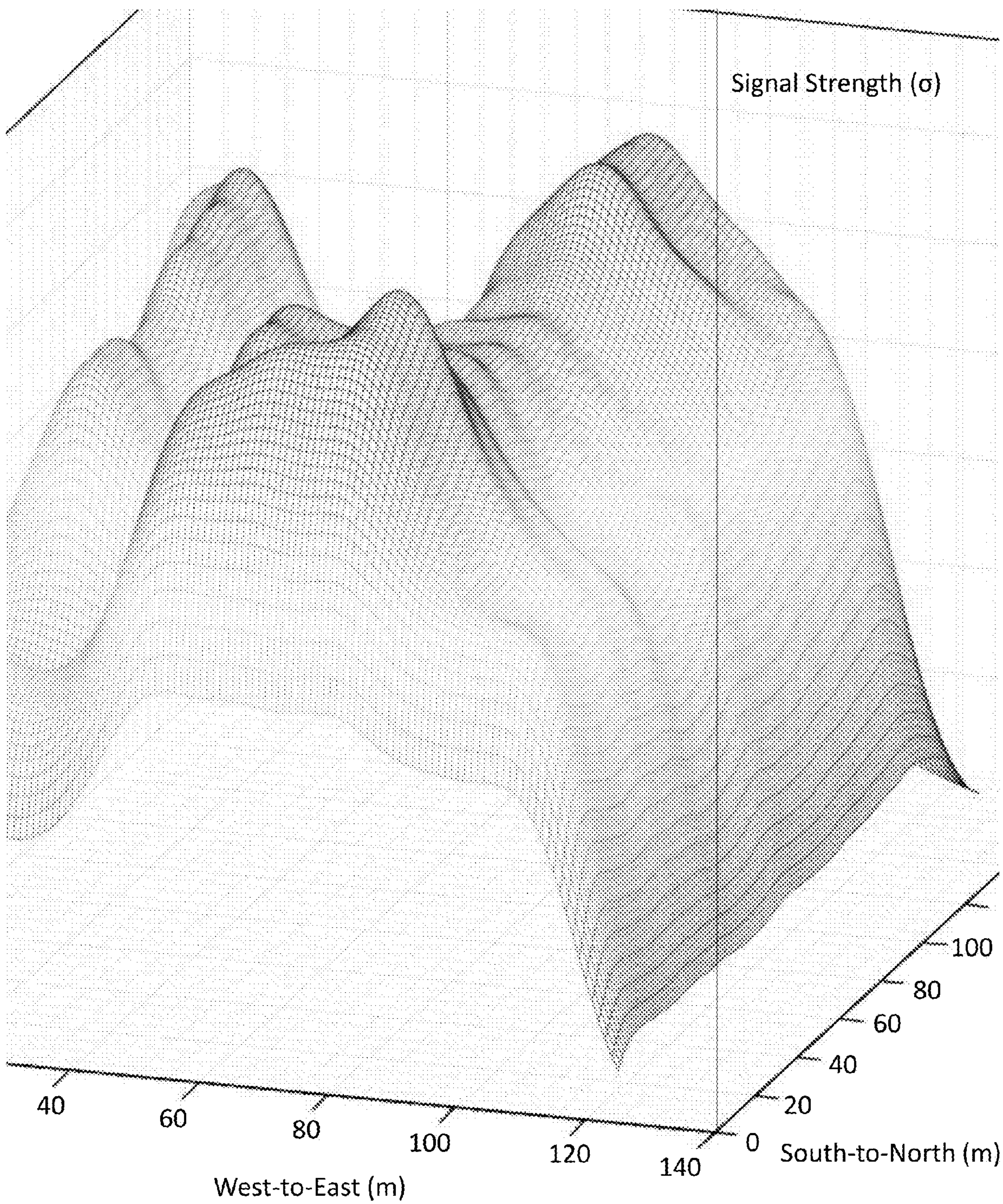
FIG. 30 illustrates a graphical user interface (GUI) for displaying objects detected by a radar system (e.g., a CW radar system) according to one embodiment of the present invention.

FIG. 30 illustrates a graphical user interface (GUI) for displaying objects detected by a radar system (e.g., a CW radar system) according to one embodiment of the present invention. The GUI is operable to provide a three-dimensional (3D) map of a saltwater environment, indicating the presence of any detected objects and/or targets. The 3D map of the saltwater environment is able to be viewed from a West-to-East and South-to-North perspective. When objects are detected, the GUI displays a double-hump-like 3D image. This occurs because an object is first detected by the bow Rx antennas of the radar system (e.g., the CW radar system), creating a rise in signal strength. This detected signal strength drops as the bow of the radar system (e.g., the CW radar system) passes over the detected object. Then, as the aft Rx antennas of the radar system (e.g., the CW radar system) detect the object, a second rise in signal strength is detected. As the aft of the radar system (e.g., the CW radar system) moves away from the detected object, a drop in signal strength occurs. The combination of the bow and aft Rx antenna detections results in a double-hump-shape on the GUI, indicating that an object has been detected. In one embodiment, the radar system (e.g., the CW radar system) is operable to detect and identify objects and/or targets in real time or near-real time. The movement of the radar system (e.g., the CW radar system) generates 2D and 3D images of the target survey area with a multiplicity of lines.

Figure 31:
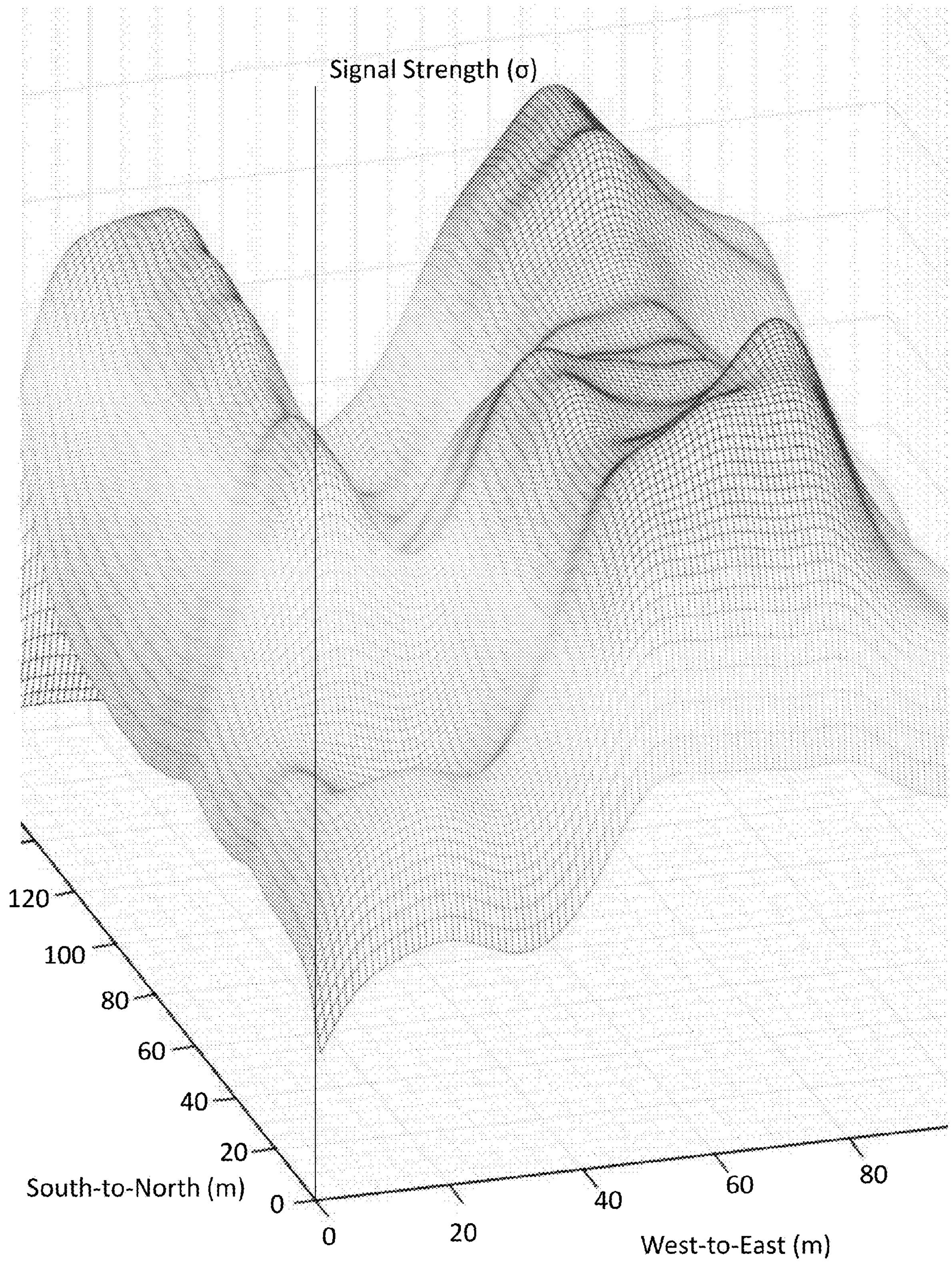
FIG. 31 illustrates a GUI for displaying objects detected by a radar system (e.g., a CW radar system) according to one embodiment of the present invention.

FIG. 31 illustrates a GUI for displaying objects detected by a radar system (e.g., a CW radar system) according to another embodiment of the present invention. The GUI displaying the 3D map of the saltwater environment is able to be viewed from a South-to-North and West-to-East perspective.

Figure 32:
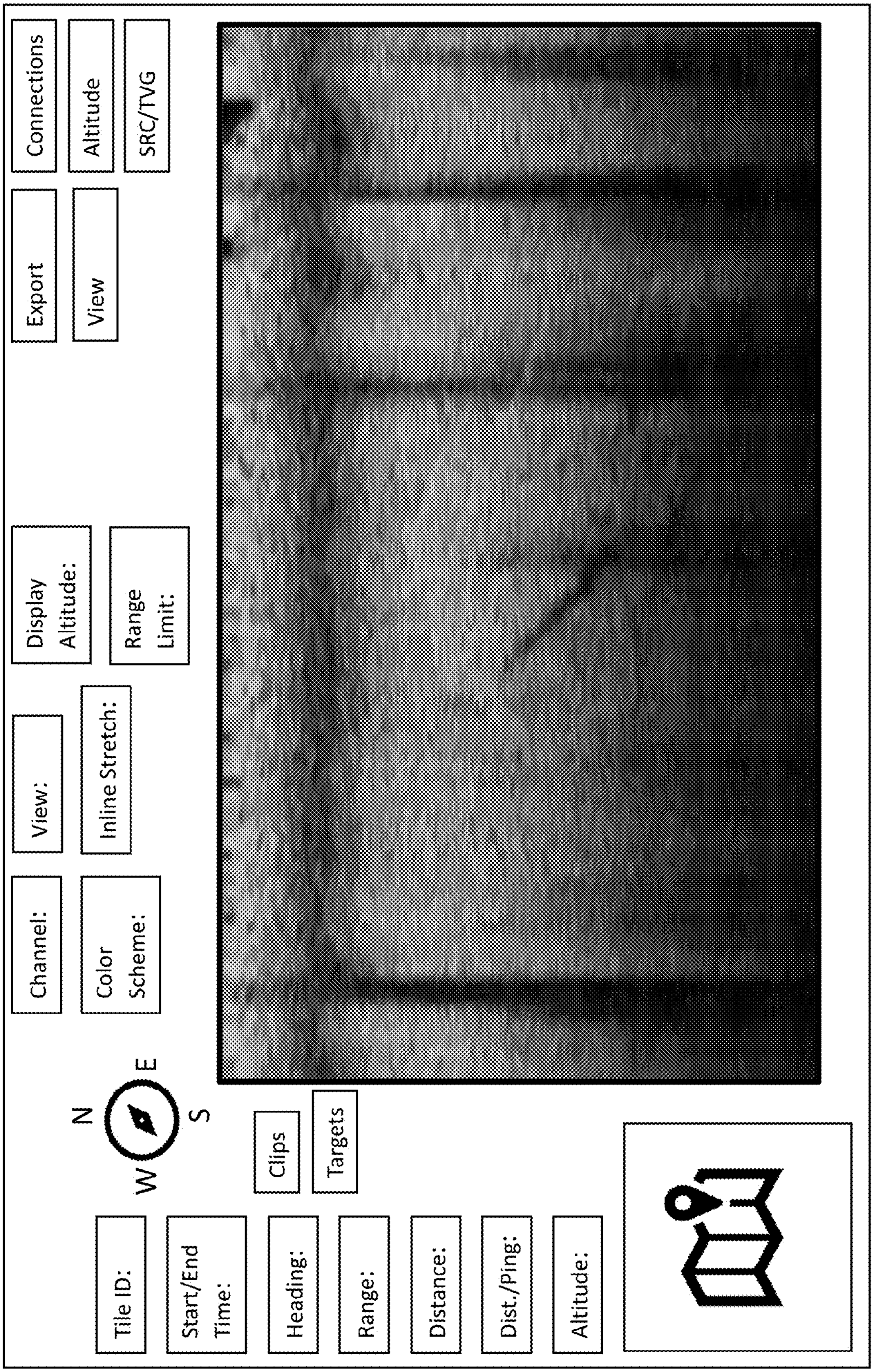
FIG. 32 illustrates a sonar GUI for a radar system (e.g., a CW radar system) according to one embodiment of the present invention.

FIG. 32 illustrates a sonar GUI for a radar system (e.g., a CW radar system) according to one embodiment of the present invention. The sonar GUI is operable to display elements including, but not limited to, a start recording time, an end recording time, a heading, a range, a distance, a measurement of the distance divided by a sonar ping, an altitude, a travel route, an inline stretch value, a range limit, a view selection drop-down box, a channel selection, a color scheme selection, an auto refresh option, a compass, a list of detected objects and/or targets, and/or a tile identification (ID) number.

Figure 33:
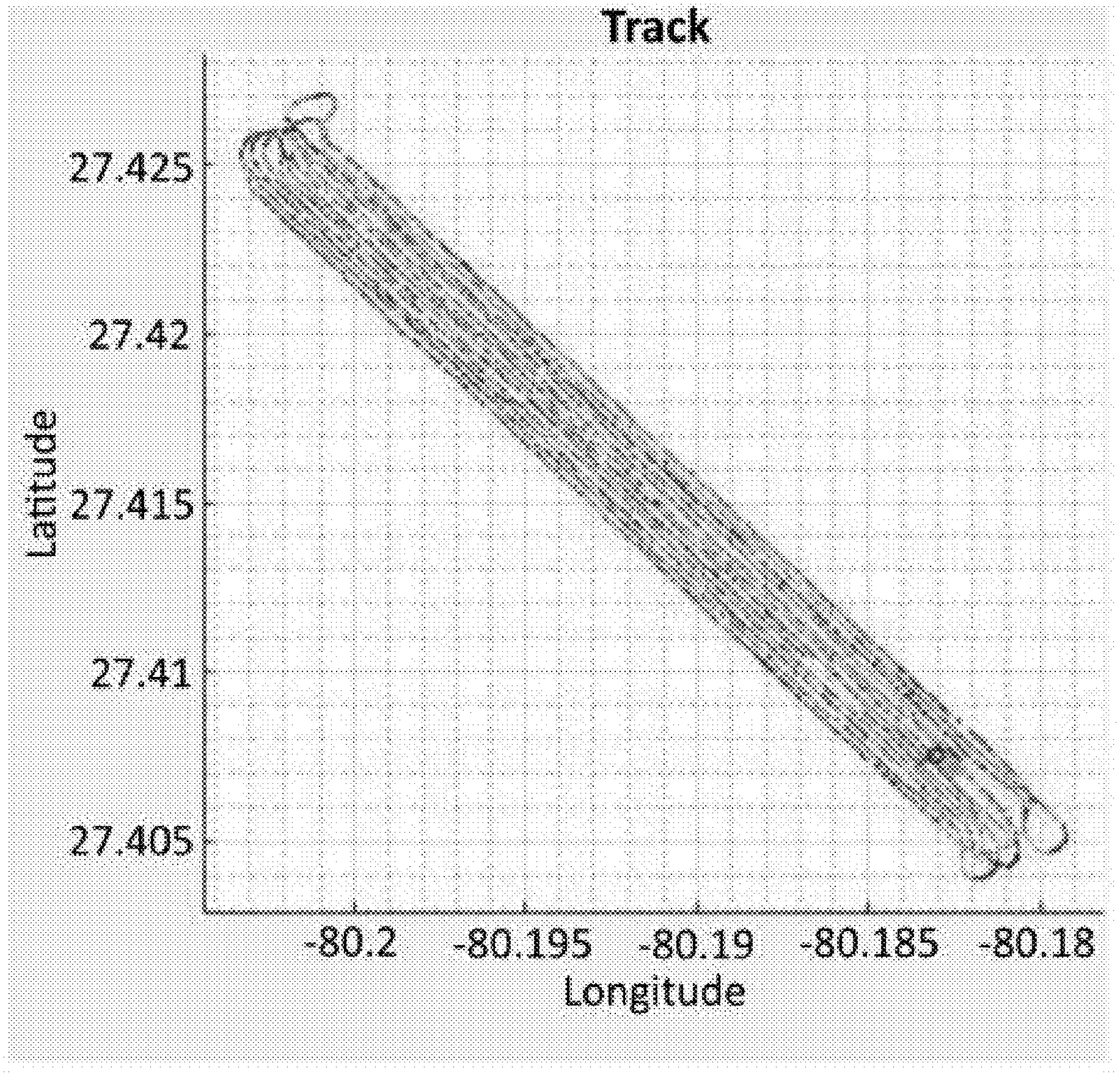
FIG. 33 illustrates a travel route GUI for a radar system (e.g., a CW radar system) according to one embodiment of the present invention.

FIG. 33 illustrates a travel route GUI for a radar system (e.g., a CW radar system) that shows the position of the tow vessel, the shallow tow assist vessel (dingy), and the real-time calculated position of the radar sensor (all three indicated by the box) according to one embodiment of the present invention. The travel route GUI is operable to display information including, but not limited to, a travel route for the radar system (e.g., the CW radar system), an object and/or target detection indication, and/or a depth value. The travel route for the radar system (e.g., the CW radar system) is displayed as a green line, indicating the positions the radar system (e.g., the CW radar system) has traveled over. As the radar system (e.g., the CW radar system) continuously travels over a target region, objects and/or targets are detected by the Rx antennas at the bow and aft of the radar system (e.g., the CW radar system). The stronger the received signal by the Rx antennas, the darker the indication on the map (e.g., the red dots on the map). A cluster of red dots is also an indication of a detected object and/or target, as this indicates a strong signal detected by the bow and aft Rx antennas. In one embodiment, the travel route GUI is displayed using color images. In one embodiment, the travel route GUI is displayed in black and white images.

Figure 34A:
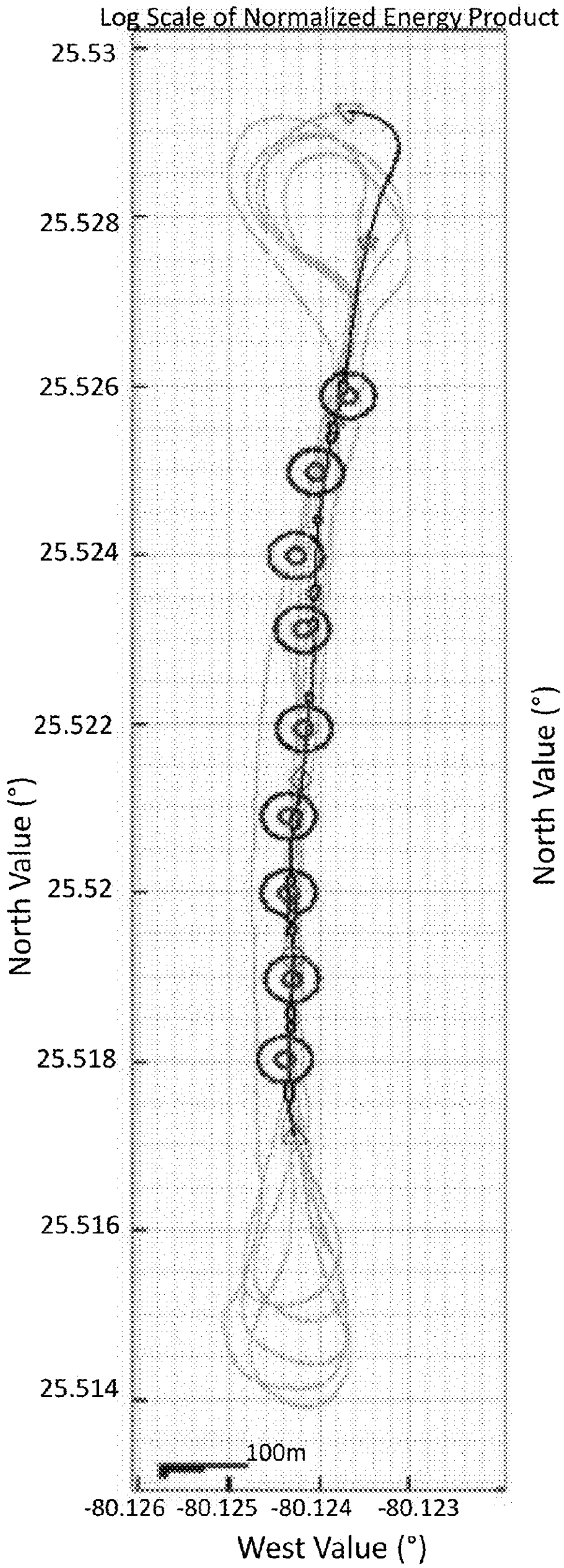
FIG. 34A illustrates a two-dimensional (2D) map indicating a log scale of a normalized energy product for a radar system (e.g., a CW radar system) with no detected targets according to one embodiment of the present invention.

FIG. 34A illustrates a two-dimensional (2D) map indicating a log scale of a normalized energy product for a radar system (e.g., a CW radar system) with no detected targets according to one embodiment of the present invention. The lack of detected objects is indicated by the absence of connecting lines between target points. As the radar system (e.g., the CW radar system) travels over a region, objects are first detected by the bow Rx antennas and then detected a second time by the aft Rx antennas. This detection pattern is visualized by solid lines, indicating that an object and/or target was detected by both sets of Rx antennas as the radar system (e.g., the CW radar system) passed over the object and/or target.

Figure 34B:
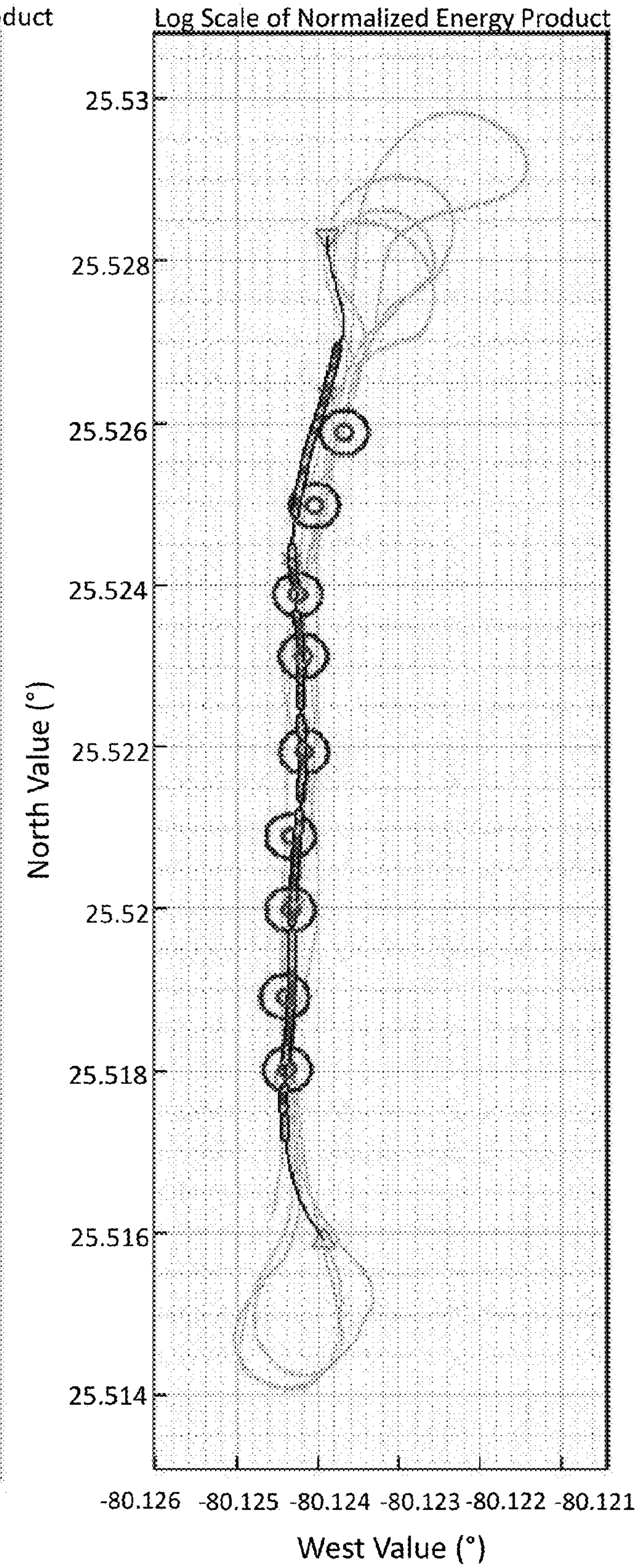
FIG. 34B illustrates a 2D map indicating a log scale of a normalized energy product for a radar system (e.g., a CW radar system) with detected targets according to another embodiment of the present invention.

FIG. 34B illustrates a 2D map indicating a log scale of a normalized energy product for a radar system (e.g., a CW radar system) with detected targets according to another embodiment of the present invention. Detected objects are indicated by the presence of connecting red lines between target zones. These red lines indicate that both the bow and aft Rx antennas received a corresponding return signal from an object and/or target. This occurs as the bow Rx antennas cross over a detected object and/or target and then move away from the detected object and/or target, with the aft Rx antennas then detecting the object and/or target followed by an increase in distance from the object and/or target. Thus, an object is detected by the radar system (e.g., the CW radar system) twice, once as the bow Rx antennas are towed over the object and a second time as the aft Rx antennas are towed over the object. This results in increased accuracy relating to object and/or target detection of both ferrous and non-ferrous metals in saltwater environments.

Figure 35A:
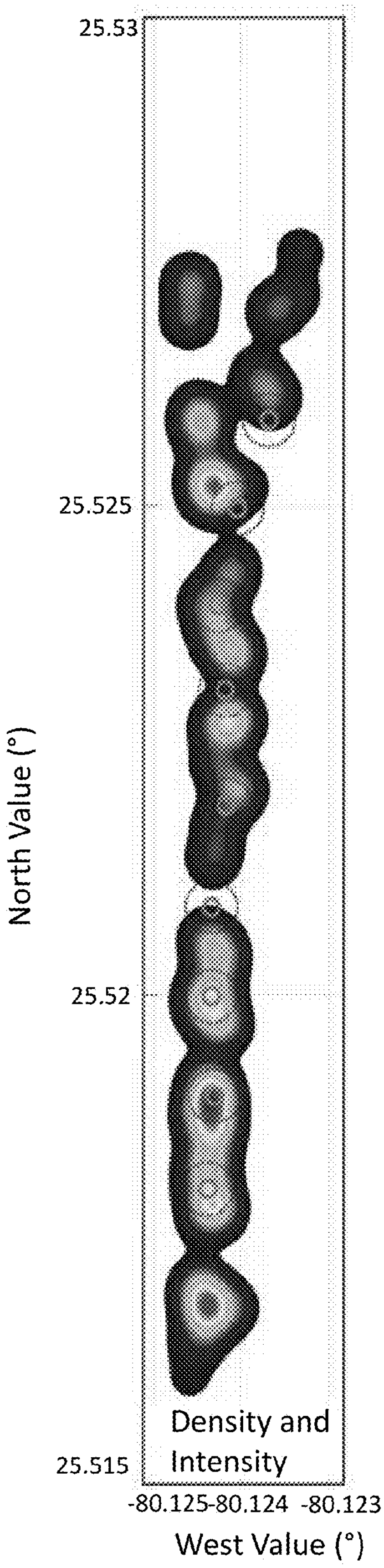
FIG. 35A illustrates a 2D density and intensity map for a radar system (e.g., a CW radar system) according to one embodiment of the present invention.

FIG. 35A illustrates a 2D density and intensity map for a radar system (e.g., a CW radar system) according to one embodiment of the present invention.

Figure 35B:
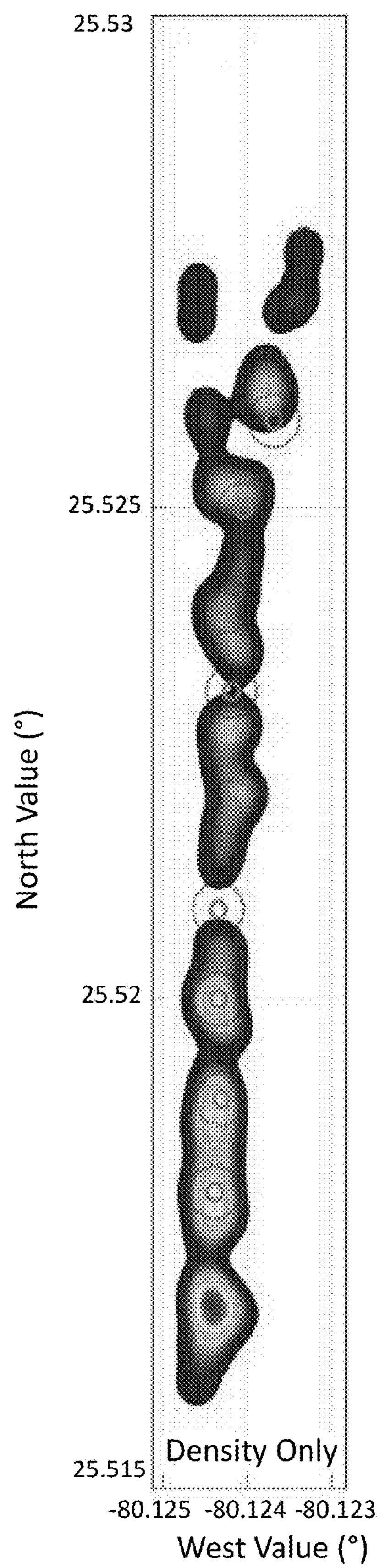
FIG. 35B illustrates a 2D density map for a radar system (e.g., a CW radar system) according to one embodiment of the present invention.

FIG. 35B illustrates a 2D density map for a radar system (e.g., a CW radar system) according to one embodiment of the present invention.

Figure 36:
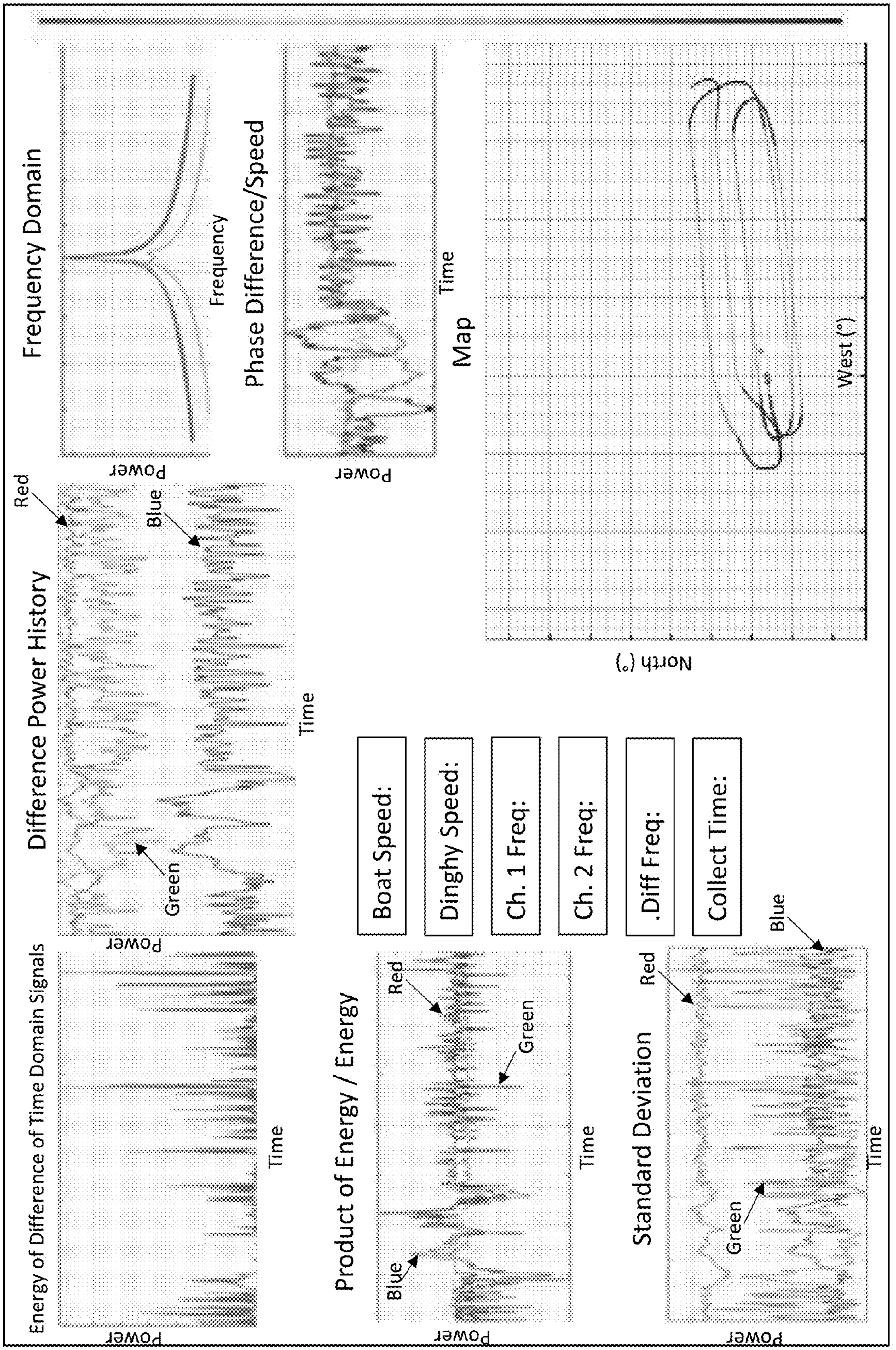
FIG. 36 illustrates a GUI for displaying energy and frequency data associated with a radar system (e.g., a CW radar system) according to one embodiment of the present invention.

FIG. 36 illustrates a GUI for displaying energy and frequency data associated with a radar system (e.g., a CW radar system) according to one embodiment of the present invention. The GUI is operable to display information including, but not limited to, a graph indicating an energy of difference of time domain signals, a graph indicating a product of energy, a graph indicating a standard deviation from antennas and power density, a graph indicating a difference in power history, a survey track map, a boat speed and/or direction, a time, a channel 1 frequency, a channel 1 power value, a channel 2 frequency, a channel 2 power value, a mean, a standard deviation, a frequency offset value, a set of average phase values, a peak frequency distance, and/or a normalized energy product value. The red and blue lines correspond to the signal return from two Rx antennas. The green line is the power density spectrum calculation, which is derived from the signal return of the Rx antennas. The GUI is further operable to display a survey track in the lower right corner of the GUI. In another embodiment, the GUI has a set(s) of user-defined windows to monitor, track, and display various component(s), system(s), and external values.

Figure 37:
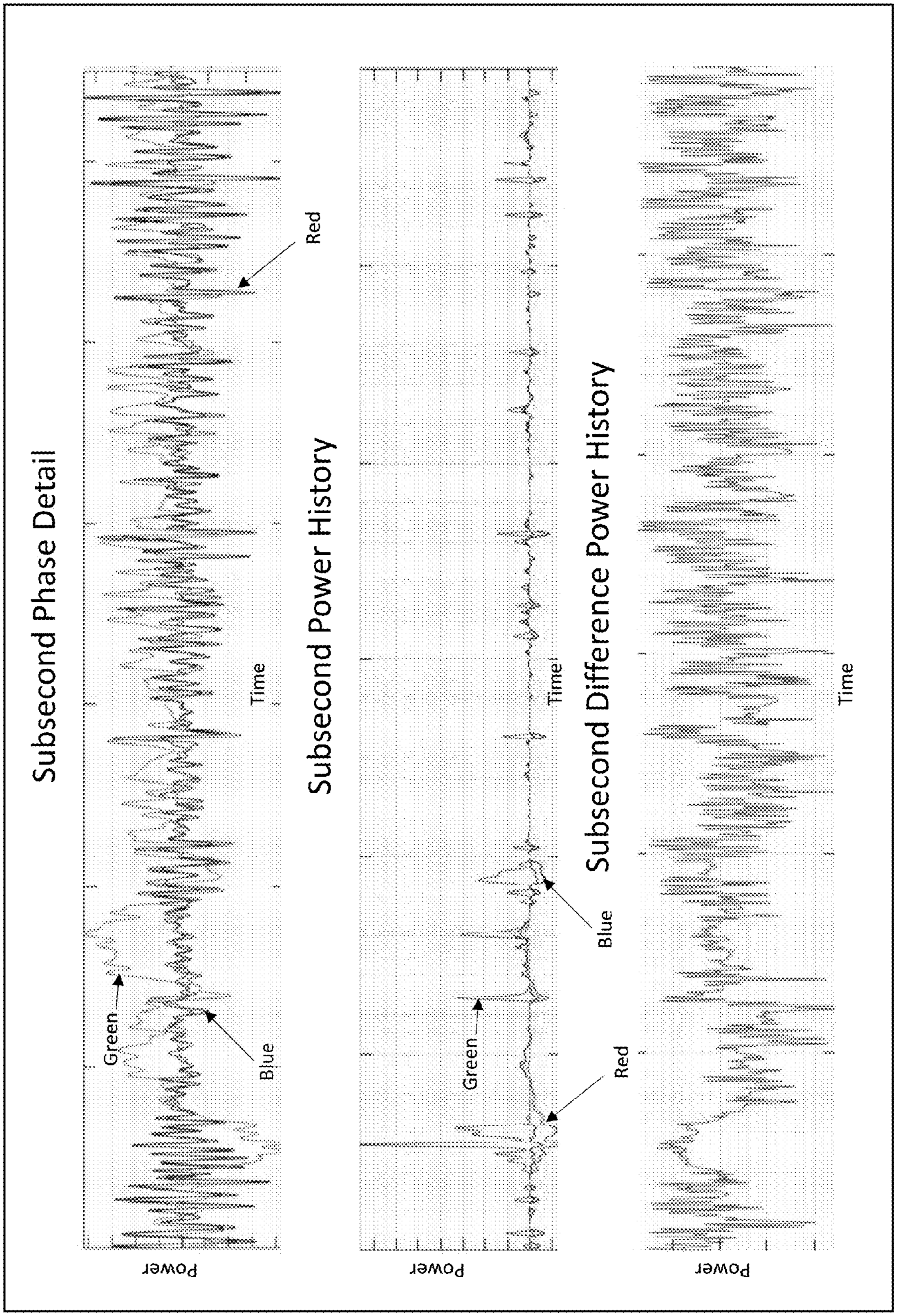
FIG. 37 illustrates a GUI for displaying phase detail and power history data associated with a radar system (e.g., a CW radar system) according to one embodiment of the present invention.

FIG. 37 illustrates a GUI for displaying phase detail and power history data associated with a radar system (e.g., a CW radar system) according to one embodiment of the present invention. The GUI is operable to display information including, but not limited to, a graph indicating subsecond phase detail, a graph indicating subsecond power history for both a bow and aft normalized energy product, and/or a graph indicating a subsecond difference power history using a mean and standard deviation. The blue and red lines correspond to a signal return from two Rx antennas. The green line is a power density spectrum calculation derived from the signal return from the two Rx antennas.

In another embodiment of the processing scheme, the fore and aft Rx antennas for at least two frequencies from at least two sets of Rx antennas are subject to phase array processing by time shifting the samples from the array based on time-distance calculations using information from the multi-GPS geolocation system. This has the impact of focusing the receive beams directly to the side of the sensor head and even with the Tx antennas.

Figure 57:
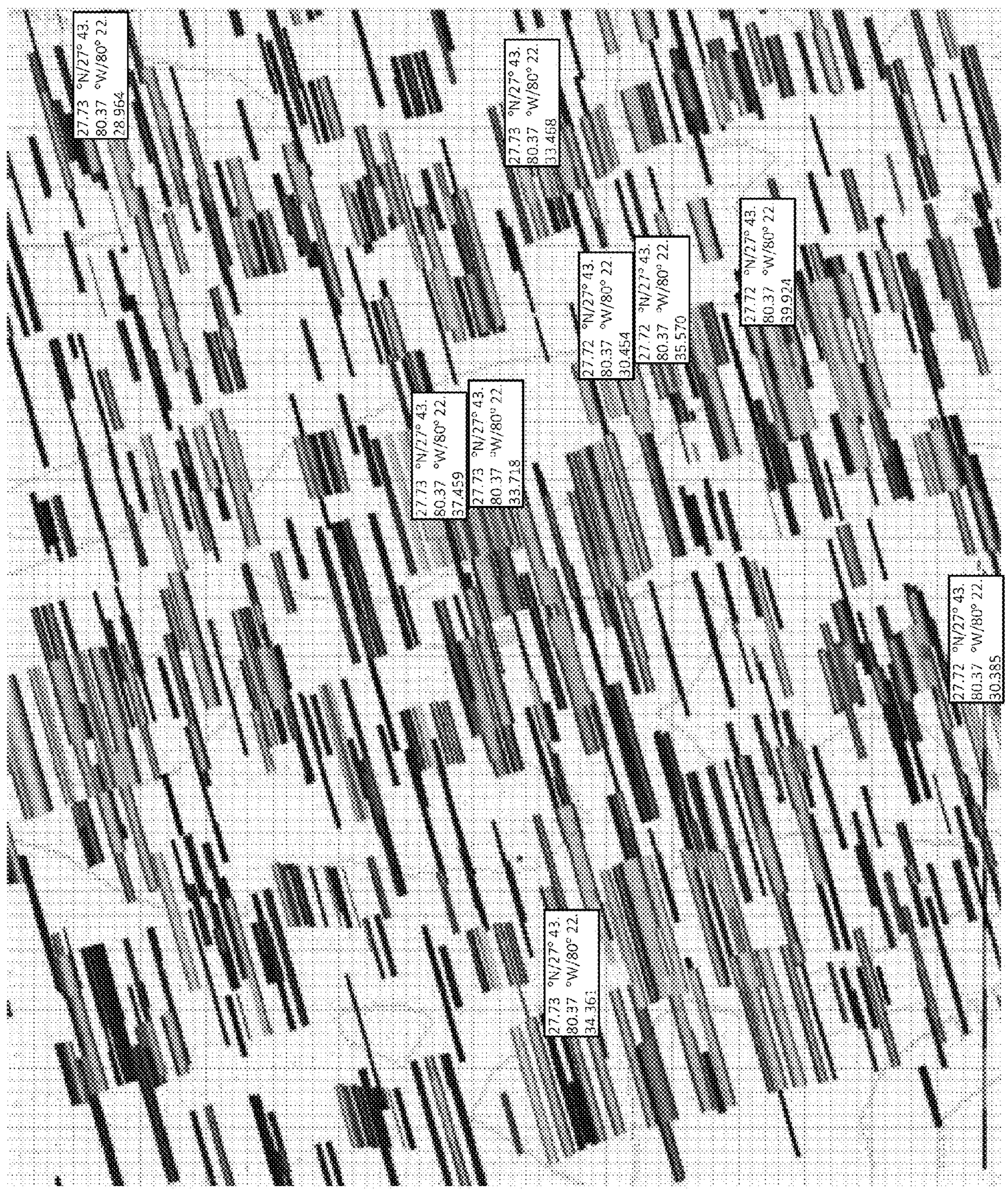
FIG. 57 illustrates one embodiment of an automatic target cueing map created by the analysis software system.

In another embodiment of the processing scheme, the at least two frequencies which are now centered on the respective Tx antennas are again time shifted such that both frequencies are synchronized in time and space. The processing then compares the at least two frequencies for how the constructive and destructive zones are aligned and the approximate range to the target object is calculated. Next, all data for the survey area is similarly processed and mapped. The peak signals where multiple survey lines overlap are determined and the software identifies those possible target locations. FIG. 57 is an illustration of the resulting Automatic Target Cueing product which identifies the most likely target location. The targets "cued" by the software are indicated by the white text filed boxes which show their location and signal strength.

In another embodiment, returns from multiple depths are hypothesized for each target and software then tests each hypothesis. The results from multiple runs are then overlayed and processed using a correlation filter. The result is a three-dimensional map of the sub-ocean floor metal distribution. FIG. 12A illustrates one such site where slices of the sub-ocean floor are taken at 0.91 m (3 ft) intervals once the first object is detected.

Stationary Fence System

Another potential use of the ultra-low frequency electromagnetic wave system is for producing a stationary fence, or shield, system. In this system, instead of constantly radiating waves outward and simply looking for return signals from any direction, one is able to radiate waves in specific directions in order to check if an object crosses a specified boundary. This greatly minimizes the required sensitivity of the receivers involved. While the general frequencies, antenna types used, pre- and post-processing of signals, and other factors are similar between the two systems, the difference in configuration is significant for the type of results being sought.

In a radar embodiment attached to a vehicle for detecting objects within an area, the energy is radiating outwardly and energy dissipates according to an inverse square law (i.e., proportional to $1/r^2$). A very small part of the wave then reflects off the object back towards the source, with the returning wave also dissipating according to an inverse square law, meaning the ultimate power is really proportional to or less than $1/r^4$, meaning that the receiver needs to be amplify the signal greatly. This dissipation is, in part, due to the fact that the receiver antenna and transmitter antenna are very close (e.g., 2 meters away) in this configuration, meaning the return path is roughly equal distance to the transmitter path. This means that the direct path from transmitter to receiver is sometimes a billion times stronger or more than the reflected path, allowing a system with a more direct path to be able to have lower sensitivity.

In the stationary fence system, as discussed further below, the antennas are able to be spaced out at much greater distances (e.g., 10 s of meters) meaning that the signal path is less likely to require reflected waves to fully travel back to the source. As the metal object passes between or near the transmitter and receiver antennas, the energy is slightly altered, allowing for detection of an object without having an inverse quartic dissipation issue. Furthermore, the spacing of antennas allows for a much, much larger detection area than is possible with the mobile, vehicle-mounted system.

In one embodiment, the radar detection system is able to be used to generate a stationary "fence" for detecting, geolocating, and/or identifying different types of objects (e.g., ships, creatures, weaponry, etc.) within a known distance. In one embodiment, the radar detection system is able to identify multiple objects simultaneously. In this way, the stationary fence system is able to detect metal, whether ferrous or non-ferrous), underwater objects or objects having electronic components moving into or out of underwater areas, in addition to detecting changes in the movement of vessels known to be within the area. The stationary fence system is able to detect both continuously moving and intermittently moving objects in the environment.

In one embodiment, the stationary fence system includes at least one signal generator, at least one transmitter antenna, at least one receiver antenna, and at least one signal processor. In one embodiment, the at least one transmitter antenna includes at least one associated signal amplifier. In one embodiment, the at least one receiver antenna includes at least one associated signal amplifier. The signal generated by the signal generator is amplified and transmitted through the at least one transmitter antenna to generate an electromagnetic wave that radiates spherically outwardly and which is reflected by metal objects within a known range. The stationary fence system includes the at least one transmitter antenna and the at least one receiver antenna being stationary (e.g., attached to a stationary surface or buried underneath the surface), while the objects being detected are, typically, moving.

In addition to detecting electromagnetic waves generated by the at least one transmitter antenna and reflected off at least one metal object, the at least one receiver antenna is also able to detect electromagnetic waves generated by other objects in the space, notably including electronic equipment (e.g., personal dive computers, underwater scooter electronics, engine electronics, etc.) that emit radio waves, intentionally or unintentionally. In this way, the system is able to detect nearby electronic equipment even without at least one transmitter antenna.

Figure 67:
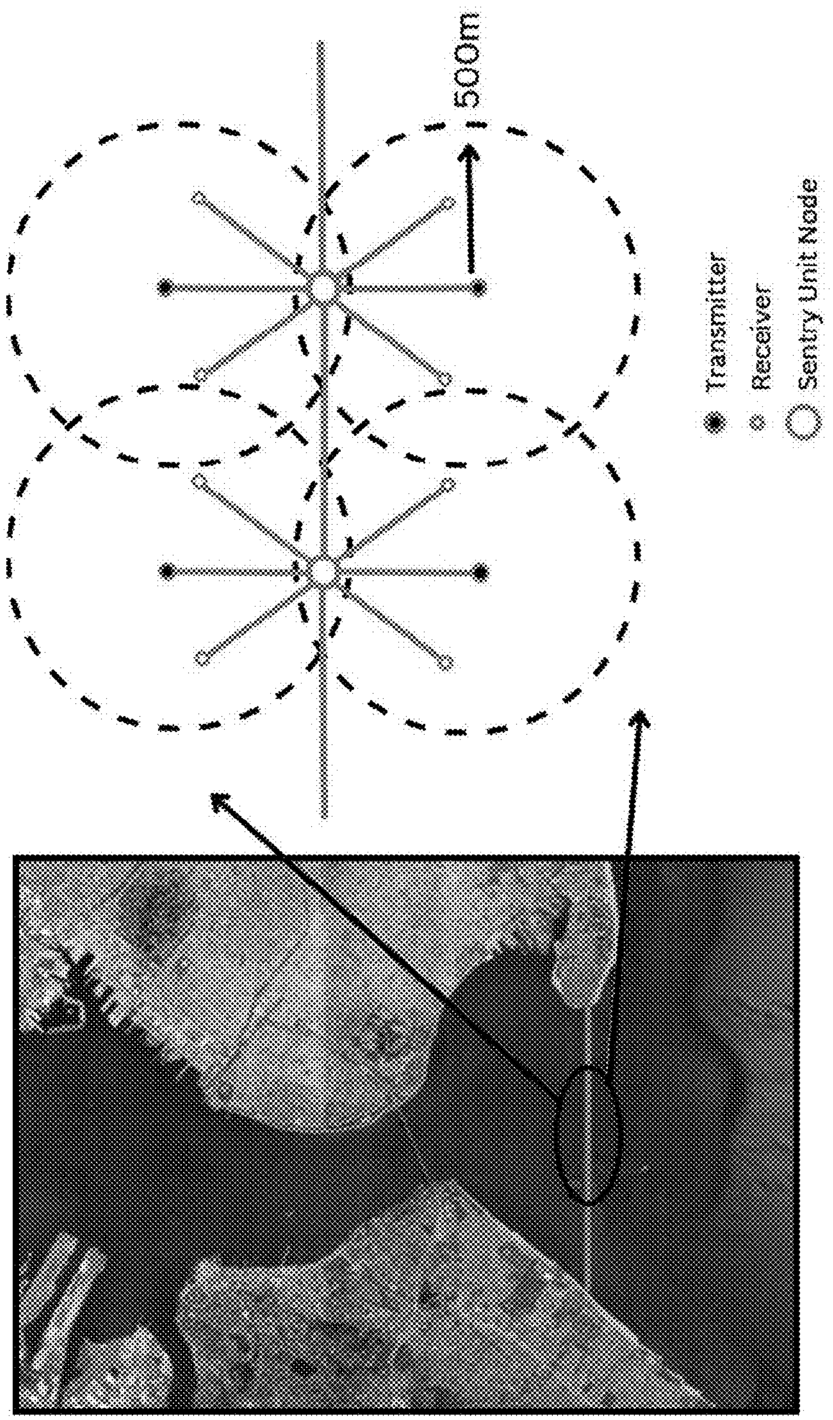

FIG. 67 illustrates the placement of a stationary fence system for a harbor according to one embodiment of the present invention. In one embodiment, the stationary fence system includes a plurality of sentry unit nodes, each connected to one or more transmitter antennas and/or one or more receiver antennas. In one embodiment, the plurality of sentry unit nodes are stretched across a body of water (e.g., from one shoreline to another,), as in a harbor. However, one of ordinary skill in the art will understand that the plurality of sentry unit nodes do not need to be connected at both ends, or even necessarily at any end, to a shore-based system and are able to stretch across any area of water. In one embodiment, each of the plurality of sentry unit nodes is separated by approximately 500 m to allow for wide coverage and to prevent interference between nodes. In another embodiment, each of the plurality of sentry unit nodes is separated by approximately 300 m. One of ordinary skill in the art will understand that the spacing between the plurality of sentry unit nodes is able to vary between approximately 10 m and approximately 1000 m, depending on the allowable, the strength of signal waves being transmitted, and/or other environmental factors. In one embodiment, the space between each of the plurality of sentry unit nodes is approximately uniform, while, in another embodiment, the space between the sentry unit nodes varies, even within a single chain.

Figure 68:
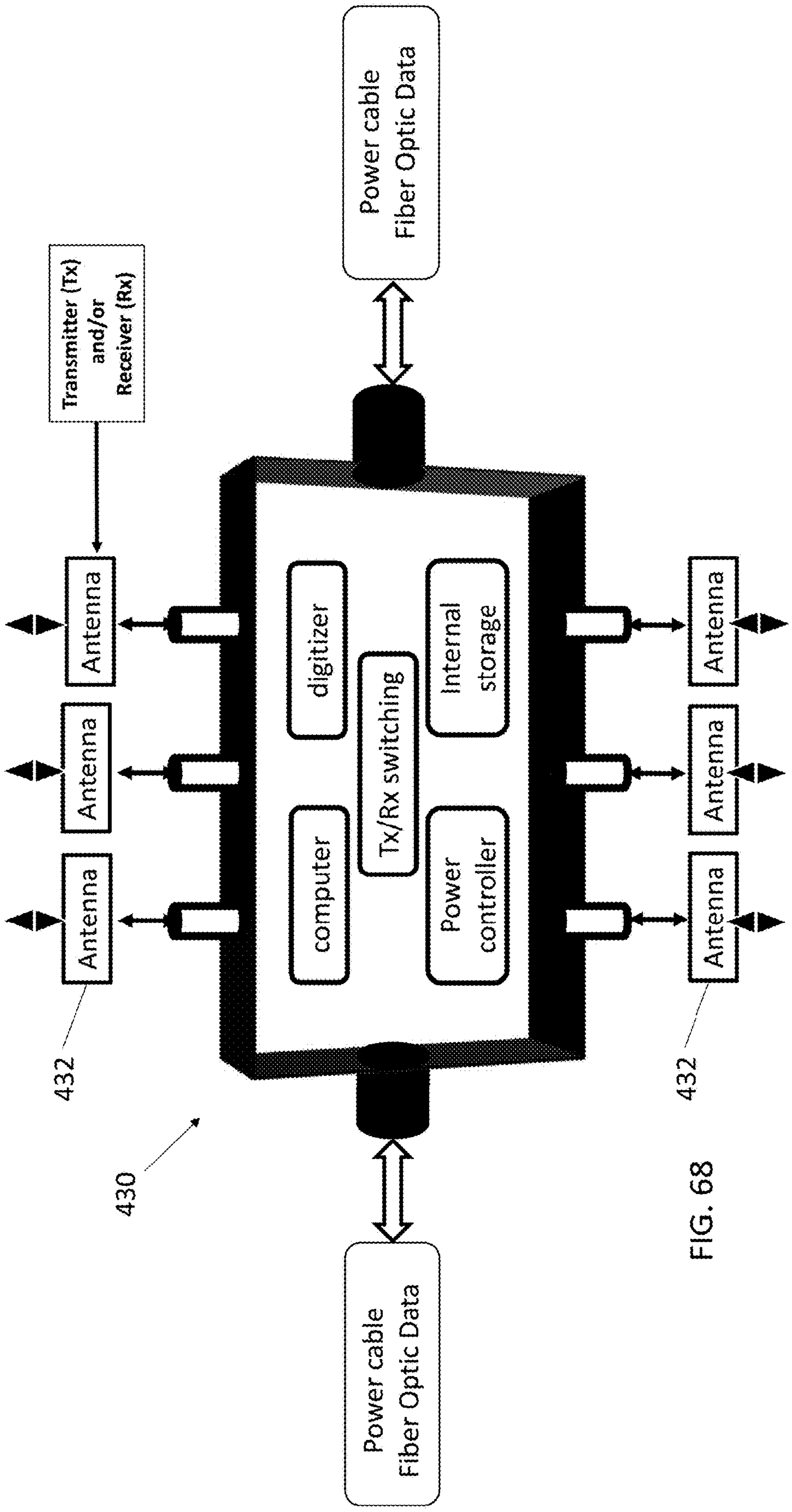

FIG. 68 illustrates a sentry unit node for a stationary fence system according to one embodiment of the present invention. Sentry unit nodes 430 are connected to one or more antennas 432. In one embodiment, the one or more antennas 432 are each able to act as both transmitters and receivers of electromagnetic waves, while, in another embodiment, some of the one or more antennas 432 are specifically transmitter nodes while others are specifically receiver nodes. In one embodiment, the sentry unit nodes 430 include at least one power controller for managing power to electronic components internal to the sentry unit node 430 and/or to the one or more antennas 432. In one embodiment, the sentry unit node 430 is connected to one or more power cables for supply power from a remote power generation source (e.g., a shore power generation system, at least one battery, etc.) to the sentry unit node 430. In one embodiment, the sentry unit node 430 is further connected to at least one data cable for receiving data instructions for signal generation and/or for sending received signal data to a remote processor or database. In one embodiment, the at least one data cable includes at least one fiber optic, twisted pair, coaxial, or any other type of data cable. In a preferred embodiment, power and data are able to flow into and out of (and therefore through) each sentry unit node 430 such that multiple sentry unit nodes 430 are able to be strung in series. In one embodiment, the power and/or data cables attach to each sentry unit node 430 via bulkhead connectors and/or any other type of water tight connector known in the art.

In one embodiment, the sentry unit node 430 includes a computer processing unit able to act as a signal generator for transmitting electromagnetic waves via the one or more antennas 432 and/or to process data received by the one or more antennas 432. In one embodiment, the sentry unit node 430 includes an internal storage operable to save signal data received from the one or more antennas 432 and/or signal generation instructions to send to the one or more antennas 432. In one embodiment, the sentry unit node 430 includes at least one digitizer for converting received signal information from the one or more antennas 432 into digital data. In one embodiment, the sentry unit node 430 includes switching firmware for switching at least one of the one or more antennas 432 between transmitting and receiving modes. In one embodiment, each sentry unit node 430 is formed from a water tight material (e.g., polyethylene terephthalate, metal, and/or one or more plastic materials). In one embodiment, the sentry unit nodes 430 are formed from a non-conductive material. However, the sentry unit nodes 430 are not required to be non-conductive in order to function and, in other embodiments, the sentry unit nodes 430 are formed, at least in part, from conductive materials.

Figure 69:
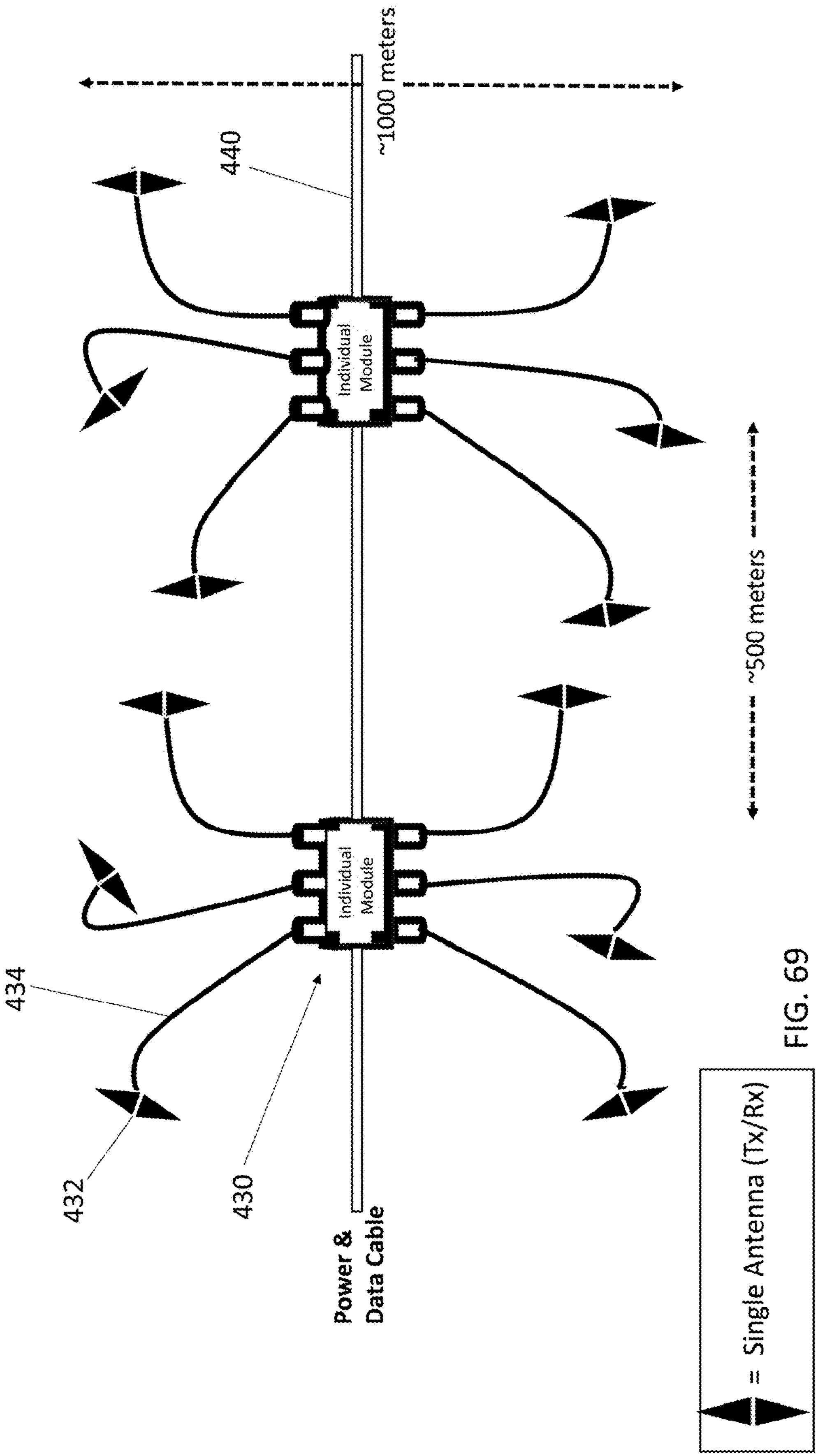

FIG. 69 illustrates multiple chained sentry unit nodes for a stationary fence system according to one embodiment of the present invention. In one embodiment, a plurality of sentry unit nodes 430 are attached, via power cables and/or data cables 440, in series with each sentry unit node 430 connected to one or more antennas 432. In one embodiment, each sentry unit node 430 is connected to the one or more antennas 432 via one or more control or data cables 434. In one embodiment, the control or data cables are attached to the one or more antennas 432 and/or to the sentry unit node 430 via water tight connectors.

Each antenna 432 is able to act specifically as a transmitter or specifically as a receiver, or is switched back and forth to operate as a transmitter or receiver by the sentry unit node 430. Antennas being able to switch back and forth between operating as transmitters and receivers is advantageous in detecting and identifying targets of interest, especially if each antenna 432 is spread out across wide distances. In particular, if a first receiver detects an object moving toward a second antenna, then the sentry unit node 430 is able to switch the second antenna from acting as a transmitter to a receiver.

In one embodiment, each antenna 432 is able to receive uniform or various power levels and is able to transmit the same or distinct frequency signals relative to other antennas in the system. In one embodiment, each antenna 432 transmits a signal frequency at a given time or the antennas 432 are able to transmit multiple frequencies simultaneously. In one embodiment, each antenna is electrically separated from other antennas, both those connected to the same sentry unit node 430 and/or other sentry unit nodes 430. Each antenna 432 is able to be used in any physical orientation (e.g., in horizontal or vertical polarity, or in parallel or perpendicular to the ocean surface or seabed) regardless of whether the antenna 432 is being used as a transmitter or receiver. Each antenna 432 is able to be constructed as an electrical or magnetic dipole or be components of a phased array system. Each antenna 432 is able to be formed from any type of material (e.g., metal, polymer, etc.).

Figure 70:
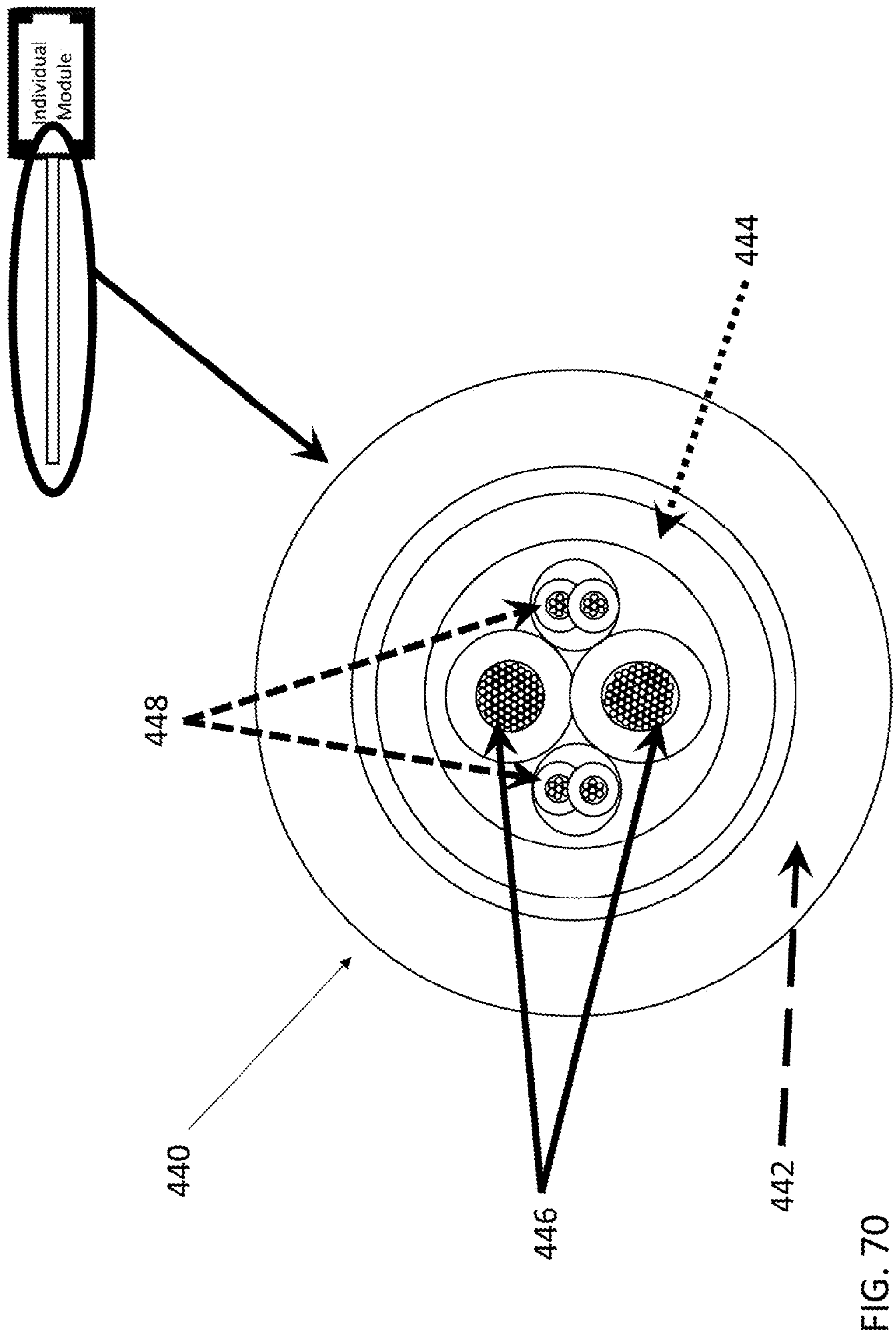

FIG. 70 illustrates a cross-sectional diagram of a cable for connecting sentry unit nodes according to one embodiment of the present invention. In one embodiment, each sentry unit node 430 is connected by at least one cable 440. In one embodiment, the at least one cable 440 includes at least one power cable 446 and at least one data cable 448 (e.g., fiber optic cable, twisted pair cable, coaxial cable, etc.) within a single cable sheath. In one embodiment, the cable sheath includes a first ground reinforced protection layer 444 and at least one saltwater sheath 442 in order to insulate and protect the at least one power cable 446 and the at least one data cable 448 from water infiltration or other damage. In one embodiment, the at least one power cable 446 is connected to at least one onshore power source (e.g., a battery, a generator, etc.) and/or at least one offshore power source (e.g., an offshore wind turbine, an offshore wave power generator, etc.).

In one embodiment, the at least one power cable 446 and/or the at least one data cable 448 are connected with at least one onshore command center. In one embodiment, the at least one onshore command center includes systems for controlling the sentry unit nodes, establishing communications with one or more other command centers or external sources, processing data received from the sentry unit nodes, storing data from the sentry unit nodes, and/or managing power supply to the sentry unit nodes. Therefore, the at least one onshore command center is able to serve as a command and control hub for the sentry unit nodes, to check the system health of the stationary fence system, and to detect and track objects proximate to the stationary fence system. In one embodiment, the at least one onshore command center transmits data to a remote site for Tier II and Tier III post-data processing reports. In one embodiment, initial processing of the signal data is performed on the sentry unit nodes before being transmitted to the at least one onshore command center.

Figure 71:
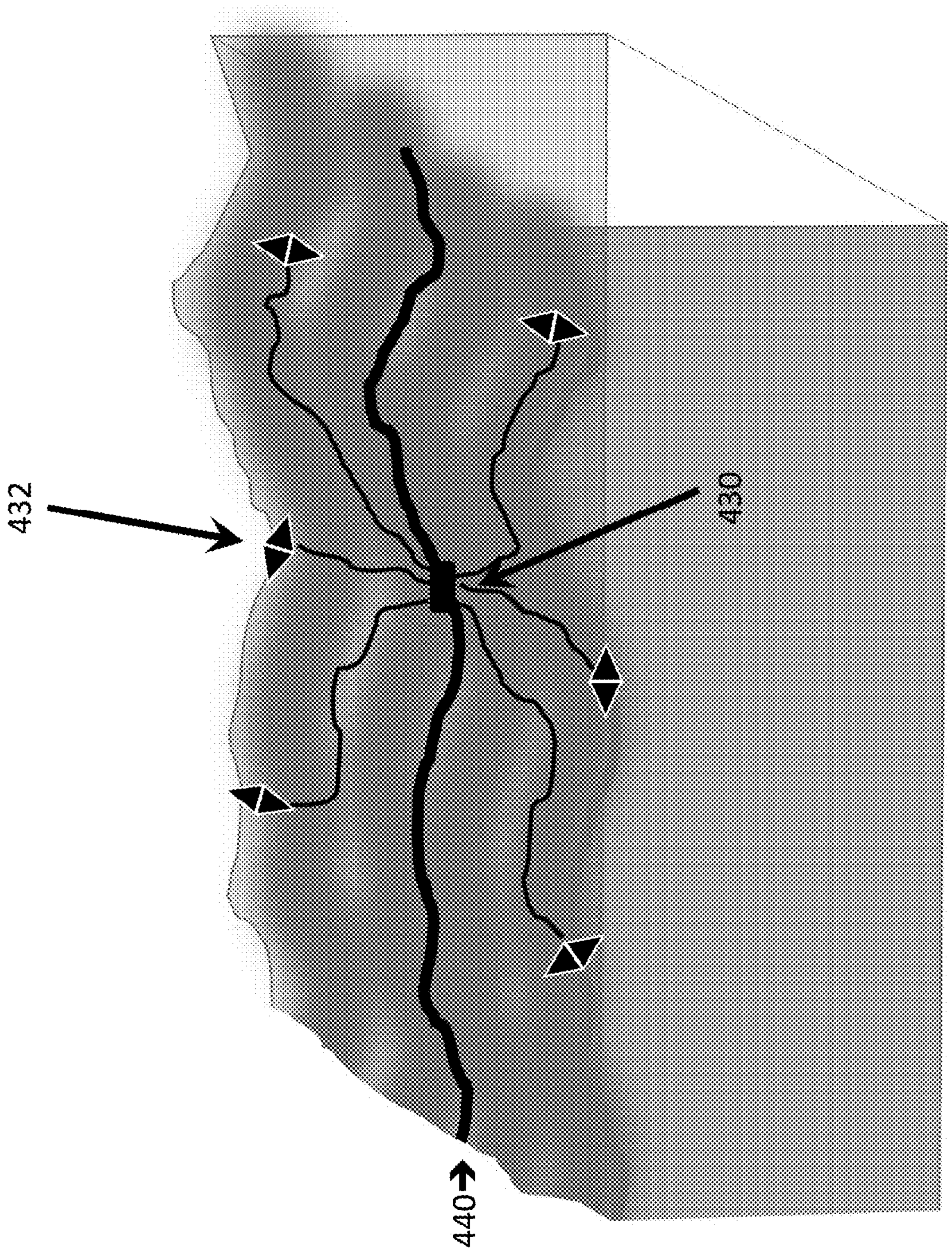

FIG. 71 illustrates an example of a stationary fence system lying on a seafloor according to one embodiment of the present invention. In one embodiment, as shown in FIG. 71, the sentry unit node 430, the plurality of antennas 432, and/or a power and/or data cable 440 are attached to or resting on the seabed. In this embodiment, physical separation of the antennas 432 helps to electronically isolate the antennas 432 from each other. In this embodiment, cross-polarization is not required.

Figure 72:
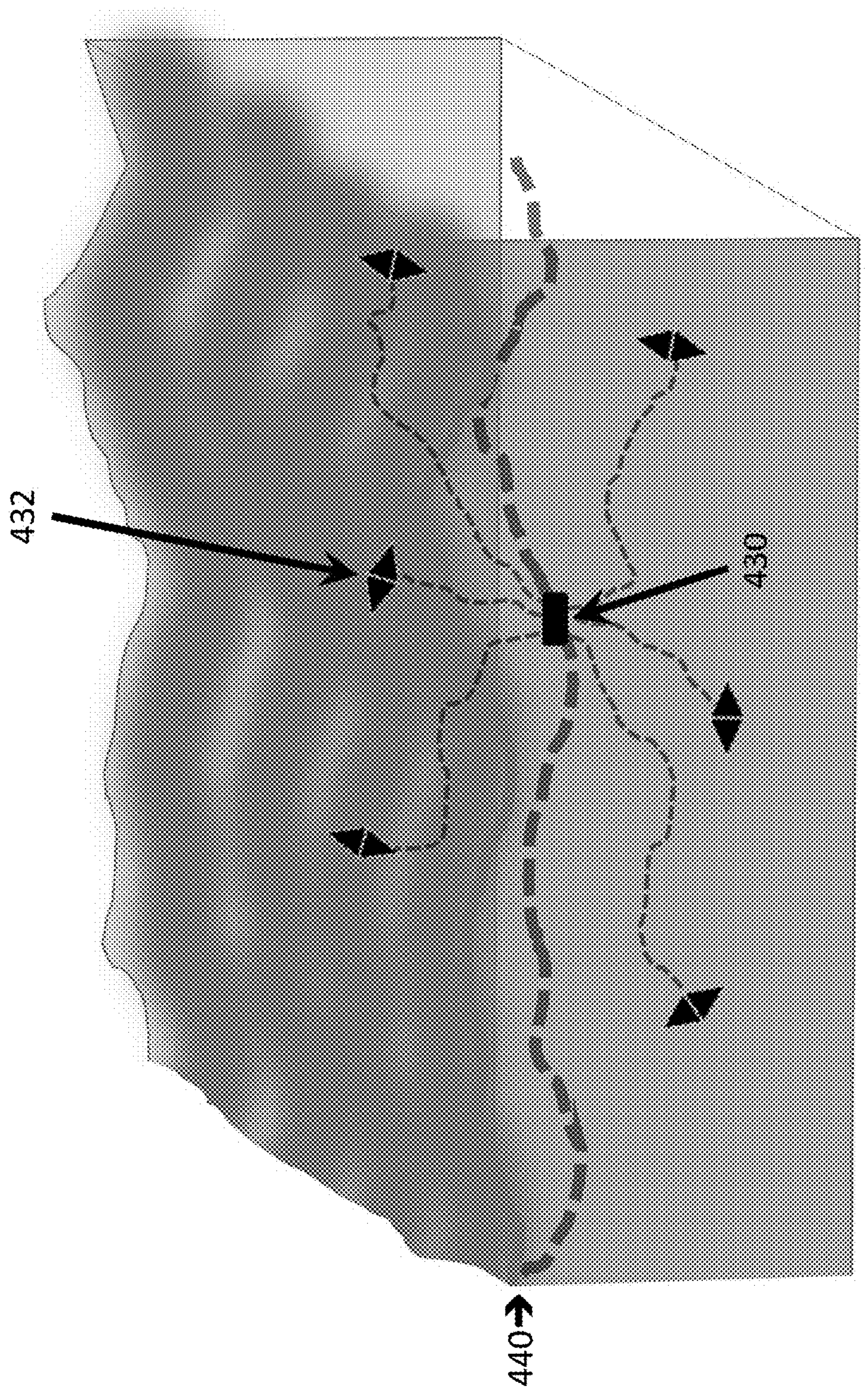

FIG. 72 illustrates a buried stationary fence system according to one embodiment of the present invention. In another embodiment, as shown in FIG. 72, the sentry unit node 430, the plurality of antennas 432, and/or the power and/or data cable 440 are buried underneath the seabed, within sand, silt, mud, coral, and/or other seabed materials. In one embodiment, this burying is performed at installation while, in another embodiment, the elements of the system are naturally covered over time. Crucially, because of the radar system's ability to penetrate the seabed, the buried elements are able to continue to operate and detect objects even while buried. Furthermore, the antennas 432 do not need to be placed in areas devoid of metal or debris, allowing for much better adaptability to various locations. Antennas are able to be grouped on one side of the power and/or data cable, grouped in specific topography regions, and/or distributed evenly across regions. Coverage of the stationary fence systems depends on the location and density of antennas per cubic volume. In one embodiment, the antennas 432 remain static and in place during use, while, in another embodiment, the antennas 432 are dynamically moveable and able to be specifically moved to better capture a suspected target after initial detection. In one embodiment, the antennas 432 are able to dynamically raise or lower in elevation after receiving commands from the sentry unit nodes 430.

Burying the antennas is advantageous for protecting the antennas 432 from the elements and/or from accidental damage from vessels such as fishing ships.

Figure 73:
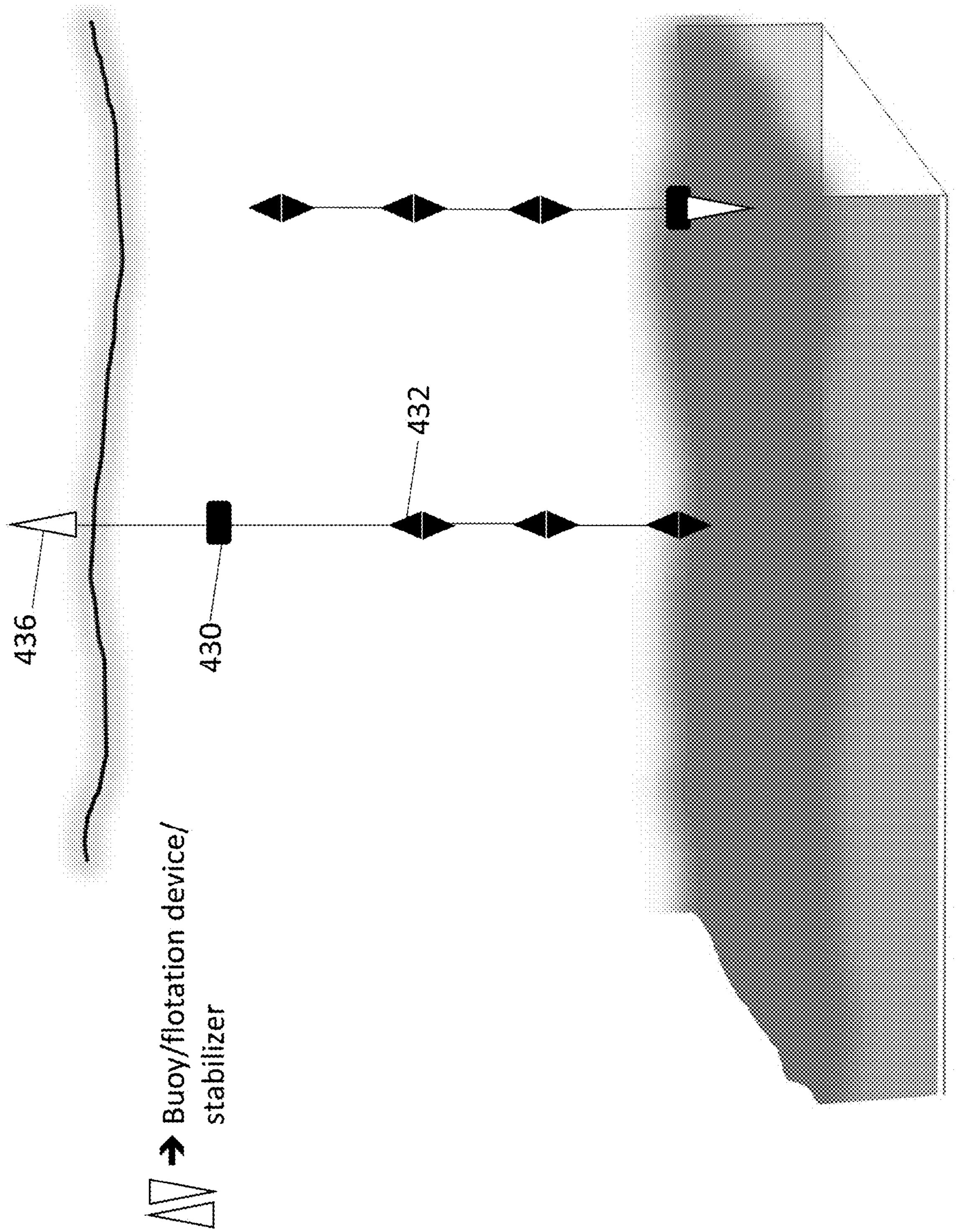

FIG. 73 illustrates a floating stationary fence system according to one embodiment of the present invention. In one embodiment, one or more of the antennas 432 are connected by one or more cables to at least one sentry unit node 430. In one embodiment, at least one power cable and/or at least one data cable connects the sentry unit node 430 to at least one buoy 436 or other flotation device. In one embodiment, instead of all antennas 432 being directly connected to the sentry unit node 430, one or more antennas 432 are connected in series (i.e., a second antenna is directly connected to a first antenna, which is directly connected to the sentry unit node 430). In this embodiment, gravity is able to maintain separation, barring precarious environmental conditions that cause great shifts, between the one or more antennas 432 based on the length of the cables connected each antenna 432. In one embodiment, the at least one buoy 436 or other flotation device is able to provide power to the system via at least one on-board battery and/or energy generation system (e.g., at least one solar panel, at least one wind turbine, at least one wave or tidal power generator, etc.). In one embodiment, instead of utilizing a buoy or other flotation device, the sentry unit node 430 is connected to at least one weighted stabilizer (e.g., at least one anchor) that holds the sentry unit node 430 and/or one or more antennas 432 to the seabed via weighting. In one embodiment, as shown in FIG. 73, different combinations of buoys 436, weighted stabilizers, and/or connections to onshore units are utilized for one or more stationary fence systems.

The stationary fence system is able to communicate with at least one on-shore location, subsurface vessels, and/or with other stationary fence equipment via encrypted communications. In one embodiment, the stationary fence system acts as a standalone detection system, while in another embodiment, it acts as a component of a relay system in communication with other stationary fences or other equipment.

Figure 74:
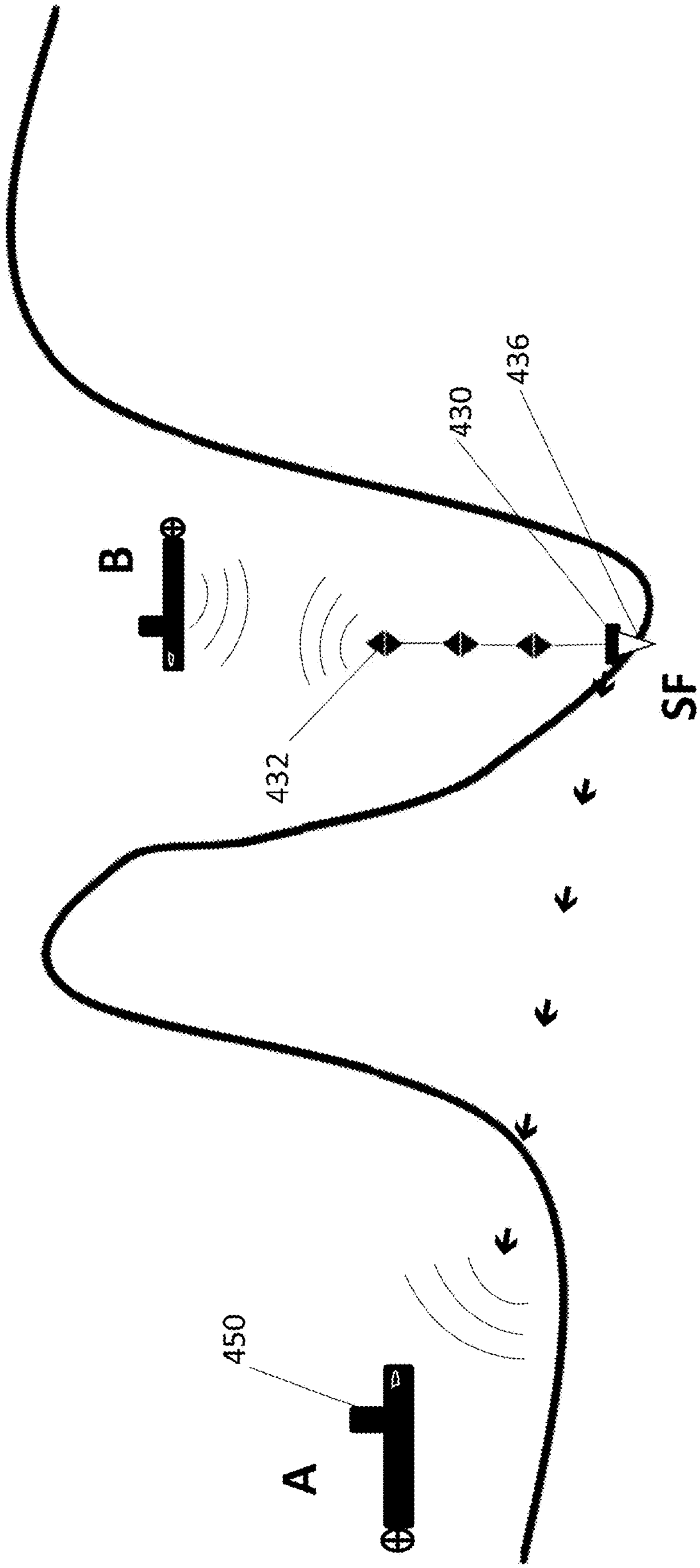

FIG. 74 illustrates a schematic of a stationary fence system detecting vessels through underwater obstacles according to one embodiment of the present invention. In one embodiment, the stationary fence system is placed on uneven terrain such that there is not an interrupted line of visibility between the antennas 432 and at least one detected object 450. Fortunately, because the electromagnetic waves used in this system are capable of penetrating and detecting (or communicating with) objects behind material such as sand, silt, mud, and/or other seabed materials, the objects 450 are still able to be detected by the system. Advantageously, this also allows the antennas 432 to be purposefully positioned such that they are out of sight of approaching objects while still being able to detect those approaching objects. It should further be noted that, as shown with respect to object B, the stationary fence system is able to be used not only to detect unintentionally passive signals produced by electronics, but also able to detect intentional transmissions from one or more vessels, allowing the stationary fence system to also act as a communication relay for friendly vessels.

In one test of the stationary fence system, the system of the present invention was able to detect 100 different vessels, with two types of returned signals. The first was a “glint” return from the propellers (between 23 and 38 cm in diameter) of boats, which occurs when the geometry of the detection results in a specular (i.e., a strongly directional) return. Glint returns were able to be detected at a range of 300 m or more. These glint returns tended to occur a single time as the boats passed through the detection region and were stronger than the second type of return, a hull or body return. The hull or body returns were detectable at distances of 150 m for larger vessels and are smoother and longer lasting than glint returns on average. Each detected vessel was less than 20 m in length, indicating strong performance even for detecting smaller objects, and therefore an even greater detection range for larger vessels.

The stationary fence system is able to rely on both passive and active detection of vessels. Passive detection occurs when an electrical signal is given off by the target vessel and the detection is therefore not based on a signal transmitted by the stationary fence system itself, while active detection is based on signals generated by the stationary fence system and reflected off the detected objects. Passive detection operates on unintentionally radiated emissions (URE) from a target and provides for a covert means of detection because no signals are emitted from a detection system. The passive detection of the present invention was able to identify signals of 11 vessels within 15 minutes at distances of up to approximately 230 m.

In one embodiment, the stationary fence system is able to detect vessels out to at least 2 km in distance.

FIG. 75 illustrates a stationary fence system utilizing a transponder according to one embodiment of the present invention. In one embodiment, the stationary fence system is integrated with at least one transponder 452. The at least one transponder 452 is able to act as a relay device for communicating between at least one vessel 450 and the one or more antennas 432, or the at least one transponder 452 is able to act as another antenna in the stationary fence system.

The at least one transponder 452 is able to receive signals (e.g., via satellite communications, mobile phone communications, wireless personal area network (BLUETOOTH) communications, shortband radio communications, airborne radar communications, etc.) and retransmit those communication underwater in order to extend the range to underwater equipment or vessels. In one embodiment, the at least one transponder 452 is able to communicate instructions to and/or receive data from at least one sentry unit node 430 if the at least one sentry unit node 430 suffers damage to a direct data cable for communicating with the shore (or if no such line exists in the first place).

Toroid Antennas

Inherently, CW radar systems include some constructive zones, where objects are able to be detected by an increase in the direct path signal and the combined target signal, destructive zones, where objects can be detected by a decrease in the direct path signal and the combined target signal, and a cross-over region, where objects cannot be detected when the target is at a range where the combined signal transition between constructive-destructive or destructive-constructive occurs. Energy from a linear sequence radar system according to various embodiments of the present invention is operable to greatly reduce the cross-over zone where objects cannot be detected. Various embodiments disclosed include transmitter and receiver antennas. In one embodiment, each receiver antenna includes its own processing chain operable to apply phase shifts to digital data created in the processing chain via a transmitter antenna. Inherently, a transmitter antenna includes a signal generator operable to generate a signal that the transmitter antenna emits. Inherently, a receiver antenna includes a signal processor operable to process the signal emitted by the transmitter antenna and/or a return signal from a target object. The phase shift is operable to create a synthetic antenna pattern seen only in the receiver antenna. Thus, combining receiver digital data allows the system to effectively focus on any area within the field-of-view. In one embodiment, the processing chain is operable to apply more than one phase shift simultaneously when using a computer cluster, or nearly simultaneously when using a single processor computer system. In another embodiment, the processing chain applies more than one phase shift in series. Thus, the processing chain is able to create synthetic zones to reduce the regions where objects cannot be detected. Effectively, the receiver is focused everywhere simultaneously with all the advantages and increased sensitivity and directivity seen in traditional phased array radars.

FIG. 76 illustrates an antenna 500 including a rod 503, an inner toroid stack 504, an outer toroid stack 505, adhesive 502, and wire wrapping 501 according to one embodiment of the present invention. The rod 503 is not limited to a particular material. In one embodiment, rod 503 includes inductive material. In a further embodiment, the inductive material includes steel and/or iron. In another embodiment, rod 503 includes a non-magnetic material.

The length and diameter of the rod 503 correlate to the desired frequency, desired output, and specific application. As such, the rod 503 is operable to vary in length and is not limited to a specified length. In one embodiment, the rod 503 has a length between about 0.1 meters to about 2.5 meters. In another embodiment, the rod 503 has a length between about 0.5 meters and about 1.5 meters. In a preferred embodiment, the rod 503 has a length of about 1.2 meters. Further, the rod 503 is operable to vary in diameter and is not limited to a specific diameter. In one embodiment, the rod 503 has a diameter between about 1 centimeter and about 10 centimeters. In another embodiment, the rod 503 has a diameter between about 2 centimeters and about 3 centimeters.

Fabrication of an antenna directly from ferrite material is impractical because there is little to no commercial market. Therefore, there exists an unmet need to produce an antenna operable to transmit and receive electromagnetic waves without disturbing the magnetic field strength and magnetic flux. In one embodiment, the inner toroid stack 504 and the outer toroid stack 505 include ferrite material. In another embodiment, the inner toroid stack 504 and the outer toroid stack 505 include non-ferrite material.

The inner toroid stack 504 includes at least one inner toroidal ring around the rod 503. The at least one inner toroidal ring includes an inner circumference and an outer circumference. In one embodiment, the inner circumference of the at least one inner toroidal ring is approximately equal to an outer circumference of the rod 503 such that it creates an air-tight seal between the inner circumference of the at least one inner toroidal ring and the outer circumference of the rod 503. In another embodiment, the circumference of the at least one inner toroidal ring is slightly larger than the circumference of the rod 503. In another embodiment, the inner toroid stack 504 includes a plurality of inner toroidal rings stacked on top of one another. In this embodiment, the inner toroid stack 504 is compressed together such that there is no air between each of the plurality of inner toroidal rings. Further, each of the plurality of inner toroidal rings is positioned around rod 503. In one embodiment, the outer toroid stack 505 has a length approximately equal to that of the inner toroid stack 504. In another embodiment, the outer toroid stack 505 has a length different than that of the inner toroid stack 504. In yet another embodiment, the inner toroid stack 504 is mounted to the rod 503.

The outer toroid stack 505 includes at least one outer toroidal ring with an inner circumference larger than an outer circumference of at least one inner toroidal ring such that the at least one inner toroidal ring is nested in the outer toroidal ring. In one embodiment, the outer toroid stack 505 includes a plurality of outer toroidal rings stacked on top of one another. In this embodiment, the outer toroid stack 505 is compressed together such that there is no air between each of the plurality of outer toroidal rings. In one embodiment, the outer toroid stack 505 has a length approximately equal to that of the inner toroid stack 504. In another embodiment, the outer toroid stack 505 has a length different than that of the inner toroid stack 504.

In one embodiment, the antenna 500 is operable to include any number of toroid stacks such that each toroid stack increases an overall circumference of the antenna 500. For example, each additional toroid stack is larger than a previous toroid stack such that the larger toroid stack surrounds the previous toroid stack. There is no limit to how many additional toroid stacks are able to be included.

Specific rod 503 length, inner toroid stack 504 length, and outer toroid stack 505 length are determined by a computer system. Once rod 503 length, inner toroid stack 504 length, and outer toroid stack 505 length are selected for, the desired frequency, desired output, and specific application, non-magnetic washers and nuts are placed on a first end and a second end of the rod 503 to secure the inner toroid stack 505 and the outer toroid stack 505 in place. The washers and nuts are tightened such that sufficient pressure is placed on the inner toroid stack 504 and the outer toroid stack 505 to ensure no air gaps are formed anywhere within the inner toroid stack 504 and the outer toroid stack 505. There is no air gap between inner toroidal rings. There is no air gap between outer toroidal rings. There is no air gap between the inner toroid stack 504 and the outer toroid stack 505. In one embodiment, there is no air gap between the inner toroid stack 504 and the rod 503.

In one embodiment, an adhesive 502 coats the outer circumference of the outer toroid stack 505. In one embodiment, wire wrapping 501 is wrapped along the length of the outer toroid stack 505. In another embodiment, wire wrapping 501 is customizable to fit the design criteria of a desired inductance. Wire wrapping 501 is operable to induce an oscillating magnetic field. In one embodiment, the wire wrapping 501 preferably covers at least a majority of the outer toroid stack 505. The antenna 500 is operable to pair with a high voltage capacitor to tune resonant frequency of the antenna 500 to the desired frequency. The antenna 500 is operable to link to an amplifier via cabling through an impedance matching network. The impedance matching network has been shown to provide 90% efficient coupling of the amplifier power to the antenna 500.

The wire wrapping 501 requires precision. In one embodiment, wire wrapping 501 is tightly wrapped around the outer circumference of the outer toroid stack 505. In a preferred embodiment, the wire wrapping 501 includes separation between adjacent sections of the wire wrapping of between about 0.3 mm and about 0.9 mm along a length of the antenna 500.

Traditionally, wire wrapping around ferrite material operates in air, rather than water. Using air as the propagation medium, transmitters operate at such a low frequency that the wavelengths generated are too long for practical use in salt water. The ultra-low frequency of air operating antennas creates issues with power measurements. Because the frequency is so low, the system operates at immeasurable voltages. Surprisingly, wire wrapping around concentric toroid stacks around a ferrite material operating in salt water drastically shortens the wavelength compared to the same antenna operating in the air. Thus, the antennas described herein are proportionally longer than traditional above water antennas relative to the wavelength and couple energy into the surrounding saltwater with dramatically greater efficiency. In one embodiment, the coupling efficiency increases by over 15,000 times. Antenna power levels are adjustable based on frequency selection. Adjusting antenna power levels influences wavelength, amplifier power supplied to the antennas, the type of ferrite used, the number of turns of wire wrapping, the type of rod (or other material used for the core), and the final diameter and length of the inner and outer toroid stack. In one embodiment, an individual antenna transmits power above 50 watts in saltwater.

FIG. 77 illustrates a radar system (e.g., a CW radar system) according to yet another embodiment of the present invention including a towing vessel, a towing cable, a transmitter antenna, and a receiver antenna. The receive antenna is operable to receive at least one return signal from a target area. In this embodiment, the transmitter antenna and the receiver antenna are towed by the towing vessel via the towing cable in a linear train, sequence, strand, and/or array. In one embodiment, the transmitter antenna and receiver antenna are oriented end-on to the direction of travel of the towing vessel. The antennas are separated by a sufficient distance to achieve the necessary electrical isolation to prevent self-jamming. Preferably, the radar system operates efficiently when towed at high speeds. In one embodiment, the radar system is operable to be towed by the towing vessel between about 0.5 and about 60 knots.

FIG. 78 illustrates a linear sequence radar system (e.g., a CW radar system) according to yet another embodiment of the present invention including a towing vessel, at least two receiver antennas, a transmitter antenna, and a towing cable. The transmitter antenna includes a signal generator operable to generate a signal that the transmitter antenna emits. In this embodiment, each of the at least two receiver antennas include a processing stream wherein the supporting computer system is able to include a single or multiple computer systems (e.g., computer clusters) operable to process an emitted signal. In this embodiment, the transmitter antenna is separated from the at least two receiver antennas by a distance sufficient to achieve the necessary electrical isolation to prevent self-jamming. In one embodiment, the at least two receiver antennas and the transmitter antenna are towed end-on to the direction of travel of the towing vessel. In another embodiment shown in FIG. 79, the linear sequence radar system includes a plurality of receiver antennas and a plurality of transmitter antennas. In this embodiment, the plurality of transmitter antennas are located along the towing cable with sufficient separation from both the plurality of receiver antennas and other transmitter antennas to achieve the necessary electrical isolation. The separation between corresponding transmitter antennas is required for each of the plurality of transmitter antennas to operate at different frequencies. In one embodiment, each of the plurality of receiver antennas is operable to operate at a different frequency. In another embodiment, each of the plurality of receiver antennas is operable to operate at the same frequency. In another embodiment, each of the plurality of receiver antennas is operable to pair with one of the plurality of transmitter antennas at a specific frequency. In another embodiment, one of the plurality of receiver antennas is operable to detect multiple transmitted frequencies for the plurality of transmitter antennas.

FIG. 80 illustrates a linear sequence radar system (e.g., a CW radar system) including a towing vessel, a towing cable, a plurality of receiver antennas, and a plurality of transmitter antennas according to one embodiment of the present invention. The plurality of transmitter antennas each include a signal generator operable to generate a signal that each of the plurality of transmitter antennas emits. Each of the plurality of receiver antennas includes a signal processor operable to receive emitted signals. In one embodiment, each of the plurality of transmitter antennas all operate at the same frequency and the phase relationship between each of the plurality of transmitter antennas is used to provide forward and aft beam steering of a transmitted signal. In one embodiment, each of the plurality of transmitter antennas are separated by about ¼ wavelength to about ½ wavelength. In one embodiment, depicted in FIG. 81, each of the plurality of receiver antennas are separated by about ¼ wavelength to about ½ wavelength. In one embodiment, each of the plurality of receiver antennas use digital phase delay in a receiver processing chain to achieve digital beam-steering of the plurality of receiver antennas. This allows the plurality of receiver antennas to be "swept" along an antenna pattern of the plurality of transmitter antennas. The peak of the plurality of receiver antennas is operable to move along the plurality of transmitter antenna emittance pattern without changing the plurality of receiver antennas in any fashion as the beam is synthetically created in a receiver processing chain. Advantageously, the linear sequence radar system creates constructive and destructive zones via beam patterns created via the plurality of receiver antennas and the plurality of transmitter antennas. The linear sequence radar system uniquely allows a definitive determination range that is less than one wavelength.

FIG. 82 illustrates a linear sequence radar system (e.g., a CW radar system) including a plurality of receiver antennas, a plurality of transmitter antennas, and more than one frequency according to one embodiment of the present invention. In one embodiment, at least two of the plurality of transmitter antennas are linked together at each frequency where a phase difference is introduced between each of the plurality of transmitter antennas so as to steer a combined antenna beam. In this embodiment, the at least two of the plurality of transmitter antennas can work cooperatively or independently. In one embodiment, the plurality of receiver antennas are operable to be deployed in set tunes to the different transmitter antenna frequencies or tuned sufficiently widely to receive all transmitter antenna frequencies simultaneously. In one embodiment, depicted in FIG. 82, each of the plurality of receiver antennas alternates positions along the towing cable with each of the plurality of transmitter antennas.

Problematically, prior art radar systems are unable to incorporate a reflector. In the ultra-low-frequency (ULF) range, with the antenna under the surface of the ocean, the critical angle for the emitted signal at the ocean-air boundary is no greater than 0.012°. This means that any emitted signal that hits the ocean-air boundary at any greater angle will be total internally reflected in the ocean. The ocean surface is not smooth, but at a wavelength above 50 meters (a common operating region for this application) the surface does appear effectively smooth to the CW radar system below World Meteorological Organization (WMO) Sea State 5, and a radar system according to various embodiments of the present invention is able to gain the benefit of the ocean surface as a reflector for the antenna or antenna array.

FIG. 83 illustrates a linear sequence radar system (e.g., a CW radar system) including a depth according to one embodiment of the present invention. In one embodiment, the linear sequence radar system is towed at a depth of ½ wavelength from the ocean surface such that the ocean surface acts as a reflector to the linear sequence radar system and increases the radiated power in a direction away from the ocean surface, towards the ocean floor. In another embodiment, the linear sequence radar system is towed at a depth greater than ½ wavelength from the ocean surface. In another embodiment, the linear sequence radar system is towed at a depth greater than 1 wavelength from the ocean surface.

FIGS. 84A and 84B illustrate radar detection zones utilizing a linear sequence radar system according to various embodiments of the present invention. Further, FIGS. 84A and 84B depicts only two embodiments of the present invention and is not intended to be limiting. A linear sequence radar system of the present invention is operable to be configured in any number of ways. FIGS. 84A and 84B depict ocean subsurface object detection in real-time where the linear sequence radar system is operable to geolocate in all three axes in real-time. FIG. 85 illustrates additional refinement in object location when constructive and destructive interference is involved.

FIG. 86 illustrates a linear sequence radar system beam pattern according to one embodiment of the present invention including a plurality of receiver antennas and a plurality of transmitter antennas each towed at a depth of about ½ wavelength. In this embodiment, the plurality of transmitter antennas are operable to operate at the same frequency and phase relationship to provide forward and aft beam steering of a transmitted signal. Without the use of a reflector, the emitted signal is a cone. A reflector effectively cuts the emitted signal in half such that twice the power is directed to the remaining ½ cone. In one embodiment, the phase relationship between the plurality of receiver antennas is digitally manipulated such that a synthetic antenna pattern is created. Digital manipulation includes at least phase shifting received signals. In this embodiment, the plurality of receiver antennas gain from the reflection formed by the ocean surface, resulting in twice the received power relative to no reflector being present.

FIG. 87 illustrates a radar system including a first linear radar system, a second linear radar system, and a towing vessel according to one embodiment of the present invention. The first and second linear radar systems include at least one receiver antenna and at least one transmitter antenna. In a preferred embodiment, the first and second linear radar systems are separated by about ¼ wavelength to about ½ wavelength. In this embodiment, a phase relationship between the at least one transmitter antenna of the first linear radar system and the at least one transmitter antenna of the second linear radar system are adjusted in such a way that a transmitted antenna pattern is directed to the left or right (relative to towing vessel), and forward or backward (relative to towing vessel). By digitally adjusting the phase relationship, all locations along the radar system are able to be simultaneously examined. FIG. 88 illustrates another embodiment of a radar system including a first linear radar system including a plurality of receiver antennas and a plurality of transmitter antennas, and a second linear radar system including a plurality of receiver antennas and a plurality of transmitter antennas.

FIG. 89 illustrates a perspective view of a radar system including a first linear radar system including a plurality of receiver antennas and a plurality of transmitter antennas, and a second linear radar system including a plurality of receiver antennas and a plurality of transmitter antennas according to one embodiment of the present invention. In this embodiment, the first and second linear radar systems are towed at a depth of about ½ wavelength and are separated by about ¼ wavelength. In one embodiment, a combination of vessel GPS and phase difference of arrival of emitted signals from the plurality of transmitter antennas from one sequence to another is used to determine sequence separation. The phase difference of arrival between the plurality of receiver antennas is able to be determined within less than 0.1 degrees using sensitive digitizers. In this embodiment, precise knowledge of the distance between the first and second linear radar systems is critical to being able to calculate the location of a target within a field-of-view.

FIG. 90 illustrates a radar system including a first linear sequence radar and a second linear sequence radar towed by separate towing vessels according to one embodiment of the present invention. In one embodiment, the radar system includes a first and a second towing vessel. The first towing vessel tows the first linear sequence radar, and the second towing vessel tows the second linear sequence radar. The distance between the first and the second linear sequence radar is calculated using GPS data from the first towing vessel, GPS data from the second towing vessel, and the phase difference between arriving transmitted frequencies. In one embodiment, the first linear radar sequence and the second linear radar sequence operate at slightly different frequencies such that receiver antennas are able to detect an emitted signal from any transmitter. In one embodiment, the frequency difference is less than 1 Hz. In another embodiment, the frequency difference is greater than 1 Hz. In another embodiment, all transmitter antennas operate at the same frequency and work cooperatively to form a combined set of antenna beams to survey a wide area. In a preferred embodiment, transmitter antennas include a computer and receiver antennas include a computer. Transmitter antenna computers and receiver antenna computers are connected via radio, laser, and/or other communication link to allow cooperative behavior. FIG. 91 illustrates another embodiment wherein the first linear radar sequence and the second linear radar sequence are towed at a depth of about ½ wavelength. In one embodiment, the first linear radar sequence and the second linear radar sequence are towed at slightly different depths. In one embodiment, the transmitter antenna computer and the receiver antenna computer are operable to shift frequencies in real time. In one embodiment, the transmitter antenna computer and the receiver antenna computer shift the frequencies while maintaining the phase array directivity and the frequency shift maintains a separation of between about ¼ and about ½ wavelength.

FIG. 92A illustrates a radar system including a plurality of linear radar sequences and a plurality of frequencies according to one embodiment of the present invention. In one embodiment, a first towing vessel tows a plurality of linear radar sequences, and a second towing vessel tows a plurality of linear radar sequences. Each of the plurality of linear radar sequences includes at least one transmitter antenna and at least one receiver antenna. In one embodiment, each of the at least one transmitter antennas are operable to operate at a different frequency. In another embodiment, each of the at least one transmitter antennas are operable to operate at the same frequency. In one embodiment, depicted in FIG. 92B, each of the plurality of linear radar sequences are towed at a depth of about ½ wavelength. In another embodiment, each of the plurality of linear radar sequences are towed at slightly different depths. In a preferred embodiment, the at least one transmitter antenna includes a computer, and the at least one receiver antenna includes a computer. The at least one transmitter antenna computer and the at least one receiver antenna computer are connected via radio, laser, and/or other communication link to allow cooperative behavior. The at least one transmitter antenna computer and the at least one receiver antenna computer are operable to detect at least one target object in a target area. In one embodiment, the at least one transmitter antenna computer and the at least one receiver antenna computer are operable to shift frequencies in real time. In one embodiment, the at least one transmitter antenna computer and the at least one receiver antenna computer shift the frequencies while maintaining the phase array directivity and the frequency shift maintains a separation of between about ¼ and about ½ wavelength.

FIG. 93 illustrates a radar system including a plurality of linear radar sequences, a plurality of frequencies, and a plurality of antennas according to one embodiment of the present invention. In one embodiment, each of the plurality of linear radar sequences includes a plurality of receiver antennas and a plurality of transmitter antennas. In one embodiment, each of the plurality of linear radar sequences is configured such that a first receiver antenna, a first transmitter antenna, and a second receiver antenna comprise an independent array system. Each of the plurality of linear radar sequences is operable to comprise at least three independent array systems, as illustrated in FIG. 93. In one embodiment, each of the plurality of transmitter antennas operate at the same frequency. In one embodiment, at least one of the linear radar (designated "left" for remainder of paragraph) sequences is operable to operate at a different phase from at least one other linear radar sequence (designated "right" for remainder of paragraph). For instance, if the right sequence is separated by the left sequence by at least ¼ wavelength, the left and right sequence operate with a 270 degree phase shift relative to any remaining linear radar sequences of the plurality of linear radar sequences.

FIGS. 94A, 94B, and 94C illustrate a radar system including at least two linear radar sequences at various depths according to various embodiments of the present invention. The at least two radar sequences include at least one transmitter antenna. In one embodiment, the at least two linear radar sequences are towed by a towing vessel at a depth of between about 1 to 100 wavelengths. Each of the at least two linear radar sequences are towed at different depths. In one embodiment, each of the at least two linear radar sequences are vertically separated by about ¼ to about ½ wavelength. Advantageously, the phase relationship between the radar sequence closer to the ocean's surface and the radar sequence further from the ocean's surface is actively controlled such that the radar sequence closer to the ocean's surface acts an active reflector array for emitted signals from the at least one transmitter antenna of the linear radar sequence further from the ocean's surface.

FIGS. 95A, 95B, and 95C illustrate a radar system including at least two towing vessels and a plurality of linear radar sequences according to one embodiment of the present invention. In one embodiment, at least two towing vessels tow a plurality of linear radar sequences at various depths. In one embodiment, each towing vessel tows two linear radar sequences closer to the ocean surface and two linear radar sequences further from the ocean's surface wherein the sequences are separated vertically by about ¼ to about ½ wavelength. Linear radar sequences nearest the ocean's surface are operable to operate at a different phase from linear radar sequences further from the ocean's surface such that the combined signal from the linear radar sequence closer to the ocean's surface and the linear radar sequence further from the ocean's surface is directed downward. The linear radar sequence closer to the ocean's surface operates as an active reflector for the linear radar sequence further from the ocean's surface. In one embodiment, each of the at least two towing vessels tows at least two linear radar sequences, wherein each of the at least linear radar two sequences are towed with a first of the at least two linear radar sequence closer to the ocean's surface by ¼ to ½ wavelength (relative to a second of the at least two linear radar sequences), wherein each of the at least two towing vessels tows the same number of linear radar sequences and the phase difference between each of the linear radar sequences closer to the ocean's surface is operable to direct the combined energy downward and the phase between the vessels adjust to steer a radar beam forward and aft as well as left and right (relative to the direction of the towing vessel). In one embodiment, each towing vessel is operable to operate a transmitter antenna included on each of the linear radar sequence at different frequencies. In another embodiment, each of the plurality of linear radar sequences operates at a different frequency. The difference in frequency is able to range from less than 1 Hz to over 1000 Hz. In an embodiment where each of the plurality of linear radar sequences are operating on slightly different frequencies, transmitter antenna computers and receiver antenna computers are operable to communicate via radio, laser, and/or any other communication link to allow cooperative behavior. In another embodiment, all transmitter antennas operate at the same frequency.

FIG. 96A illustrates a radar system including at least three towing vessels according to one embodiment of the present invention including a first towing vessel towing a receiver antenna, a second towing vessel towing a transmitter antenna, and a third towing vessel towing a receiver antenna. In one embodiment, depicted in FIG. 96B, the second towing vessel is between the first towing vessel and the third towing vessel. In another embodiment, the first towing vessel is between the second towing vessel and the third towing vessel.

FIG. 97A illustrates a radar system including at least three towing vessels, a plurality of receiver antennas, and a plurality of transmitter antennas according to one embodiment of the present invention. In one embodiment, each of the plurality of transmitter antennas operates at a different frequency. In one embodiment, two of the at least three towing vessels tow a plurality of receiver antennas and one of the at least three towing vessels tows a plurality of transmitter antennas. In another embodiment, depicted in FIG. 97B, two of the at least three towing vessels tow a plurality of transmitter antennas and one of the at least three towing vessels tows a plurality of receiver antennas. According to one embodiment, illustrated in FIGS. 98A and 98B, each of the plurality of receiver antennas and each of the plurality of transmitter antennas are separated by about ¼ wavelength to about ½ wavelength.

FIG. 99A illustrates a radar system including at least three towing vessels, a plurality of receiver antennas, a plurality of transmitter antennas, and a plurality of frequencies according to one embodiment of the present invention. In one embodiment, a first towing vessel tows a plurality of receiver antennas, a second towing vessel tows a plurality of transmitter antennas, and a third towing vessel tows a plurality of receiver antennas. In one embodiment, a first set of the plurality of receiver antennas towed by the first towing vessel operates at the same frequency as a first set of the plurality of transmitter antennas towed by the second towing vessel and a first set of receiver antennas towed by the third towing vessel. In another embodiment, each of the plurality of receiver antennas and transmitter antennas operate at the same frequency relative to the antenna position on the tow cable. For example, all receiver antennas and transmitter antennas closest to the tow vessel operate at a first frequency, all receiver antennas and transmitter antennas furthest away from the tow vessel operate at the same frequency different from the antennas closest to the tow vessel. In another embodiment, depicted in FIG. 99B, a first towing vessel tows a plurality of transmitter antennas, a second towing vessel tows a plurality of receiver antennas, and a third towing vessel tows a plurality of transmitter antennas.

FIG. 100 illustrates a radar system including a plurality of modules according to one embodiment of the present invention. Each of the plurality of modules is operable to self-right to guarantee the antennas maintain proper orientation. In one embodiment, each module includes either a receiver antenna or a transmitter antenna. In one embodiment, modules are operable to configure the receiver antenna and the transmitter antenna such that the receiver antenna cross polarizes to other transmitter antennas to reduce crosstalk between transmitter antennas. In another embodiment, modules are operable to configure the receiver antenna and the transmitter antenna such that the receiver antenna does not cross polarize to other transmitter antennas. In one embodiment, the plurality of modules are separated by between about 3 meters and about 50 meters. Greater separation allows for greater transmitter power and therefore increased detection and geolocation range. In one embodiment, the radar system includes between 2 and 10 modules operating at the same or different frequencies.

FIG. 101 illustrates a radar system including two towing cables and a plurality of modules according to one embodiment of the present invention. In one embodiment, the two towing cables each include a plurality of modules similarly depicted in FIG. 100.

FIGS. 102A, 102B, and 102C illustrate a radar system including a plurality of transmitter antennas and a plurality of receiver antennas towed behind a towing vessel at a known depth and layback according to one embodiment of the present invention. The plurality of receiver antennas further includes at least two receiver antennas within about 10 meters of the towing vessel (closest to the towing vessel) with a known cross-track separation. In this embodiment, the plurality of transmitter antennas and the plurality of the receiver antennas are at a greater depth than the at least two receiver antennas located within about 10 meters from the towing vessel. Further, the at least two receiver antennas closest to the towing vessel are operable to receive transmitted signals from the plurality of transmitter antennas. In this embodiment, the plurality of receiver antennas and the plurality of transmitter antennas are geolocated using phase difference of arrival. More specifically, the at least two receiver antennas closest to the towing vessel each include a sensor head operable to receive transmitted signals. The phase angle of arrival of transmitted signals is determined from a signal received by the at least two receiver antennas located within about 10 meters from the towing vessel. The phase angle of arrival allows the determination of the angle of the plurality of transmitter antennas and the plurality of receiver antennas relative to the path of the towing vessel (which is rarely directly behind the towing vessel), and when combined with the known depth and layback the real-time geolocation of the plurality of transmitter antennas and the plurality of receiver antennas can be determined with great precision (<2 m).

FIGS. 103A and 103B illustrate a radar system including a plurality of transmitter antennas and a plurality of receiver antennas towed by a towing vessel at a known depth and layback according to one embodiment of the present invention. The plurality of receiver antennas further includes at least two receiver antennas mounted to the towing vessel below the waterline such that they are vertically (FIG. 103A) or horizontally (FIG. 103B) mounted and operable to receive a transmitted signal from the plurality of transmitter antennas. In this embodiment, the plurality of transmitter antennas and the plurality of the receiver antennas are at a greater depth than the at least two receiver antennas mounted to the towing vessel. In this embodiment, the plurality of receiver antennas and the plurality of transmitter antennas are geolocated using phase difference of arrival. More specifically, at least one receiver sensor head is mounted to the towing vessel. Each of the at least one receiver sensor head mounted to the towing vessel is operable to receive the transmitted signal from the plurality of transmitter antennas. The phase angle of arrival of a transmitted signal received by each of the at least one receiver sensor heads is used to determine the angle of tow of the radar system relative to the path of the towing vessel, and when combined with the known depth and layback the real-time geolocation of the plurality of transmitter antennas and plurality of receiver antennas can be determined with great precision (<2 m).

FIG. 104 illustrates a radar system using GPS according to one embodiment of the present invention. In one embodiment, the radar system includes a sensor, where the sensor includes an antenna sequence or antenna module. In one embodiment, at least two towing vessels are each equipped with GPS and a plurality of transmitter antennas and a plurality of receiver antennas. At least one of the at least two towing vessels has a processing system to determine phase angle of arrival of transmitted signals received by the plurality of receiver antennas on each of the at least two towing vessels. Using radio, laser, or other communication links between each of the at least two towing vessel's receiver antenna data, the receiver antenna data is transmitted to a processor and the phase difference of arrival is calculated. Using signals received by the plurality of the receiver antennas, the distance between the plurality of transmitter antennas and the plurality of receiver antennas towed behind the at least two towing vessels is able to be determined.

FIGS. 105A and 105B illustrate radar detection zones with constructive and destructive zones according to various embodiments of the present invention. In one embodiment, the arrangement of antennas and the phase relationship forces transmitted signals to propagate predominantly in a line perpendicular to the line created by an antenna in a first row. By manipulating the phase relationship between antennas in a second row, the transmitted signals are able to be directed at a desired angle relative to the perpendicular. The combination of phase shift among various antennas is nearly infinite. However, FIGS. 105A and 105B illustrate examples of phase shift such that obstructed view is minimized. FIG.

106 illustrates a perspective view of antenna positioning where the antennas are placed on the ocean floor according to one embodiment of the present invention. In the embodiment depicted in FIG. 106, the distance between a first row of transmitter antennas and a second row of transmitter antennas is about ¼ wavelength.

FIG. 107 illustrates a receiver system according to one embodiment of the present invention. In one embodiment, the receiver system includes one or more receiver antennas placed in a harbor entrance or other restricted waterway connected to at least one low noise, high gain amplifier to detect electromagnetic unintentional radiated emissions (URE) in the ULF region from passing surface and subsurface vessels. In another embodiment, the receiver system includes a multitude of antennas arranged along a cable placed along or around critical infrastructure connected to at least one low noise, high gain amplifier connected to a signal processor to detect electromagnetic URE in a ULF region from passing surface and subsurface vessels. In one embodiment, the receiver system includes at least one receiver antenna, at least one low-noise, high gain amplifier towed by at least one vessel to detect electromagnetic URE in the ULF region from near-by surface and subsurface vessels.

FIG. 108 illustrates a receiver system including more than one vessel according to one embodiment of the present invention. In one embodiment, a plurality of vessels tow receiver systems including at least one receiver antenna and at least one low-noise, high gain amplifier connected to a signal processor to detect electromagnetic URE in the ULF region from near-by surface and subsurface vessels. In one embodiment, depicted in FIG. 109, a signal processor applies a digital filter and phase shifts to various receiver signals to form synthetic antenna patterns. The signal processor applying the digital shift applies to multiple ranges of frequencies within an overall passband of the receiver system.

Above Sea Level System

One aspect of the underlying physics is the effect of the boundary layer between the saltwater and the air. The critical angle according to Snell's Law for the ULF band is drastically different whether the source is in the saltwater or in the air. A signal originating in the saltwater is only able to escape if the incident angle is less than 0.012° from the normal. This means much of the energy interacting with the surface of the water is fully reflected back into the saltwater; however, when the signal originates in the air, there is no critical angle. That is, all energy interacting with the surface of the saltwater are coupled into it. If the source (a magnetic dipole antenna as described herein) is far enough from the ocean's surface, it should only radiate in the microwatt range and that is practically useless; however, that is only true when the antenna is well separated from the saltwater. If the antenna is in the air but close to the saltwater, the magnetic lines of force travel into the water, meaning the resulting radiated electromagnetic wave is effectively initiated in the saltwater. This effect is seen in the measured radiation resistance of the antenna. When an antenna is operated within a few meters above the saltwater surface, the radiation resistance is within roughly 10% of the peak seen when it is fully submerged (i.e., the antenna is 90% as efficient in the air near saltwater as in the saltwater).

FIGS. 110A and 110B illustrate an above sea level transmitter antenna in combination with at least one below sea level receiver antenna according to one embodiment of the present invention. In one embodiment, the at least one above sea level transmitter is moving. In another embodiment the at least one below sea level receiver antenna is moving. In another embodiment, the at least one above sea level transmitter is moving and the at least one below sea level receiver is not moving. In one embodiment, the at least one below sea level receiver antenna combines with at least one above sea level transmitter antenna. In one embodiment, the above sea level transmitter is connected to a boat, surface vessel, low flying aircraft, and/or a drone. In one embodiment, the low flying aircraft and/or drone is operable to travel at a speed between about 1 mile per hour to about 70 miles per hour without compromising the transmitter antenna efficiency. The above sea level transmitter antenna and the at least one below sea level receiver antenna include a GPS sensor operable to determine the location of the above sea level transmitter antenna and the at least one below sea level receiver antenna in real time. A data link connects the above sea level transmitter antenna and the at least one below sea level receiver antenna. In one embodiment, the above sea level transmitter antenna moves above at least one below sea level receiver antenna such that a wide area of search is achievable.

FIG. 111 illustrates a stationary set of receivers according to one embodiment of the present invention. In one embodiment, the stationary set of receivers are tethered to the ocean floor and receive transmissions from a transmitter antenna moving along the surface of the ocean or flying above the surface of the ocean. The stationary set of receivers are geolocated during placement and are connected to shore via cables or to processing nodes located on or under the ocean floor, wherein the processing nodes are connected to the shore.

Pulse Radar

In the prior art, the power generated by the electrically short antennas available was insufficient to allow pulsed waveforms as the minimum range caused by the shortest possible pulse was nearly the same as the maximum detection range. Developments described herein in antenna design and optimization for the saltwater environment have demonstrated detection ranges greater than 300 meters. Single antenna pulsed operation is now possible. Additionally, when the antennas are arranged as phased arrays where increased total power is achieved, pulsed operation is now possible at substantial range. Because of the pulsed waveform, it is possible to use the same array to both transmit and receive.

In one embodiment, a single transmitter/receiver antenna is operated as a pulsed radar either towed or stationary. In another embodiment, a single transmitter/receiver antenna is combined with at least one receiver antenna wherein the transmitter/receiver antenna operates as a pulsed radar, and the at least one receiver antenna operates as a bistatic or multistatic radar receiver. In one embodiment, a phased array transmitter (either moving or stationary) emits a pulsed waveform bandlimited to the ULF region. The pulsed waveform provides range accuracy to less than 30 meters depending on the operating frequency. Transmitter and receiver arrays are separate because of the attenuation of the saltwater, self-jamming can be avoided in the pulsed operating mode which allows active pulse cancellation to be used in receiver processing chain. The advantage of active pulse cancellation is that the minimum range of the system is able to effectively be cut down to zero (i.e., no blind range as seen in typically pulsed radar systems). Combining pulsed radar with CW enables localization of a target in the CW mode and then usage of a pulsed mode to eliminate ambiguous detection zones encountered when using solely the CW mode.

FIG. 112 illustrates a radar system (e.g., CW or pulse radar system) according to one embodiment of the present invention including at least one transmitter antenna mounted below a lighted or otherwise powered buoy, at least one below sea level transmitter antenna mounted below a lighted or otherwise powered buoy. In one embodiment, the radar system includes an amplifier, control electronics, and a communication package (e.g., 5G modem) mounted on a buoy with the at least one transmitter antenna mounted below the buoy, and an amplifier, control electronics, and a communication package (e.g., 5G modem) mounted on a buoy with the at least one receiver antenna mounted below the buoy. Power to the at least one above sea level transmitter antenna and at least one above sea level receiver antenna is taken from a cable that supplies power to the buoy. The communications systems are linked to shore where command, control, processing, and analysis occurs.

FIG. 113 illustrates an above and below sea level radar system including a shore-based facility according to one embodiment of the present invention including at least one transmitter antenna connected via a cable to an onshore facility, at least one receiver system mounted under a lighted channel or other buoy receiving power, and a ground processing station. In one embodiment, the receiver system includes low power electronics to capture a received signal from at least one target in a target area and transmit the received signal to the shore-based facility. The shore-based facility includes signal generating equipment for the at least one transmitter antenna and command, control, communications, processing, and analysis systems for the at least one receiver system. The waveform used by the at least one transmitter antenna is operable to include CW, pulsed, and/or a combination of CW and pulsed on a time-shared basis.

FIG. 114 illustrates a radar system including an Unmanned Underwater Vehicle (UUV) according to one embodiment of the present invention including at least one transmitter antenna, a signal generator, and at least one receiver system. The signal generator is housed within the at least one transmitter antenna. In one embodiment, the at least one transmitter antenna is mounted on an UUV. In one embodiment, the receiver system includes a receiver antenna connect via a cable to a shore-based signal processor, wherein the UUV transits the area and the at least one receiver system detects a signal from the signal generator within the at least one transmitter antenna mounted on the UUV and the return signal from at least one surface or subsurface UUV in the area (target object). In one embodiment, depicted in FIG. 115, the radar system includes at least two UUVs operating at different frequencies such that each transmitter frequency is unique to only one of the at least two UUVs. In one embodiment, depicted in FIG. 116, the radar system includes a plurality of UUVs operating at different frequencies such that each transmitter frequency is unique to only one of the plurality of UUVs. In the embodiment depicted in FIG. 116, each of the plurality of UUVs operate in a known pseudorandom set of courses such that the location of each UUV and at least one transmitter antenna is unknown to an unauthorized intruder, but each location is known by the at least one receiver system. The waveform used by the at least one transmitter antenna is operable to include CW, pulsed, and/or a combination of CW and pulsed on a time-shared basis.

FIG. 117 illustrates a radar system including at least one transmitter antenna and a signal generator mounted to at least one UUV, a receiver system, and a shore-based processing facility according to one embodiment of the present invention. In one embodiment, the receiver system includes a receiver antenna, receiver electronics, and a communication package mounted to a different channel buoy operable to receiver power. The receiver system is operable to extract power from a power system that provides power to the channel buoy. The communication system is linked to the shore-based processing facility where command, control, processing, and analysis systems are located. In one embodiment, depicted in FIG. 118, the receiver system includes a cable linking the receiver system to the shore-based processing facility. In another embodiment, each of the at least one transmitter antenna and the signal generator mounted to the at least one UUV operate at a different frequency.

FIG. 119 illustrates a radar system including at least one transmitter antenna, a signal generator, and wireless communication system, all mounted to a buoy; at least one receiver antenna, a signal processor, and a wireless communication system, all mounted to a different buoy; at least one transmitter antenna and signal generator, both wired to a ground processing facility; at least one transmitter antenna and signal generator, both mounted to a UUV operable to receive commands from the ground processing facility via at least electromagnetic or acoustic signals; at least one receiver antenna and signal processor, both mounted to a different UUV operable to transmit data from a received signal via at least electromagnetic or acoustic signals to the ground processing facility; at least one adaptable transmitter/receiver system including a signal generator, a signal processor, switching equipment, and a communications system operable to nearly instantaneously switch between transmitting and receiving located on a different buoy, on the ocean floor and connected to the ground processing facility via a cable, and/or mounted on a UUV according to one embodiment of the present invention. In this embodiment, all transmitter antennas and receiver antennas work adaptively with each other as directed by the ground processing facility.

FIG. 120 illustrates a radar system (e.g., CW or pulse radar system) including a transmitter antenna array fixed to the ocean floor, and at least one receiver antenna array fixed to the ocean floor according to one embodiment of the present invention. In one embodiment, the transmitter antenna array and the at least one receiver antenna array are separated by some distance such that at least one target is detected as it passes in an area around the at least one receiver antenna array, as depicted in FIG. 120. The system acts as a bistatic or multistatic radar. Traditionally, whether a radar system acts bistatic or multistatic depends on the number of wavelengths between a transmitter antenna and a receiver antenna. While there is no clear cutoff for the number of wavelengths between a transmitter antenna and a receiver antenna to determine whether a radar system is multistatic or bistatic, generally, the more wavelengths between the transmitter antenna and the receiver antenna, the more likely the radar system is considered multistatic. Various embodiments of the invention described herein are operable to act as multistatic at a minimum distance of about 300 meters to about 500 meters.

FIG. 121 illustrates a radar system (e.g., CW or pulse radar system) including at least one transmitter system including a signal transmitter antenna, a signal generator, and a self-contained power supply including wave action based, solar, and/or other renewable power source; at least one receiver system including a receiver antenna, a signal processor, a self-contained power supply including wave action based, solar, or other renewable power source; and a communication system operable to connect to shore (e.g., a tethered surface buoy, underwater modem, and/or fiber optic cable) according to one embodiment of the present invention. In one embodiment, the at least one transmitter system is operable to receiver power from a shore base via cables mounted on or below the ocean floor in about 30 meters to about 300 meters water depth. In one embodiment, the at least one receiver system is operable to receiver power via a shore base via cables mounted on or below the ocean floor in about 30 meters to about 1000 meters water depth. The radar system is operable to detect subsurface and surface vessels in a target area. In one embodiment, the at least one receiver system is in the vicinity of the at least one transmitter system. The at least one transmitter system operates at the same frequency with a plurality of different phase shifts such that transmitter antennas and receiver antennas are operable to apply a digital phase shift to receiver signals such that the receiver system is able to form multiple simultaneous or near simultaneous synthetic phased array antenna patterns. In another embodiment, the phase shifts are applied in series.

FIG. 122 illustrates a radar system (e.g., CW or pulse radar system) including a transmitter system including a first transmitter antenna array at a first depth and a second transmitter antenna array at a second depth less than the first depth, and a receiver system including a receiver antenna array at a first depth and a second receiver array at a second depth less than the first depth according to one embodiment of the present invention. The first and second transmitter antenna arrays each include a signal generator and a self-contained power supply including wave-based action, solar, any other renewable power source, and/or any other power source taught in the aforementioned embodiments. The first and second receiver antenna arrays each include a signal processor and a self-contained power supply including wave-based action, solar, any other renewable power source, and/or any other power source taught in the aforementioned embodiments. The first depth of the first transmitter antenna array and the second depth of the second transmitter antenna array are separated by about ¼ to about ½ wavelength. The first depth of the first receiver antenna array and the second depth of the second receiver antenna array are separated by about ¼ to about ½ wavelength. The signal generator of the first transmitter antenna array and the signal generator of the second transmitter antenna array operate such that the combined output of the first and second signal generator is directed towards the ocean's surface and the first transmitter antenna array functions as an active reflector to the second transmitter antenna array. Each of the first and second transmitter antenna arrays operate at the same frequency with a plurality of different phase shifts such that the first and the second transmitter antenna arrays form a single phased array. Each of the first and the second receiver antenna arrays are operable to apply a digital phase shift to receive signals such that the receiver system can form multiple simultaneous or near simultaneous synthetic phased array antenna patterns. In one embodiment, the receiver system includes at least two sets of receiver antenna arrays. In another embodiment, the receiver system includes at least one set of receiver antenna arrays. The waveform used by the transmitter system is able to be CW, pulsed, or a combination of CW and pulsed on a time-shared basis.

FIG. 123 illustrates a radar system (e.g., CW or pulse radar system) including at least one transmitter system including a first antenna array at a first depth and a second antenna array at a second depth, each of the antennas in the first and second array including its own signal generator; at least one receiver system including a first antenna array at a first depth and a second antenna array at a second depth; a self-contained power supply including wave based action, solar, or other renewable power source, and/or shore-based power; and a communication system to enable command, control, and/or data exfiltration of the radar system according to one embodiment of the present invention.

In one embodiment, the first antenna array and the second antenna array of the at least one transmitter system are either rectangular or elliptical. In one embodiment, the first antenna array is separated from the second antenna array of the at least one transmitter system by a depth of about ¼ to about ½ wavelength. The depth separation between the first antenna array and the second antenna array of the at least one transmitter system enables the deeper antenna array to act as an active reflector to direct a combined output towards the ocean's surface. The phase shift between the first antenna array and the second antenna array of the at least one transmitter system is operable to steer a transmitted radar beam in any direction.

In one embodiment, the first antenna array and the second antenna array of the at least one receiver system are either rectangular or elliptical. In one embodiment, the first antenna array and the second antenna array of the at least one receiver system are separated by a depth of about ¼ to about ½ wavelength. The depth separation between the first and second antenna array of the at least one receiver system is operable to combine the output of each signal generator, such that the deeper antenna array acts as a synthetic reflector in a processing stream. The at least one receiver system is operable to perform digital phase shifts such that sensitivity is able to be simultaneously or nearly simultaneously directed in any direction. In one embodiment, the radar system includes a second receiver system including a first antenna array at a first depth and a second antenna array at a second depth identical to the first receiver system.

Figure 38:
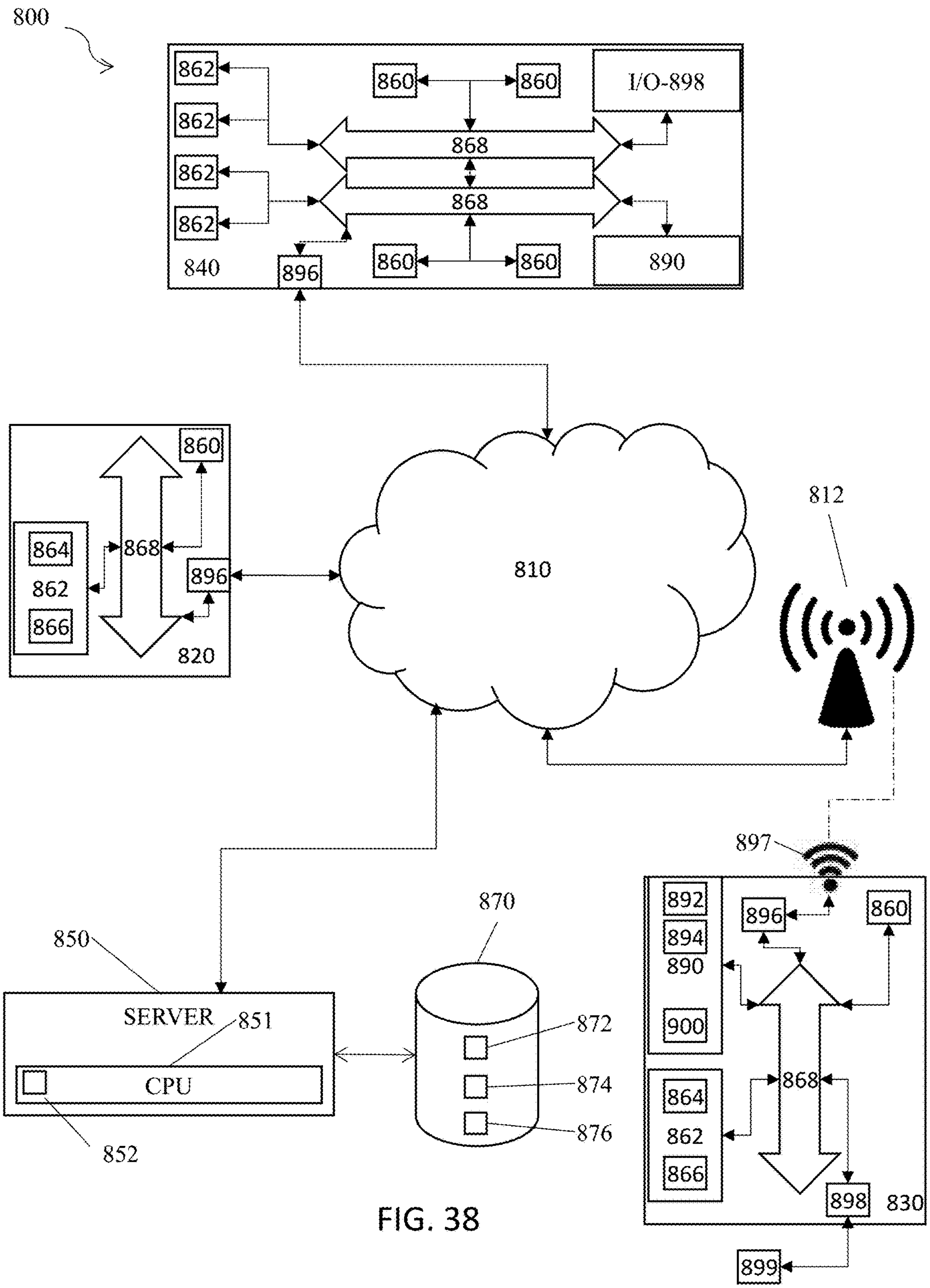
FIG. 38 is a schematic diagram of a system of the present invention.

FIG. 38 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 38, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable to be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 38, is operable to include other components that are not explicitly shown in FIG. 38, or is operable to utilize an architecture completely different than that shown in FIG. 38. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

The above-mentioned examples are provided to serve the purpose of clarifying the aspects of the invention, and it will be apparent to one skilled in the art that they do not serve to limit the scope of the invention. By nature, this invention is highly adjustable, customizable and adaptable. The above-mentioned examples are just some of the many configurations that the mentioned components can take on. All modifications and improvements have been deleted herein for the sake of conciseness and readability but are properly within the scope of the present invention.

The invention claimed is:

1. A radar system for detecting objects in an underwater environment, comprising:
- at least one transmitter (Tx) antenna including at least one signal generator operable to emit at least one transmission signal to a target area;
- at least one receiver (Rx) antenna including at least one signal receiver and at least one signal processor;
- wherein the at least one Tx antenna and the at least one Rx antenna include a plurality of toroidal ring stacks;
- wherein a first of the plurality of toroidal ring stacks is mounted to an inductor rod;
- wherein each of the plurality of toroidal ring stacks include an outer circumference equal to an inner circumference of a subsequent toroidal ring stack such that each of the plurality of toroidal ring stacks increases an overall diameter of the at least one Tx antenna and/or the at least one Rx antenna;
- wherein an outer circumference of an outermost toroidal ring stack of the plurality of toroidal ring stacks includes wire wrapping sufficient to induce an oscillating magnetic field;
- wherein the at least one signal receiver is operable to receive at least one return signal from the target area via the at least one Rx antenna; and
- wherein the at least one signal processor is operable to analyze the at least one return signal.

2. The radar system of claim 1, further comprising at least one towing vessel, wherein the at least one towing vessel tows the at least one Tx antenna and the at least one Rx antenna via a towing cable.

3. The radar system of claim 2, wherein the at least one towing vessel tows the at least one Rx antenna via a first towing cable and tows the at least one Tx antenna via a second towing cable, wherein the first and second towing cables are different lengths and towed at different depths.

4. The radar system of claim 1, wherein the at least one Tx antenna is operable to emit a continuous, pulsed, and/or a time-shared combination of continuous and pulsed waveform.

5. The radar system of claim 1, wherein the radar system is operable to adjust frequencies in real-time.

6. The radar system of claim 1, wherein the at least one signal processor is operable to detect at least one target object in the target area based on the at least one return signal.

7. The radar system of claim 6, further comprising a graphical user interface (GUI), wherein the GUI is operable to display a visualization of the at least one target object in the target area.

8. A radar system for detecting objects in an underwater environment, comprising:
- a plurality of transmitter (Tx) antennas, each including at least one signal generator operable to emit at least one transmission signal to a target area;
- a plurality of receiver (Rx) antennas, each including at least one signal receiver and at least one signal processor;
- wherein the plurality of Tx antennas and the plurality of Rx antennas include a plurality of toroidal ring stacks;
- wherein a first of the plurality of toroidal ring stacks is mounted to an inductor rod;
- wherein each of the plurality of toroidal ring stacks include an outer circumference equal to an inner circumference of a subsequent toroidal ring stack such that each of the plurality of toroidal ring stacks increases an overall diameter of each of the plurality of Tx antennas and/or the plurality of Rx antennas;
- wherein an outer circumference of an outermost toroidal ring stack of the plurality of toroidal ring stacks includes wire wrapping;
- wherein the at least one signal receiver is operable to receive at least one return signal from the target area via the plurality of Rx antennas; and
- wherein the at least one signal processor is operable to analyze the at least one return signal.

9. The radar system of claim 8, further comprising at least two towing vessels, wherein a first towing vessel tows at least one of the plurality of Tx antennas and at least one of the plurality of Rx antennas, and a second towing vessel tows at least one of the plurality of Tx antennas and at least one of the plurality of Rx antennas.

10. The radar system of claim 8, further comprising at least one towing vessel, wherein the at least one towing vessels tows the plurality of Tx antennas and the plurality of Rx antennas, wherein each of the plurality of Tx antennas are separated from each other by about 0.25 to about 0.5 wavelengths, wherein each of the plurality of Rx antennas are separated from each other by about 0.25 to about 0.5 wavelengths.

11. The radar system of claim 8, wherein each of the plurality of Tx antennas operate at different frequencies and each of the plurality of Rx antennas are operable to receive each of the different frequencies.

12. The radar system of claim 8, further comprising a low flying aerial vehicle, wherein the low flying aerial vehicle carries the plurality of Tx antennas above water, wherein the plurality of Rx antennas are separate from the low flying aerial vehicle and are below the water.

13. The radar system of claim 8, further comprising at least one towing vessel, wherein the at least one towing vessel includes the plurality of Tx antennas, wherein the plurality of Rx antennas are separate from the at least one towing vessel and are mounted to the ocean floor.

14. A radar system for detecting objects in an underwater environment, comprising:
- a plurality of transmitter (Tx) antennas, each including at least one signal generator operable to emit at least one transmission signal to a target area;

a plurality of receiver (Rx) antennas, each including at least one signal receiver and at least one signal processor;

wherein the plurality of Tx antennas and the plurality of Rx antennas include a plurality of toroidal ring stacks;

wherein a first of the plurality of toroidal ring stacks is mounted to an inductor rod;

wherein each of the plurality of toroidal ring stacks include an outer circumference equal to an inner circumference of a subsequent toroidal ring stack such that each of the plurality of toroidal ring stacks increases an overall diameter of each of the plurality of Tx antennas and/or the plurality of Rx antennas;

wherein an outer circumference of an outermost toroidal ring stack of the plurality of toroidal ring stacks includes wire wrapping sufficient to induce an oscillating magnetic field;

wherein the at least one signal receiver is operable to receive at least one return signal from the target area via the plurality of Rx antennas;

wherein the at least one signal processor is operable to analyze the at least one return signal; and wherein the at least one signal processor is operable to detect at least one target object in the target area based on the at least one return signal.

15. The radar system of claim 14, wherein at least one of the plurality of Tx antennas is above water and at least one of the plurality of Tx antennas is below the water, wherein at least one of the plurality of Rx antennas is above water and at least one of the plurality of Rx antennas is below water.

16. The radar system of claim 14, further comprising a land-based processing facility.

17. The radar system of claim 16, wherein the plurality of Tx antennas and the plurality of Rx antennas are mounted to the ocean floor, and the plurality of Rx antennas transmit the at least one return signal to the land-based processing facility.

18. The radar system of claim 16, wherein the plurality of Tx antennas are mounted to at least one unmanned underwater vehicle (UUV) and the plurality of Rx antennas are mounted to the ocean floor, wherein the plurality of Rx antennas transmit the at least one return signal to the land-based processing facility.

19. The radar system of claim 14, wherein the plurality of Tx antennas are mounted to at least one unmanned underwater vehicle (UUV) and the plurality of Rx antennas are mounted to the ocean floor.

20. The radar system of claim 14, wherein the plurality of Tx antennas and the plurality of Rx antennas are mounted to the ocean floor and tethered to a communication buoy along the ocean surface.

21. A radar system for detecting ferrous and non-ferrous metal in an underwater environment, comprising:

at least one transmitter system including a transmitter antenna, wherein the transmitter antenna includes a signal generator connected to a wireless communication system;

at least one receiver system including a receiver antenna operable to receive signals generated by the signal generator, wherein the receiver antenna includes a signal processor connected to a wireless communication system;

at least one shore-based facility operable to connect to the transmitter antenna wireless communication system and the receiver antenna wireless communication system;

wherein the at least one transmitter system is mounted below a first buoy operable to receive power, wherein the at least one transmitter system draws power from the first buoy;

wherein the transmitter system is operable to transmit a signal to a target area;

wherein the at least one receiver system is mounted below a second buoy operable to receiver power, wherein the at least one receiver system draws power from the second buoy;

wherein the receiver system is operable to receive the transmitted signal from the target area;

wherein the transmitter system is operable to transmit continuous wave signals, pulsed waveform signals, and/or a time-shared combination of continuous wave and pulsed waveform signals;

wherein the radar system is operable to shift frequencies in real time; and wherein the underwater environment includes saltwater.

22. A system for detection of unintentional radiated emissions (URE) in an underwater environment, comprising:

at least one receiver antenna tethered to an ocean floor, residing upon the ocean floor, and/or buried under the ocean floor;

at least one transmitter antenna operable to transmit a signal to a target area;

wherein the at least one receiver antenna is operable to receive the transmitted signal from the target area;

wherein the at least one receiver antenna is tied to or connected to a high-gain, low-noise amplifier, a receiver or a digitizer, and a signal processor;

wherein the system is operable detect URE from at least one target in the target area; and wherein the underwater environment is a saltwater environment.

23. A system for detection of unintentional radiated emissions (URE) in an underwater environment, comprising:

at least one vehicle;

at least one receiver antenna, wherein the at least one receiver antenna is towed by the at least one vehicle or mounted directly on the at least one vehicle;

at least one transmitter antenna operable to transmit a signal to a target area;

wherein the at least one receiver antenna is connected to a high-gain, low-noise amplifier;

wherein the high-gain, low noise amplifier is connected to a signal processor;

wherein the at least one receiver antenna is operable to receive the transmitted signal from the target area;

wherein the signal processor is operable to detect the URE from at least one target in the target area; and wherein the underwater environment is a saltwater environment.

24. A radar system for detecting ferrous and non-ferrous metal in an underwater environment, comprising:

at least one transmitter antenna including a signal generator;

at least one receiver antenna including a signal processor;

wherein the at least one transmitter antenna and the at least one receiver antenna are powered from a shore, internal power, and/or connected to a surface of the underwater environment or near-surface of the underwater environment to a renewable power system;

wherein the at least one transmitter antenna and the at least one receiver antenna are connected to a communication system operable to provide command, control, and exfiltration of detection of at least one target in a target area;

wherein the at least one transmitter antenna is separated by sufficient distance from the at least one receiver antenna to provide electrical isolation;

wherein the at least one transmitter antenna and the at least one receiver antenna are located at a depth greater than 30 meters and are arranged to observe an ocean above the at least one transmitter antenna and the at least one receiver antenna;

wherein the at least one transmitter antenna is operable to transmit a signal including a continuous wave, a pulsed waveform, or a time-shared combination continuous wave and pulsed waveform;

wherein the radar system is operable to shift frequencies in real time; and wherein the underwater environment is a saltwater environment.

25. The system of claim 24, wherein each of the at least one of transmitter antennas are connected to signal generators configured to operate at a same frequency, wherein each of the at least one transmitter antennas are configured to operate with a multitude of different phase shifts, and wherein each of the at least one of transmitter antennas are separated from each other by about ¼ to about ½ wavelength such that the each of the at least one transmitter antennas are configured as a phased array.

26. The system of claim 25, wherein each of the at least one receiver antennas are connected to a signal processor, wherein each of the at least one receiver antennas are separated by about ¼ to about ½ the wavelength of the transmitted signal, wherein the signal processor is operable to apply a multitude of digital phase shifts to synthesize a multitude of phased array receiver antenna patterns in real-time.

27. The system of claim 26, wherein a second set of transmitter antennas are located below the at least one transmitter antenna by about ¼ to about ½ wavelength, and wherein the second set of transmitter antennas each include a signal generator configured such that a combined transmitted signal is directed towards the surface of the underwater environment.

28. The system of claim 27, wherein a second set of receiver antennas are included below the at least one receiver antenna by about ¼ to about ½ wavelength and wherein the signal processor of the at least one receiver antenna and a signal processor of the second set of receiver antennas are operable to apply a digital phase shift to a received signal to create a multitude of synthesized receiver antenna patterns directed towards the surface of the underwater environment.

29. The system of claim 28, wherein an operating depth of the radar system is greater than one kilometer below the surface of the underwater environment and capable of detecting the at least one target in the target area anywhere between the at least one transmitter antenna and/or the at least one receiver antennas and the surface of the underwater environment.

30. The system of claim 27, wherein the second set of transmitter antennas and the at least one transmitter antenna are replicated to either side of the second set of transmitter antennas or the at least one transmitter antenna such that the replication is about ¼ to about ½ wavelength apart from each other, and wherein the signal generator for each of the second set of transmitter antennas and the at least one transmitter antenna are operable to change phase such that a resulting multidimensional array creates a single phased array antenna steerable in any direction.

31. The system of claim 30, wherein the second set of receiver antennas and the at least one receiver antenna are replicated to either side of the second set of receiver antennas or the at least one receiver antenna and separated by about ¼ to about ½ wavelength creating a multidimensional phased array receiver antenna, and wherein the system is operable to include receiver phased arrays surrounding the transmitter array.

* * * * *